US008375206B2

(12) United States Patent
Asano et al.

(10) Patent No.: US 8,375,206 B2
(45) Date of Patent: *Feb. 12, 2013

(54) AUTHENTICATION AND ENCRYPTION UTILIZING COMMAND IDENTIFIERS

(75) Inventors: Tomoyuki Asano, Tokyo (JP); Yoshihito Ishibashi, Tokyo (JP); Taizo Shirai, Tokyo (JP); Toru Akishita, Chiba (JP); Masaharu Yoshimori, Tokyo (JP); Makoto Tanaka, Tokyo (JP)

(73) Assignees: Sony Corporation (JP); Sony Computer Entertainment Inc. (JP)

( * ) Notice: Subject to any disclaimer, the term of this patent is extended or adjusted under 35 U.S.C. 154(b) by 148 days.

This patent is subject to a terminal disclaimer.

(21) Appl. No.: 12/709,918

(22) Filed: Feb. 22, 2010

(65) Prior Publication Data

US 2010/0235633 A1 Sep. 16, 2010

Related U.S. Application Data

(60) Continuation of application No. 11/642,704, filed on Dec. 20, 2006, now Pat. No. 7,669,052, which is a division of application No. 10/412,771, filed on Apr. 11, 2003, now abandoned, which is a continuation of application No. 09/937,120, filed on Dec. 17, 2001, now Pat. No. 7,373,506, which is a continuation of application No. PCT/JP01/00346, filed on Jan. 19, 2001.

(30) Foreign Application Priority Data

| Jan. 21, 2000 | (JP) | P2000-013322 |
|---|---|---|
| Jan. 25, 2000 | (JP) | P2000-015551 |
| Jan. 25, 2000 | (JP) | P2000-015858 |
| Jan. 25, 2000 | (JP) | P2000-016029 |
| Jan. 25, 2000 | (JP) | P2000-016213 |
| Jan. 25, 2000 | (JP) | P2000-016251 |
| Jan. 25, 2000 | (JP) | P2000-016292 |

(51) Int. Cl.
*H04L 29/06* (2006.01)
(52) U.S. Cl. ......... 713/167; 713/160; 713/168; 713/171
(58) Field of Classification Search .................. 713/160, 713/167, 168, 171
See application file for complete search history.

(56) References Cited

U.S. PATENT DOCUMENTS
(Continued)

FOREIGN PATENT DOCUMENTS

| EA | 0 867 843 | 9/1998 |
|---|---|---|
| EP | 0 789 361 A2 | 8/1997 |

(Continued)

OTHER PUBLICATIONS

W. Ford, Computer Communications Security: Integrity Check-Values (Seals), Computer Communications Security, 1994, pp. 75-77, 116-117.

(Continued)

*Primary Examiner* — Jason Gee
(74) *Attorney, Agent, or Firm* — Lerner, David, Littenberg, Krumholz & Mentlik, LLP

(57) ABSTRACT

A data processing system, recording device, data processing method and program providing medium are provided to execute authentication processing and content storing processing between apparatuses. Program localization is employed to restrict access to program content. A plurality of key blocks store key data for authentication processing. Key block designation information is set in a recorder/reproducer, which is configured for executing authentication processing with the recording device by designating a key block. The recorder/reproducer can set a key block for each product, model or the like. In addition, data stored according to a selected key block cannot be utilized in a recorder/reproducer in which a different key block is set. Furthermore, an encryption processing controlling section of a recording device executes control in accordance with a pre-defined setting sequence. Furthermore, an illegal instrument that has not completed the authentication processing can be prevented from utilizing program content.

23 Claims, 92 Drawing Sheets

U.S. PATENT DOCUMENTS

| | | | |
|---|---|---|---|
| 5,065,429 A | 11/1991 | Lang | |
| 5,199,073 A | 3/1993 | Scott | |
| 5,396,558 A | 3/1995 | Ishiguro et al. | |
| 5,446,796 A | 8/1995 | Ishiguro et al. | |
| 5,450,489 A | 9/1995 | Ostrover et al. | |
| 5,497,418 A * | 3/1996 | Kudelski | 380/242 |
| 5,502,765 A | 3/1996 | Ishiguro et al. | |
| 5,523,641 A | 6/1996 | Yatsuda et al. | |
| 5,546,461 A | 8/1996 | Ibaraki et al. | |
| 5,625,693 A | 4/1997 | Rohatgi et al. | |
| 5,673,319 A | 9/1997 | Bellare et al. | |
| 5,680,587 A | 10/1997 | Bodo et al. | |
| 5,715,403 A | 2/1998 | Stefik | |
| 5,883,958 A | 3/1999 | Ishiguro et al. | |
| 5,915,024 A | 6/1999 | Kitaori et al. | |
| 5,917,910 A | 6/1999 | Ishiguro et al. | |
| 5,991,878 A | 11/1999 | McDonough et al. | |
| 6,011,849 A | 1/2000 | Orrin | |
| 6,021,419 A * | 2/2000 | Clarke et al. | 708/300 |
| 6,055,236 A | 4/2000 | Nessett et al. | |
| 6,058,477 A | 5/2000 | Kusakabe et al. | |
| 6,126,071 A * | 10/2000 | Yoshimura | 235/382 |
| 6,163,647 A | 12/2000 | Terashima et al. | |
| 6,226,749 B1 * | 5/2001 | Carloganu et al. | 726/2 |
| 6,253,193 B1 | 6/2001 | Ginter et al. | |
| 6,298,401 B1 | 10/2001 | Anderson | |
| 6,304,973 B1 * | 10/2001 | Williams | 726/3 |
| 6,356,753 B1 * | 3/2002 | Kolev et al. | 455/411 |
| 6,366,297 B1 * | 4/2002 | Feagans | 715/736 |
| 6,589,535 B2 | 7/2003 | Castelli et al. | |
| 6,598,161 B1 | 7/2003 | Kluttz et al. | |
| 6,859,535 B1 | 2/2005 | Tatebayashi et al. | |
| 6,896,709 B1 | 5/2005 | Han et al. | |
| 6,915,434 B1 | 7/2005 | Kuroda et al. | |
| 2001/0004736 A1 | 6/2001 | Hirano et al. | |
| 2002/0077177 A1 | 6/2002 | Elliott | |
| 2002/0176575 A1 | 11/2002 | Qawami et al. | |

FOREIGN PATENT DOCUMENTS

| | | | |
|---|---|---|---|
| EP | 0 798 892 A2 | 10/1997 | |
| EP | 0 802 535 A1 | 10/1997 | |
| EP | 0 851 418 | 7/1998 | |
| EP | 0 886 409 A2 | 12/1998 | |
| EP | 0 989 557 A1 | 7/1999 | |
| EP | 1 039 462 A2 | 9/2000 | |
| FR | 2772532 | 6/1999 | |
| FR | 2772532 A1 | 6/1999 | |
| JP | 3-151738 | 6/1991 | |
| JP | 6-162289 | 6/1994 | |
| JP | 06-289782 | 10/1994 | |
| JP | 8-248879 | 9/1996 | |
| JP | 9-106429 | 4/1997 | |
| JP | 9-121340 | 5/1997 | |
| JP | 10-3257 | 1/1998 | |
| JP | 10-65662 | 3/1998 | |
| JP | 10-126406 | 5/1998 | |
| JP | 10-164508 | 6/1998 | |
| JP | 10-187826 | 7/1998 | |
| JP | 10-283268 A1 | 10/1998 | |
| JP | 10-283280 | 10/1998 | |
| JP | 10-327142 | 12/1998 | |
| JP | 11-008618 | 1/1999 | |
| JP | 11213552 A | 8/1999 | |
| JP | 2000-181803 | 6/2000 | |
| JP | 2000-196582 | 7/2000 | |
| JP | 2000-285026 | 10/2000 | |
| JP | 2000-330870 | 11/2000 | |
| JP | 2000-341265 | 12/2000 | |
| WO | 97/43761 | 11/1997 | |
| WO | 99/38164 A1 | 7/1999 | |
| WO | 99/40702 A1 | 8/1999 | |
| WO | 99/50992 | 10/1999 | |
| WO | 99/55055 A1 | 10/1999 | |
| WO | 00/49764 A1 | 8/2000 | |

OTHER PUBLICATIONS

Eiji Okamomo, "Angou Riron Numon" (the 1st printing), Kyouritsu Shuppan K.K., Feb. 25, 1993 chapter 6; Angoukagi Haisou Kanri Houshiki to Himitsu Jouhou Bunsan Houshiki (3); Kanri Bunsan gata Kagi Haisou Houshiki, "Mutsushiin Type" deno "Taishou Kagi Sisei Housiki" pp. 118-119.

Shinichi Ikeno, et A1., "Gendai Angou Riron", (the 3rd printing), Zaidan Houjin, Denshi Jouhou Tsushin Gakkai, May 20, 1989 chapter 12, DigitA1 Shomei No. (2); Ninshoushi Shougou hou pp. 223-225.

Bloom, Jeffrey et al, "Copy Protection for DVD Video", Proceedings of the IEEE, New York, vol. 87, No. 7, Jul. 1999.

Office Action from Japanese Application No. 2002-187865, dated Apr. 20, 2010.

* cited by examiner

| |
|---|
| HEADER LENGTH |
| CONTENT LENGTH |
| FORMAT VERSION |
| FORMAT TYPE |
| CONTENT TYPE |
| OPERATION PRIORITY |
| LOCALIZATION FIELD |
| COPY PERMISSION |
| MOVE PERMISSION |
| ENCRYPTION ALGORITHM |
| ENCRYPTION MODE |
| INTEGRITY CHECK METHOD |

USAGE POLICY

FIG. 5

| Kbit | | BLOCK NUMBER |
|---|---|---|
| | BLOCK 1 | BLOCK LENGTH |
| | | ENCRYPTION FLAG |
| | | FLAG TO BE VERIFIED (ICV FLAG) |
| | | ICV1 |
| | ⋮ | ⋮ |
| | BLOCK N | BLOCK LENGTH |
| | | ENCRYPTION FLAG |
| | | ICV FLAG |
| | | CONTENT INTEGRITY CHECK VALUE (ICVN) |

BLOCK INFORMATION TABLE

FIG. 6

ISO/IEC 9798-2 MUTUAL AUTHENTICATION AND KEY SHARING METHOD USING SYMMETRICAL KEY CRYPTOGRAPHY TECHNIQUE

ISO/IEC 9798-3 MUTUAL AUTHENTICATION AND KEY SHARING METHOD USING SYMMETRICAL KEY CRYPTOGRAPHY TECHNIQUE

FIG. 19 HOW DATA ARE HELD ON RECORDING DEVICE

FIG. 22 CONTENT DOWNLOAD PROCESS

METHOD FOR GENERATING INDIVIDUAL KEY FROM MASTER KEY - (1)
[BASIC FLOW]
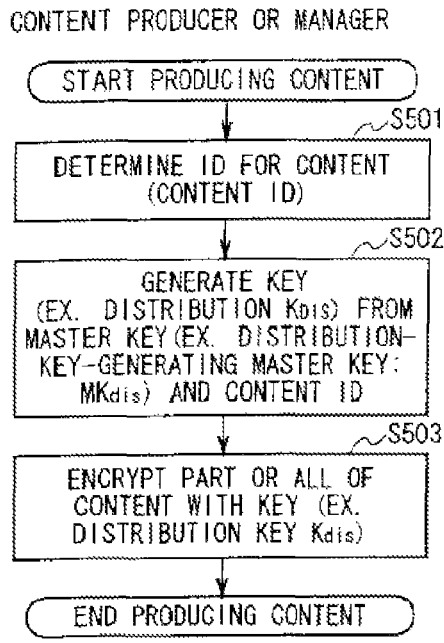
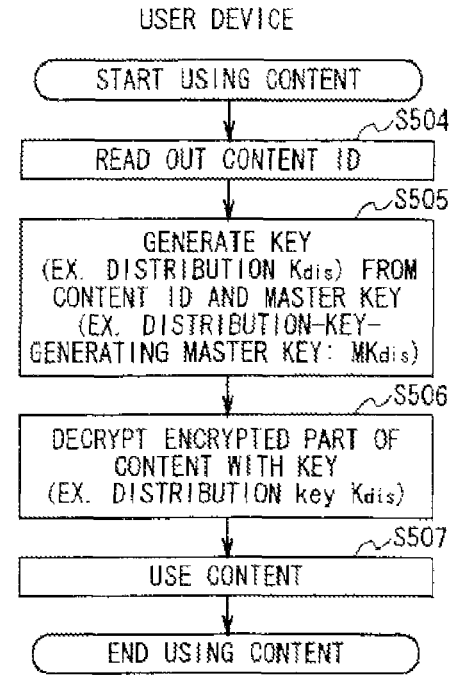
[KEY OWNER CONFIGURATION]
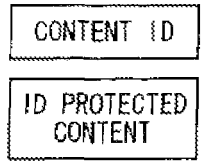
FIG. 50

METHOD FOR GENERATING INDIVIDUAL KEY FROM MASTER KEY – (3)
[BASIC FLOW]
MEDIUM PRODUCER OR MANAGER
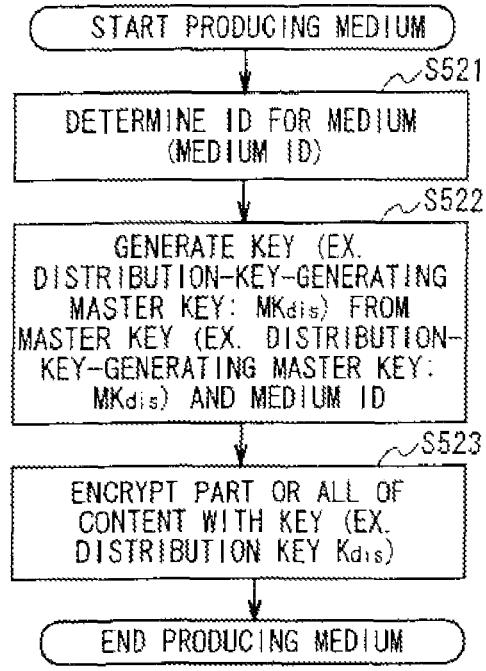
USER DEVICE
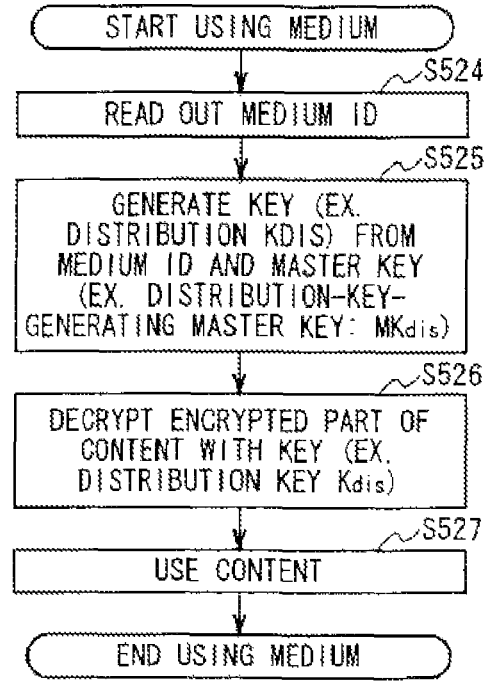
[KEY OWNER CONFIGURATION]
MEDIA CREATION OR ADMINISTRATOR
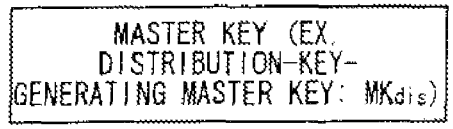
USER DEVICE
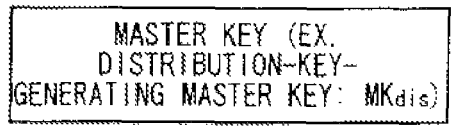
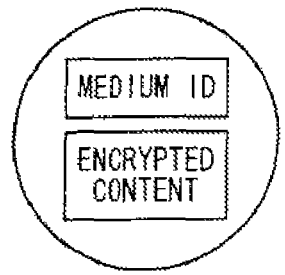
FIG. 53

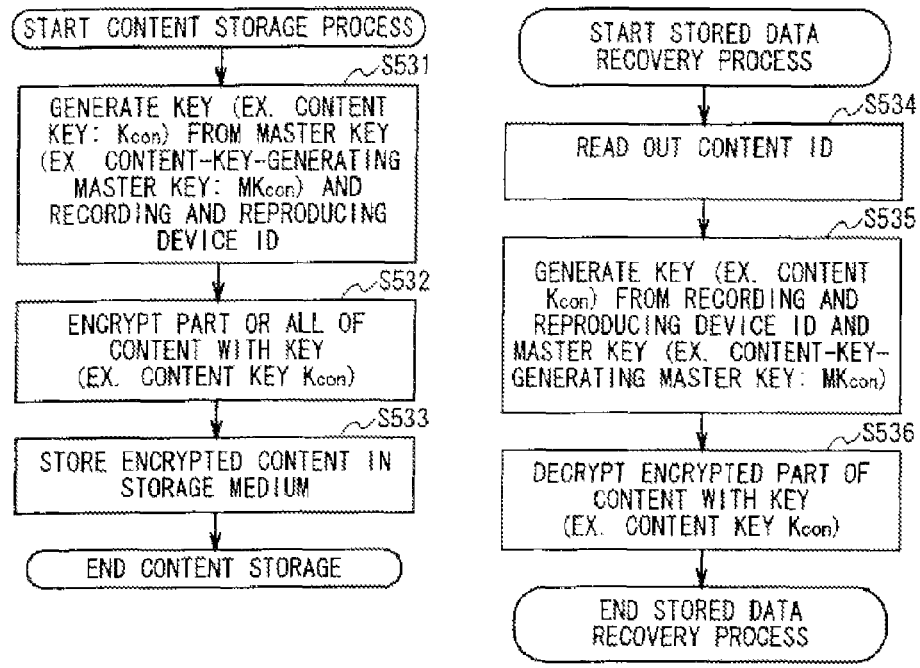
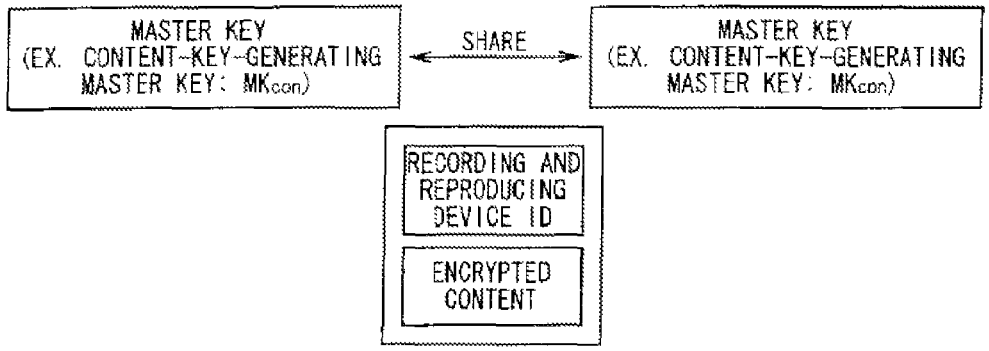
FIG. 54

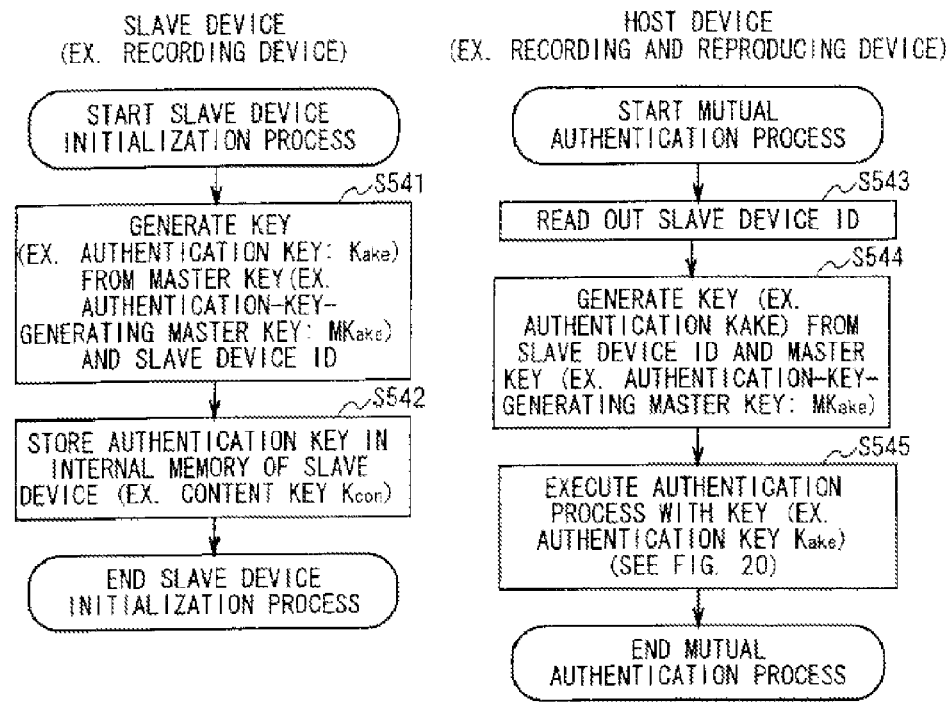
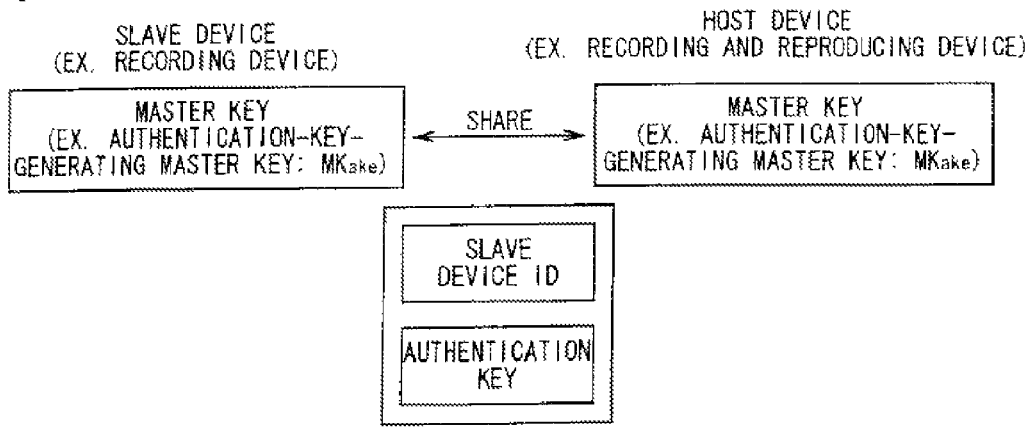
FIG. 55

DATA MANAGING FILE (1)

| DATA NUMBER | CONTENT ID (GAME ID) | RECORDING AND REPRODUCING DEVICE ID (IDDEV) | PROGRAM LOCALIZATION |
|---|---|---|---|
| 1 | 12345678... | 56789012... | YES |
| 2 | ABCDEF12... | 09876543... | YES |
| 3 | 12245678... | 58834762... | NO |
| : | : | : | : |

FIG. 71

DATA MANAGING FILE (2)

| DATA NUMBER | CONTENT ID (GAME ID) | RECORDING AND REPRODUCING DEVICE ID (IDdev) | PROGRAM LOCALIZATION |
|---|---|---|---|
| 1 | 12345678... | 56789012... | NO |
| 2 | ABCDEF12... | 09876543... | YES |
| 3 | 12245678... | 58834762... | YES |
| : | | | |

FIG. 76

DATA MANAGING FILE (3)

| DATA NUMBER | CONTENT ID (GAME ID) | RECORDING AND REPRODUCING DEVICE ID (IDdev) | PROGRAM LOCALIZATION | RECORDING AND REPRODUCING DEVICE LOCALIZATION |
|---|---|---|---|---|
| 1 | 12345678... | 56789012... | YES | NO |
| 2 | ABCDEF12... | 09876543... | YES | YES |
| 3 | 1122457678 | 58834762... | NO | YES |
| ... | ... | ... | ... | ... |

FIG. 81

DATA MANAGING FILE (4)

| DATA NUMBER | CONTENT ID (GAME ID) | RECORDING AND REPRODUCING DEVICE ID (IDdev) | USER PROGRAM LOCALIZATION |
|---|---|---|---|
| 1 | 123455678... | 56789012... | YES |
| 2 | ABCDEF12... | 09876543... | YES |
| 3 | 1122457678 | 58834762... | NO |
| ... | ... | ... | ... |

FIG. 84

AUTHENTICATION AND ENCRYPTION UTILIZING COMMAND IDENTIFIERS

CROSS REFERENCE TO RELATED APPLICATIONS

This application is a continuation of U.S. patent application Ser. No. 11/642,704, filed Dec. 20, 2006, which is a divisional of U.S. patent application Ser. No. 10/412,771, filed on Apr. 11, 2003, which is a continuation of U.S. patent application Ser. No. 09/937,120, filed Dec. 17, 2001, the entire disclosures of which are hereby incorporated by reference herein.

BACKGROUND OF THE INVENTION

The present invention relates to a data processing apparatus, and a data processing method, and more particularly, to a method and apparatus for verifying that data constituting a data content is valid, that is, checking whether or not the data has been tampered with; as well as a method for imparting verification values; and also to an apparatus and a method capable of enhancing security by generating individual keys necessary for encryption processing using master keys corresponding to their respective individual keys. Moreover the present invention provides a configuration that eliminates illegal usage of content data. More specifically, the invention relates to an apparatus and a method capable of identifying illegal reproduction devices and eliminating illegal use of content. Furthermore, the present invention relates to an apparatus and a method capable of easily setting content only available to the data processing apparatus using content data and content data also available to other data processing apparatuses based on information specific to the data processing apparatus, etc. Still further, the present invention relates to a method, apparatus and verification value assignment method for verifying the validity of data configuring data contents, that is, verifying the presence or absence of tampering.

Furthermore, the present invention relates to a data processing apparatus, a content data generating method, and a data processing method that realizes a content data configuration to provide and utilize content data under high security management. The content data is in a configuration in which data (including at least any one of voice information, image information and program data) is applied to encryption processing. The content data is provided to a content user together with various kinds of header information, and the content user performs reproduction, execution, or storing processing in a recording device.

Still further, the present invention relates to a data processing apparatus, a data processing method and a content data generating method for providing a configuration for efficiently executing reproduction processing. For instance, the data contents may be compressed voice data, image data or the like. More specifically, it enables a configuration of content data in which compressed data and an expansion processing program are combined to retrieve and extract an applicable expansion processing program based on header information of compressed data contents in which an applied expansion processing program is stored as header information to execute reproduction processing.

The present invention further relates to a configuration and method for reproducing various content such as sounds, images, games, or programs which are available through various recording media. The recording media include DVDs, CDs, wire or radio communication means such as CATV, the Internet, and satellite communication. Reproduction occurs in a recording and reproducing device of a user. The contents are stored in an exclusive recording device such as, for example, a memory card, a hard disk, or a CD-ROM. Use limitations, such as limitations selected by a content distributor, are stored along with content to provide security such that the distributed content will not be illegally used.

Various data such as game programs, sound data, image data, or documenting programs (these are hereafter referred to as "contents") are now distributed via a network such as the Internet or via distributable storage media such as DVDs or CDs. These distributed contents can be stored in a recording device such as a memory card or a hard disk that is attached to a recording and reproducing apparatus such as a personal computer (PC) or a game apparatus of a user so that once stored, the contents can be reproduced from the storage media.

The main components of a memory card used in a conventional information apparatus such as a video game apparatus or a PC include a control means for controlling operations, a connector for connection to a slot connected to the control means and formed in the information apparatus, and nonvolatile memory connected to the control means for storing data. The non-volatile memory provided in the memory card comprises, for example, an EEPROM, flash memory, or the like.

Various contents such as data or programs that are stored in the memory card are invoked from the non-volatile memory in response to a user's command from an information apparatus main body such as a game apparatus or a PC. The game apparatus or PC can be used as a reproduction apparatus or to respond to a user's command provided via a connected input means. The contents are reproduced from the information apparatus main body or from a display, speakers, or the like which are connected thereto.

Software content such as game programs, music data or image data generally have their distribution rights held by their creators or sellers. Thus, in distributing this content, a configuration is generally used which places specified limitations on the usage. That means the use of software is permitted only for regular users so as to prevent unauthorized copying or the like. In other words, security is taken into consideration.

One method for realizing limitations on the use by a user is a process for encrypting distributed content. This process comprises distributing various content such as sound data, image data, or game programs which are encrypted, for example, via the Internet, and decrypting the distributed content that has been encrypted. Decryption takes place only for people confirmed to be regular users. Distributing the various content corresponds to a configuration with a means for imparting a decryption key.

Encrypted data can be decrypted into, for example, plain text by a decryption process based on a predetermined procedure. A data encrypting and decrypting method that uses an encryption key for an information encrypting process while using a decryption key for such a decryption process is conventionally known.

There are various types of aspects of data encrypting and decrypting methods using an encryption key and a decryption key. One example is called a common key cryptosystem. The common key cryptosystem uses a common encryption key for a data encrypting process and a common decryption key for a data decrypting process and imparts these common keys for the encryption and decryption processes to regular users while excluding data access by illegal users that have no key. A representative example of this cryptosystem is the Data Encryption Standard (DES).

The encryption and decryption keys used for the encryption and decryption processes are obtained, for example, by applying a one-way function such as a hash function based on a password or the like. The one-way function makes it difficult to determine the input of the function from the output of the function. For example, a password decided by a user is used as an input to a one-way function so as to generate an encryption key and a decryption key based on the output from the one-way function. Determining the password (which is the original data for the keys) from the encryption and decryption keys is substantially impossible.

In addition, a method called a "public key cryptosystem" uses different algorithms for a process based on an encryption key used for encryption and for a process based on a decryption key used for decryption. The public key cryptosystem uses a public key available to unspecified users so that an encrypted document for a particular individual is decrypted using a public key issued by this particular user. The document encrypted with the public key can only be decrypted with a secret key corresponding to the public key used for the decryption process. Since the secret key is owned by the individual that has issued the public key, the document encrypted with the public key can be decrypted only by individuals having the secret key. A representative public key cryptosystem is the RSA (Rivest-Shamir-Adleman) encryption.

The use of such a cryptosystem enables encrypted contents to be decrypted only for regular users. A conventional content distributing configuration employing such a cryptosystem will be described with reference to FIG. 1.

FIG. 1 shows an example of a configuration in which a reproduction means 10 such as a PC or a game apparatus reproduces a program, sound or video data, or the like (content) obtained from a data providing means such as a DVD or CD 30, or the Internet 40 and wherein data obtained from the DVD or CD 30, Internet 40, or the like are stored in a storage means 20 such as a floppy disk, a memory card, a hard disk, or the like.

The content, such as a program, sound or video data, is provided to a user having the reproduction means 10. A regular user obtains encryption data as well as key data that are their encryption and decryption keys.

The reproduction means 10 has a CPU 12 to reproduce input data by means of a reproduction process section 14. The reproduction process section 14 decrypts encrypted data to reproduce content such as a provided program, sound or image data.

The regular user saves the content to the storage means 20 in order to use the provided program again. The reproduction means 10 has a storage process section 13 for executing this content storage process. The storage process section 13 encrypts and saves the data in order to prevent the data stored in the storage means 20 from being illegally used.

A content encrypting key is used to encrypt the content. The storage process section 13 uses the content encrypting key to encrypt the content and then stores the encrypted content in a storage section 21 of the storage means 20 such as a floppy disk (FD), a memory card, or a hard disk.

To obtain and reproduce the stored content from the storage means 20, the user obtains encrypted data from the storage means 20 and causes the reproduction process section 14 of the reproduction means 10 to execute the decryption process using a content decrypting key. That is, the decryption key is used in order to obtain and reproduce decrypted data from the encrypted data.

According to the conventional example of the configuration shown in FIG. 1, the stored content is encrypted in the storage means 20 (such as a floppy disk or memory card) and thus cannot be read externally. When, however, this floppy disk is to be reproduced by a reproduction means of another information apparatus, such as PC or game apparatus, the reproduction is impossible unless the reproduction means has the same content key (i.e., the same decryption key for decrypting the encrypted content). Accordingly, to implement a form available to a plurality of information apparatuses, a common decryption key must be provided to users.

The use of a common content encrypting key, however, means that there will be a higher possibility of distributing the encryption process key to users not having a regular license. Consequently, it may not be possible to prevent the illegal use of the content by users not having the regular license. Thus, it will be difficult to exclude the illegal use in PCs, game apparatuses, or the like by users who do not have the regular license.

In case that key information leaks from one of the apparatuses, the use of common content encrypting key and decryption key can cause damage to the whole system which utilizes the keys.

Furthermore, in an environment using a common key as described above, it is possible to easily copy, for example, content created on a certain PC and initially saved to a storage means such as a memory card or floppy disk, to a second floppy disk. Consequently, using the second copied floppy disk instead of the original content data will be possible so that a large number of copied content data available to information apparatuses such as game apparatuses or PCs may be created or tampered.

A method which is conventionally used includes verifying an integrity check value in content data to check the validity of the data. That is, in order to determine whether or not the data have been tampered with, a recording and reproducing device collates an integrity check value (generated based on the data to be verified) with the integrity check value contained in the content data to verify the data.

The integrity check value for the data content, however, is generally generated for the entire set of data. Collating the integrity check value generated for the entire set of data requires a integrity check value to be generated for the entire set of data to be checked. If, for example, a integrity check value (ICV) is to be determined using a Message Authentication Code (MAC) generated in a DES-CBC (Cipher Block Chaining) mode, the DES CBC process must be executed on the entire set of data. The amount of such calculations increases linearly with the data length, thereby disadvantageously reducing processing efficiency.

SUMMARY OF THE INVENTION

The present invention solves the above problems with the conventional art. The present invention provides, as a first object of the invention, a data processing apparatus and method and a data verifying value imparting method, which efficiently confirms the validity of data and efficiently executes a download process for a recording device. The download process is executed after the verification. A reproduction process is also executed after the verification along with other processes. A program providing medium for use in this apparatus and these methods is also presented.

Furthermore, as techniques for limiting the use of content data to authorized users, various kinds of encryption processing are available, such as data encryption, data decryption, data verification and signature processing. However, executing these kinds of encryption processing requires common secret information. For example, common secret information is used in key information applied to encryption and decryption of content data, or to an authentication key used for authentication shared between two apparatuses (i.e., apparatuses between which content data is transferred or apparatuses between which authentication processing is executed).

Therefore, in the case where key data (which is shared secret information), is leaked from either of the two apparatuses, the content encryption data (using the shared key information) can also be decrypted by a third party who has no license, thus allowing illegal use of contents. The same is true for the case where an authentication key is leaked This can lead to establishing an authentication for an apparatus with no license. Leakage of keys, therefore, has consequences that threat the entire system.

The present invention is intended to solve these problems.

The second object of the invention is to provide a data processing apparatus, data processing system and data processing method with enhanced security in encryption processing. The data processing apparatus of the present invention does not store individual keys necessary to execute encryption processing such as data encryption, data decryption, data verification, authentication processing and signature processing in a storage section. Instead, the data processing apparatus stores master keys to generate these individual keys. The master keys are stored in the storage section and allows an encryption processing section to generate necessary individual keys based on the master keys and identification data of the apparatus or data.

Furthermore, it is possible to maintain a certain degree of security by supplying data encrypted content. However, in the case where various encryption keys stored in memory are read and leaked through illegal reading of memory, key data, etc. and copied on a recorder/reproducer without any authorized license, contents may be illegally used using the copied key information.

It is a third object of the present invention to provide a data processing apparatus, data processing method and content data generation method in a configuration capable of excluding such illegal reproducers. That is, a configuration that is capable of identifying illegal reproducers and not allowing the identified illegal reproducers to execute processing such as reproduction and downloading of content data.

Furthermore, techniques for limiting the use of content data to authorized users include encryption processing using predetermined encryption keys, for example, signature processing. However, conventional encryption using signature processing generally has a signature key common to all entities using the content in a system. Such a common signature key allows different apparatuses to use common content. This can lead to illegal copies of contents.

It is possible to store encrypted contents using a unique password, etc., but the password may be stolen. It is also possible to decrypt the same encrypted data content by entering the same password through different reproducers. However, it is difficult for a conventional security configuration to implement a system that can identify a reproducer that only allows the reproducer to use the contents.

The present invention has been implemented to solve the above problems of the prior art. It is a fourth object of the present invention to provide a data processing apparatus and data processing method capable of allowing only a specific data processing apparatus to reproduce contents according to contents utilization restrictions. This is done by making it possible to selectively use both an apparatus-specific key, which is specific to a data processing apparatus, and a system common key, which is common to other data processing apparatuses.

Furthermore, encryption processing of content data is used as a method of limiting utilization of content data to only authorized users. However, there are various kinds of content data, such as voice information, image information and program data. There are various kinds of content in cases such as (a) where all content data is required to be encrypted, and (b) where a part requiring encryption processing and a part not requiring encryption processing are mixed.

Applying encryption processing uniformly to various content may generate unnecessary decryption processing in reproduction processing of the contents. It may also generate unfavorable situations in terms of processing efficiency and processing speed. For example, for data such as music data in which real time reproduction is essential, it is desirable to have a content data structure that can apply decryption processing in high speed processing.

The present invention solves such problems. It is a fifth object of the present invention to provide a data processing apparatus, a content data generating method and a data processing method to apply various data structures corresponding to types of content data to specific content. In other words, various different data formats are provided corresponding to the content. This enables generation and processing of content data in a manner that has high security and easy to utilize in reproduction, execution and the like.

Furthermore, voice data, image data and the like that are decrypted are then output to an AV output section to be reproduced. Nowadays, often times, content is compressed and stored in a storage medium or distributed. It is therefore necessary to expand the compressed data before reproducing it. For example, if voice data is compressed in the MP-3 format, the voice data will be decrypted by a MP3 decoder. If content data is image data which is compressed in the MP-3 format, the voice data is expanded by a MPEG2 decoder to be output.

However, as there are various kinds of compression processing and expansion processing programs, even if compressed data is provided from a content provider via a medium or a network, it can be impossible to reproduce the data with a reproducing apparatus that does not have a compatible expansion program.

It is a sixth object of the present invention to provide a configuration for efficiently executing reproduction processing of compressed data. That is, a data processing apparatus, a data processing method and a content data generating method for efficiently executing reproduction processing are presented in the case in which the content is compressed voice data, image data or the like.

The foregoing objects and other objects of the invention have been achieved by providing a data processing apparatus and a data processing method.

In accordance with an embodiment of the present invention, a data record reproducing player is provided. The data record reproducing player is capable of reproducing program content. It comprises a recording device, an encryption processing unit, an input unit and a control unit. The recording device is operable to record save data of the program content. The encryption processing unit is operable to execute an encryption process and a decryption process on the save data. The encryption processing unit employs a cryptographic key for executing the encryption process and the decryption process. The input unit is operable to enter a program localization on the save data, wherein the program localization is maintained in a data management file. The control unit is capable of accessing the data management file and is operable to determine an encryption processing method and a decryption processing method for the save data. The encryption processing method is capable of using the cryptographic key and is determined according to the program localization. The encryption processing method is adapted for storing the save data in the recording device. The decryption processing method is determined according to the program localization and is adapted for reproducing the cryptographic key.

In an example, the program content includes an identifier and the program localization is a program restriction that enables use of the save data depending on the identifier. The data management file is structured as a table for storing the program restriction depending upon the identifier. In this example, if the program restriction provides for restriction of the program content, the encryption processing unit executes the encryption processing method or the decryption processing method on the save data using a save data encryption key of the program content. In this case, the save data encryption key is based on at least one of an individual encryption key or individual information of the program content. If the program restriction provides for no restriction of the program content, the encryption processing unit executes the encryption processing method or the decryption processing method on the save data using at least one of a system-shared encryption key and a system save data encryption key. The system save data encryption key is based on the system-shared encryption key. The system-shared encryption key is stored in the data record reproducing player. In this example, the individual encryption key is preferably a content key Kcon that is capable of being stored in a header portion of content data, and the system-shared encryption key is a system signature key Ksys that is capable of being stored in a plurality of different data record reproducing players.

In another example, the data record reproducing player further comprises identity information. In this example, the program localization is a record reproducing player restriction that enables use of the save data depending on the identity information. The data management file is structured as a table for storing the record reproducing player restriction in correspondence with an identifier of the program content. In this example, if the record reproducing player restriction provides for restriction of a record reproducing player, the encryption processing unit executes the encryption processing method or the decryption processing method on the save data using a save data encryption key of the record reproducing player. The save data encryption key is based on at least one of an individual encryption key of the data record reproducing player and individual information. If the record reproducing player restriction provides for no restriction of the record reproducing player, the encryption processing unit executes the encryption processing method or the decryption processing method on the save data using at least one of a system-shared encryption key and a shared save data encryption key. The shared save data encryption key is based on the system-shared encryption key. The system-shared encryption key is stored in the data record reproducing player. In this example, the individual encryption key is preferably an individual signature key Kdev that is capable of being stored in the data record reproducing player, and the system-shared encryption key is a system signature key Ksys that is capable of being stored in a plurality of specific data record reproducing players.

In a further example, the program content includes an identifier and the program localization is a user restriction that enables use of the save data depending on a user's identity. In this example, the data management file is structured as a table for storing the user restriction depending upon the identifier. If the user restriction provides for restriction of the user, the encryption processing unit executes the encryption processing method or the decryption processing method on the save data using a user save data encryption key. The user save data encryption key is based on a password received by the input unit. If the user restriction provides for no restriction of the user, the encryption processing unit executes the encryption processing method or the decryption processing method on the save data using at least one of a system-shared encryption key and a shared save data encryption key. The shared save data encryption key is based on the system-shared encryption key. The system-shared encryption key is stored in the data record reproducing player. In this example, the system-shared encryption key is preferably a system signature key Ksys that is capable of being stored in a plurality of record reproducing players.

In accordance with another embodiment of the present invention, a save data processing method for use in a data record reproducing player is provided. The method is capable of reproducing program content. The method comprises obtaining an input of program localization and determining an encryption processing mode for storing save data into a recording device according to the program localization. An encryption key is selected according to the encryption processing mode. Also, encryption processing is executed on the save data using the encryption key.

In an example, the program content includes an identifier and the program localization is a program restriction that enables use of the save data depending on the identifier. In this example, if the program restriction provides for restriction of the program content, the encryption key is selected from one of an individual encryption key and a save data encryption key. The save data encryption key is based on at least one of the individual encryption key and individual information. If the program restriction provides for no restriction of the program content, the encryption key is selected from one of a system-shared encryption key and a shared save data encryption key. The shared save data encryption key is based the system-shared encryption key. The system-shared encryption key is stored in the data record reproducing player.

In another example, the data record reproducing player includes identity information, and the program localization is a record reproducing player restriction that enables use of the save data depending on the identity information. In this example, if the record reproducing player restriction provides for restriction of a record reproducing player, the encryption key is selected from one of an individual encryption key of the data record reproducing player and an individual save data encryption key of the record reproducing player. The individual save data encryption key is based on at least one of the individual encryption key and individual information. If the record reproducing player restriction provides for no restriction of the record reproducing player, the encryption key is selected from one of a system-shared encryption key and a shared save data encryption key. The shared save data encryption key is based on the system-shared encryption key. The system-shared encryption key is stored in the data record reproducing player.

In a further example, the program localization is a user restriction that enables use of the save data depending on a user's identity. In this example, if the user restriction provides for restriction of the user, the encryption key is selected from one of a password and an individual save data encryption key. The individual save data encryption key is based on the password. If the user restriction provides for no restriction of the user, the encryption key is selected from one of a system-shared encryption key and a shared save data encryption key. The shared save data encryption key is based on the system-shared encryption key. The system-shared encryption key is stored in the data record reproducing player.

In accordance with yet another embodiment of the present invention, a save data processing method for use in a data record reproducing player is provided. The data record reproducing player is capable of reproducing program content. In the method, a decryption processing mode is determined for reproducing save data according to a program localization. The program localization is provided as a data management file. The save data is retrieved from a recording device. A decryption key is selected according to the decryption processing mode, and decryption processing is executed on the save data using the decryption key.

In an example of this embodiment, the program content includes an identifier, and the program localization is a program restriction that enables use of the save data depending on the identifier. Furthermore, if said program restriction provides for restriction of the program content, the decryption key is selected from an individual decryption key and a save data decryption key. The save data decryption key is based on at least one of the individual decryption key and individual information. If the program restriction provides for no restriction of the program content, the decryption key is selected from one of a system-shared decryption key and a shared save data decryption key. The shared save data decryption key is based on the system-shared decryption key. The system-shared decryption key is stored in the data record reproducing player.

In another example of this embodiment, the data record reproducing player includes identity information, and the program localization is a record reproducing player restriction that enables use of the save data depending on the identity information. In this example, if the record reproducing player restriction provides for restriction of a record reproducing player, the decryption key is selected from one of an individual decryption key of the data record reproducing player and an individual save data decryption key of the record reproducing player. The individual save data decryption key is based on at least one of the individual decryption key and individual information. If the record reproducing player restriction provides for no restriction of the record reproduction player, the decryption key is selected from one of a system-shared decryption key and a shared save data decryption key. The shared save data decryption key is based on the system-shared decryption key. The system-shared decryption key is stored in the data record reproducing player.

In a further example of this embodiment, the program localization is a user restriction that enables use of the save data depending on a user's identity. If the user restriction provides for restriction of the user, the decryption key is selected from one of a password and an individual save data decryption key. The individual save data decryption key is based on said password. If the user restriction provides for no restriction of the user, the decryption key is selected from one of a system-shared decryption key and a shared save data decryption key. The shared save data decryption key is based on the system-shared decryption key. The system-shared decryption key is stored in the data record reproducing player.

In accordance with a further embodiment of the present invention, a recording medium recorded with a computer program is provided. The computer program is capable of executing a save data process having certain actions to perform in a data record reproducing player. The data record reproducing player is capable of reproducing program content on a computer system. The actions include determining an encryption processing mode according to a program localization obtained from an input unit. The encryption processing mode is adapted for storing save data into a recording device. An encryption key is selected according to the encryption processing mode. Encryption processing is executed on the save data using the encryption key.

In accordance with yet another embodiment of the present invention, a recording medium recorded with a computer program is provided. The computer program is capable of executing a save data process having certain actions to perform in a data record reproducing player. The data record reproducing player is capable of reproducing program content on a computer system. The actions include determining a decryption processing mode according to a program localization stored in a data management file. The decryption processing mode is adapted to reproduce save data retrieved from a recording device. A decryption key is selected according to the decryption processing mode. Decryption processing is executed on the data using the decryption key.

In accordance with another embodiment of the present invention, a data processing system is provided. The system comprises a recording device and a recorder/reproducer. The recording device has a data storing section for storing content data and a plurality of key blocks for storing key data applicable to authentication processing. The key data in each one of the plurality of key blocks is distinct to that key block. The recorder/reproducer is operable to perform the authentication processing with the recording device, to designate a first key block out of the plurality of key blocks, and to execute the authentication processing with the recording device based on the key data stored in the first key block. Transfer of the content data between the recorder/reproducer and the recording device is enabled when the authentication processing is successful. Preferably, the key data in each of the plurality of key blocks includes an authentication key.

In an example of this embodiment, the recorder/reproducer includes setting information in which one key block of the plurality of key blocks is capable of being applied to the authentication processing as a designated key block. The setting information is stored in a memory in the recorder/reproducer. When the authentication processing is performed between the recorder/reproducer and the recording device, the recorder/reproducer determines the designated key block based on the setting information. Preferably, the setting information is different for each of a plurality of product units.

In another example of this embodiment, the recorder/reproducer includes a memory for storing the key data. In this example, authentication of the key data stored in the memory is only established using the key data in a selected key block in the recording device.

In yet another example of this embodiment, the data processing system further comprises a memory in the recorder/reproducer, a master key Mkake, and an authentication key Kake. The master key Mkake is stored in the recorder/reproducer memory. The authentication key Kake is generated based on the master key Mkake, wherein authentication of the authentication key Kake is only established in the authentication processing using the key data in a selected key block in the recorder/reproducer. In this example, the data processing system preferably further comprises a memory in said recording device and recording device identification information IDmem stored in the recording device. In such a case, the recorder/reproducer is operable to generate the authentication key Kake by encryption processing of the recording device identification information IDmem based on the master key Mkake, and to perform the authentication processing with the selected key block of the recording device using the authentication key Kake. The authentication key Kake is preferably a plurality of distinct authentication keys Kake each associated with one of the plurality of key blocks.

In a further example of this embodiment, the recorder/reproducer includes a data storage section for storing storage data. In this example, each key block of the recording device includes recording device identifier information, an authentication key, a random number generation key and a storing key. The recording device identifier information contains specific information about the recording device. The authentication key is adapted for use in the authentication processing. The random number generation key is adapted for use in the authentication processing. The storing key is adapted for use in encryption processing of the storage data.

In this example, the storing key preferably includes a plurality of distinct storing keys each stored in one of the plurality of key blocks. The plurality of distinct storing keys is capable of use in the encryption processing of the storage data. Also, the recording device is operable to execute key exchange processing of the plurality of distinct storing keys, and, if a data utilization request is received by the recording device, the recording device is operable to output encryption data using a key that is different from the plurality of distinct storing keys.

In another example of this embodiment, the recording device further includes an encryption processing section operable to select the first key block in accordance with key block designation information received from the recorder/reproducer, and to execute the authentication processing with the recorder/reproducer using the key data in the first key block. Preferably, the encryption processing section of the recording device is operable to execute encryption processing using the key data in the first key block.

In yet another example of this embodiment, the data processing system further comprises a plurality of designatable key blocks in the recording device. At least one of the designatable key blocks is configured as a commonly designatable key block that is designatable in recorder/reproducers other than the recorder/reproducer.

In accordance with a further embodiment of the present invention, a recording device is provided, which comprises a data storage section and a plurality of key blocks. The data storage section stores content data transferable to and from an external apparatus. The plurality of key blocks stores key data. The key data is applicable to authentication processing between the recording device and the external apparatus, wherein the key data is operable to store information for each of the plurality of key blocks. Preferably, each of the plurality of key blocks includes a unique authentication key for use with the authentication processing, and each unique authentication key is configured as the key data.

In an example of this embodiment, the recording device further comprises a memory and a distinct authentication key Kake. The memory is for storing recording device identification information IDmem. The distinct authentication key Kake is for each of the plurality of key blocks. Each of the distinct authentication keys Kake is stored in one of the plurality of key blocks.

In another example of this embodiment, each of said plurality of key blocks includes recording device identifier information, an authentication key, a random number generation key and a storing key. The recording device identifier information contains specific information about the recording device. The authentication key is adapted for use in the authentication processing. The random number generation key is adapted for use in the authentication processing. The storing key is adapted for use in encryption processing of storage data in the data storage section.

In this example, the storing key preferably includes distinct key data that is different for each of the plurality of key blocks. The storing key is usable in the encryption processing. Furthermore, the recording device is preferably operable to execute key exchange processing of the storing key, and, if a data utilization request is received by the recording device, he recording device is preferably operable to output encryption data using a key that is different from the storing key.

In a further example of this embodiment, the recording device further includes an encryption processing section. The encryption processing section is operable to select a specific key block from the plurality of key blocks in accordance with key block designation information received from the external apparatus. The encryption processing section is also able to execute the authentication processing using the key data in the specific key block. The encryption processing section is preferably operable to execute encryption processing using the key data in the specific key block.

In accordance with another embodiment of the present invention, a data processing method is provided for use in a data processing system. The data processing system includes a recorder/reproducer and a recording device operable to transmit encryption data to each other. The data processing method comprises designating in the recorder/reproducer a selected key block out of a plurality of key blocks held by he recording device and executing authentication processing between the recorder/reproducer and the recording device based on key data stored in the selected key block. Preferably, each of the plurality of key blocks includes an authentication key for use in the authentication processing, and the authentication key of each of the plurality of key blocks is configured as distinct key data. Alternatively, the authentication processing step includes designating the selected key block based on setting information held in a memory in the recorder/reproducer.

In an example, the embodiment further comprises storing a master key Mkake for a recording device authentication key in a memory in the recorder/reproducer. This example also includes generating an authentication key Kake based on the master key Mkake for use in the authentication processing. In this example, the recording device preferably includes a memory for storing recording device identification information IDmem, and each of the plurality of key blocks stores the authentication key Kake. The authentication key Kake is distinct for each key block. Furthermore, the data processing method preferably further includes executing encryption processing of the recording device identification information IDmem based on the master key Mkake to generate the authentication key Kake.

In another example, the selected key block is preferably designated in accordance with key block designation information received from the recorder/reproducer.

In yet another example, the method further comprises executing encryption processing in the recording device using the key data in the selected key block. In this example, the selected key block is selected in accordance with key block designation information received from the recorder/reproducer, and the encryption processing is executed during data storing processing and during data transfer processing of content data in a data storing section of the recording device.

In a further example, the recording device further includes a data storage section, and each of the plurality of key blocks of the recording device includes a storing key used in encryption processing of the stored in the data storage section. In this example, the method further comprises executing key exchange processing of the storing key in the recording device. If a data utilization request that is encrypted by the storing key is received from outside the recording device, the encryption data is output by a key different from the storing key to outside the recording device.

In accordance with yet another embodiment of the present invention, a recording medium recorded with a computer program is provided. The computer program is for executing data processing in a data processing system, which includes a recorder/reproducer and a recording device operable to transmit encryption data to each other. The data processing comprises designating in the recorder/reproducer a selected key block out of a plurality of key blocks held by the recording device and executing authentication processing between the recorder/reproducer and the recording device based on key data stored in the selected key block.

In accordance with a further embodiment of the present invention, a data processing system is provided. The system is operable to transmit encryption data, and comprises a first apparatus and a second apparatus. The first apparatus has a command identifier. The second apparatus has an encryption processing section that is capable of executing encryption processing on data transmitted to and from the first apparatus. The encryption processing section including a control section operable to receive the command identifier in accordance with a pre-defined setting sequence and to retrieve a command from a register. The command corresponds to the command identifier. The control section is also operable to have the command executed. In this embodiment, if the command identifier differs from the predefined setting sequence, the control section is operable to cancel execution of the command.

In an example of this embodiment, the pre-defined setting sequence is a command number setting sequence in which numbers are sequentially incremented. The control section is thus operable to store a value of the command identifier received from the first apparatus in a memory. It is also operable to determine coincidence of a new command identifier received from the first apparatus with the pre-defined setting sequence based on the received value stored in the memory. If the new command identifier is different from the pre-defined setting sequence, the control section is operable to reset the command identifier stored in the memory without performing command processing corresponding to the new command identifier.

In another example of this embodiment, the data processing system further comprises a command register, an authentication processing command sequence, an encryption processing command sequence, and a sequence. The command register is within the second apparatus, and is for storing the command in accordance with the pre-defined setting sequence. The authentication processing command sequence is for executing authentication processing between the first apparatus and the second apparatus. The encryption processing command sequence is for executing the encryption processing. The sequence is set such that an authentication command identifier corresponding to the authentication processing command sequence is executed prior to a command sequence corresponding to the encryption processing command sequence.

In this example, the encryption processing command sequence preferably includes at least one of encryption key exchange processing for encryption data transferred from the first apparatus to the second apparatus and stored in a storage unit in said second apparatus, and encryption key exchange processing for the encryption data stored in the storage unit in the second apparatus and transferred from the second apparatus to the first apparatus. More preferably the control section is operable to manage an order of command execution based on the pre-defined setting sequence and the command identifier in the encryption key exchange processing. In this case, when the command processing is different from the pre-defined setting sequence, the control section does not accept command processing from an external apparatus, including the first apparatus, during command execution relating to the encryption key exchange processing.

Alternatively in this example, if authentication is established between the first apparatus and the second apparatus, the control section is operable to perform certain operations. The operations include setting an authentication flag indicating that the authentication processing is finished. The operations also include executing command management control to enable execution of the encryption processing command sequence during setting of the authentication flag. The operations further include resetting the authentication flag when repeating the authentication processing command sequence.

In a further example of this embodiment, the second apparatus is a storage device having a data storage section for storing the encryption data. Also in this example, the first apparatus is a recorder/reproducer for storing data in the storage device and for retrieving the data stored in the storage device to reproduce and execute the data. The recorder/reproducer includes an encryption processing section for executing the encryption processing of the transmission data with the storage device.

In this example, the storage device preferably includes a key block for storing an authentication key and a storing key. The authentication key is usable in authentication processing between the recorder/reproducer and the storage device. The storing key is usable as an encryption key for the encryption data stored in the data storing section of the storage device. The control section is operable to receive a command identifier from the recorder/reproducer, to execute authentication processing using the authentication key in accordance with the pre-defined setting sequence, and, after completing the authentication processing, to execute the encryption processing of data accompanying key exchange processing using the storing key.

More preferably, the key block includes a plurality of key blocks each storing the authentication key and the storing key. In this case, the authentication key is different from the storing key. The recorder/reproducer is operable to notify the storage device of one key block as a designated key block out of the plurality of key blocks. The designated key block is used in the authentication processing and the encryption processing. The storage device is operable to execute the authentication processing using the authentication key stored in the designated key block and to execute the encryption processing of the data using the storing key in the designated key block.

In accordance with another embodiment of the present invention, a recording device is provided. The recording device comprises a data storage section and an encryption processing section. The data storage section is operable to store content data that is transferable to an external apparatus. The encryption processing section is operable to execute encryption processing of transmission data with the external apparatus. The encryption processing section includes a control section operable to receive a command identifier transferred from the external apparatus in accordance with a setting sequence and to retrieve a command from a register. The command corresponds to the command identifier. The control section is also operable to have the command executed. If the command identifier differs from the setting sequence, the control section is operable to cancel processing of the command.

Preferably, the control section further includes a command number setting sequence in which numbers are sequentially incremented as the setting sequence. Also, the control section is preferably further operable to perform certain functions. A function is to store a received value of the command identifier in a memory. Another function is to determine coincidence of a new command identifier received from the external apparatus with the setting sequence based on the received value. If it is determined that the new command identifier is different from the setting sequence, another function is to reset the received value stored in the memory without performing command processing corresponding to the new command identifier.

In an example, this embodiment further comprises a command register, an authentication processing command sequence, an encryption processing command sequence and a sequence. The command register is for storing the command in accordance with the setting sequence. The authentication processing command sequence is for executing authentication processing between the external apparatus and the recording device. The encryption processing command sequence is for executing the encryption processing relating to transferred data between the external apparatus and the recording device. The sequence is set such that the command identifier corresponding to the authentication processing command sequence is executed prior to a command sequence corresponding to the encryption processing command sequence.

In this example, the encryption processing command sequence preferably includes at least one of encryption key exchange processing for encryption data transferred from the external apparatus to the recording device and stored in a storage unit in the recording device, and encryption key exchange processing for the encryption data stored in the storage unit and transferred from the recording device to the external apparatus. More preferably, the control section is operable to manage an order of command execution based on the setting sequence and the command identifier in the encryption key exchange processing. Here, the control section does not accept command processing from the external apparatus during the command execution relating to the encryption key exchange processing when the command processing is different from the setting sequence.

Alternatively in this example, the control section is operable to perform certain operations. An operation is to set an authentication flag. Another operation is to execute command management control. Yet another operation is to reset the authentication flag when repeating the authentication processing command sequence. If authentication is established between the external apparatus and the recording device, the authentication flag is set to indicate that the authentication processing is finished. The command management control enables execution of the encryption processing command sequence during setting of the authentication flag.

In yet another example, the recording device further comprises a key block. The key block is for storing an authentication key and a storing key. The authentication key is usable in authentication processing between the external apparatus and the recording device. The storing key is usable as an encryption key for the data stored in the data storage section. In this example, the control section is operable to receive the command identifier from the external apparatus, to execute the authentication processing using the authentication key, and after completing the authentication processing, to execute the encryption processing of data accompanying key exchange processing using the storing key.

In this example, the key block preferably includes a plurality of key blocks, which each store the authentication key and the storing key. In this case, the external apparatus is operable to notify the recording device of one key block out of the plurality of key blocks. The one key block is a designated key block used in authentication processing and encryption processing of selected data. The recording device is operable to execute the authentication processing using the authentication key stored in the designated key block to execute the encryption processing using the storing key in the designated key block.

In accordance with a further embodiment of the present invention, a data processing method is provided for use in a data processing system. The system has a first apparatus and a second apparatus operable to transmit encryption data to each other. The method comprises executing command processing control in the second apparatus for receiving a command identifier in accordance with a setting sequence. The command identifier is transferred from the first apparatus. The method also comprises retrieving a command corresponding to the command identifier from a register. The method further comprises processing the command. If the command identifier is different from the setting sequence, the method also comprises canceling the processing of the command.

In an example of this embodiment, the setting sequence is a command number setting sequence in which numbers are sequentially incremented. Also, the command processing control includes storing a receiving value of the command identifier in a memory and determining coincidence of a new command identifier received from the first apparatus with the setting sequence based on the receiving value. If the new command identifier is different from the setting sequence, the receiving value stored in the memory is reset without performing command processing corresponding to the new command identifier.

In another example of this embodiment, the command processing control includes executing an authentication processing command sequence for executing authentication processing between the first apparatus and the second apparatus. This example also includes executing an encryption processing command sequence for executing encryption processing relating to transferred data between the first apparatus and the second apparatus. The setting sequence is a sequence for executing the authentication processing command sequence prior to the encryption processing command sequence.

In this example, the encryption processing command sequence preferably includes at least one of encryption key exchange processing for encryption data transferred from the first apparatus to the second apparatus and stored in a storage unit in the second apparatus, and encryption key exchange processing for the encryption data stored in the storage unit in the second apparatus and transferred from the second apparatus to the first apparatus. More preferably, the command processing control includes additional actions. During processing of a series of commands relating to the encryption key exchange processing, an action includes managing an order of command processing based on the setting sequence and the command identifier. Another action includes not accepting command processing from an external apparatus when the command processing is different from the setting sequence.

Alternatively, if authentication is established between the first apparatus and the second apparatus, this example further includes setting an authentication flag indicating that the authentication processing is finished. The example also further includes executing command management control during the command processing control to enable execution of the encryption processing command sequence when setting the authentication flag. In this case, the method preferably further includes resetting the authentication flag when executing a new authentication processing command sequence.

In accordance with yet another embodiment of the present invention, a recording medium recorded with a computer program is provided. The computer program is for executing data processing having certain actions in a data processing system. The system includes a first apparatus and a second apparatus operable to transmit encryption data to each other. An action is receiving a command identifier that is transferred from the first apparatus to the second apparatus in accordance with a setting sequence. Another action is retrieving a command corresponding to the command identifier from a register. A further action is processing the command. If the command identifier is different from the setting sequence, another action is canceling the processing of the command.

Other objects, features, and advantages of the present invention will be seen from the detailed explanation based on the embodiment and attached drawings of the present invention described later.

As described above, according to the data processing apparatus and method and data-verifying-value-imparting method of the present invention, partial integrity check values generated as integrity check values for a partial data set containing one or more partial data obtained by dividing content data into a plurality of pieces are used for a collation process to verify the partial data, and a partial-integrity-check-value-verifying integrity check values used to verify a partial integrity check value set comprising a combination of a plurality of partial integrity check values are used for a collation process to verify the entirety of a plurality of partial data sets corresponding to a plurality of partial integrity check values constituting a partial integrity check value set. Consequently, compared to a configuration for imparting a single integrity check value to the entire content data, partial verification is achieved and the entire verification process is efficient due to the use of the partial integrity check values.

Further, according to the data processing apparatus and method and data-verifying-value-imparting method of the present invention, the verification process can be executed depending on how content data are used, for example, whether the data are to be downloaded or reproduced; for example, a verification process for a data portion that is unlikely to be tampered can be omitted. Therefore, efficient verification is achieved depending on how data is used.

Furthermore, the data processing apparatus and data processing method of the present invention are configured in such a way that individual keys necessary to execute encryption processing such as data encryption, data decryption, data verification, authentication processing and signature processing are not stored in a storage section, master keys to generate these individual keys are stored in the storage section instead, the encryption processing section of the data processing apparatus extracts the master keys corresponding to these individual keys such as encryption keys and authentication keys from the storage section as required, executes encryption processing applying a DES algorithm, etc. based on the extracted master keys and identification data of the apparatus or data and generates individual keys such as an encryption key and authentication key, and therefore the present invention eliminates the possibility of the individual keys themselves leaking from the storage section and enhances the security of an encryption processing system because acquiring the individual keys will require a plurality of information pieces such as information of both individual key generation algorithm and master keys, identification data of the apparatus or data. Moreover, even if an individual key is leaked for some reasons, the range of damage is limited to the range of the individual key, which will not lead to collapse of the entire system.

Furthermore, the data processing apparatus, data processing system and data processing method of the present invention is configured in such a way that individual keys are sequentially generated based on the identification data of the apparatus or data, which eliminates the need to maintain the list of keys applied to individual apparatuses in a control apparatus, facilitating system control as well as enhancing the security.

Furthermore, according to the data processing apparatus, data processing method and contents data generation method of the present invention, illegal device identification data information is stored in contents data, collation between an illegal device list and the recorder/reproducer identifier of the recorder/reproducer attempting to use the contents is executed prior to the use of the contents by the recorder/reproducer, and in the case where the collation result shows that some entries of the illegal device list match the recorder/reproducer identifier, the subsequent processing, for example, contents data decryption, downloading or reproduction processing, etc. is stopped, thus making it possible to prevent a reproducer, etc. that has illegally acquired a key from illegally using contents.

Furthermore, the data processing apparatus, data processing method and contents data generation method of the present invention adopt a configuration allowing the contents data to include check values together for the illegal device list in the content data, making it possible to prevent tampering of the list itself and provide a contents data utilization configuration with enhanced security.

Furthermore, the data processing apparatus and data processing method of the present invention allows a data processing apparatus such as a recorder/reproducer and PC to store an apparatus-specific key, which is specific to the data processing apparatus and a system common key, which is common to other data processing apparatuses using contents data, making it possible to process contents according to contents utilization restrictions. The data processing apparatus selectively uses these two keys according to contents utilization restrictions. For example, in the case where the contents are only available to the data processing apparatus, the key specific to the data processing apparatus is used, while in the case where the contents are also available to other systems, a check value for the contents data is generated and collation processing is performed using the system common key. It is possible to decrypt and reproduce the encrypted data only when the collation is established, thus allowing processing according to contents utilization restrictions such as contents only available to the data processing apparatus or contents commonly available to the system, etc.

Furthermore, the data processing apparatus, data processing method and contents data verification value assignment method of the present invention is configured to generate a contents check value in units of contents block data, execute collation processing on the contents check value generated, generate a contents intermediate value based on the contents block data to be verified and generate a contents check value through encryption processing applying a contents check value generation key, thus allowing efficient verification compared to conventional processing on entire data.

Furthermore, the data processing apparatus, data processing method and contents data verification value assignment method of the present invention allows verification in contents block units and simplified verification processing according to download processing and reproduction processing, etc. providing efficient verification according to the mode of use.

Furthermore, since the data processing apparatus, the content data generating method, and the data processing method of the present invention is made to have the configuration that is provided with the plurality of content blocks in the content data and enables encryption processing for a unit of each content block, and also have the configuration in which the key used for content encryption is further encrypted and stored in the header section, even if, for example, a plurality of content blocks exist and blocks requiring encryption processing and blocks not requiring encryption processing are mixed, it becomes possible to have an arbitrary data structure that couples each block.

In addition, according to the data processing apparatus, the data processing system, and the data processing method of the present invention, by making the configuration of the content block to be a regular configuration, for example, a configuration having a uniform data length, or a configuration in which the encryption block and the non-encryption (plain-text) block are alternately disposed, decryption processing and the like of the content block can be promptly executed, and encryption content data suitable for processing corresponding to contents of the content data, for example, reproduction and the like of music data can be provided.

Furthermore, the data processing apparatus, the data processing method and the content data generating method can efficiently execute reproduction processing in the case in which contents are compressed voice data, image data or the like. That is, by making a configuration of content data to be one in which compressed data and an expansion processing program are combined, expansion processing, to which an expansion processing program incidental to compressed content data is applied, is made possible in the reproduction processing apparatus, and a situation in which the expansion processing program does not exist in the reproduction processing apparatus and reproduction cannot be performed can be avoided.

Moreover, according to the data processing apparatus, the data processing method and the content data generating means, since a configuration of content data has a configuration in which the reproduction processing apparatus determines the expansion processing program applicable to the compressed content data based on the header information, and the reproduction processing apparatus further retrieves a program applicable from accessible recording media or the like and executes expansion processing by making content data to be a combination of compressed data and the header section storing the type of the compression processing program, or, if the contents has the expansion processing program, a combination of the expansion processing program and the header storing the type of the program, program retrieving processing does not need to be executed by a user, and efficient reproduction processing becomes possible.

BRIEF DESCRIPTION OF THE DRAWINGS

FIG. 5 is a view showing a usage policy contained in a header of content data.

FIG. 6 is a view showing block information contained in a header of content data.

FIG. 50 is a view (example 1) showing an example of a process executed by a content provider and a user in conjunction with the method for individually generating various keys using master keys.

FIG. 53 is a view (example 3) showing an example of a process executed by the content provider and the user in conjunction with the method for individually generating various keys using master keys.

FIG. 54 is a view (example 4) showing an example of a process executed by the content provider and the user in conjunction with the method for individually generating various keys using master keys.

FIG. 55 is a view (example 5) showing an example of a process executed by the content provider and the user in conjunction with the method for individually generating various keys using master keys.

FIG. 71 is a view showing the configuration of a data managing file (example 1) used during a process for storing and reproducing save data.

FIG. 76 is a view showing the configuration of a data managing file (example 2) used during the process for storing and reproducing save data.

FIG. 81 is a view showing the configuration of a data managing file (example 3) used during the process for storing and reproducing save data.

FIG. 84 is a view showing the configuration of a data managing file (example 4) used during the process for storing and reproducing save data.

DETAILED DESCRIPTION

Figure 1:
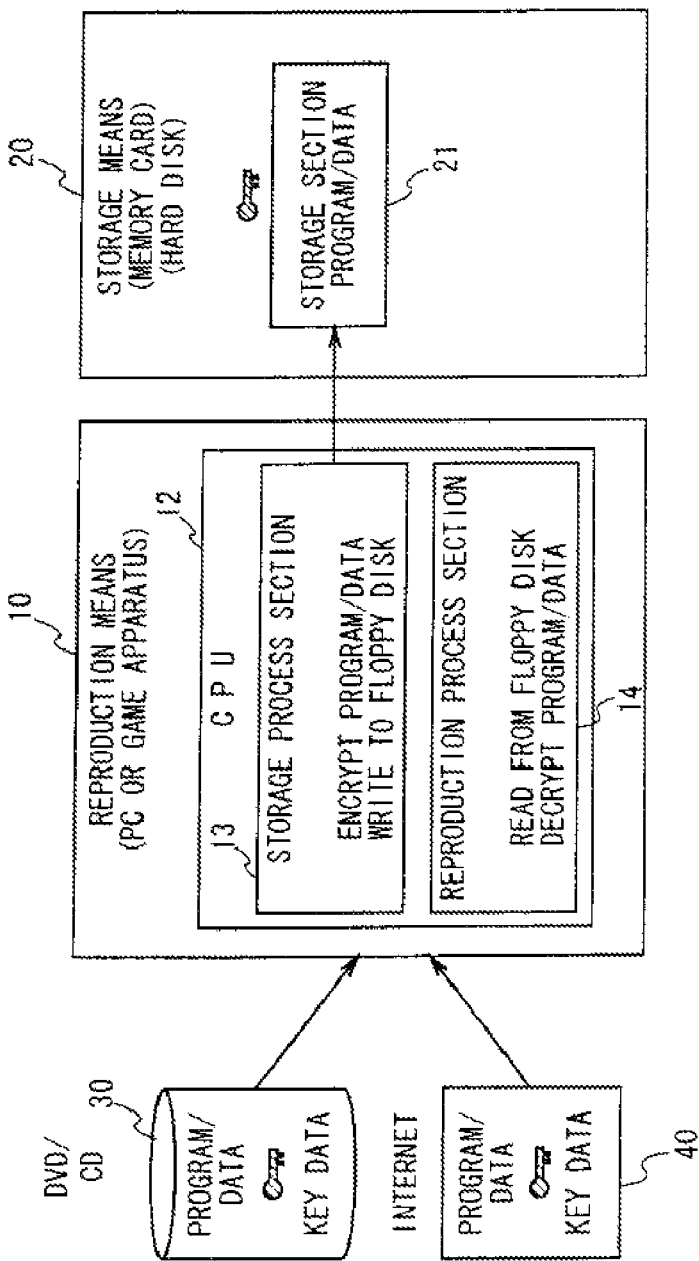
FIG. 1 is a view showing the configuration of a conventional data processing system.
Figure 2:
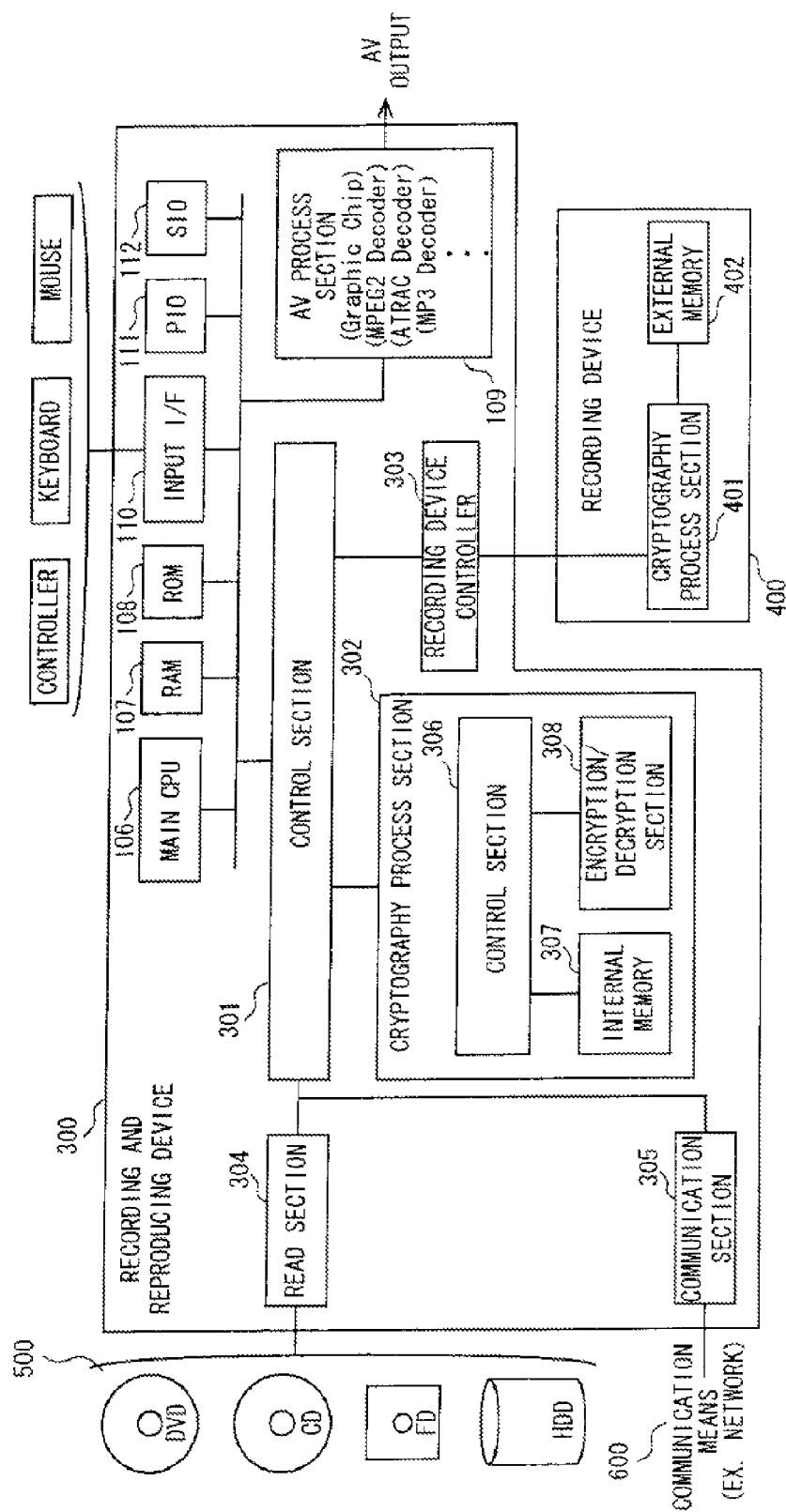
FIG. 2 is a view showing the configuration of a data processing apparatus to which the present invention is applied.

The embodiments of the present invention will be described below. The description will proceed in the order of the following items:
(1) Configuration of Data Processing apparatus
(2) Content Data Format
(3) Outline of Cryptography Processes Applicable to Present Data Processing Apparatus
(4) Configuration of Data Stored in Recording and Reproducing Apparatus
(5) Configuration of Data Stored in Recording Device
(6) Mutual Authentication Process between Recording and Reproducing Device and Recording Device
(6-1) Outline of Mutual Authentication Process
(6-2) Switching to Key Block during Mutual Authentication
(7) Process for Downloading from Recording and Reproducing Device to Recording Device
(8) Process Executed by Recording and Reproducing Device to Reproduce Information from Recording Device
(9) Key Exchanging Process after Mutual Authentication
(10) Plural Content Data Formats and Download and Reproduction Processes Corresponding to Each Format
(11) Aspect of Process Executed by Content Provider to Generate Check Values (ICV)
(12) Cryptography Process Key Generating Configuration Based on Master Key
(13) Controlling Cryptography Intensity in Cryptography Process
(14) Program Activating Process Based on Activation Priority in Handling Policy in Content Data
(15) Content Configuration and Reproduction (Decompression) Process
(16) Process for Generating and storing Saved Data in Recording Device and Reproducing the Same therefrom
(17) Configuration for Excluding (Revoking) Illegal Apparatuses
(18) Secure Chip Configuration and Manufacturing Method therefor
(1) Configuration of Data Processing Apparatus FIG. 2 illustrates a block diagram showing the general configuration of one embodiment of a data processing apparatus according to the present invention. Main components of the data processing apparatus are a recording and reproducing device 300 and a recording device 400.

The recording and reproducing device 300 comprises, for example, a personal computer (PC), a game apparatus or the like. The recording and reproducing device 300 has a control section 301 for carrying out unifying control including the control of communication between the recording and reproducing device 300 and the recording device 400 during a cryptography process in the recording and reproducing device 300. The recording and reproducing device 300 also includes a cryptography process section 302, which is responsible for the whole cryptography process. It also includes a recording device controller 303 for executing an authentication process with the recording device 400 connected to the recording and reproducing device 300 to read and write data. Recording and reproducing device 300 further includes a read section 304 for reading data from a medium 500, such as a DVD, CD, floppy disk (FD) or hard disk (HDD), and a communication section 305 for transmitting and receiving data to and from the exterior network via communication means 600.

The recording and reproducing device 300 downloads and reproduces content data to and from the recording device 400 controlled by the control section 301. The recording device 400 is a storage medium that can preferably be installed in and removed from the recording and reproducing device 300, for example, as a memory card. The recording device 400 has an external memory 402 comprising a non-volatile memory such as an EEPROM, a flash memory, a hard disk, or a RAM with batteries.

The recording and reproducing device 300 has the read section 304 as an interface to which content data stored in the storage medium 500. The communication section 305 acts as an interface to which content data distributed from an exterior network such as the Internet can be input.

The recording and reproducing device 300 has the cryptography process section 302 to execute an authentication process, an encryption and a decryption processes, a data verification process, or other processes. The cryptography process section 302 operates in downloading content data externally input via the read section 304 or the communication section 305 to the recording device 400 or reproducing and executing content data from the recording device 400. The cryptography process section 302 comprises a control section 306, an internal memory 307 and an encryption/decryption section 308. Control Section 306 controls the entire cryptography process section 302. The internal memory 307 holds information such as keys for the cryptography process and which has been processed so as to prevent data from being externally read out therefrom easily. Encryption/decryption section 308 is used for executing the encryption and decryption processes, generating and verifying authentication data, generating random numbers, etc.

The control section 301 transmits an initialization command to the recording device 400 via the recording device controller 303 when, for example, the recording device 400 is installed in the recording and reproducing device 300. Control section 301 can also execute a mediation process for various processes such as a mutual authentication between the encryption/decryption section 308 and the encryption/decryption section 406. Control section 301 can also perform an integrity check value collating process and encryption and decryption processes. Each of these processes will be described in detail later.

The cryptography process section 302 can execute the authentication process, the encryption and decryption processes, the data verifying process, and other processes, as previously described.

The cryptography process control section 306 executes control of the whole cryptography process. This includes the authentication process and the encryption/decryption processes executed by the recording and reproducing device 300. These are, for example, processes of setting an authentication completion flag when the authentication process executed between the recording and reproducing device 300 and the recording device 400 has completed and commanding the execution of various processes executed in the encryption/decryption section 308. Some of the various processes are, for example, a download process, a process for generating integrity check values for reproduced content data, and commanding the execution of a process for generating various key data.

The internal memory 307 stores key data, identification data, and other data required for various processes. Some of the various processes include the mutual authentication process, the integrity check value collating process, and the encryption and decryption processes which are executed in the recording and reproducing device 300. These processes will be described later in detail.

The encryption/decryption section 308 uses key data and similar information stored in the internal memory 307 to execute the authentication process, the encryption and decryption processes, the generation and verification of predetermined integrity check values or electronic signatures, the verification of data, the generation of random numbers, etc. in downloading externally input content data to the recording device 400 or reproducing and executing content data stored in the recording device 400.

In this case, the internal memory 307 of the recording and reproducing device cryptography process section 302 holds important information such as cryptography keys and is configured so as not to have its data externally read out easily. Thus, the cryptography process section 306 is configured as a tamper-resistant memory characterized to restrain external invalid reads. It comprises, for example, a semiconductor chip that essentially rejects external accesses and has a multilayer structure, an internal memory sandwiched between dummy layers of aluminum or the like or arranged in the lowest layer, and a narrow range of operating voltages and/or frequencies. This configuration will be described later in detail.

In addition to these cryptography process functions, the recording and reproducing device 300 comprises a main Central Processing Unit (CPU) 106, a RAM (Random Access Memory) 107, a ROM (Read Only Memory) 108, an AV process section 109, an input interface (I/F) 110, a PIO (Parallel I/O) interface 111, and a SIO (Serial I/O) interface 112.

The main CPU 106, the RAM 107, and the ROM 108 are components functioning as a control system for the main body of the recording and reproducing device 300. CPU 106, RAM 107 and ROM 103 principally function as a reproduction process section for reproducing data decrypted by the cryptography process section 302. For example, the main CPU 106 executes control for the reproduction and execution of content, such as output of content data read out from the recording device and then decrypted, to the AV process section 109 under the control of the control section 301.

The RAM 107 is used as a main storage memory for various processes executed by the CPU 106 and as a working area for these processes. The ROM 108 stores a basic program for starting up an Operating System (OS) or the like activated by the CPU 106, as well as other data.

The AV process section 109 has a data compression and decompression process mechanism. Specifically, the AV process section 109 includes an MPEG2 decoder, an ATRAC decoder, an MP3 decoder etc . . . to execute processes for data outputs to a data output apparatus such as a display or speakers (not shown) attached or connected to the recording and reproducing device 300 main body.

The input I/F 110 outputs data input from various connected input means such as a controller, a keyboard, and a mouse, to the main CPU 106. The main CPU 106 executes a process in accordance with a command issued by a user via the controller, based on, for example, a game program being executed.

The PIO interface 111 and the SIO interface 112 are used as storage devices for a memory card or a game cartridge and as a connection interface to a portable electronic device or the like.

The main CPU 106 also executes control in storing saved data, setting data or the like for, as an example, a game being executed. During this process, stored data is transferred to the control section 301. This causes the cryptography process section 302 to execute a cryptography process for the saved data as required and then stores the encrypted data in the recording device 400. These cryptography processes will be described later in detail.

The recording device 400 is a storage medium that can preferably be installed in and removed from the recording and reproducing device 300, and comprises, for example, a memory card. The recording device 400 has the cryptography process section 401 and the external memory 402.

The recording device cryptography process section 401 executes the mutual authentication process, encryption and decryption processes, data verification process, and other processes. These processes occur between the recording and reproducing device 300 and the recording device 400 in downloading content data from the recording and reproducing device 300 or reproducing content data from the recording device 400 to the recording and reproducing device 300. The cryptography process section 401 has a control section, an internal memory, an encryption/decryption section, and other components similar to the cryptography process section of the recording and reproducing device 300. The details will be described in relation to FIG. 3. The external memory 402 stores encrypted content data or the like. It comprises a non-volatile memory comprising a flash memory such as an EEPROM, a hard disk, a RAM with batteries or the like.

Figure 3:
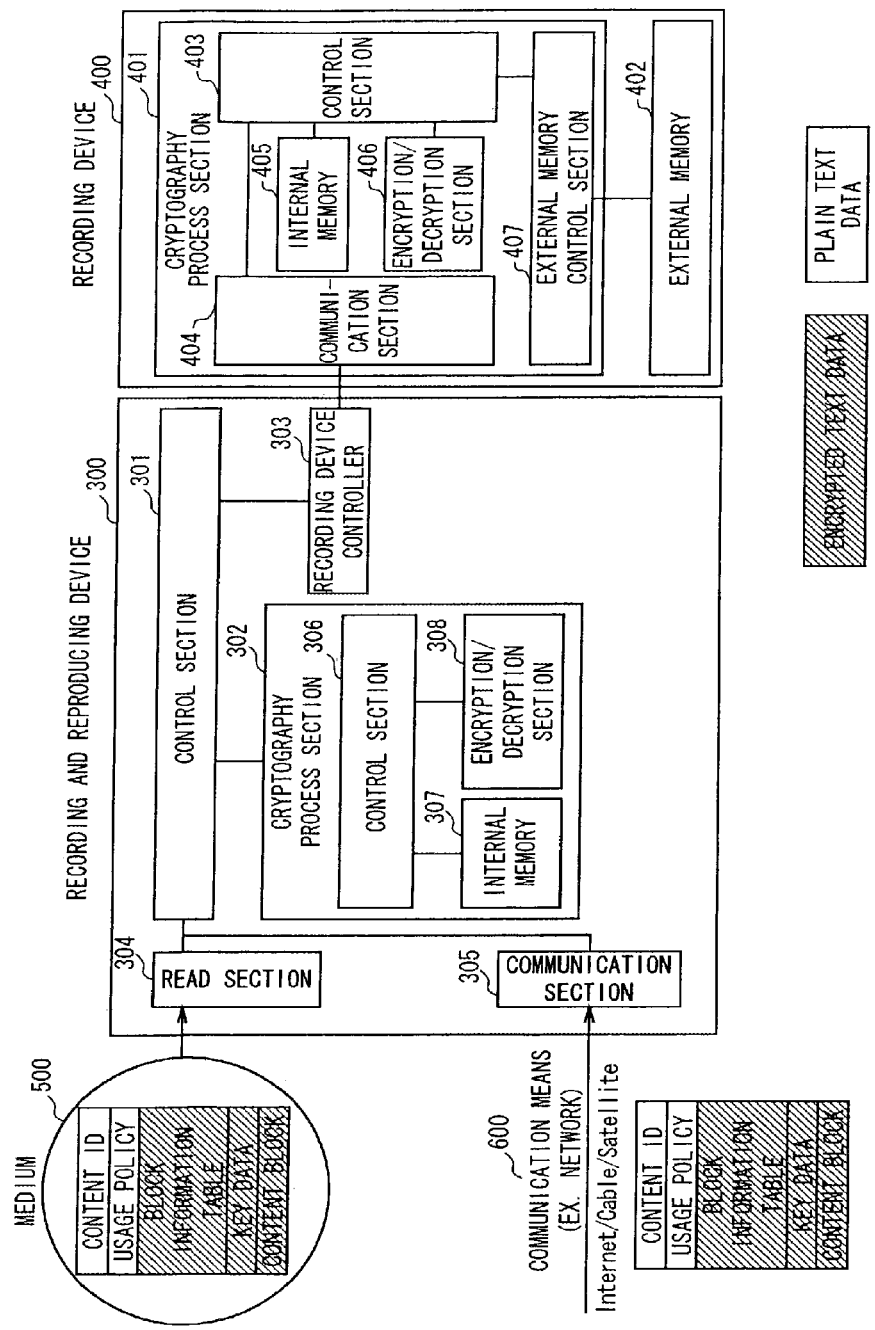
FIG. 3 is a view showing the configuration of a data processing apparatus to which the present invention is applied.

FIG. 3 is a view schematically showing the configuration of data input from the medium 500 and the communication means 600 that are content providing means from which the data processing apparatus according to the present invention receives data. The recording and reproducing device 300 receives an input of content from the content providing means 500 or 600. Recording and reproducing device 300 operates on arrangements for the cryptography process in the recording device 400.

The medium 500 is, for example, an optical disk medium, a magnetic disk medium, a magnetic tape medium, a semiconductor medium, or the like. The communication means 600 is capable of data communication via the Internet, cable, or satellite communication.

In FIG. 3, the recording and reproducing device 300 verifies data input by the medium 500 or the communication means 600. That is, a recording and reproducing device 300 verifies content meeting a predetermined format, and stores the verified content in the recording device 400.

As shown in the sections of the medium 500 and communication means 600 the content data has the following components:

Content ID: content ID as an identifier for content data.

Usage policy: a usage policy containing constituent information of content data. For example, the usage policy contains the sizes of a header section and a content section constituting the content data, a format version, a content type indicating whether the content is a program or data, and a localization field indicating whether the content can be used only in an apparatus that has downloaded the content or also in other apparatuses.

Block information table: the block information table comprises the number of content blocks, a block size, an encryption flag indicating the presence of encryption, and other information.

Key data: key data comprises an encryption key for encrypting the above described block information table, a content key for encrypting a content block, or the like.

Content block: the content block comprises program data, music or image data, or other data to be actually reproduced.

The content data will be explained later in further detail with reference to FIG. 4 and subsequent figures.

The content data are encrypted by the content key (hereafter referred to as the "Kcon") and then provided to the recording and reproducing device 300 from the medium 500 or the communication means 600. The content can be stored in the external memory of the recording device 400 via the recording and reproducing device 300.

For example, the recording device 400 uses a key (hereafter referred to as a "storage key", or Kstr unique thereto. The storage key is stored in the internal memory 405 thereof to encrypt the content contained in the content data, the block information table contained in the content data as header information, and information on various keys, such as the content key Kcon. This is done before storing these data in the external memory 402. To download the content data from the recording and reproducing device 300 to the recording device 400 or allow the recording and reproducing device 300 to reproduce the content data stored in the recording device 400, predetermined procedures such as a mutual authentication process between the apparatuses and content data encrypting and decrypting processes are required. These processes will be explained later in detail.

The recording device 400 has the cryptography process section 401 and the external memory 402. The cryptography process section 401 has a control section 403, a communication section 404, the internal memory 405, an encryption/decryption section 406, and an external memory control section 407.

The recording device 400 is responsible for the whole cryptography process, controls the external memory 402, and comprises the recording device cryptography process section 401 cryptography process section 401 is for interpreting a command from the recording and reproducing device 300 and executing a process. The recording device 400 also includes the external memory 402, which holds contents or the like.

The recording device cryptography process section 401 has the control section 403 for controlling the entire recording device cryptography process section 401, the communication section 404 for transmitting and receiving data to and from the recording and reproducing device 300 and the internal memory 405. Internal memory 405 holds information such as keys for the cryptography process. The information has been processed so as to prevent data from being easily externally read out therefrom. The encryption/decryption section 406 is used for executing the encryption and decryption processes, generating and verifying authentication data, generating random numbers, etc. The external memory control section 407 is used for reading and writing data from and to the external memory 402.

The control section 403 executes control of the whole cryptography process. This includes the authentication process and the encryption/decryption processes executed by the recording device 400. The encryption/decryption processes include, for example, processes of setting an authentication completion flag when the authentication process executed between the recording and reproducing device 300 and the recording device 400 has completed. The control section 403 also commands the execution of various processes executed in the encryption/decryption section 406 of the cryptography process section 401. For example, the various processes can include a download process and a process for generating integrity check values for reproduced content data. The control section 403 also commands the execution of a process for generating various key data.

The internal memory 405 comprises a memory having a plurality of blocks to store a plurality of sets of key data, identification data, or other data which are required for various processes. Such various processes include the mutual authentication process, integrity check value collating process, and an encryption and decryption process, which are executed by the recording device 400, as described later in detail.

The internal memory 405 of the recording device cryptography process section 401, like the internal memory 307 of the cryptography process section 302 previously described, holds important information such as cryptography keys. Internal memory 307 must thus be configured so as not to have its data externally read out easily. Thus, the cryptography process section 401 of the recording device 400 is characterized to restrain external invalid reads. It comprises a semiconductor chip that essentially rejects external accesses and has a multilayer structure, an internal memory sandwiched between dummy layers of aluminum or the like or arranged in the lowest layer, and a narrow range of operating voltages and/or frequencies. In this regard, the cryptography process section 302 may be software configured so as to prevent secret information for keys from leaking easily to the exterior network or the like.

The encryption/decryption section 406 uses key data or the like stored in the internal memory 405 to execute the data verifying process, the encryption and decryption processes, the generation and verification of predetermined integrity check values or electronic signatures, the generation of random numbers, etc. It does this in downloading content data from the recording and reproducing device 300, reproducing content data stored in the external memory 402 of the recording device 400, or executing mutual authentication between the recording and reproducing device 300 and the recording device 400.

The communication section 404 is connected to the recording device controller 303 of the recording and reproducing device 300. The communication section 404 downloads or reproduces content data or communicates transfer data between the recording and reproducing device 300 and the recording device 400 during the mutual authentication process. This is done according to the control of the control section 301 of the recording and reproducing device 300, or the control of the control section 403 of the recording device 400.

(2) Content Data Format

Next, by using FIG. 4 to FIG. 6, the data format of data stored in the medium 500 or communicated on the data communication means 600 will be explained.

Figure 4:
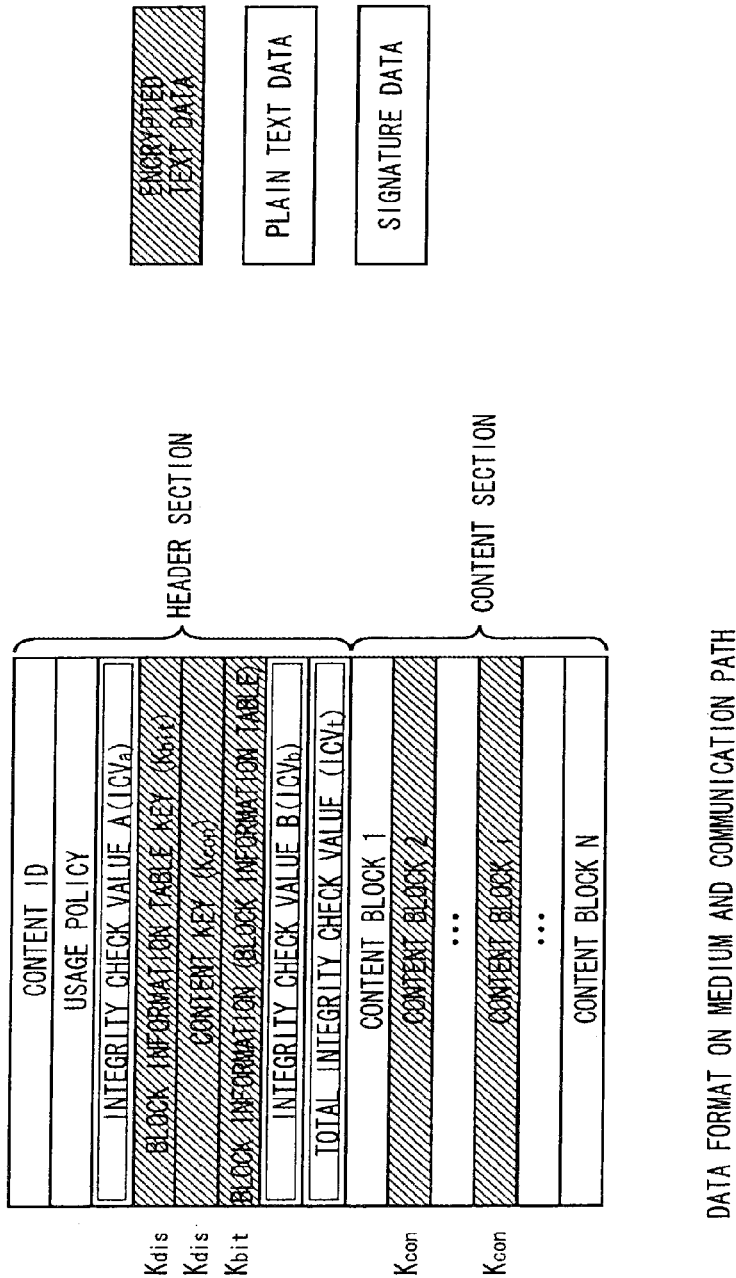
FIG. 4 is a view showing a data format of content data on a medium or a communication path.

The configuration shown in FIG. 4 shows the format of the entire content data. The configuration shown in FIG. 5 shows details of the "usage policy" that partly constitutes the header section of the content data. The configuration shown in FIG. 6 shows details of the "block information table" that partly constitutes the header section of the content.

A representative example of the data format applied to the system according to the present invention will be explained. However, different types of data formats, such as formats corresponding to game programs and formats suitable for real-time processing of music data or the like, can be used for the present system. The aspects of these formats will be described later in further detail in "(10) Plural Content Data Formats and Download and Reproduction Processes Corresponding to Each Format."

In the data format shown in FIG. 4, items shown in gray indicate encrypted data. Items enclosed by double frames indicate tamper check data. The other items shown in white indicate plain text data that are not encrypted. Encryption keys of the encryption section are shown on the left of the frames. In the example shown in FIG. 4, some of the blocks (content block data) of the content section contain encrypted data, while the others contain non-encrypted data. This form varies depending on the content data. All the content block data contained in the data may be encrypted.

As shown in FIG. 4, the data format is divided into the header section and the content section. The header section comprises a content ID, a usage policy, an integrity check value A (hereafter referred to as "ICVa"), a block information table key (hereafter referred to as "Kbit"), a content key Kcon, a block information table (hereafter referred to as "BIT"), an integrity check value B ("ICVb"), and a total integrity check value ("ICVt"). The content section comprises a plurality of content blocks, for example, encrypted and non-encrypted content.

In this case, the individual information indicates a content ID for identifying a specific piece of content. The usage policy, as shown in FIG. 5, comprises a header length indicating the size of the header section; a content length indicating the size of the content section; a format version indicating version information for the format; a format type indicating the type of the format; a content type indicating the type of the content, that is, whether it is a program or data; an operation priority indicating a priority for activation if the content type is a program; a localization field indicating whether the content downloaded in accordance with this format can be used only in an apparatus that has downloaded the content or also in other similar apparatuses; a copy permission indicating whether the content downloaded in accordance with this format can be copied from the apparatus that has downloaded the content to another similar apparatus; a move permission indicating whether the content downloaded in accordance with this format can be moved from the apparatus that has downloaded the content to another similar apparatus; an encryption algorithm indicating an algorithm used to encrypt content blocks in the content section; an encryption mode indicating a method for operating the algorithm used to encrypt the content in the content section; and an integrity check method indicating a method for generating integrity check values, as shown in detail in FIG. 5.

The above described data items recorded in the usage policy are only exemplary and various usage policy information can be recorded depending on the aspect of corresponding content data. The identifier is described later in detail in, for example, "(17) Configuration for Excluding (Revoking) Illegal Apparatuses." It is also possible to make a configuration so as to exclude the use of content caused by the illegal apparatus by recording the content of an illegal recording and reproducing apparatus as data and by checking the start time of the use.

The integrity check value A ICVa is used to verify that the content ID or the usage policy has not been tampered with. It functions as a check value for partial data instead of the entire content data. That is, it functions as a partial integrity check value. The data block information table key Kbit is used to encrypt a block information table. The content key Kcon is used to encrypt content blocks. The block information table key Kbit and the content key Kcon are encrypted with a distribution key (hereafter referred to as "Kdis") on the medium 500 and the communication means 600.

FIG. 6 shows the block information table in detail. The block information table in FIG. 6 comprises data encrypted with the block information table key Kbit as illustrated in FIG. 4. The block information table comprises a block number, indicating the number of content blocks and information on N content blocks. The content block information table comprises a block length; an encryption flag indicating whether or not the block ash been encrypted; an ICV flag indicating whether or not integrity check values must be calculated, and a content integrity check value (ICVi).

The content integrity check value is used to verify that each content block has not been tampered with. A specific example of a method for generating a content integrity check value will be explained later in "(10) Plural Content Data Formats and Download and Reproduction Processes Corresponding to Each Format." The block information table key Kbit, used to encrypt the block information table, is further encrypted with the distribution key Kdis.

The data format in FIG. 4 will be described further. The integrity check value B, ICVb, is used to verify that the block information table key Kbit, the content key Kcon, and the block information table have not been tampered with. It functions as a check value for partial data instead of the entire content data. That is, it functions as a partial integrity check value. The total integrity check value ICVt is used to verify the integrity check values ICVa and ICVb, integrity check values ICVi for each content block (if this has been set), partial integrity check values thereof, or all the data to be checked have not been tampered with.

In FIG. 6, the block length, the encryption flag, and the ICV flag can be arbitrarily set. However, certain rules may be established. For example, encrypted and plain-text areas may be repeated over a fixed length, all the content data may be encrypted, or the block information table BIT may be compressed. Additionally, the content key Kcon may be contained in the content block instead of the header section to allow different content keys Kcon to be used for different content blocks. Examples of the content data format will be described in further detail in (10) Plural Content Data Formats and Download and Reproduction Processes Corresponding to Each Format."

(3) Outline of Cryptography Processes Applicable to Present Data Processing Apparatus Next, the aspects of various cryptography processes applicable to the data processing apparatus according to the present invention will be explained. The description of the cryptography processes shown in "(3) Outline of Cryptography Processes Applicable to Present Data Processing Apparatus" correspond to an outline of the aspect of a cryptography process on which are based various processes executed by the present data processing apparatus, which will be specifically described later. For example, "a. authentication process between recording and reproducing device and recording device", "b. download process for device for loading contents", and "c. process for reproducing content stored in recording device" will be explained herein. Specific processes executed by the recording and reproducing device 300 and the recording device 400 will be each described in detail in item (4) and subsequent items.

An outline of the cryptography process applicable to the data processing apparatus will be described in the following order:

(3-1) Message Authentication Based on Common Key Cryptosystem (3-2) Electronic Signature Based on Public Key Cryptosystem (3-3) Verification of Electronic Signature Based on Public Key Cryptosystem (3-4) Mutual Authentication Based on Common Key Cryptosystem (3-5) Public Key Certificate (3-6) Mutual Authentication Based on Public Key Cryptosystem (3-7) Encryption Process Using Elliptic Curve Cryptography (3-8) Decryption Process Using Elliptic Curve Cryptography (3-9) Random Number Generating Process
(3-1) Message Authentication Based on Common Key Cryptosystem First, a process for generating tamper detecting data using a common key cryptography method will be explained. The tamper detecting data are added to the data in order to check for tampering and to authenticate a creator.

For example, the tamper detecting data may be the ICVa, the ICVb, and the total integrity check value in the data structure described in FIG. 4, and the content check value stored in each block in the block information table shown in FIG. 6.

Here, the use of the DES, which is a common key cryptosystem, will be explained as an example of a method for generating and processing electronic signature data. In addition to the DES, the present invention may use, for example, the FEAL (Fast Encipherment Algorithm or the AES (Advance Encryption Standard) (U.S. next-term standard cryptography) as a similar process based on a common key cryptosystem.

A method for generating an electronic signature using a general DES will be explained with reference to FIG. 7. First, before generating an electronic signature, a message to which the electronic signature is to be added is divided into sets of 8 bytes (the pieces of the divided message are hereafter referred to as "M1, M2, . . . , MN"). An initial value (hereafter referred to as "IV") and the M1 are exclusive-ORed. The result is referred to as "I1". Next, the I1 is input to a DES encrypting section, which encrypts it using a key (hereafter referred to as "K1") The output is referred to as "E1". Subsequently, the E1 and the M2 are exclusive-ORed, and the output I2 is input to the DES encrypting section, which encrypts it using the key K1 the output is referred to as "E2". This process is repeated to encrypt all the messages (M1, M2, . . . MN) obtained by means of the division. The final output is an electronic signature ("EN"). This value is generally called a "MAC (Message Authentication Code)" used to check a message for tampering. In addition, such a system for chaining encrypted texts is called a "CBC (Cipher Block Chaining) mode."

Figure 7:
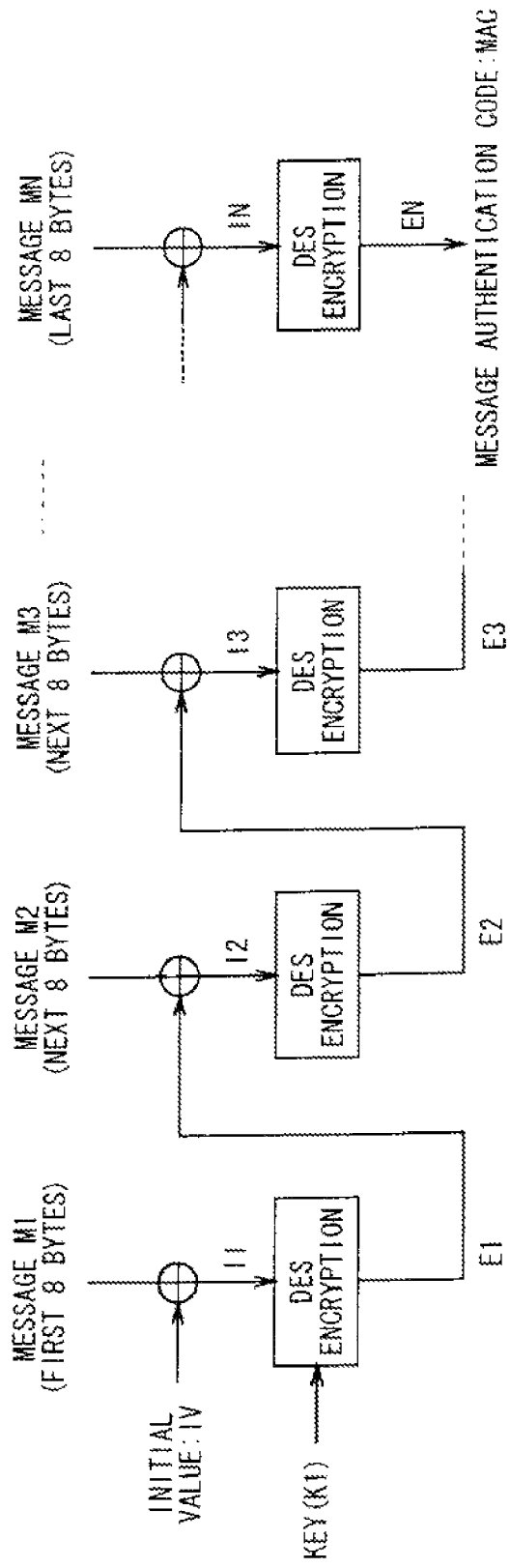
FIG. 7 is a view showing an electronic signature generating method using DES.

The MAC value output in the example of generation shown in FIG. 7 can be used as the integrity check value A or B or total integrity check value in the data structure shown in FIG. 4 which is enclosed by double frames and the content check value ICV1 to ICVN stored in each block in the block information table shown in FIG. 6. In verifying the MAC value, a verifier generates it using a method similar to that used to originally generate it. The verification is determined to be successful if the same value is obtained.

Moreover, in the example shown in FIG. 7, the initial value IV is exclusive-ORed with the first 8-byte message M1, but the initial value IV may be zero and not exclusive-ORed.

Figure 8:
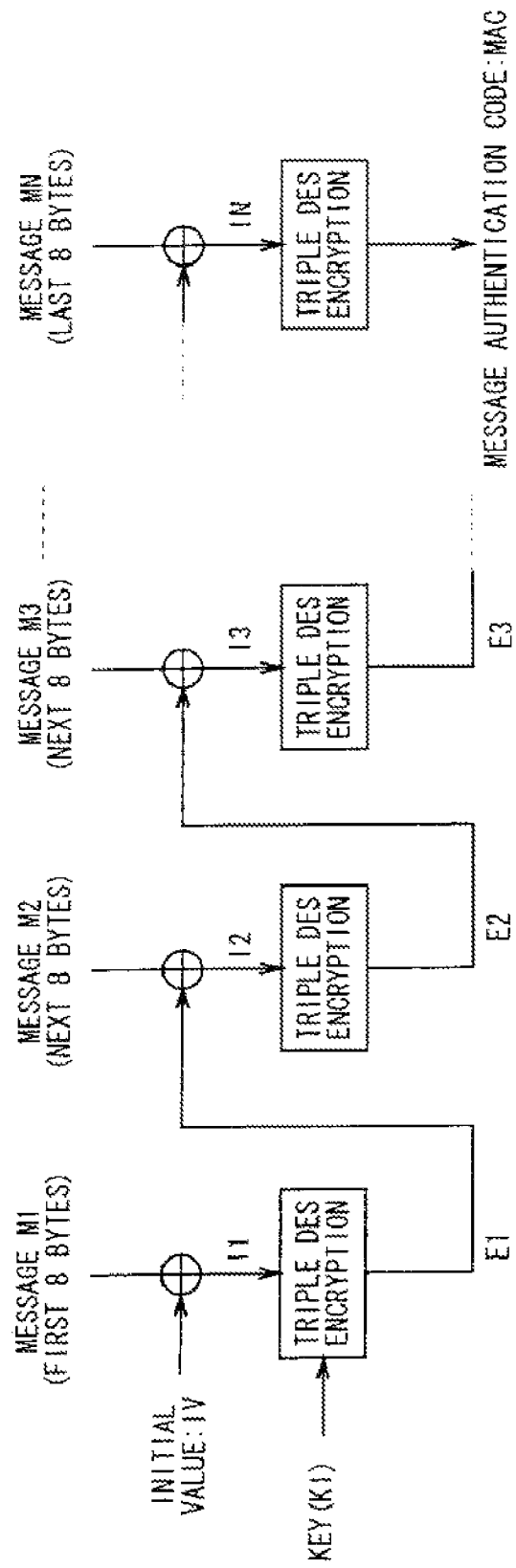
FIG. 8 is a view showing an electronic signature generating method using Triple DES.

FIG. 8 shows the configuration of a method for generating the MAC value which has improved security compared to the MAC value generating method shown in FIG. 7. FIG. 8 shows an example where instead of the Single DES in FIG. 7, the Triple DES is used to generate the MAC value.

Figure 9:
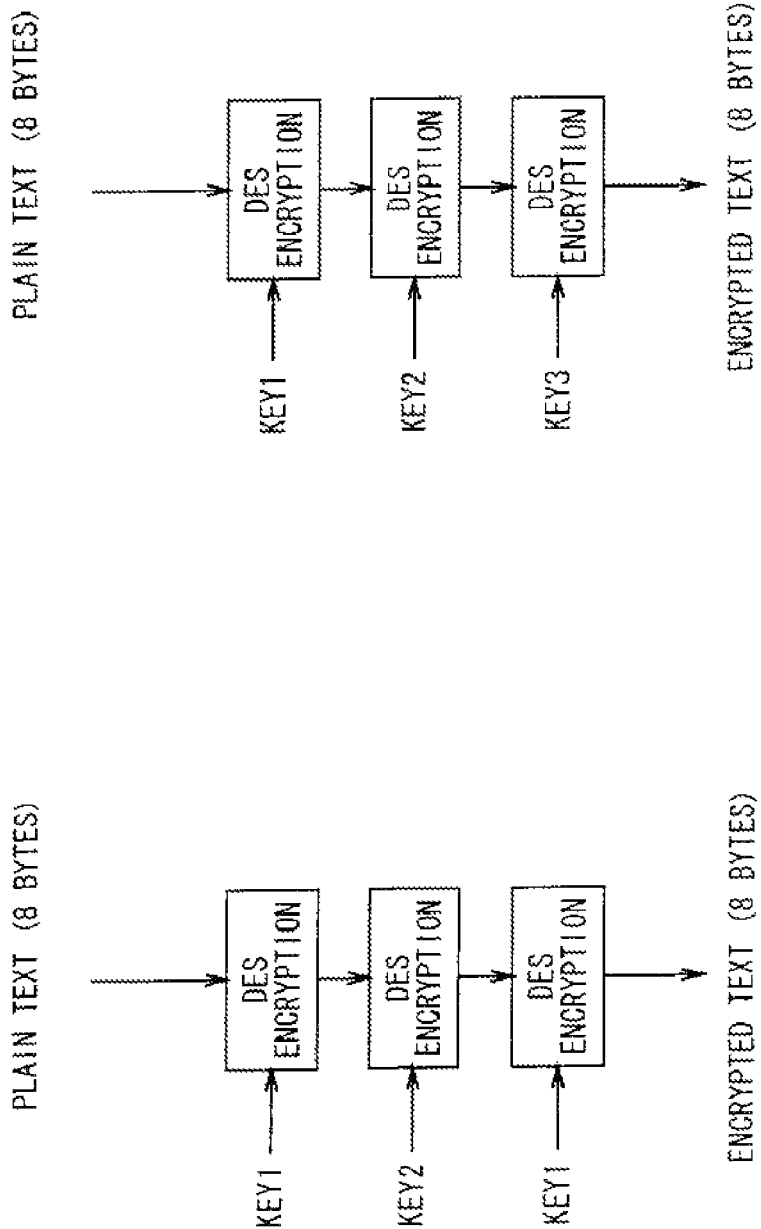
FIG. 9 is a view depicting Triple DES.

FIGS. 9A and 9B show an example of a detailed configuration of each of the Triple DES components shown in FIG. 8. There are two different aspects of the configuration of the Triple DES as shown in FIG. 9. FIG. 9(a) shows an example using two cryptography keys. Processing is carried out in the order of an encryption process with a key 1 (K1), a decryption process with a key 2 (K2), and an encryption process with the key 1. The two types of keys are used in the order of K1, K2, and K1. FIG. 9(b) shows an example using three cryptography keys. Processing is carried out in the order of an encryption process with the key 1, an encryption process with the key 2, and an encryption process with a key 3 (K3). The three types of keys are used in the order of K1, K2, and K3. The plurality of processes are thus continuously executed to improve security intensity compared to the Single DES. The Tripled DES configuration, however, has the disadvantage of requiring an amount of processing time three times as large as that for the Single DES.

Figure 10:
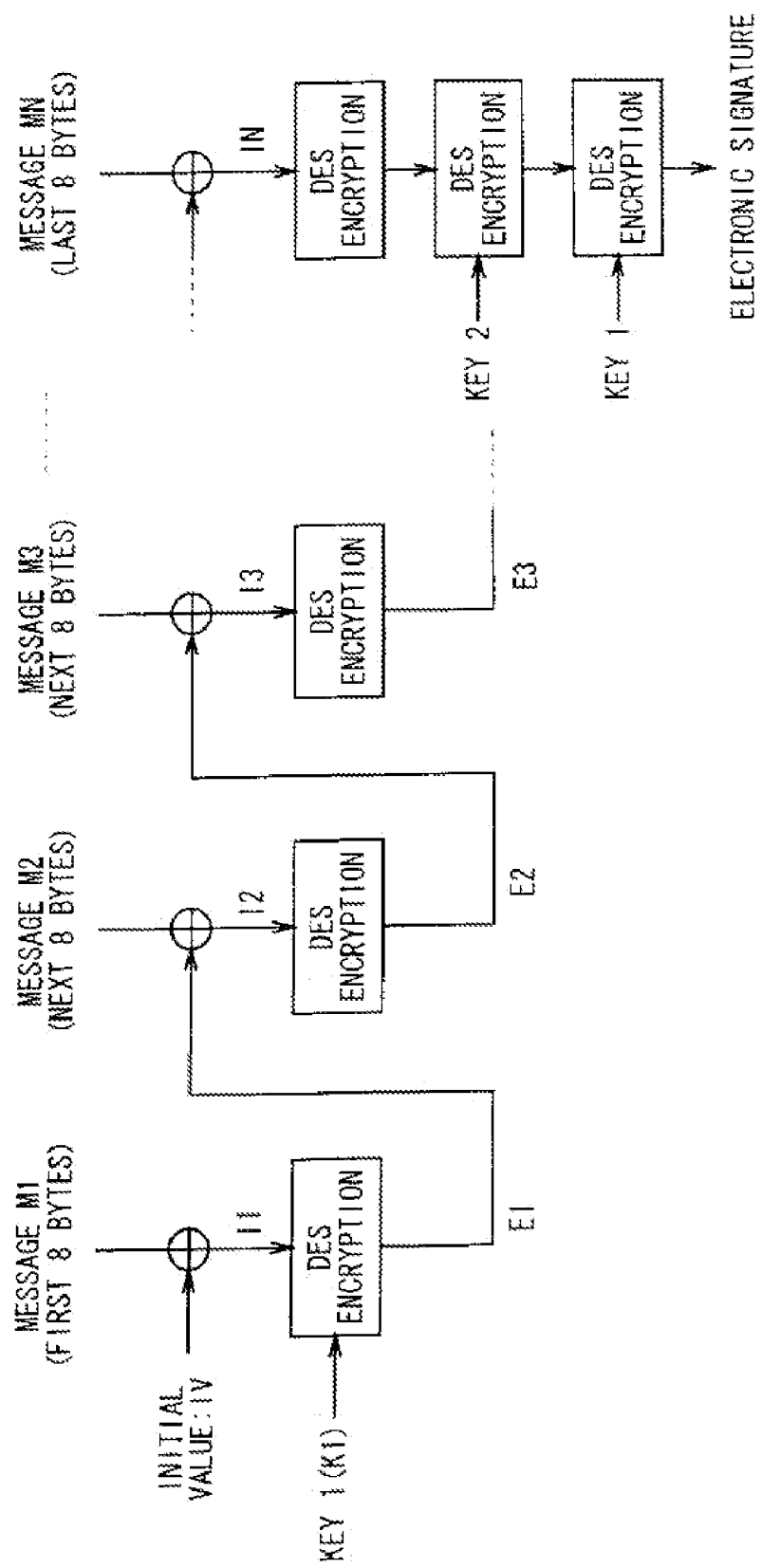
FIG. 10 is a view showing an electronic signature generating method partly using Triple DES.

FIG. 10 shows an example of a MAC value generating configuration obtained by improving the Triple DES configuration described in FIGS. 8 and 9. In FIG. 10, the encryption process for each of the messages (M1, M2, . . . , MN) from beginning to end of a message string to which a signature is to be added is based on the Single DES. Only the encryption process for the last message is based on the Triple DES configuration shown in FIG. 9(a).

The configuration shown in FIG. 10 reduces the time required to generate the MAC value for the message down to a value almost equal to the time required for the MAC value generating process based on the Single DES. This is done with improved security compared to the MAC value based on the Single DES. Moreover, the Triple DES configuration for the last message may be as shown in FIG. 9(b).

(3-2) Electronic Signature Based on Public Key Cryptosystem

The method for generating electronic signature data (if the common key encryption system) is used as the encryption system has been described. A method for generating electronic signature data will be described with reference to FIG. 11 for a common key cryptosystem being used as the encryption system. The process shown in FIG. 11 corresponds to a process flow generation of electronic signature data using the Elliptic Curve Digital Signature Algorithm (EC-DSA), as per IEEE P1363/D3. An example using Elliptic Curve Cryptography (hereafter referred as "ECC") as public key cryptography will be explained. In addition to ECC, the data processing apparatus according to the present invention may use, for example, RSA (Rivest, Shamir, Adleman; ANSI X9.31) cryptography, which is a similar public cryptosystem.

Figure 11:
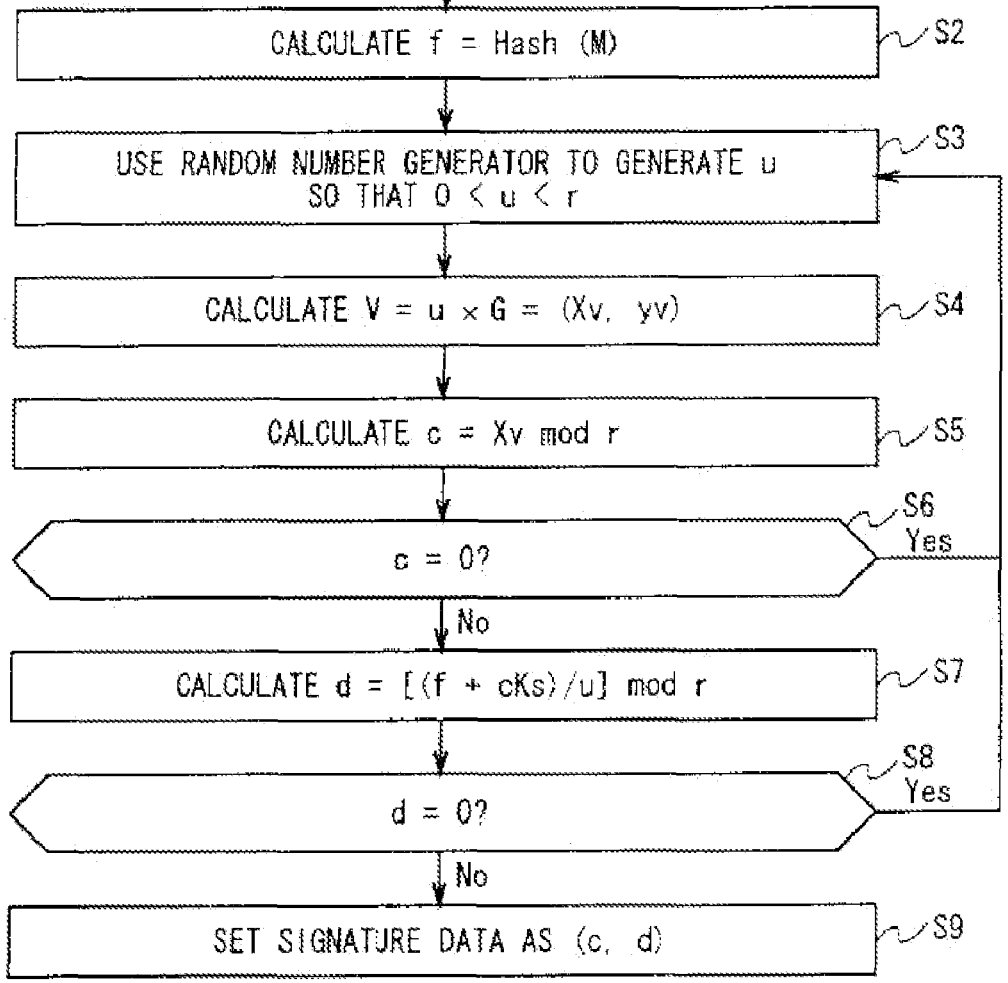
FIG. 11 is a view showing a process flow of electronic signature generation.

Each step in FIG. 11 will be described. At step S1, the following definitions are set reference symbol p denotes a characteristic. Reference symbols a and b denote coefficients of an elliptic curve (elliptic curve: $y^2=x^3+ax+b$). M denotes a message. G denotes a base point on the elliptic curve. Symbol r denotes the digit of G. Ks denotes a secret key ($0<Ks<r$). At step S2, a hash value for the message M is calculated to obtain f=Hash(M).

Then, a method for determining a hash value using a hash function will be explained. The hash function receives a message as an input, compresses it into data of a predetermined bit length, and outputs the compressed data as a hash value. The hash value is characterized in that it is difficult to predict an input from a hash value (output). For instance, when one bit of data input to the hash function changes, many bits of the hash value change. Thus, it is difficult to find different input data with the same hash value. The hash function employed may be, for example, MD4, MD5, SHA-1, or DES-CBC similar to that described in FIG. 7 or other figures. In this case, the MAC (corresponding to the integrity check value ICV), which is the final output value, is the hash value.

Subsequently, at step S3, a random number u ($0<u<r$) is generated. At step S4 the base point G is multiplied by u to obtain coordinates V (Xv, Yv). An addition and a multiplication by two on the elliptic curve are defined as follows:

If P=(Xa, Ya), Q=(Xb, Yb), R=(Xc, YC)=P+Q.

When P≠Q (addition), $$Xc = \lambda^2 - Xa - Xb$$

$$Yc = \lambda x(Xa - Xc) - Ya$$

$$\lambda = (Yb - Ya)/(Xb - Xa)$$

When P=Q (multiplication by two), $$Xc = \lambda^2 - 2Xa$$

$$Yc = \lambda x(Xa - Xc) - Ya$$

$$\lambda = (3(Xa)^2 + a)/(2Ya) \qquad (1)$$

These are used to multiply the point G by u. Although the calculation speed is low, the most easy-to-understand calculation method is shown below. G, 2×G, 4×G, ... is calculated, the u is binary-expanded, and corresponding $2^i$×G (value obtained by multiplying G by 2 i times) is added to bits of 1 (i denotes a bit position as counted from an LSB).

At step S5, c=Xv mod r is calculated, and at step S6, is determined whether the result is zero. If the result is not zero, then at step S7, d=[(f+cKs)/u] mod r is calculated. At step S8, it is determined whether d is zero. If d is not zero, then at step S9, c and d are output as electronic signature data. When r is assumed to denote a length of 160 bits, the electronic signature data have a length of 320 bits.

If c is 0 at step S6, the process returns to step S3 to regenerate a new random number. Similarly, if d is 0 at step S8, the process also returns to step S3 to regenerate a new random number.

(3-3) Verification of Electronic Signature Based on Public Key Cryptosystem

Figure 12:
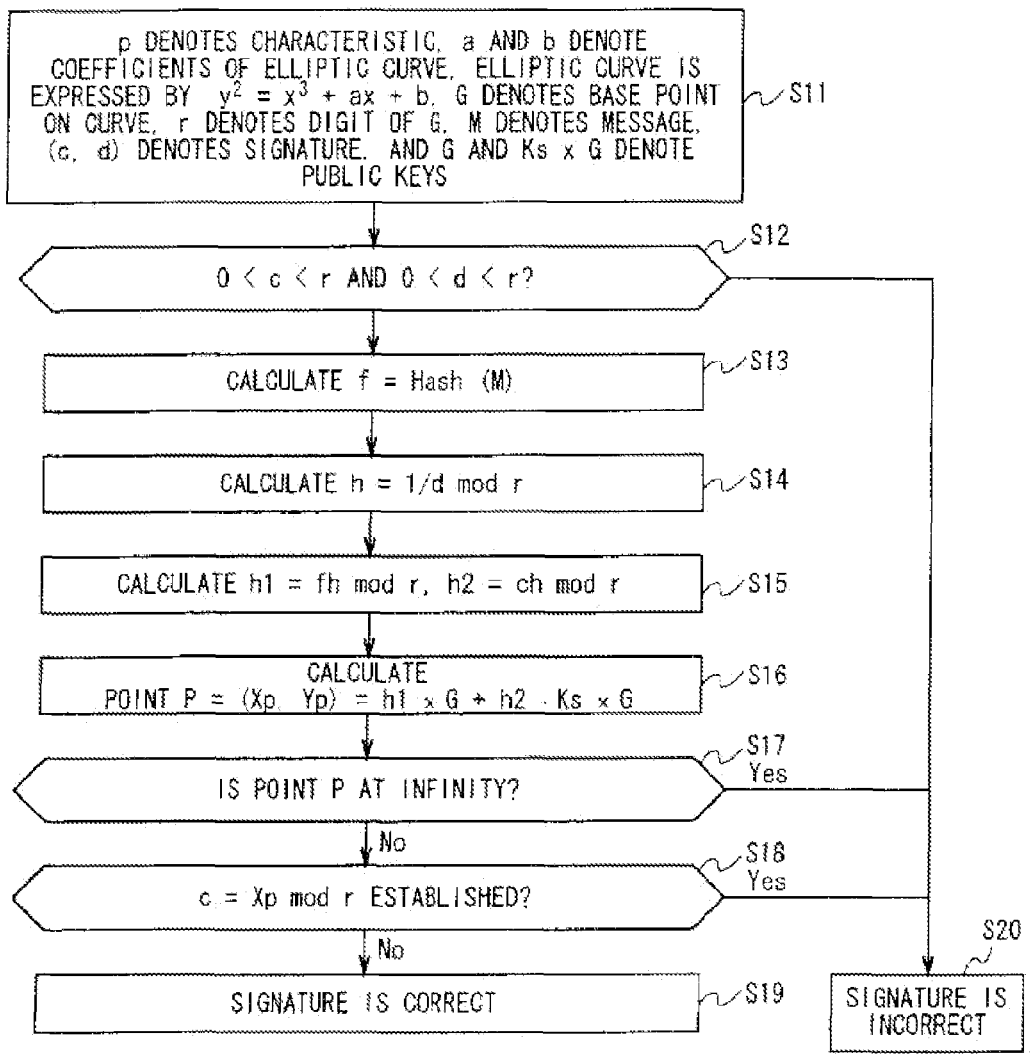
FIG. 12 is a view showing a process flow of electronic signature generation.

Next, a method for verifying an electronic signature using the public key cryptosystem will be described with reference to FIG. 12. At step S11, the following definitions are set. Reference symbol M denotes a message. Reference symbol p denotes a characteristic. Reference symbols a and b denote elliptic curve coefficients (elliptic curve: $y^2 = x^3 + ax + b$). Reference symbol G denotes a base point on the elliptic curve. Reference symbol r denotes the digit of G. Reference symbols G and Ks×G denote public keys (0<Ks<r). At step S12, it is verified that the electronic signature data c and d meet 0<c<r and 0<d<r. If the data meet these conditions, then at step S13, a hash value for the message M is calculated to obtain f=Hash (M). Next, at step S14, h=1/d mod r is calculated, and at step S15, h1=fh mod r and h2=ch mod r are calculated.

At step S16, the already calculated values h1 and h2 are used to calculate P=(Xp, Yp)=h1×G+h2·Ks×G. An electronic-signature verifier knows the public keys G and Ks×G and can thus calculate a scalar multiplication of a point on the elliptic curve similar to step S4 in FIG. 11. Then, at step S17, it is determined whether the P is a point at infinity. If not, the process proceeds to step S18 (the determination of whether the P is a point at infinity can actually be made at step S16). That is, when P=(X, Y) and Q=(X, −Y) are added together, if the λ cannot be calculated, it indicates that P+Q is a point at infinity. At step S18, Xp mod r is calculated and compared with the electronic signature data c. Finally, if these values are equal, the process proceeds to step S19 to determine that the electronic signature is correct.

If it is determined that the electronic signature is correct, the data has not been tampered with and a person holding the secret key corresponding to the public keys has generated the electronic signature.

If the signature data c or d do not meet 0<c<r or 0<d<r at step S12, the process proceeds to step S20. Additionally, if the P is a point at infinity at step S17, the process also proceeds to step S20. Further, if the value of Xp mod r does not equal the signature data c at step S18, the process proceeds to step S20.

If it is determined at step S20 that the signature is incorrect, this indicates that the received data has been tampered with or has not been generated by the person holding the secret key corresponding to the public keys.

(3-4) Mutual Authentication Based on Common Key Cryptosystem

Figure 13:
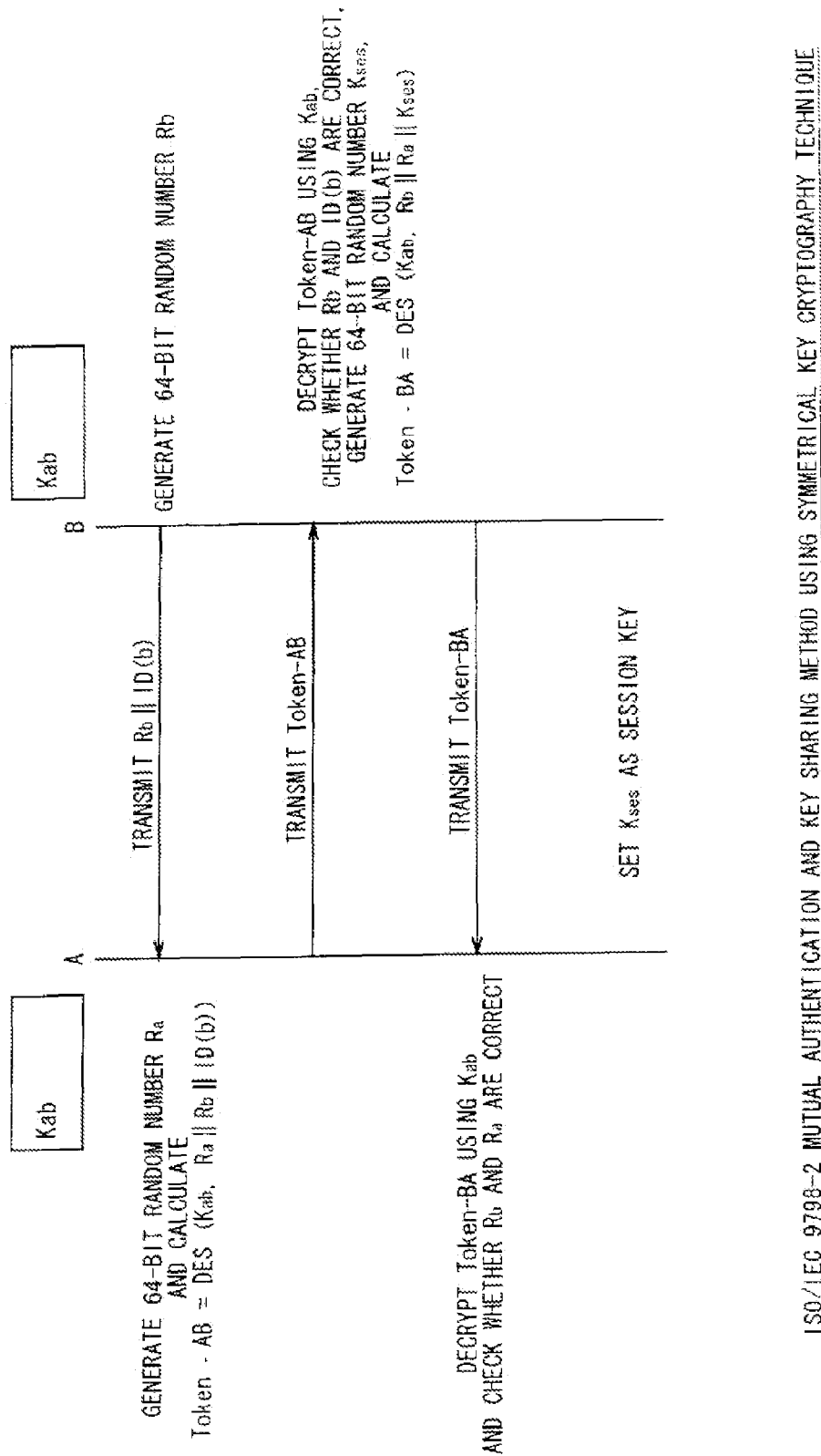
FIG. 13 is a view depicting a mutual authentication process sequence using a symmetrical cryptography technique.

Next, a mutual authentication method using a common key cryptosystem will be explained with reference to FIG. 13. In this figure, the common key cryptosystem is the DES, but any common key cryptosystem similar to that previously described may be used. In FIG. 13, B first generates a 64-bit random number Rb and transmits the Rb and its own ID, ID(b), to A. On receiving data, the A generates a new 64-bit random number Ra, encrypts the data in the DES CBC mode in the order of the Ra, Rb, and ID(b) using a key Kab, and returns them to B. According to the DES CBC mode process configuration shown in FIG. 7, the Ra, Rb, and ID(b) correspond to M1, M2, and M3, and outputs E1, E2, and E3 are encrypted texts when an initial value: IV=0.

On receiving the data, B decrypts the received data with the key Kab. To decrypt the received data, the encrypted text E1 is first decrypted with the key Kab to obtain the random number Ra. Then, the encrypted text E2 is decrypted with the key Kab, and the result and E1 are exclusive-ORed to obtain the Rb. Finally, the encrypted text E3 is decrypted with the key Kab, and the result and E2 are exclusive-ORed to obtain the ID(b). Of the Ra, Rb, and ID(b) thus obtained, the Rb and ID(b) are checked for equality to those transmitted by B. If they are successfully verified, B authenticates A.

Then, B generates a session key (hereafter referred to as "Kses") used after the authentication. Kses is generated using a random number. The Rb, Ra, and Kses are encrypted in the DES CBC mode in this order using the key Kab and then returned to A.

On receiving the data, A decrypts the received data with the key Kab. The method for decrypting the received data is similar to that executed by B, so detailed description thereof is omitted. Of the Rb, Ra, and Kses thus obtained, the Rb and Ra are checked for equality to those transmitted by A. If they are successfully verified, A authenticates B. After A and B have authenticated each other, the session key Kses is used as a common key for secret communication after the authentication.

If illegality or inequality is found during the verification of the received data, the mutual authentication is considered to have failed and the process is aborted.

(3-5) Public Key Certificate

Next, the public key certificate will be explained with reference to FIG. 14. The public key certificate is issued, for example, by a Certificate Authority ("CA") for the public key cryptosystem. When a user submits his or her own ID, a public key, and others to the CA, the CA adds information such as its own ID and valid term to the data submitted by the user and further adds its signature thereto to generate a public key certificate.

Figure 14:
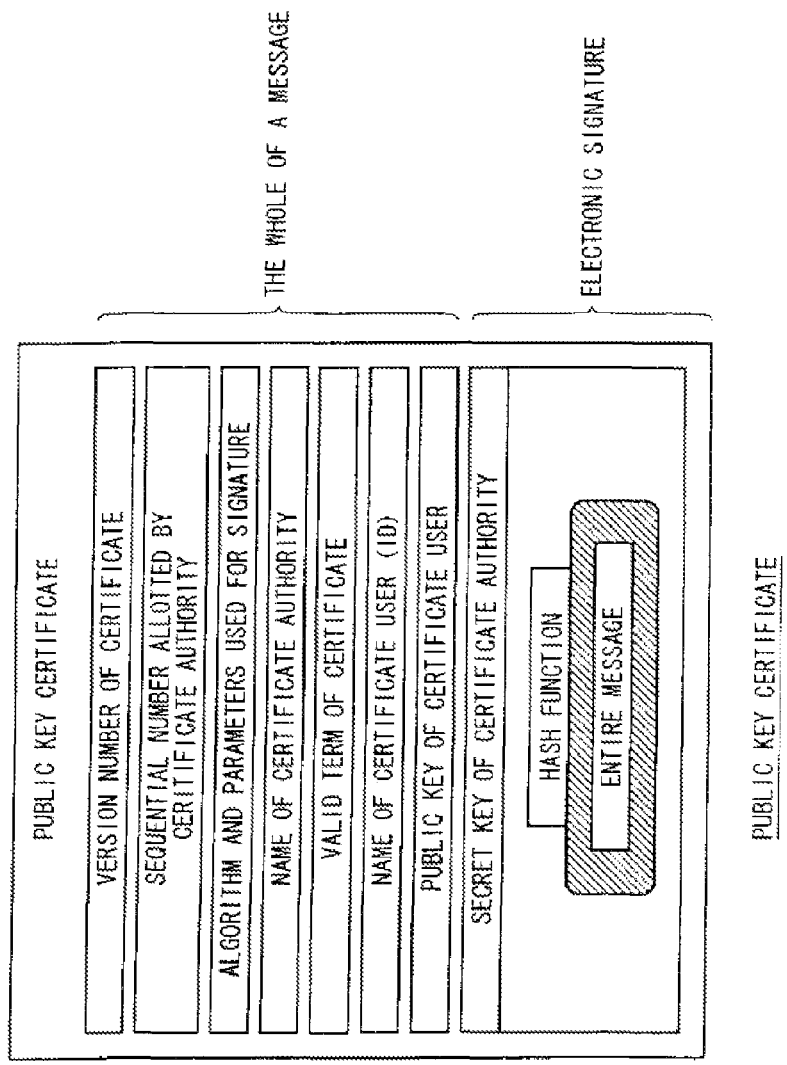
FIG. 14 is a view depicting a public key certificate.

The public key certificate shown in FIG. 14 contains the version number of the certificate, the sequential number of the certificate allotted to the certificate user by the CA, an algorithm and parameters used for the electronic signature, the name of the CA, the valid term of the certificate, the name (user ID) of the certificate user, and the public key and electronic signature of the certificate user.

The electronic signature is data generated by applying the hash function to the entirety of: the version number of the certificate, the sequential number of the certificate allotted to the certificate user by the certificate authority; the algorithm and parameter used for the electronic signature; the name of the CA; the valid term of the certificate; the name of the certificate user; and the public key of the certificate user. This generates a hash value. The secret key of the CA is used for this value. For example, the process flow described in FIG. 11 is applied to the generation of the electronic signature.

The CA issues the public key certificate shown in FIG. 14, updates a public key certificate for which the valid term has expired, and creates, manages, and distributes an illegal user list to exclude users who has committed an injustice (this is called "revocation"). It also generates public and secret keys as required.

On the other hand, to use this public key certificate, the user uses the public key of the CA held by itself to verify the electronic signature on the public key certificate. After the electronic signature has been successfully verified, the user takes the public key out from the public key certificate and uses it. Thus, all users who use the public key certificate must hold a common public key of the CA. The method for verifying the electronic authority has been described in FIG. 12, so detailed description thereof is omitted.

(3-6) Mutual Authentication Based on Public Key Cryptosystem

Figure 15:
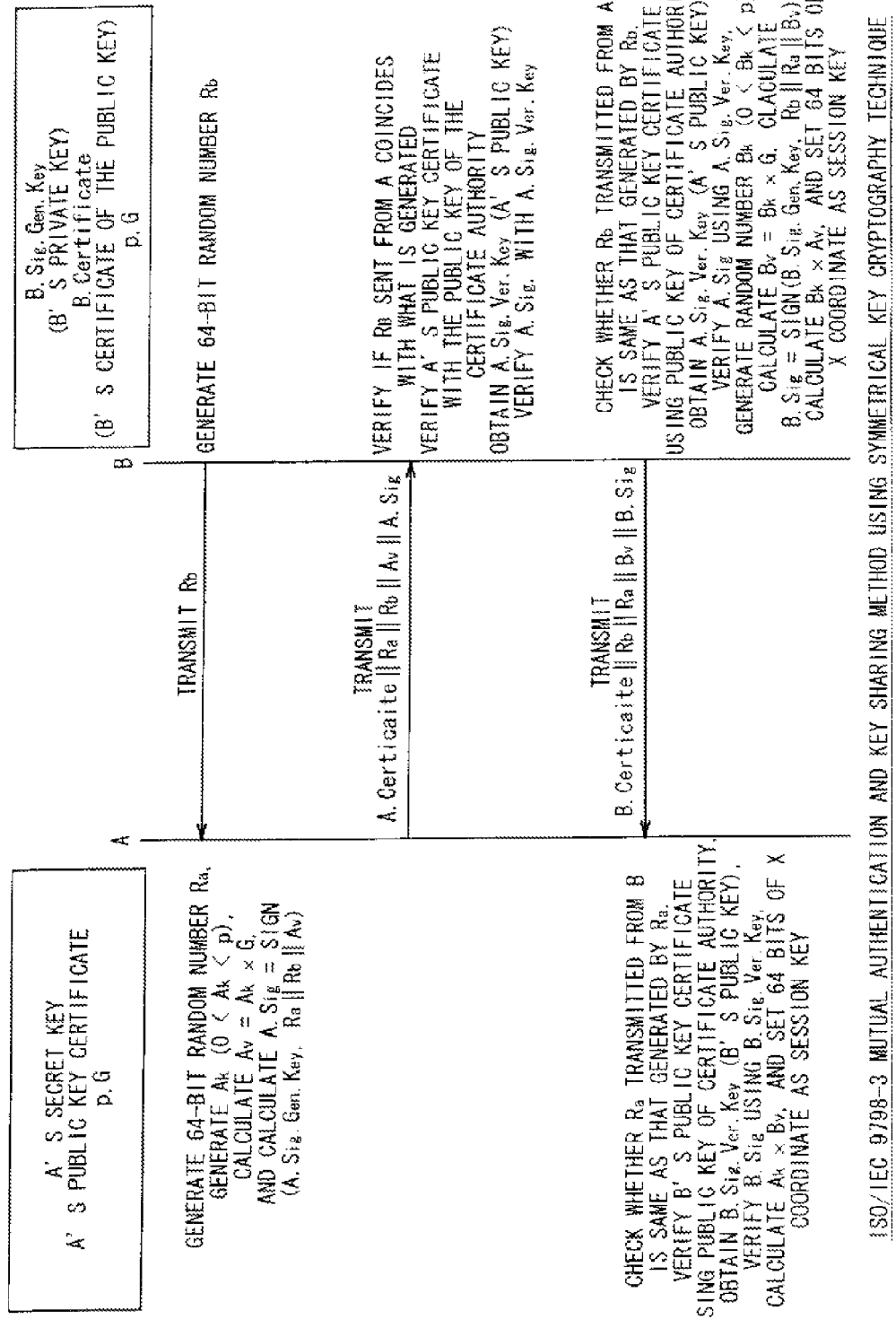
FIG. 15 is a view depicting a mutual authentication process sequence using an asymmetrical cryptography technique.

Next, a method for mutual authentication using a 160-bit elliptic curve cryptography, which is a public key cryptography, will be described with reference to FIG. 15. In this figure, the public key cryptosystem is the ECC, but any similar public key cryptosystem may be used as previously described. In addition, the key size is not limited to 160 bits. In FIG. 15, B first generates and transmits the 64-bit random number Rb to A. On receiving the data, A generates a new 64-bit random number Ra and a random number Ak smaller than the characteristic p. It then multiplies a base point G by Ak to determine a point Av=Ak×G, generates an electronic signature A. Sig for the Ra, Rb, and Av (X and Y coordinates), and returns these data to B together with A's public key certificate. In this case, since the Ra and Rb each contain 64 bits and the X and Y coordinates of the Av each contain 160 bits, the electronic signature is for the total of 448 bits. The method for generating the electronic signature has been described in FIG. 11, so detailed description thereof is omitted. The public key certificate has also been explained in FIG. 14, so detailed description thereof is omitted.

On receiving A's public key certificate, Ra, Rb, Av, and electronic signature A. Sig, B verifies that the Rb transmitted by A matches that generated by the B. If they are determined to match, B verifies the electronic signature in A's public key certificate using the public key of the CA, and takes out A's public key. The verification of the public key certificate has been explained with reference to FIG. 14, so detailed description thereof is omitted. B then uses A's public key obtained to verify the electronic signature A. Sig. The method for verifying the electronic signature has been explained in FIG. 12, so detailed description thereof is omitted. Once the electronic signature has been successfully verified, B authenticates A.

Next, B generates a new random number Bk smaller than the characteristic p. It then multiplies the base point G by Bk to determine a point Bv=Bk×G, generates an electronic signature B. Sig for the Rb, Ra, and Bv (X and Y coordinates), and returns these data to A together with B's public key certificate.

On receiving B's public key certificate, Rb, Ra, Av, and electronic signature B. Sig, A verifies that the Ra transmitted by B matches that generated by A. If they match, A verifies the electronic signature in B's public key certificate using the public key of the CA, and takes out B's public key. A then uses B's public key obtained to verify the electronic signature B. Sig. Once the electronic signature has been successfully verified, A authenticates B.

If both A and B have successfully authenticated each other, B calculates Bk×Av (since the Bk is a random number but the Av is a point on the elliptic curve, the point on the elliptic curve must be subjected to scalar multiplication), and A calculates Ak×Bv so that lower 64 bits of each of the X coordinates of these points are used as the session key for subsequent communication (if the common key cryptography uses a 64-bit key length). Of course, the session key may be generated from the Y coordinates, or the lower 64 bits may not be used. In secret communication after the mutual authentication, not only transmitted data are encrypted with the session key, but an electronic signature may be added thereto.

If illegality or inequality is found during the verification of the electronic signature or received data, the mutual authentication is considered to have failed and the process is aborted.

(3-7) Encryption Process Using Elliptic Curve Cryptography

Figure 16:
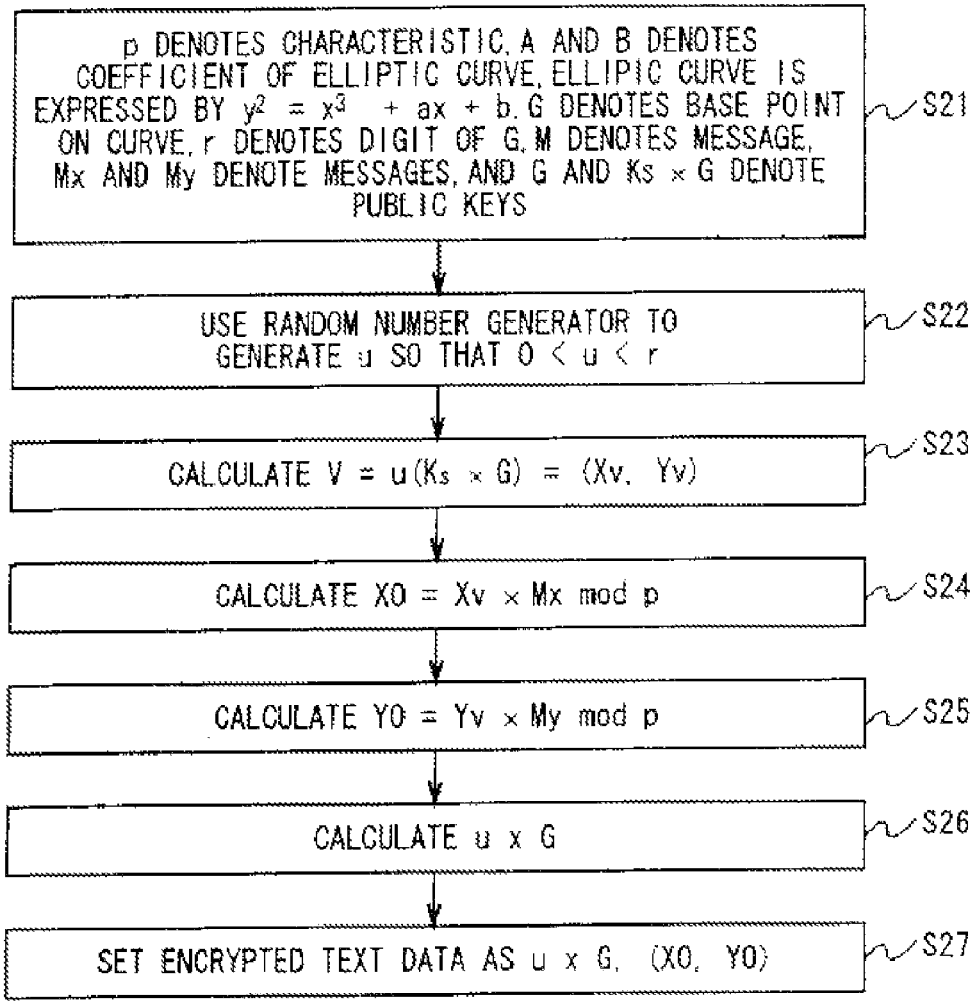
FIG. 16 is a view showing a process flow of an encryption process using elliptic curve cryptography.

Next, encryption using elliptic curve cryptography will be explained with reference to FIG. 16. At step S21, the following definitions are set. Reference symbols Mx and My denote messages. Reference symbol p denotes a characteristic, reference symbols a and b denote elliptic curve coefficients (elliptic curve: $y^2=x^3+ax+b$). Reference symbol G denotes a base point on the elliptic curve. Reference symbol r denotes the digit of G. Reference symbols G and Ks×G denote public keys (0<Ks<r). At step S22, the random number u is generated so that 0<u<r. At step S23, coordinates V are calculated by multiplying the public key Ks×G by the u. The scalar multiplication on the elliptic curve has been explained at step S4 in FIG. 11, and description thereof is thus omitted. At step S24, the X coordinate of the V is multiplied by the Mx and then divided by the p to determine a remainder X0. At step S25, the Y coordinate of the V is multiplied by the My and then divided by the p to determine a remainder Y0. If the length of the message is smaller than the number of the bits, the My comprises a random number, and the decryption section discards it. At step S26, u×G is calculated and at step S27, an encrypted text u×G, (X0, Y0) is obtained.

Decryption Process Using Elliptic Curve Cryptography

Figure 17:
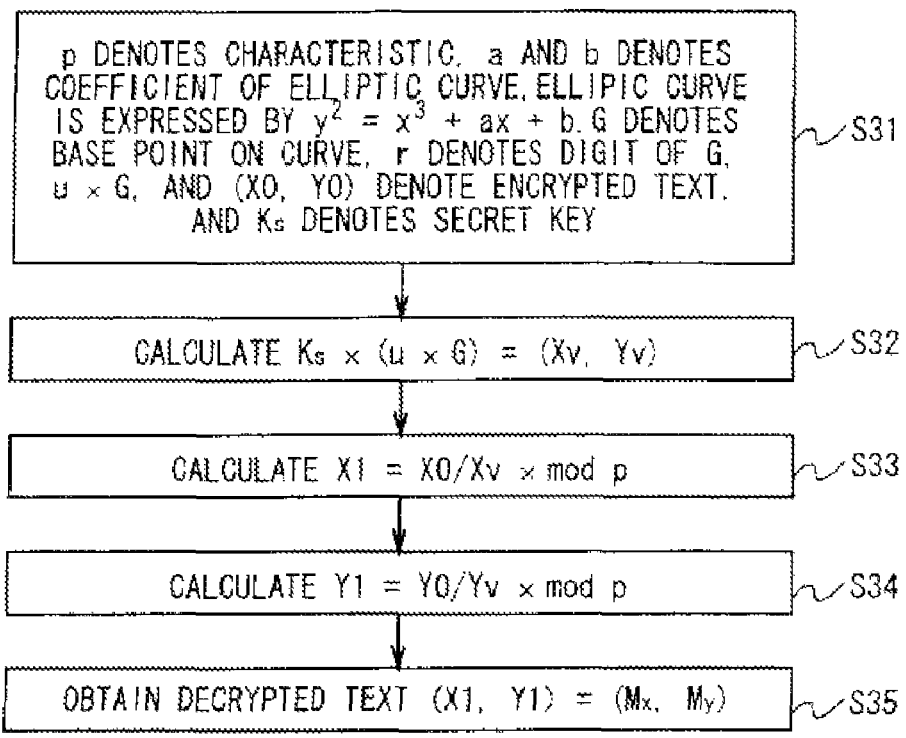
FIG. 17 is a view showing a process flow of a decryption process using elliptic curve cryptography.

Next, decryption using the elliptic curve cryptography will be described with reference to FIG. 17. At step S31, the following definitions are set. Reference symbols u×G and (X0, Y0) denote encrypted text data. Reference symbol p denotes a characteristic. Reference symbols a and b denote elliptic curve coefficients (elliptic curve: $y^2=x^3+ax+b$). Reference symbol G denotes a base point on the elliptic curve. Reference symbol r denotes the digit of G. Reference symbol Ks denotes a secret key (0<Ks<r). At step S32, the encrypted data u×G are multiplied by a value corresponding to the secret key Ks to determine coordinates V (Xv, Yv). At step S33, the X coordinate of (X0, Y0) is taken out from the encrypted data and X1=X0/Xv mod p is calculated. At step S34, the Y coordinate is taken out and Y1=Y0/Yv mod p is calculated. At step S35, X1 is determined to be Mx and Y1 is determined to be My to obtain a message. At this point, if the My is not used for the message, Y1 is discarded.

In this manner, when the secret key is Ks, the public key is G, and Ks×G is calculated, the key used for encryption and the key used for decryption may be different.

Another known example of the public key cryptography is the RSA, but detailed description thereof is omitted (details thereof are described in PKCS #1 Version 2).

Random Number Generating Process

Next, a method for generating a random number will be explained. Known random-number generating methods include an intrinsic random-number generating method that amplifies thermal noise to generate a random number from the resulting A/D output and a pseudo random-number generating method that combines together a plurality of linear circuits such as M sequences. A method is also known which uses common key cryptography such as the DES. In this example, the pseudo random-number generating method using the DES will be described (ANSI X9.17 base).

First, the value of 64 bits (for a smaller number of bits, higher bits are set to 0) obtained from data such as time is defined as D, key information used for the Triple-DES is defined as Kr, and a seed for generating a random number is defined as S. Then, the random number R is calculated as follows:

$$I=\text{Triple-}DES(Kr,D) \quad (2\text{-}1)$$

$$I=\text{Triple-}DES(Kr,S^\phi I) \quad (2\text{-}2)$$

$$I=\text{Triple-}DES(Kr,R^\phi I) \quad (2\text{-}3)$$

In this case, Triple-DES( ) is a function that uses a first argument as cryptography key information and encrypts the value of a second argument based on the Triple-DES. The operation $\phi$ is an exclusive OR executed every 64 bits. The last value S is updated as a new seed.

If random numbers are continuously generated, Equations (2-2) and (2-3) are repeated.

The aspects of various cryptography processes applicable to the data processing apparatus according to the present invention have been described. Next, specific processes executed in the present data processing apparatus will be described in detail.

(4) Configuration of Data Stored in Recording and Reproducing Device

Figure 18:
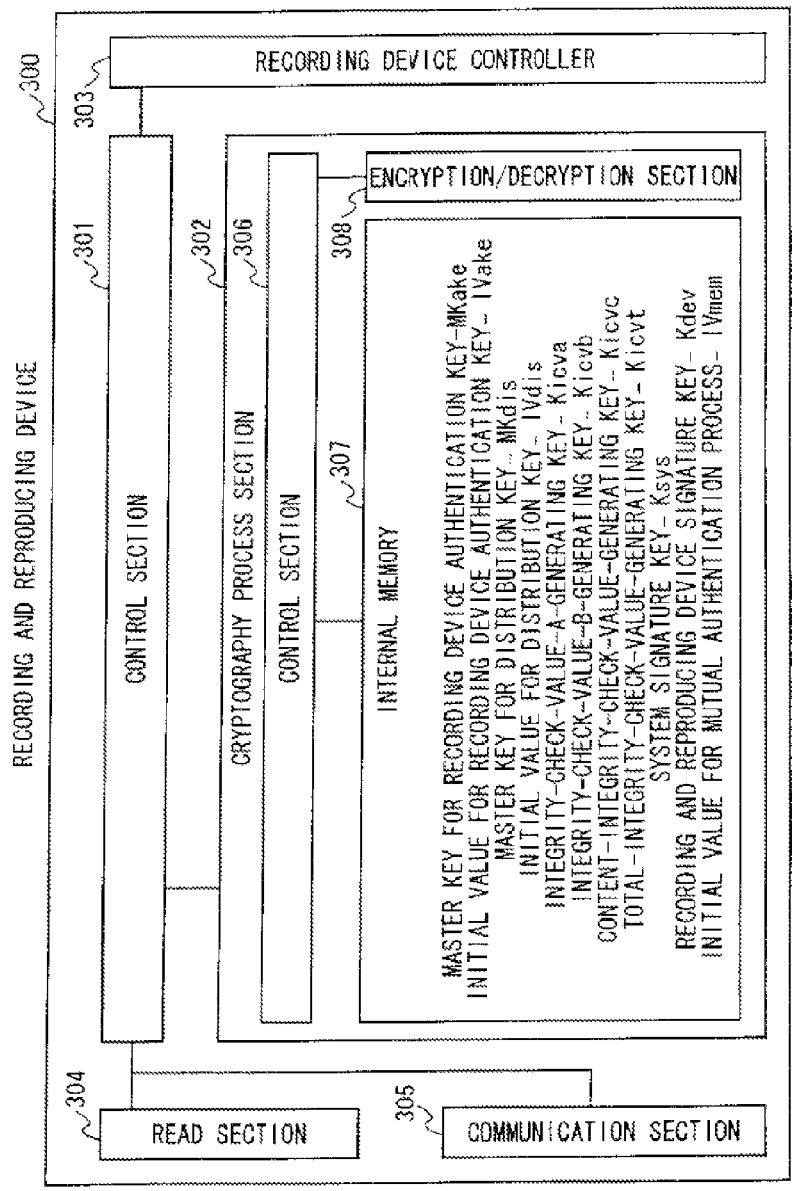
FIG. 18 is a view showing how data are held on a recording and reproducing device.

FIG. 18 is a view illustrating the contents of data held in the internal memory 307 configured in the recording and reproducing device cryptography process section 302 of the recording and reproducing device 300 shown in FIG. 3.

As shown in FIG. 18, the internal memory 307 stores the following keys and data:

MKake: recording device authenticating master key for generating an authentication and key exchange key (hereafter referred to as "Kake") required for a mutual authentication process executed between the recording and reproducing device 300 and recording device 400 (see FIG. 3).

IVake: initial value for the recording device authenticating key.

MKdis: master key for a distribution key for generating a distribution key Kdis.

IVdis: distribution-key-generating initial value.

Kicva: integrity-check-value-A-generating key for generating the integrity check value ICVa.

Kicvb: integrity-check-value-B-generating key for generating the integrity check value ICVb.

Kicvc: content-integrity-check-value-generating key for generating the integrity check value ICVi (i=1 to N) for each content block.

Kicvt: total-integrity check value-generating key for generating the total integrity check value ICVt.

Ksys: system signature key used to add a common signature or ICV to a distribution system.

Kdev: recording and reproducing device signature key that varies depending on recording and reproducing device and that is used by the recording and reproducing device to add a signature or ICV.

IVmem: initial value that is used for a cryptography process for mutual authentication, or the like. This is shared by the recording device.

These keys and data are stored in the internal memory 307 configured in the recording and reproducing device cryptography process section 302.

(5) Configuration of Data Stored in Recording Device

Figure 19:
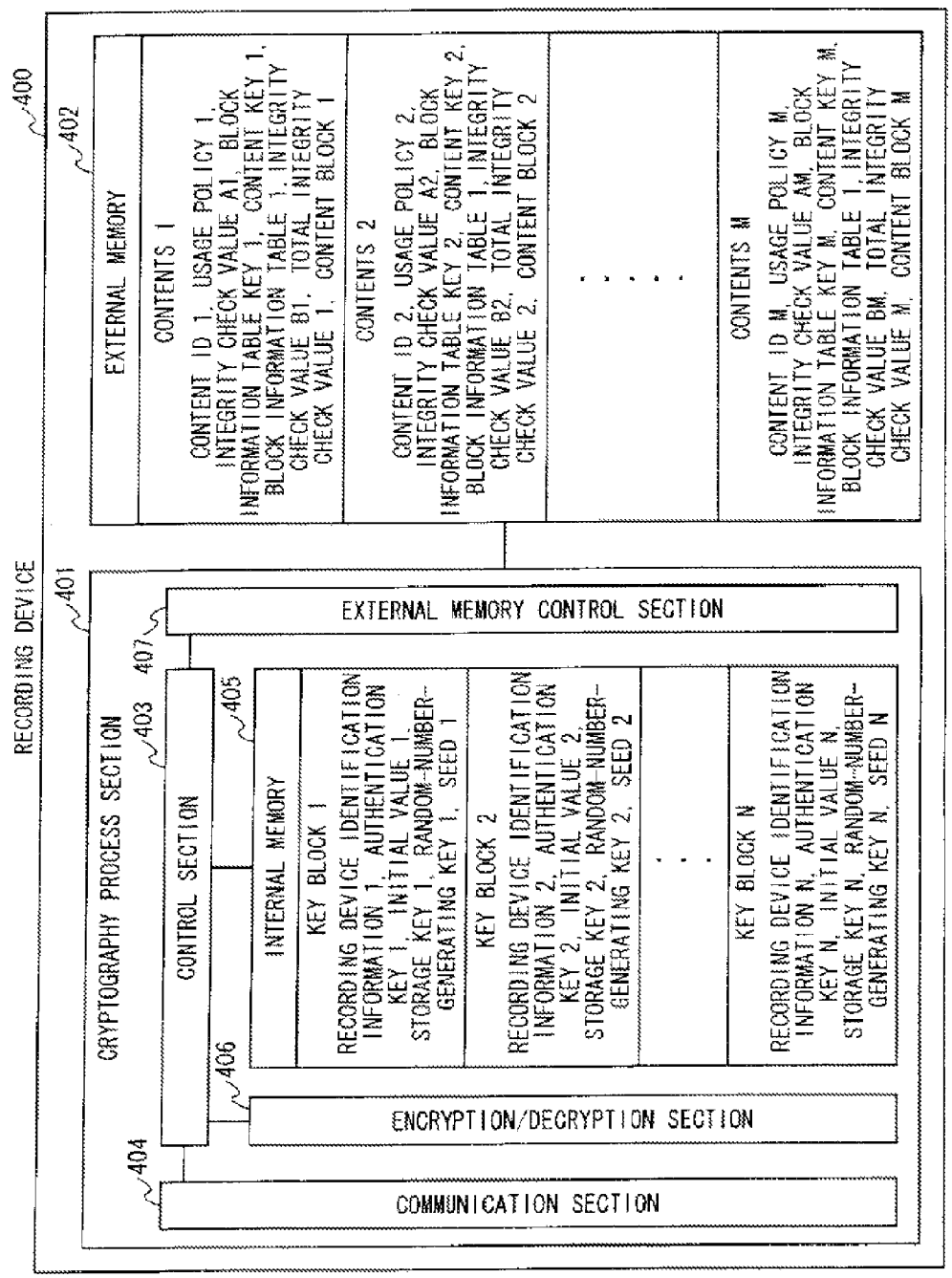
FIG. 19 is a view showing how data are held on a recording device.

FIG. 19 is a view showing how data are held on the recording device 400. In this figure, the internal memory 405 is divided into a plurality of (in this example, N) blocks each storing the following keys and data:

IDmen: recording device identification information that is unique to the recording device 400.

Kake: authentication key that is used for mutual authentication with the recording and reproducing device 300.

IVmem: initial value that is used for a cryptography process for mutual authentication, or the like.

Kstr: storage key that is a cryptography key for the block information table and other content data.

Kr: random number generating key.

S: seed.

These data are each held in the corresponding block. An external memory 402 holds a plurality of (in this example, M) content data. It holds the data described in FIG. 4 as shown, for example, in FIG. 26 or 27. The difference in configuration between FIGS. 26 and 27 will be described later.

Figure 20:
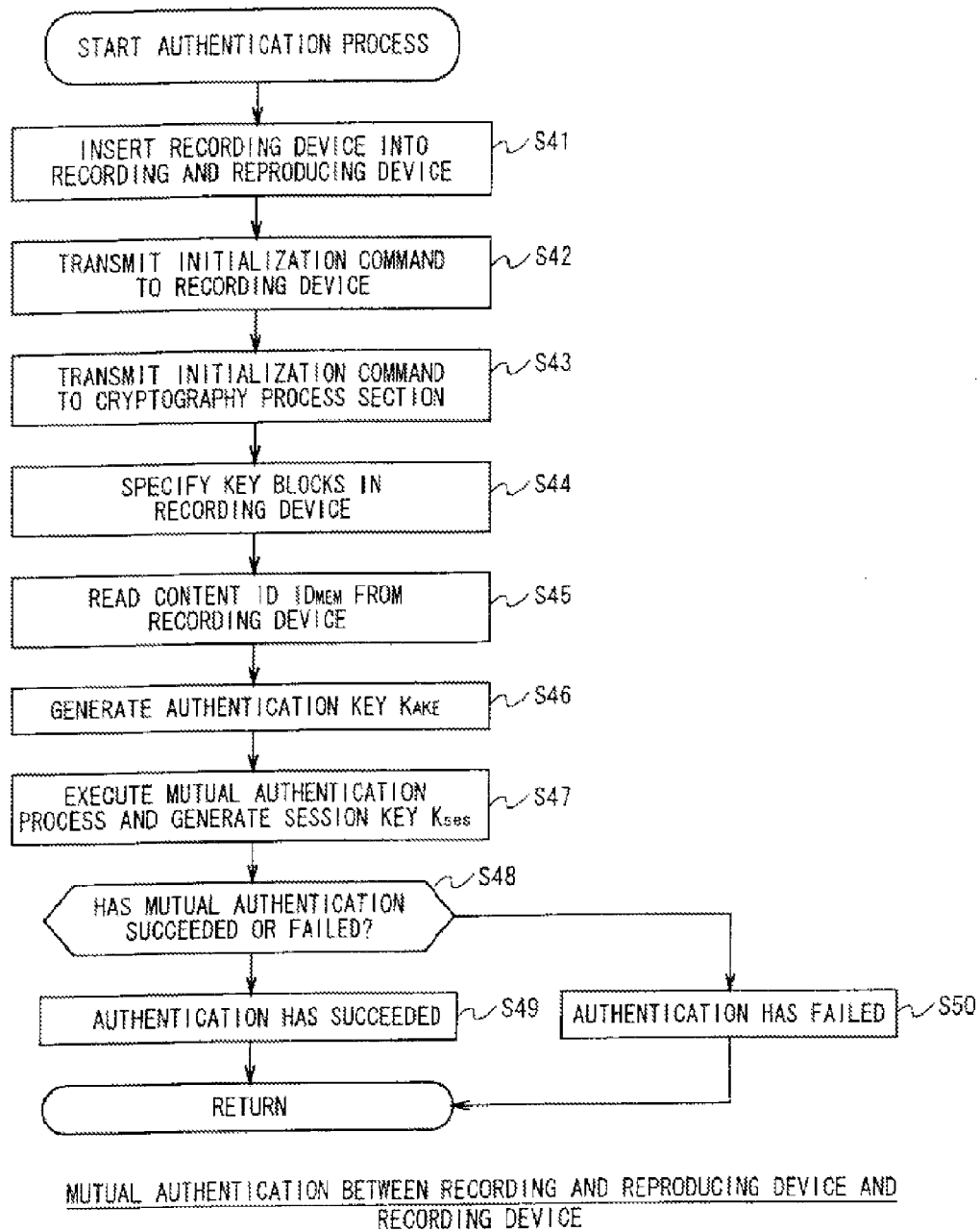
FIG. 20 is a view showing a process flow of mutual authentication between the recording and reproducing device and the recording device.

(6) Mutual Authentication Process Between Recording and Reproducing Device and Recording Device (6-1) Outline of Mutual Authentication Process FIG. 20 is a flow chart illustrating a procedure for an authentication between the recording and reproducing device 300 and the recording device 400. At step S41, the user inserted the recording device 400 into the recording and reproducing device 300. If, however, the recording device 400 is capable of communication in a non-contact manner, it need not be inserted thereinto.

When the recording device 400 is set in the recording and reproducing device 300, a recording device detecting means (not shown) in the recording and reproducing device 300 shown in FIG. 3 notifies the control section 301 that the recording device 400 has been installed. Then at step S42, the control section 301 of the recording and reproducing device 300 transmits an initialization command to the recording device 400 via the recording device controller 303. On receiving the command, the recording device 400 causes the control section 403 of the recording device cryptography process section 401 to receive the command via the communication section 404 and clear an authentication completion flag if it has been set. That is, an unauthenticated state is set.

Then at step S43, the control section 301 of the recording and reproducing device 300 transmits an initialization command to the recording and reproducing device cryptography process section 302. At this point, it also transmits a recording device insertion port number. When the recording device insertion port number is transmitted, even if a plurality of recording devices 400 are connected to the recording and reproducing device 300, the recording and reproducing device 300 can simultaneously execute authentication with these recording devices 400 and transmit and receive data thereto and therefrom.

On receiving the initialization command, the recording and reproducing device cryptography process section 302 of the recording and reproducing device 300 causes the control section 306 thereof to clear the authentication complete flag corresponding to the recording device insertion port number if it has been set. That is, the unauthenticated state is set.

Then at step S44, the control section 301 of the recording and reproducing device 300 specifies a key block number used by the recording device cryptography process section 401 of the recording device 400. Details of the key block number will be described later. At step S45, the control section 301 of the recording and reproducing device 300 reads out the recording device identification information IDmem stored in the specified key block in the internal memory 405 of the recording device 400. At step S46, the control section 301 of the recording and reproducing device 300 transmits the recording device identification information IDmem to the recording and reproducing device cryptography process section 302 to generate the authentication key Kake based on the recording device identification information IDmem. The authentication key Kake is generated, for example, as follows:

$$Kake=DES(MKake,IDmem\phi IVake) \quad (3)$$

In this case, the MKake denotes the master key for the recording device authentication key used to generate the authentication key Kake required for the mutual authentication process executed between the recording and reproducing device 300 and the recording device 400 (see FIG. 3). The master key can be stored in the internal memory 307 of the recording and reproducing device 300 as described above. Additionally, the IDmem denotes the recording device identification information unique to the recording device 400. Furthermore, the IVake denotes the initial key for the recording device authentication key. In addition, in the above equation, the DES( ) denotes a function that uses a first argument as cryptography key and encrypts the value of a second argument based on the DES. The operation $\phi$ denotes an exclusive OR executed every 64 bits.

If, for example, the DES configuration shown in FIG. 7 or 8 is applied, the message M shown in FIGS. 7 and 8 corresponds to the recording device identification information: IDmem, the key K1 corresponds to the master key for the device authentication key: MKake, the initial value IV corresponds to the value: IVake, and the output obtained is the authentication key Kake.

Then at step S47, the mutual authentication process and the process for generating the session key Kses are carried out. The mutual authentication is executed between the encryption/decryption section 308 of the recording and reproducing device cryptography process section 302 and the encryption/decryption section 406 of the recording device cryptography process section 401; the control section 301 of the recording and reproducing device 300 mediates therebetween.

The mutual authentication process can be executed as previously described in FIG. 13. In the configuration shown in FIG. 13, A and B correspond to the recording and reproducing device 300 and the recording device 400, respectively. First, the recording and reproducing device cryptography process section 302 of the recording and reproducing device 300 generates the random number Rb and transmits the Rb and the recording and reproducing device identification information IDdev, which is its own ID, to the recording device cryptography process section 401 of the recording device 400. The recording and reproducing device identification information IDdev is an identifier unique to a reproducing device stored in a memory section configured in the recording and reproducing device 300. The recording and reproducing device identification information IDdev may be recorded in the internal memory of the recording and reproducing device cryptography process section 302.

On receiving the random number Rb and the recording and reproducing device identification information IDdev, the recording device cryptography process section 401 of the recording device 400 generates a new 64-bit random number Ra, encrypts the data in the DES CBC mode in the order of the Ra, Rb, and recording and reproducing device identification information IDdev using the authentication key Kake, and returns them to the recording and reproducing device cryptography process section 302 of the recording and reproducing device 300. For example, according to the DES CBC mode process configuration shown in FIG. 7, the Ra, Rb, and IDdev correspond to the M1, M2, and M3, respectively, and when the initial value IV=IVmem, the outputs E1, E2, and E3 are encrypted texts.

On receiving the encrypted texts E1, E2, and E3, the recording and reproducing device cryptography process section 302 of the recording and reproducing device 300 decrypts the received data with the authentication key Kake. To decrypt the received data, the encrypted text E1 is first decrypted with the key Kake and the result and the IVmem are exclusive-ORed to obtain the random number Ra. Then, the encrypted text E2 is decrypted with the key Kake, and the result and the E1 are exclusive-ORed to obtain the Rb. Finally, the encrypted text E3 is decrypted with the key Kake, and the result and the E2 are exclusive-ORed to obtain the recording and reproducing device identification information IDdev. Of the Ra, Rb, and recording and reproducing device identification information IDdev thus obtained, the Rb and recording and reproducing device identification information IDdev are checked for equality to those transmitted by the recording and reproducing device 300. If they are successfully verified, the recording and reproducing device cryptography process section 302 of the recording and reproducing device 300 authenticates the recording device 400.

Then, the recording and reproducing device cryptography process section 302 of the recording and reproducing device 300 generates a session key (hereafter referred to as "Kses") used after the authentication. Kses is generated using a random number. The Rb, Ra, and Kses are encrypted in the DES CBC mode in this order using the key Kake and the initial value IVmem and then returned to the recording device cryptography process section 401 of the recording device 400.

On receiving the data, the recording device cryptography process section 401 of the recording device 400 decrypts the received data with the key Kake. The method for decrypting the received data is similar to that executed by the recording and reproducing device cryptography process section 302 of the recording and reproducing device 300, so detailed description thereof is omitted. Of the Ra, Rb, and Kses thus obtained, the Rb and Ra are checked for equality to those transmitted by the recording device 400. If they are successfully verified, the recording device cryptography process section 401 of the recording device 400 authenticates the recording and reproducing device 300. After these devices have authenticated each other, the session key Kses is used as a common key for secret communication after the authentication.

If illegality or inequality is found during the verification of the received data, the mutual authentication is considered to have failed and the process is aborted.

If the mutual authentication has been successful, the process proceeds from step S48 to step S49 where the recording and reproducing device cryptography process section 302 of the recording and reproducing device 300 holds the session key Kses and where the authentication complete flag is set, indicating that the mutual authentication has been completed. Additionally, if the mutual authentication has failed, the process proceeds to step S50, the session key Kses is discarded and the authentication complete flag is cleared. If the flag has already been cleared, the clearing process is not necessarily required.

If the recording device 400 is removed from the recording device insertion port, the recording device detecting means in the recording and reproducing device 300 notifies the control section 301 of the recording and reproducing device 300 that the recording device 400 has been removed. In response to this, the control section 301 of the recording and reproducing device 300 commands the recording and reproducing device cryptography process section 302 of the recording and reproducing device 300 to clear the authentication complete flag corresponding to the recording device insertion port number. In response to this, the recording and reproducing device cryptography process section 302 of the recording and reproducing device 300 clears the authentication complete flag corresponding to the recording device insertion port number.

The example has been described where the mutual authentication process is executed in accordance with the procedure shown in FIG. 13, but the present invention is not limited to the above described example of authentication process. The process may be executed, for example, in accordance with the above described mutual authentication procedure in FIG. 15. Alternatively, in the procedure shown in FIG. 13, A in FIG. 13 may be set as the recording and reproducing device 300, B may be set as the recording device 400, and the ID that B: recording device 400 first delivers to A: recording and reproducing device 300 may be set as the recording device identification information in the key block in the recording device 400. Various processes are applicable to the authentication process procedure executed in the present invention, and the present invention is not limited to the above described authentication process.

(6-2) Switching Key Block During Mutual Authentication

The mutual authentication process in the data processing apparatus according to the present invention is partly characterized in that the authentication process is executed by configuring a plurality of (for example, N) key blocks on the recording device 400 side and allowing the recording and reproducing device 300 to specify one of them (step S44 in the process flow in FIG. 20). As previously described in FIG. 19, the internal memory 405 configured in the cryptography process section 401 of the recording device 400 has a plurality of key blocks formed therein which store various different data such as key data and ID information. The mutual authentication process executed between the recording and reproducing device 300 and the recording device 400 as described in FIG. 20 is carried out on one of the plurality of key blocks of the recording device 400 in FIG. 19.

Conventional configurations for executing a mutual authentication process between a recording medium and a reproducing device therefor generally use a common authentication key for the mutual authentication. Thus, when the authentication key is to be changed for each product destination (e.g., country) or each product, key data required for authentication processes for the recording and reproducing device side and the recording device side must be changed on both devices. Accordingly, key data required for an authentication process stored in a newly sold recording and reproducing device 300 does not correspond to key data required for an authentication process stored in a previously sold recording and reproducing device 300, so the new recording and reproducing device 300 cannot access an old version of recording device 400. A similar situation occurs in the relationship between a new version of recording device 400 and the old version of recording and reproducing device 300.

In the data processing apparatus according to the present invention, key blocks are stored in the recording device 400 as a plurality of different key sets as shown in FIG. 19. The recording and reproducing device 300 has a key block to be applied to the authentication process. That is, a specified key block set, for example, for each product destination (e.g., country), product, device type, version, or application. This set information is stored in the memory section of the recording and reproducing device 300, for example, the internal memory 307 in FIG. 3 or other storage elements of the recording and reproducing device 300. It is accessed by the control section 301 during the authentication process to specify a key block in accordance therewith.

The master key Mkake for the recording device authentication key in the internal memory 307 of the recording and reproducing device 300 is set in accordance with settings for a specified key block and can correspond only to that specified key block. It does not establish mutual authentication with any key blocks other than the specified one.

As is seen in FIG. 19, the internal memory 405 of the recording device 400 has N key blocks (1 to N) set. Each store recording device identification information, an authentication key, an initial value, a storage key, a random-number generating key, and a seed. Each key block stores at least authenticating key data as data varying depending on the block.

In this manner, the key data configuration of the key block in the recording device 400 varies depending on the block. Thus, for example, a key block with which a certain recording and reproducing device A can execute the authentication process using the master key MKake for the recording device authentication key stored in the internal memory can be set as a key block No. 1, and a key block with which a recording and reproducing device B with a different specification can execute the authentication process can be set as another key block, for example, a key block No. 2.

Although described later in detail, when content is stored in the external memory 402 of the recording device 400, the storage key Kstr stored in each key block is used to encrypt and store the content. More specifically, the storage key is used to encrypt a content key for encrypting a content block.

As shown in FIG. 19, the storage key is configured as a key that varies depending on the block. Thus, a content stored in a memory of a recording device is prevented from being shared by two different recording and reproducing devices 300 set to specify different key blocks. That is, differently set recording and reproducing devices 300 can each use only the contents stored in a recording device 400 that is compatible with its settings.

Data that can be made common to each key block can be made so while, for example, only the authenticating key data and the storage key data may vary depending on the key block.

In a specific example where key blocks comprising a plurality of different key data are configured in the recording device 400, for example, different key block numbers to be specified are set for different types of recording and reproducing devices 300 (e.g., an installed type, a portable type, and the like), or different specified key blocks are set for different applications. Furthermore, different key blocks may be set for different territories. For example, the key block No. 1 is specified for recording and reproducing devices 300 sold in Japan, and the key block No. 2 is specified for recording and reproducing devices 300 sold in the U.S. With such a configuration, content that is used in different territories and that is stored in each recording device 400 with a different storage key cannot be used in a recording and reproducing device 300 with different key settings even if a recording device 400 such as a memory card is transferred from the U.S. to Japan or vice versa, thereby preventing the illegal or disorderly distribution of the content stored in the memory. Specifically, this serves to exclude a state where a content key Kcon encrypted with different storage keys Kstr can be mutually used in two different countries.

Moreover, at least one of the key blocks 1 to N in the internal memory 405 of the recording device 400 shown in FIG. 19, (for example, the No. N key block) may be shared by any recording and reproducing device 300.

For example, when the key block No. N and the master key MKake for the recording device authentication key, (which is capable of authentication), are stored in all apparatuses, content can be distributed irrespective of the type of the recording and reproducing device 300, the type of the application, or the destination country. For example, encrypted content stored in a memory card with the storage key stored in the key block No. N can be used in any apparatus. Music data or the like can be decrypted and reproduced from a memory card by encrypting the data with the storage key in a shared key block, storing them in the memory card, and setting the memory card in, for example, a portable sound reproducing device storing the master key MKake for the recording device authentication key, which is also shared.

Figure 21:
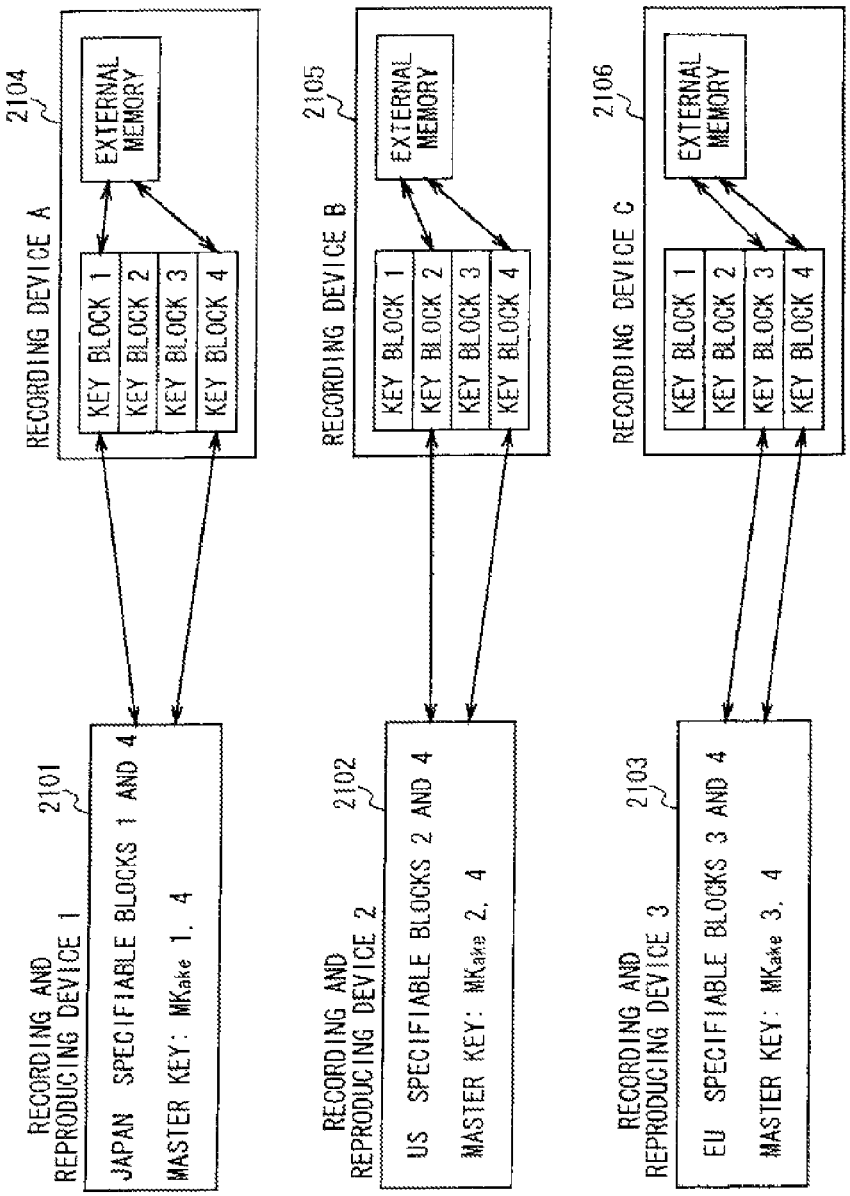
FIG. 21 is a view showing the relationship between a master key of the recording and reproducing device and a corresponding master key of the recording device.

FIG. 21 shows an example of the usage of the recording device of the present data processing apparatus, which has a plurality of key blocks. For instance, a recording and reproducing device 2101 is a product sold in Japan and has a master key that establishes an authentication process with the key blocks No. 1 and No. 4 in the recording device. A recording and reproducing device 2102 is a product sold in the U.S. and has a master key that establishes an authentication process with the key blocks No. 2 and No. 4 in the recording device. A recording and reproducing device 2103 is a product sold in the EU and has a master key that establishes an authentication process with the key blocks No. 3 and No. 4 in the recording device.

For example, the recording and reproducing device 2101 establishes authentication with the key block 1 or 4 in the recording device A 2104 to store, in the external memory, content encrypted via the storage key stored in that key block. The recording and reproducing device 2102 establishes authentication with the key block 2 or 4 in the recording device B 2105 to store, in the external memory, content encrypted via the storage key stored in that key block. The recording and reproducing device 2103 establishes authentication with the key block 3 or 4 in the recording device C 2106 to store, in the external memory, content encrypted via the storage key stored in that key block. Then, if the recording device A 2104 is installed in the recording and reproducing device 2102 or 2103, content encrypted with the storage key in the key block 1 is unavailable because authentication is not established between the recording and reproducing device 2102 or 2103 and the key block 1. On the other hand, content encrypted with the storage key in the key block 4 is available because authentication is established between the recording and reproducing device 2102 or 2103 and the key block 4.

As described above, in the data processing apparatus according to the present invention, the key blocks comprising the plurality of different key sets are configured in the recording device 400, while the recording and reproducing device 300 stores the master key enabling authentication for a particular key block, thereby enabling the setting of restrictions on content use.

Moreover, a plurality of key blocks, for example, 1 to k may be specified in one recording and reproducing device 300, while a plurality of key blocks p and q may be specified in the other recording and reproducing devices 300. Additionally, a plurality of sharable key blocks may be provided.

(7) Process for Downloading from Recording and Reproducing Device to Recording Device Next, a process for downloading content from the recording and reproducing device 300 to the external memory of the recording device 400 in the present data processing apparatus will be explained.

Figure 22:
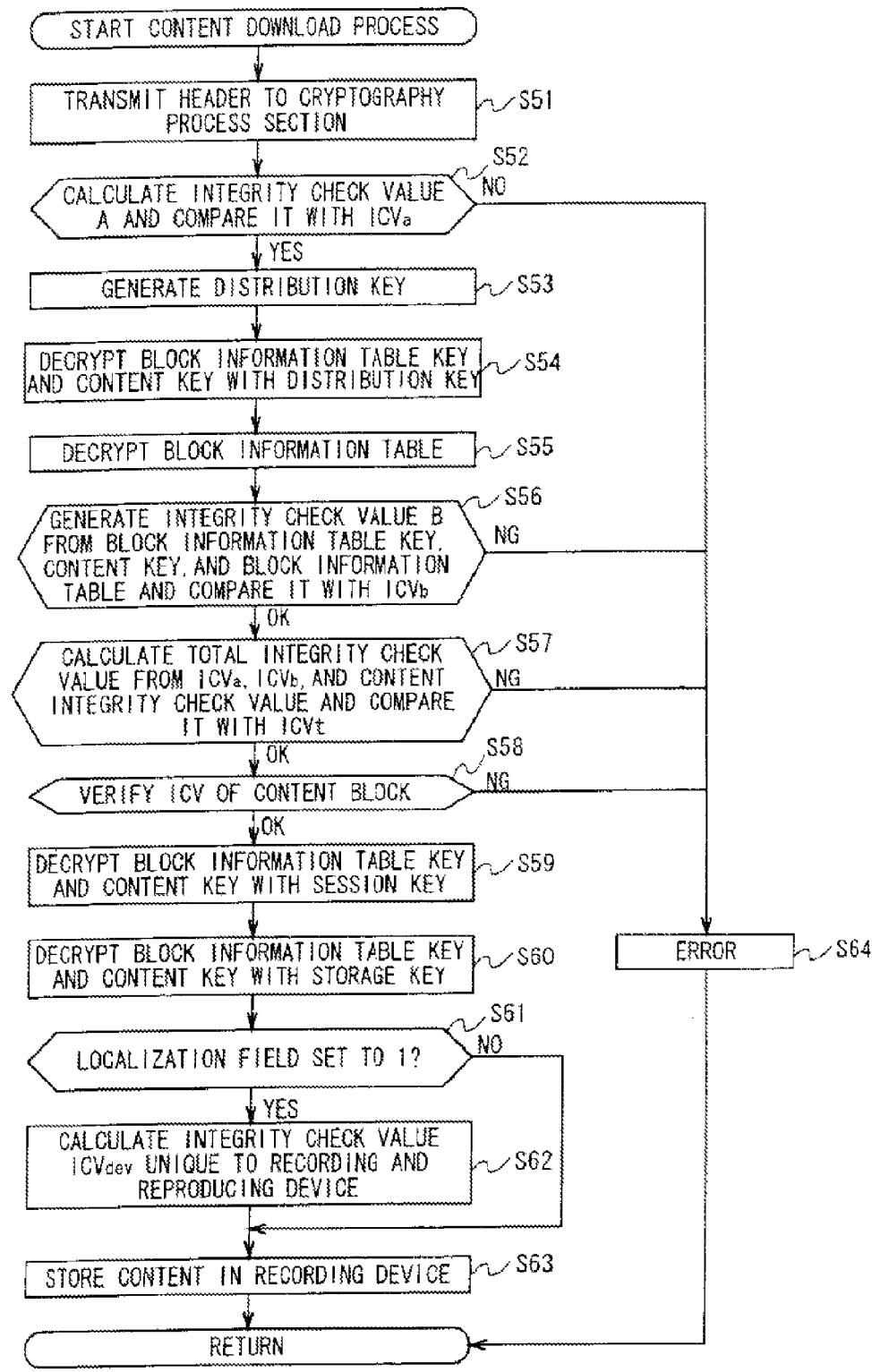
FIG. 22 is a view showing a process flow of a content download process.

FIG. 22 is a flow chart illustrating a procedure for downloading a content from the recording and reproducing device 300 to the recording device 400. In this figure, the above described mutual authentication process is assumed to have been completed between the recording and reproducing device 300 and the recording device 400.

At step S51, the control section 301 of the recording and reproducing device 300 uses the read section 304 to read data of a predetermined format out from the medium 500 storing contents or uses the communication section 305 to receive data from the communication means 600 in accordance with a predetermined format. Then, the control section 301 of the recording and reproducing device 300 transmits the header section (see FIG. 4) of the data to the recording and reproducing device cryptography process section 302 of the recording and reproducing device 300.

Figure 23:
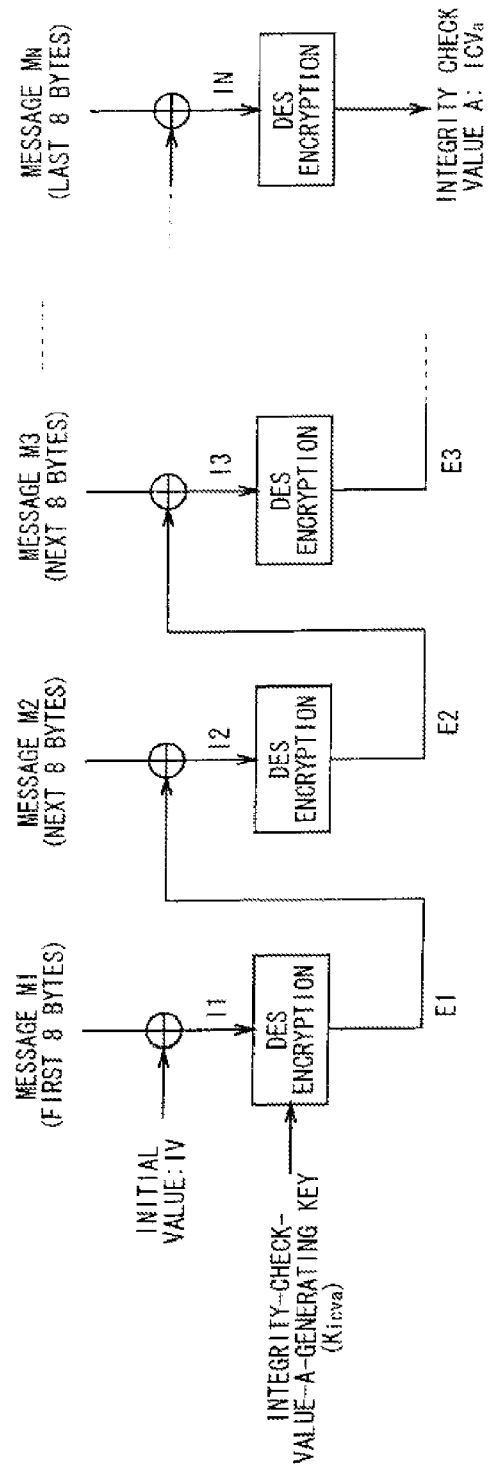
FIG. 23 is a view depicting a method for generating an integrity check value A: ICVa.

Next, at step S52, the control section 306 of the recording and reproducing device cryptography process section 302, which has received the header at step S51, causes the encryption/decryption section 308 of the recording and reproducing device cryptography process section 302 to calculate the ICVa. The ICVa is calculated in accordance with the ICV calculation method described in FIG. 7, using as a key the integrity-check-value-A-generating key Kicva stored in the internal memory 307 of the recording and reproducing device cryptography process section 302 and using the content ID and the usage policy as a message, as shown in FIG. 23. The initial value may be IV=0 or may be the integrity-check-value-A-generating initial value IVa may be used which is stored in the internal memory 307 of the recording and reproducing device cryptography process section 302. Finally, the integrity check value A and the check value: ICVa stored in the header are compared together, and if they are equal, the process proceeds to step S53.

As previously described in FIG. 4, the check value A, ICVa, is used to verify that the content ID and the usage policy have not been tampered with. If the integrity check value A calculated in accordance with the ICV calculation method described in FIG. 7 equals the check value ICVa stored in the header, it is determined that the content ID and the usage policy have not been tampered with. The integrity check value A from one method in FIG. 7 uses, as a key, the integrity-check-value-A-generating key Kicva stored in the internal memory 307. It uses the content ID and the usage policy as a message.

Next, at step S53, the control section 306 of the recording and reproducing device cryptography process section 302 causes the encryption/decryption section 308 of the recording and reproducing device cryptography process section 302 to generate the distribution key Kdis. The distribution key Kdis is generated, for example, as follows:

$$Kdis = DES(MKdis, ContentID \oplus IVdis) \quad (4)$$

In this case, the MKdis denotes the master key for the distribution key for generating the distribution key Kdis The master key can be stored in the internal memory 307 of the recording and reproducing device 300 as described above. In addition, the content ID is identification information for the header section of content data. The IVdis denotes the initial value for the distribution key. Additionally, in the above equation (4), the DES( ) denotes a function that uses a first argument as cryptography key and that encrypts the value of a second argument. The operation φ denotes an exclusive OR executed every 64 bits.

At step S54, the control section 306 of the recording and reproducing device cryptography process section 302 uses the encryption/decryption section 308 of the cryptography process section 302, as well as the distribution key Kdis generated at step S53, to decrypt the block information table key Kbit and content key Knon (see FIG. 4). Kbit and Kdis are stored in the header section of the data obtained from the medium 500 via the read section 304 or received from the communication means 600 via the communication section 305. As shown in FIG. 4, the block information table key Kbit and the content key Knon are encrypted beforehand with the distribution key Kdis on the medium 500, such as a DVD or CD, or on a communication means 600 such as the Internet.

Further, at step S55, the control section 306 of the recording and reproducing device cryptography process section 302 uses the encryption/decryption section 308 of the recording and reproducing device cryptography process section 302 to decrypt the block information table (BIT) with the block information table key Kbit decrypted at step S54. The block information table (BIT), as shown in FIG. 4, is encrypted beforehand with the block information table key Kbit on the medium 500 such as the DVD or CD, or the communication means 600 such as the Internet.

Figure 24:
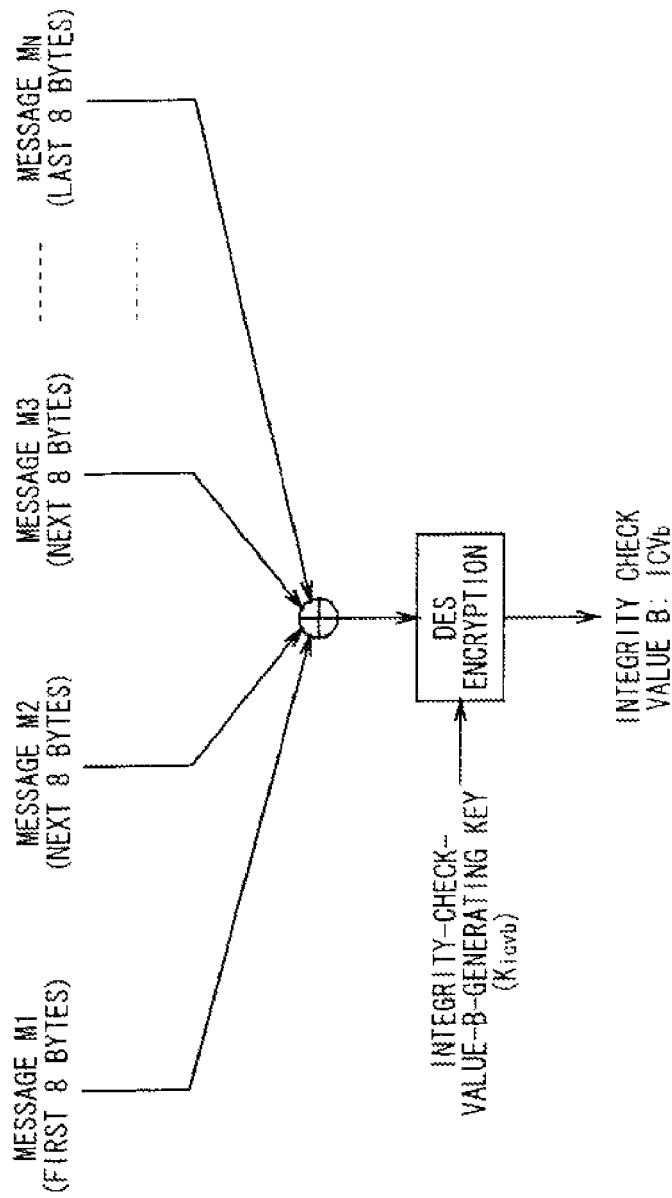
FIG. 24 is a view depicting a method for generating an integrity check value B: ICVb.

Further, at step S56, the control section 306 of the recording and reproducing device cryptography process section 302 divides the block information table key Kbit, the content key Kcon, and the block information table (BIT) into 8-byte pieces, which are all exclusive-ORed (any operation such as an addition or subtraction may be used). Next, the control section 306 of the recording and reproducing device cryptography process section 302 causes the encryption/decryption section 308 of the recording and reproducing device cryptography process section 302 to calculate the integrity check value B (ICVb). The ICVb is generated by using as a key the integrity-check-value-B-generating key Kicvb stored in the internal memory 307 of the recording and reproducing device cryptography process section 302. This is done to decrypt the previously calculated exclusive-ORed value based on the DES, as shown in FIG. 24. Finally, the integrity check value B and the ICVb in the header are compared together, and if they are equal, the process proceeds to step S57.

As previously described in FIG. 4, the check value B, ICVb is used to verify that the block information table key Kbit, the content key Kcon, and the block information table (BIT) have not been tampered with. If the integrity check value B equals the check value ICVb stored in the header, it is determined that the block information table key Kbit, the content key Kcon, and the block information table have not been tampered with. The integrity check value B is generated by using, as a key, the integrity-check-value-B-generating key Kicvb stored in the internal memory 307, dividing the block information table key Kbit, the content key Kcon, and the block information table (BIT) into 8-byte pieces; exclusive-Oring these data; and encrypting the exclusive-ORed data based on the DES.

At step S57, the control section 306 of the recording and reproducing device cryptography process section 302 causes the encryption/decryption section 308 of the recording and reproducing device cryptography process section 302 to calculate an intermediate integrity check value. The intermediate value is calculated in accordance with the ICV calculation method described in FIG. 7. This is done using the total-integrity-check-value generating key Kicvt as a key. The key is stored in the internal memory 307 of the recording and reproducing device cryptography process section 302, and uses the integrity check values A and B and all the held content integrity check values as a message. The initial value may be IV=0 or the total-integrity-check-value-generating initial value IVt may be used. IVt is stored in the internal memory 307 of the recording and reproducing device cryptography process section 302. Additionally, the intermediate integrity check value generated is stored in the recording and reproducing device cryptography process section 302 of the recording and reproducing device 300, as required.

This intermediate integrity check value is generated using the integrity check values A and B and all the content integrity check values as a message. Data verified by each of these integrity check values may be verified by collating them with the intermediate integrity check value. In this embodiment, however, a plurality of different integrity check values can be separately generated based on the intermediate integrity check value. This is done so that the process for verifying the absence of tamper which process is executed for shared data for the entire system and the verification process for identifying occupied data occupied only by each recording and reproducing device 300 after the download process can be distinguishably executed. The plurality of different integrity check values are, for instance, total integrity check values ICVt and the check value ICVdev unique to the recording and reproducing device 300. These integrity check values will be described later.

The control section 306 of the recording and reproducing device cryptography process section 302 causes the encryption/decryption section 308 of the recording and reproducing device cryptography process section 302 to calculate the total integrity check value ICVt. The total integrity check value ICVt is generated by using as a key a system signature key Ksys to decrypt the intermediate integrity check value based on the DES. Ksys can be stored in the internal memory 307 of the recording and reproducing device cryptography process section 302. Finally, the total integrity check value ICVt generated and the ICVt in the header stored at step S51 are compared together, and if they are equal, the process proceeds to step S58. The system signature key Ksys is common to a plurality of recording and reproducing devices 300, that is, the entire system executing the process of recording and reproducing certain data.

As previously described in FIG. 4, the total integrity check value ICVt is used to verify that all of the integrity check values ICVa and ICVb and the integrity check value for each content block have not been tampered with. Thus, if the total integrity check value generated by means of the above-described process equals the integrity check value ICVt, stored in the header, it is determined that all of the integrity check values ICVa and ICVb and the integrity check value for each content block have not been tampered with.

Then at step S58, the control section 301 of the recording and reproducing device 300 takes content block information out from the block information table (BIT) and checks whether any content block is to be verified. If any content block is to be verified, the content integrity check value has been stored in the block information in the header.

If any content block is to be verified, the control section 301 reads this content block out from the medium 500 by using the read section 304 of the recording and reproducing device 300 or received from communicating means 600 by using the communication section 305 of the recording and reproducing device 300. Control section 301 transmits the content block to the recording and reproducing device cryptography process section 302 of the recording and reproducing device 300. On receiving the content block, the control section 306 of the recording and reproducing device cryptography process section 302 causes the encryption/decryption section 308 of the recording and reproducing device cryptography process section 302 to calculate the content intermediate value.

The content intermediate value is generated by using the content key Kcon decrypted at step S54 to decrypt an input content block in the DES CBC mode, separating the resulting data into 8-byte pieces, and exclusive-ORing all these pieces (any operation such as an addition or subtraction may be used).

Then, the control section 306 of the recording and reproducing device cryptography process section 302 causes the encryption/decryption section 308 of the recording and reproducing device cryptography process section 302 to calculate the content integrity check value. The content integrity check value is generated by using as a key the content-integrity-check-value-generating key Kicvc to decrypt the content intermediate value based on the DES. Kicvc is stored in the internal memory 307 of the recording and reproducing device cryptography process section 302. Then, the control section 306 of the recording and reproducing device cryptography process section 302 compares this content integrity check value with the ICV in the content block received from the control section 301 of the recording and reproducing device 300 at step S51. It then passes the result to the control section 301 of the recording and reproducing device 300. On receiving the result, and if the verification has been successful, the control section 301 of the recording and reproducing device 300 takes out the next content block to be verified and causes the recording and reproducing device cryptography process section 302 of the recording and reproducing device 300 to verify this content block. Similar verification processes are repeated until all the content blocks are verified. The initial value may be IV=0 or the content-integrity-check-value-generating initial value IVc used may be that which is stored in the internal memory 307 of the recording and reproducing device cryptography process section 302 (if the header generating side uses the same settings). Additionally, all the checked content integrity check values are held in the recording and reproducing device cryptography process section 302 of the recording and reproducing device 300. Furthermore, the recording and reproducing device cryptography process section 302 of the recording and reproducing device 300 monitors the order in which the content blocks are verified. This is done to consider whether the authentication has failed (if the order is incorrect) or if it verifies the same content block twice or more. If all the content blocks have been successfully verified, the process proceeds to step S59.

Then at step S59, the recording and reproducing device cryptography process section 302 of the recording and reproducing device 300 causes the encryption/decryption section 308 of the recording and reproducing device cryptography process section 302 to encrypt the block information table key Kbit and content key Kcon decrypted at step S54. This is done using the session key Kses made sharable during the mutual authentication. The control section 301 of the recording and reproducing device 300 reads the block information table key Kbit and content key Kcon from the recording and reproducing device cryptography process section 302 of the recording and reproducing device 300. The block information table key Kbit and content key Kcon being decrypted using the session key Kses. The control section 301 then transmits these data to the recording device 400 via the recording device controller 303 of the recording and reproducing device 300.

Then at step S60, on receiving the block information table key Kbit and content key Kcon transmitted from the recording and reproducing device 300, the recording device 400 causes the encryption/decryption section 406 of the recording device cryptography process section 401 to decrypt the received data using the session key Kses. Kses is made sharable during the mutual authentication. Encryption/decryption section 406 reencrypts the decrypted data with the storage key Kstr, which is unique to the recording device and is stored in the internal memory 405 of the recording device cryptography process 401. Finally, the control section 301 of the recording and reproducing device 300 reads the block information key Kbit and the content key Kcon out from the recording device 400 via the recording device controller 303 of the recording and reproducing device 300. The block information key Kbit and the content key Kcon can be reencrypted with the storage key Kstr. These are then substituted with the block information key Kbit and content key Kcon encrypted with the distribution key Kdis.

At step S61, the control section 301 of the recording and reproducing device 300 takes the localization field out from the usage policy in the header section of the data to determine whether the downloaded content can be used only in this recording and reproducing device 300 (in this case, the localization field is set to 1) or also by other similar recording and reproducing devices 300 (in this case, the localization field is set to 0). If the result of the determination shows that the localization field is set to 1, the process proceeds to step S62.

At step S62, the control section 301 of the recording and reproducing device 300 causes the recording and reproducing device cryptography process section 302 of the recording and reproducing device 300 to calculate the integrity check value unique to the recording and reproducing device 300. The integrity check value unique to the recording and reproducing device 300 is generated by using as a key a recording and reproducing device signature key Kdev to decrypt the intermediate integrity check value based on the DES, the intermediate integrity check value being held at step S58. Kdev is stored in the internal memory 307. The calculated integrity check value ICVdev unique to the recording and reproducing device 300 substitutes for the total integrity check value ICVt.

As previously described, the system signature key Ksys is used to add a common signature, or ICV, to the distribution system. The recording and reproducing device 300 signature key Kdev varies depending on the recording and reproducing device 300 and is used by the recording and reproducing device to add a signature or ICV. That is, data signed with the system signature key Ksys are successfully checked by a system (recording and reproducing device 300) having the same system signature key. Specifically, such data have the same total integrity check value ICVt so as to be sharable. If, however, data is signed with the recording and reproducing device signature key Kdev the data stored in a recording device after the signing cannot be reproduced if an attempt is made to reproduce it after this recording device has been inserted in another recording and reproducing device 300. That is, an error occurs due to the unequal integrity check values ICVdev unique to the recording and reproducing device 300.

Thus, in the data processing apparatus according to the present invention, the setting of the localization field enables contents to be arbitrarily set so as to be shared throughout the entire system or used only by particular recording and reproducing devices 300.

At step S63, the control section 301 of the recording and reproducing device 300 stores the content in the external memory 402 of the recording device 400.

Figure 26:
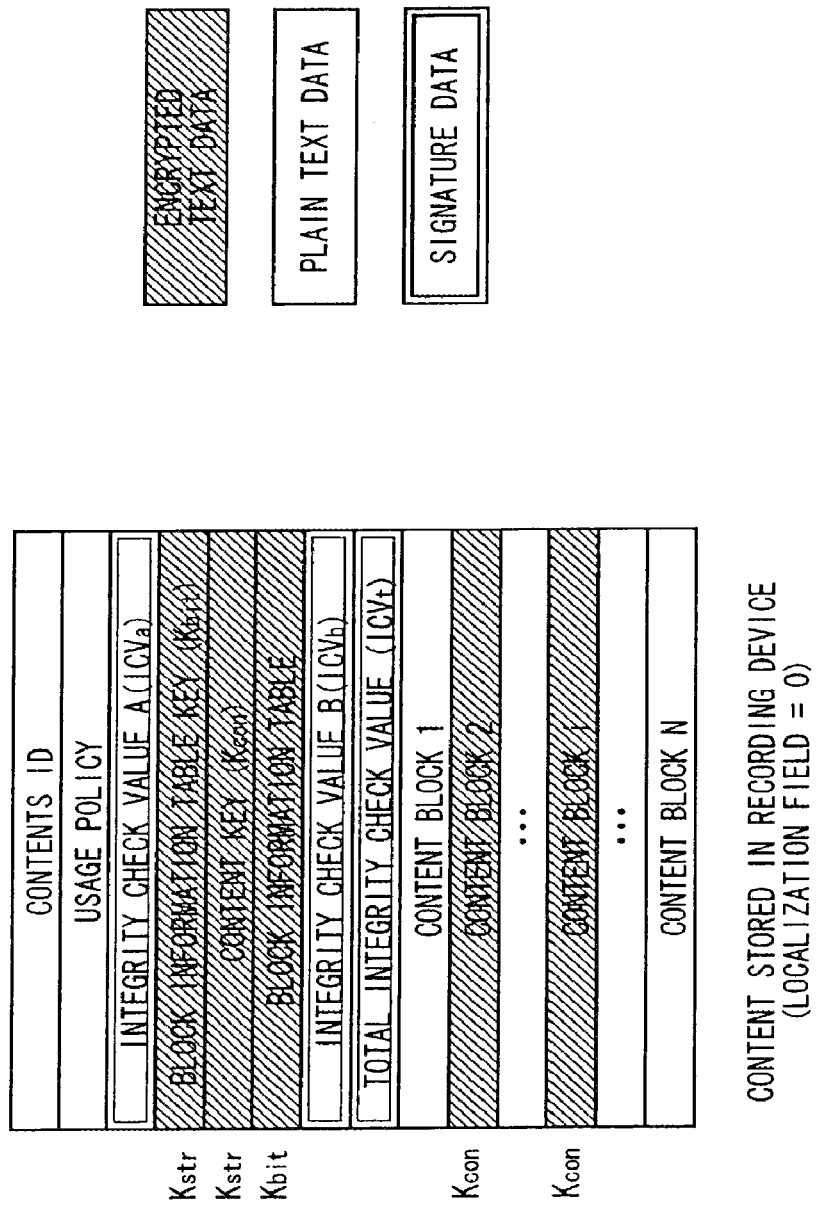
FIG. 26 is a view showing a format of content data stored in the recording device (localization field=0).
Figure 27:
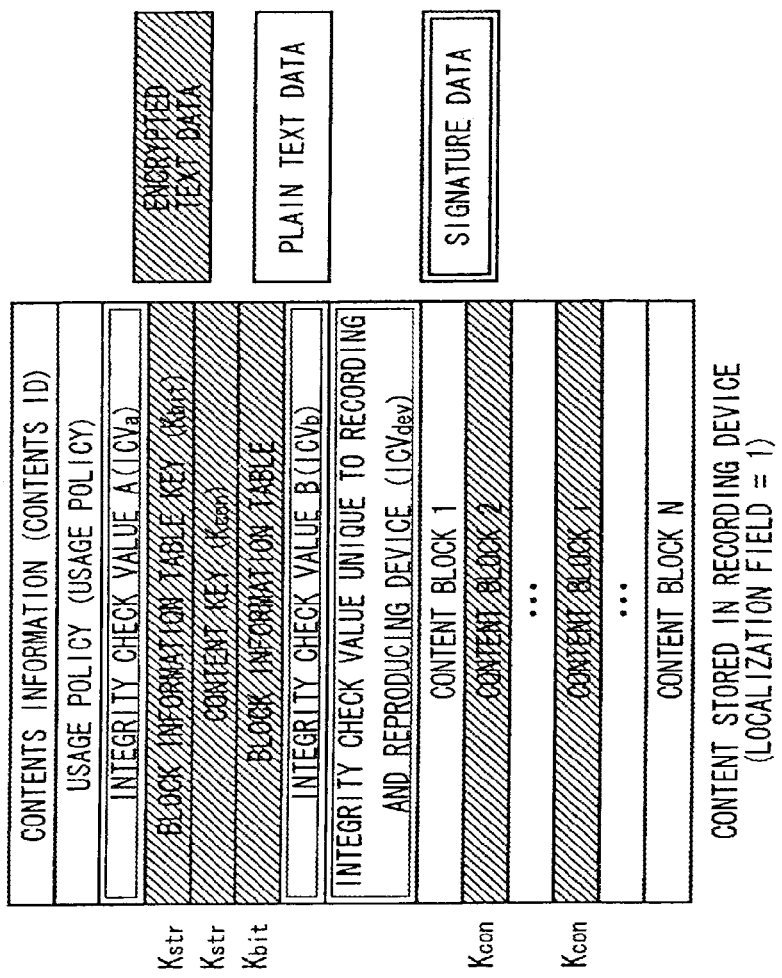
FIG. 27 is a view showing a format of content data stored in the recording device (localization field=1).

FIG. 26 is a view showing how the content is stored in the recording device 400 if the localization field is set to 0. FIG. 27 is a view showing how the content is stored in the recording device 400 if the localization field is set to 1. The only difference between FIGS. 26 and 4 is whether the content block information key Kbit and the content key Kcon are encrypted with the distribution key Kdis or the storage key Kstr. The difference between FIGS. 27 and 26 is that the integrity check value calculated from the intermediate integrity check value is encrypted with the system signature key Ksys in FIG. 26, whereas it is encrypted with the recording and reproducing device signature key Kdev unique to the recording and reproducing device 300 in FIG. 27.

In the process flow of FIG. 22, if the verification of the integrity check value A has failed at step S52, if the verification of the integrity check value B has failed at step S56, if the verification of the total integrity check value ICVt has failed at step S57, or if the verification of the content block content integrity check value has failed at step S58, then the process proceeds to step S64 to provide a predetermined error display because the verification is no good.

In addition, if the localization field is 0 at step S61, the process skips step S62 to advance to step S63.

(8) Process Executed by Recording and Reproducing Device to Reproduce Information Stored in Recording Device Next, a process executed by the recording and reproducing device 300 to reproduce content information stored in the external memory 402 of the recording device 400 is analyzed.

Figure 28:
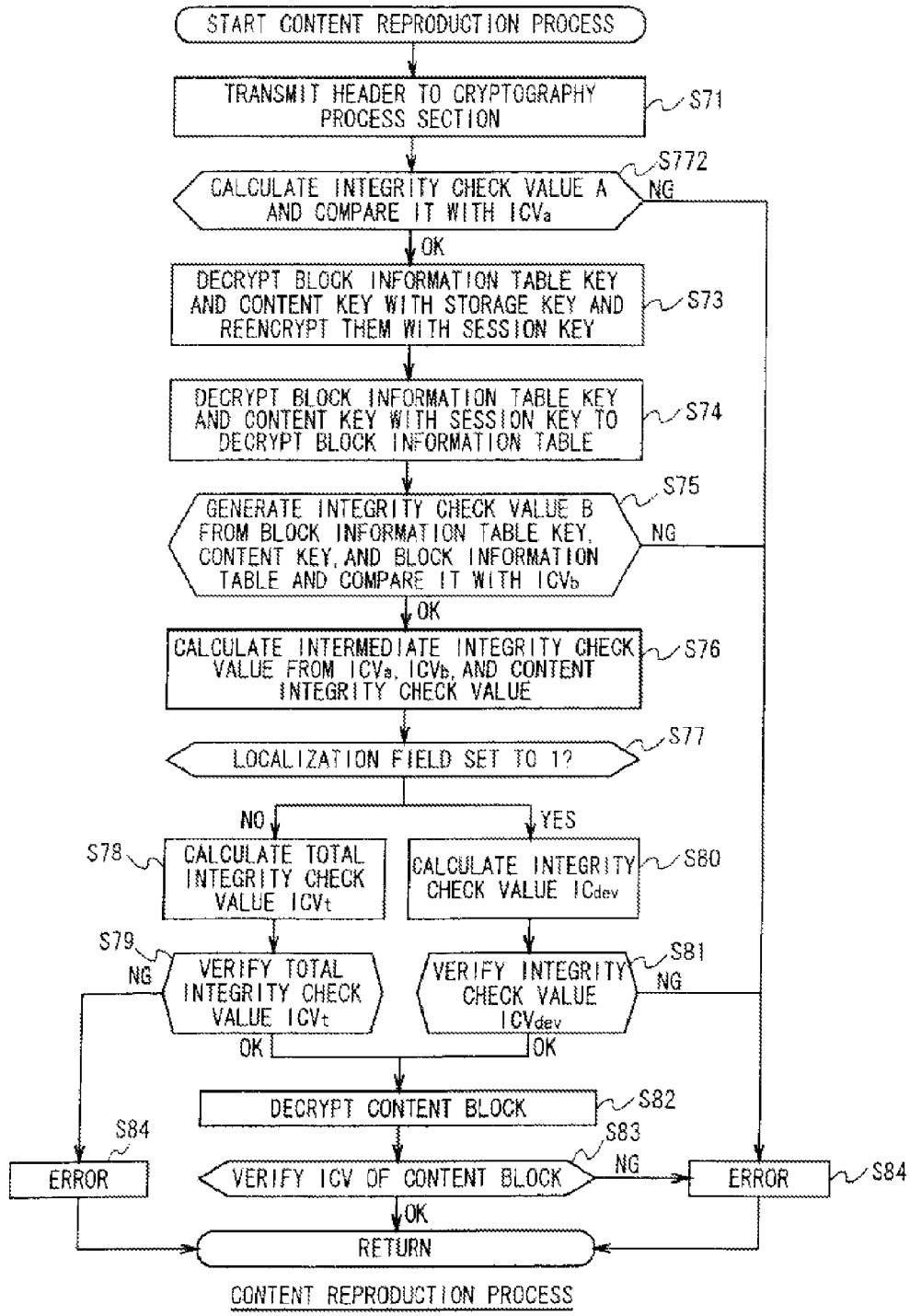
FIG. 28 is a view showing a process flow of a content reproduction process.

FIG. 28 illustrates a procedure executed by the recording and reproducing device 300 to read content out from the recording device 400 and use it. In FIG. 28, the mutual authentication is assumed to have been completed between the recording and reproducing device 300 and the recording device 400.

At step S71, the control section 301 of the recording and reproducing device 300 uses the recording device controller 303 to read the content out from the external memory 402 of the recording device 400. The control section 301 of the recording and reproducing device 300 then transmits the header section of the data to the recording and reproducing device cryptography process section 302 of the recording and reproducing device 300. Step S72 is similar to step S52 described in "(7) Process for Downloading from Recording and Reproducing Device to Recording Device." At this step, the control section 306 of the recording and reproducing device cryptography process section 302, which has received the header, causes the encryption/decryption section 308 of the recording and reproducing device cryptography process section 302 to calculate the integrity check value A. The integrity check value A is calculated in accordance with an ICV calculation method similar to that described in FIG. 7, using, as a key, the integrity-check-value-A-generating key Kicva and using the content ID and the usage policy as a message, as shown in FIG. 23. Kicva can be stored in the internal memory 307 of the recording and reproducing device cryptography process section 302.

As previously described, the check value A, ICVa, is used to verify that the content ID and the usage policy have not been tampered with. If the integrity check value A calculated in accordance with the ICV calculation method described in FIG. 7 equals the check value ICVa stored in the header, it is determined that the content ID and usage policy stored in the recording device 400 have not been tampered with. Integrity check value A is calculated using, as a key, the integrity-check-value-A-generating key Kicva stored in the internal memory 307 and using the content ID and the usage policy as a message.

Then at step S73, the control section 301 of the recording and reproducing device 300 takes the block information table key Kbit and the content key Kcon out from the read-out header section. It then transmits them to the recording device 400 via the recording device controller 303 of the recording and reproducing device 300. On receiving the block information table key Kbit and the content key Kcon transmitted from the recording and reproducing device 300, the recording device 400 causes the encryption/decryption section 406 of the recording device cryptography process section 401 to decrypt the received data with the storage key Kstr, and to then reencrypt the decrypted data using the session key Kses made sharable during the mutual authentication. Kstr is unique to the recording device which is stored in the internal memory 405. Then, the control section 301 of the recording and reproducing device 300 reads the block information key Kbit and the content key Kcon out from the recording device 400 via the recording device controller 303 of the recording and reproducing device 300. The block information key Kbit and the content key Kcon can be reencrypted with the session key Kses from the recording device 400.

Then at step S74, the control section 301 of the recording and reproducing device 300 transmits the received block information key Kbit and content key Kcon to the recording and reproducing device cryptography process section 302 of the recording and reproducing device 300. The block information key Kbit and content key Kcon can be reencrypted with the session key Kses.

On receiving the block information key Kbit and content key Kcon reencrypted with the session key Kses, the recording and reproducing device cryptography process section 302 of the recording and reproducing device 300 causes the encryption/decryption section 308 of the recording and reproducing device cryptography process section 302 to decrypt the block information key Kbit and content key Kcon encrypted with the session key Kses. This is done using the session key Kses made sharable during the mutual authentication. The recording and reproducing device cryptography process section 302 then causes the encryption/decryption section 308 to decrypt the block information table received at step S71. This is done using the decrypted block information table key Kbit.

The recording and reproducing device cryptography process section 302 of the recording and reproducing device 300 substitutes the decrypted block information table key Kbit, content key Kcon, and block information table BIT with those received at step S71 for retention. In addition, the control section 301 of the recording and reproducing device 300 reads the decrypted block information table BIT out from the recording and reproducing device cryptography process section 302 of the recording and reproducing device 300.

Step S75 is similar to step S56 described in "(7) Process for Downloading from Recording and Reproducing Device to Recording Device." The control section 306 of the recording and reproducing device cryptography process section 302 divides the block information table key Kbit, content key Kcon, and block information table (BIT) read out from the recording device 400, into 8-byte pieces and then exclusive-ORs all of them. The control section 306 of the recording and reproducing device cryptography process section 302 then causes the encryption/decryption section 308 of the recording and reproducing device cryptography process section 302 to calculate BICVb. ICVb is generated by using as a key the integrity-check-value-B-generating key Kicvb stored in the internal memory 307 of the recording and reproducing device cryptography process section 302, as shown in the previously described FIG. 24. This is done to encrypt the previously calculated exclusive-ORed value based on the DES. Finally, the check value B and the ICVb in the header are compared together, and if they are equal, the process proceeds to step S76.

As previously described, the check value B, ICVb, is used to verify that the block information table key Kbit, the content key Kcon, and the block information table have not been tampered with. If the integrity check value B generated by using as a key the integrity-check-value-B-generating key Kicvb equals the check value ICVb stored in the header of the data read out from the recording device 400, it is determined that the block information table key Kbit, the content key Kcon, and the block information table have not been tampered with. Kicvb is stored in the internal memory 307. The block information table key Kbit, the content key Kcon, and the block information table (BIT) read from the recording device 400 are divided into 8-byte pieces. This data is exclusive-ORed. The exclusive-ORed data is encrypted based on the DES.

At step S76, the control section 306 of the recording and reproducing device cryptography process section 302 causes the encryption/decryption section 308 of the recording and reproducing device cryptography process section 302 to calculate the intermediate integrity check value. The intermediate value is calculated in accordance with the ICV calculation method described in FIG. 7 or the like. This is done using the total-integrity-check-value-generating key Kicvt as a message. Kicvt is stored in the internal memory 307. Kicvt incorporates the integrity check values A and B and all the held content integrity check values. The initial value may be IV=0 or the total-integrity-check-value-generating initial value IVt may be used. Additionally, the intermediate integrity check value is stored in the recording and reproducing device cryptography process section 302.

Then at step S77, the control section 301 of the recording and reproducing device 300 takes the localization field out from the usage policy (contained in the header section of the data read out from the external memory 402 of the recording device 400), to determine whether the downloaded content can be used only in this recording and reproducing device 300 (in this case, the localization field is set to 1), or also by other similar recording and reproducing devices 300 (in this case, the localization field is set to 0). If the result of the determination shows that the localization field is set to 1, that is, the process proceeds to step S80. A value of 1 means that it is set such that the downloaded content can be used only in this recording and reproducing device 300. If the localization is set to 0, then the process proceeds to step S78. A value of 0 means that it is set such that the content can also be used by other similar recording and reproducing device 300. Step S77 may be processed by the cryptography process section 302.

Figure 25:
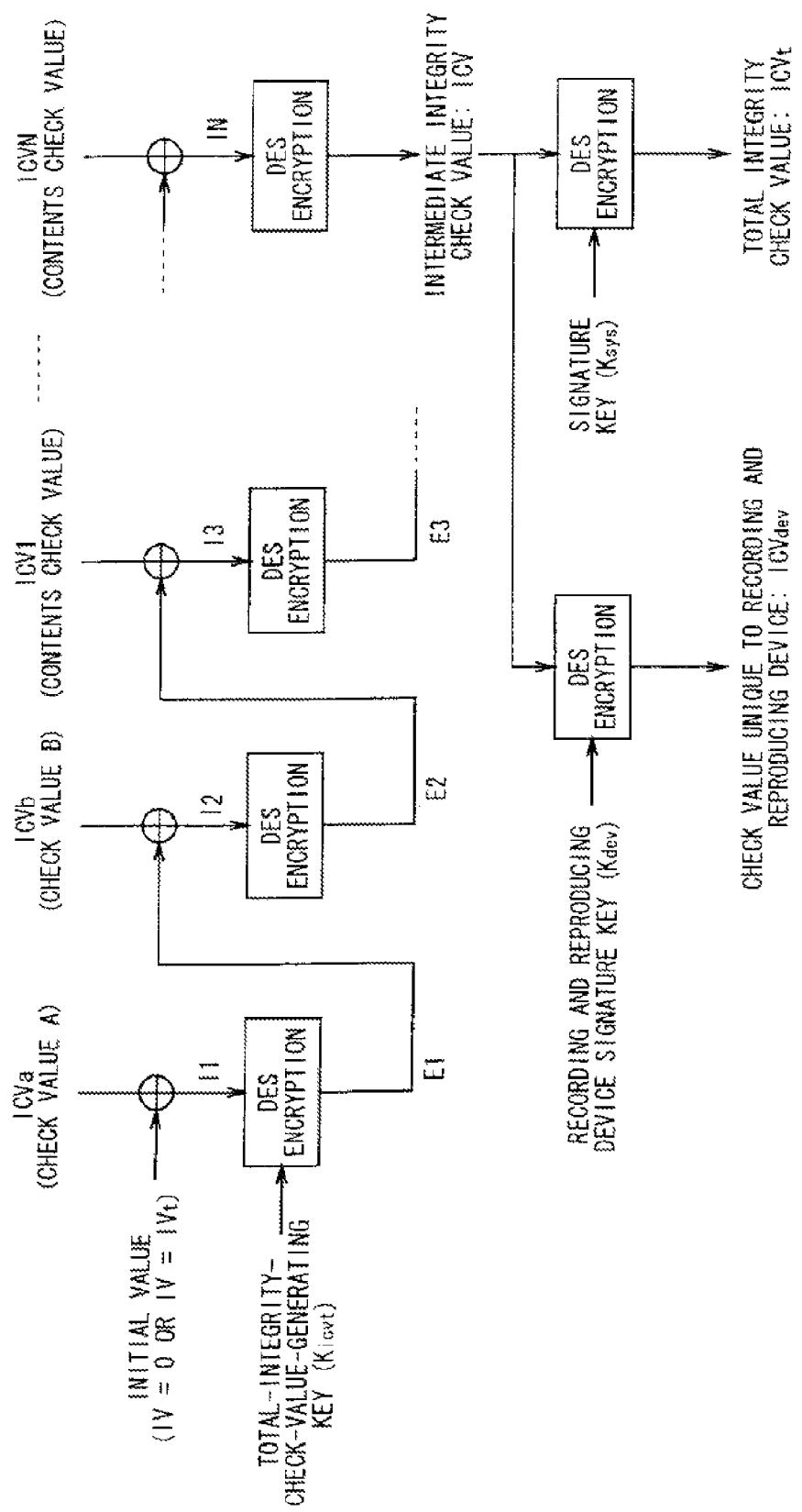
FIG. 25 is a view depicting a method for generating a total integrity check value and an integrity check value unique to the recording and reproducing device.

At step S78, the total integrity check value ICVt is calculated in the same manner as step S58 described in "(7) Process for Downloading from Recording and Reproducing Device to Recording Device." That is, the control section 306 of the recording and reproducing device cryptography process section 302 causes the encryption/decryption section 308 of the recording and reproducing device cryptography process section 302 to calculate the total integrity check value ICVt. The total integrity check value ICVt is generated by using a system signature key Ksys as a key to encrypt the intermediate integrity check value based on the DES, as shown in FIG. 25. Ksys can be stored in the internal memory 307 of the recording and reproducing device cryptography process section 302.

Then the process proceeds to step S79 to compare the total integrity check value ICVt generated at step S78 with the ICVt in the header stored at step S71. If the values are equal, the process proceeds to step S82.

As previously described, the total integrity check value ICVt is used to verify that the integrity check values ICVa and ICVb and all the content block integrity check values have not been tampered with. Thus, if the total integrity check value generated by means of the above described process equals the integrity check value ICVt stored in the header, it is determined that the integrity check values ICVa and ICVb and all the content block integrity check values have not been tampered with in the data stored in the recording device 400.

If the result of the determination at step S77 shows that the localization field is set such that the downloaded content can be used only in this recording and reproducing device 300, that is, it is set to 1, the process proceeds to step S80.

At step S80, the control section 306 of the recording and reproducing device cryptography process section 302 causes the encryption/decryption section 308 of the recording and reproducing device cryptography process section 302 to calculate the integrity check value ICVdev unique to the recording and reproducing device 300. The integrity check value ICVdev unique to the recording and reproducing device 300 is generated, as shown in the previously described FIG. 25, by using a recording and reproducing device signature key Kdev as a key to encrypt the intermediate integrity check value based on the DES, the intermediate integrity check value being held at step S58. Kdev is unique to the recording and reproducing device, and is stored in the internal memory 307. At step S81, the check value ICVdev (unique to the recording and reproducing device 300) calculated at step S80 is compared with the ICVdev stored at step S71. If they are equal, the process proceeds to step S82.

Thus, data signed with the same system signature key Ksys are successfully checked by a system (recording and reproducing device 300) having the same system signature key. That is, such data have the same total integrity check value ICVt so as to be sharable. If, however, data is signed with the recording and reproducing device signature key Kdev, the data stored in a recording device 400 after the signing cannot be reproduced if an attempt is made to reproduce them after this recording device 400 has been inserted in another recording and reproducing device 400. That is, an error occurs due to a mismatch in the integrity check value ICVdev unique to the recording and reproducing device 300. Accordingly, the setting of the localization field enables content to be arbitrarily set so as to be shared throughout the entire system or used only by particular recording and reproducing devices 300.

At step S82, the control section 301 of the recording and reproducing device 300 takes content block information out from the block information table (BIT) (read out at step S74) and checks whether any content block is to be encrypted. If any content block is to be encrypted, the control section 301 reads this content block out from the external memory 402 of the recording device 400 via the recording device controller 303 of the recording and reproducing device 300. It then transmits the content block to the recording and reproducing device cryptography process section 302 of the recording and reproducing device 300. On receiving the content block, the control section 306 of the recording and reproducing device cryptography process section 302 causes the encryption/decryption section 308 of the recording and reproducing device cryptography process section 302 to decrypt the content. The control section 306 also causes the encryption/decryption section 308 to calculate the content integrity check value at step S83, if the content block is to be verified.

Step S83 is similar to step S58 described in "(7) Process for Downloading from Recording and Reproducing Device to Recording Device." The control section 301 of the recording and reproducing device 300 takes content block information out from the block information table (BIT) and determines from the stored content integrity check value whether any content block is to be verified. If any content block is to be verified, the control section 301 receives this content block from the external memory 402 of the recording device 400 and transmits it to the recording and reproducing device cryptography process section 302 of the recording and reproducing device 300. On receiving the content block, the control section 306 of the recording and reproducing device cryptography process section 302 causes the encryption/decryption section 308 of the recording and reproducing device cryptography process section 302 to calculate the content intermediate value.

The content intermediate value is generated by using the content key Kcon (decrypted at step S74) to decrypt the input content block in the DES CBC mode, separating the resulting data into 8-byte pieces, and exclusive-ORing all these pieces.

Then, the control section 306 of the recording and reproducing device cryptography process section 302 causes the encryption/decryption section 308 of the recording and reproducing device cryptography process section 302 to calculate the content integrity check value. The content integrity check value is generated by using as a key the content-integrity-check-value-generating key Kicvc to encrypt the content intermediate value based on the DES. Kicvc is stored in the internal memory 307. Then, the control section 306 of the recording and reproducing device cryptography process section 302 compares this content integrity check value with the ICV in the content block received from the control section 301 of the recording and reproducing device 300 at step S71, and passes the result to the control section 301 of the recording and reproducing device 300. On receiving the result (and if the verification has been successful), the control section 301 of the recording and reproducing device 300 takes out the next content block to be verified. It causes the recording and reproducing device cryptography process section 302 of the recording and reproducing device 300 to verify this content block. Similar verification processes are repeated until all the content blocks are verified. The initial value may be IV=0 or the content-integrity-check-value-generating initial value IVc may be used which is stored in the internal memory 307 of the recording and reproducing device cryptography process section 302. Additionally, all the checked content integrity check values are held in the recording and reproducing device cryptography process section 302 of the recording and reproducing device 300. Furthermore, the recording and reproducing device cryptography process section 302 of the recording and reproducing device 300 monitors the order in which the content blocks are verified. This is done to consider the authentication to have failed if the order is incorrect or if it is caused to verify the same content block twice or more.

The control section 301 of the recording and reproducing device 300 receives the result of the comparison of the content integrity check value. If no content block is to be verified, all the results of comparisons will be successful. If the verification has been successful, it takes the decrypted content from the recording and reproducing device cryptography process section 302 of the recording and reproducing device 300. It then takes out next content block to be verified and causes the recording and reproducing device cryptography process section 302 of the recording and reproducing device 300 to decrypt this content block. Similar verification processes are repeated until all the content blocks are decrypted.

At step S83, if the recording and reproducing device cryptography process section 302 of the recording and reproducing device 300 determines after the verification process that the content integrity check values are not equal, it considers the verification to have failed and avoids decrypting the remaining contents. In addition, the recording and reproducing device cryptography process section 302 of the recording and reproducing device 300 monitors the order in which the content blocks are decrypted. This is done to consider the decryption to have failed if the order is incorrect or if it is caused to decrypt the same content block twice or more.

If the verification of the integrity check value A has failed at step S72, if the verification of the integrity check value B has failed at step S75, if the verification of the total integrity check value ICVt has failed at step S79, if the verification of the integrity check value ICVdev unique to the recording and reproducing device 300 has failed at step S81, or if the verification of the content block content integrity check value has failed at step S81, then the process proceeds to step S84 to provide a predetermined error display because the verification is no good.

As described above, not only important data or content can be encrypted, concealed, or checked for tampering when the content is downloaded or used. This can be done even if data on a recording medium are simply copied to another recording medium. The content can be prevented from being correctly decrypted because the block information table key Kbit (for decrypting the block information table BIT) and the content key Kcon (for decrypting the content) are stored with the storage key Kstr unique to the recording medium. More specifically, at step S74 in FIG. 28, another recording device 400 cannot decrypt the data correctly because each recording device 400 decrypts data encrypted with a different storage key Kstr.

(9) Key Exchanging Process after Mutual Authentication

The data processing apparatus according to the present invention is partly characterized in that the recording device 400 can be used only after the above described mutual authentication process between the recording and reproducing device 300 and the recording device 400, and also in that the use form of the recording device is limited.

For example, to prevent a user from generating a recording device 400 such as a memory card, in which content is stored by means of illegal copying or the like, and setting this recording device 400 in a recording and reproducing device 300 for use, the mutual authentication process is executed between the recording and reproducing device 300 and the recording device 400. Content (that may be encrypted) can be transferred between the recording and reproducing device 300 and the recording device 400 only if they have been mutually authenticated.

Figure 29:
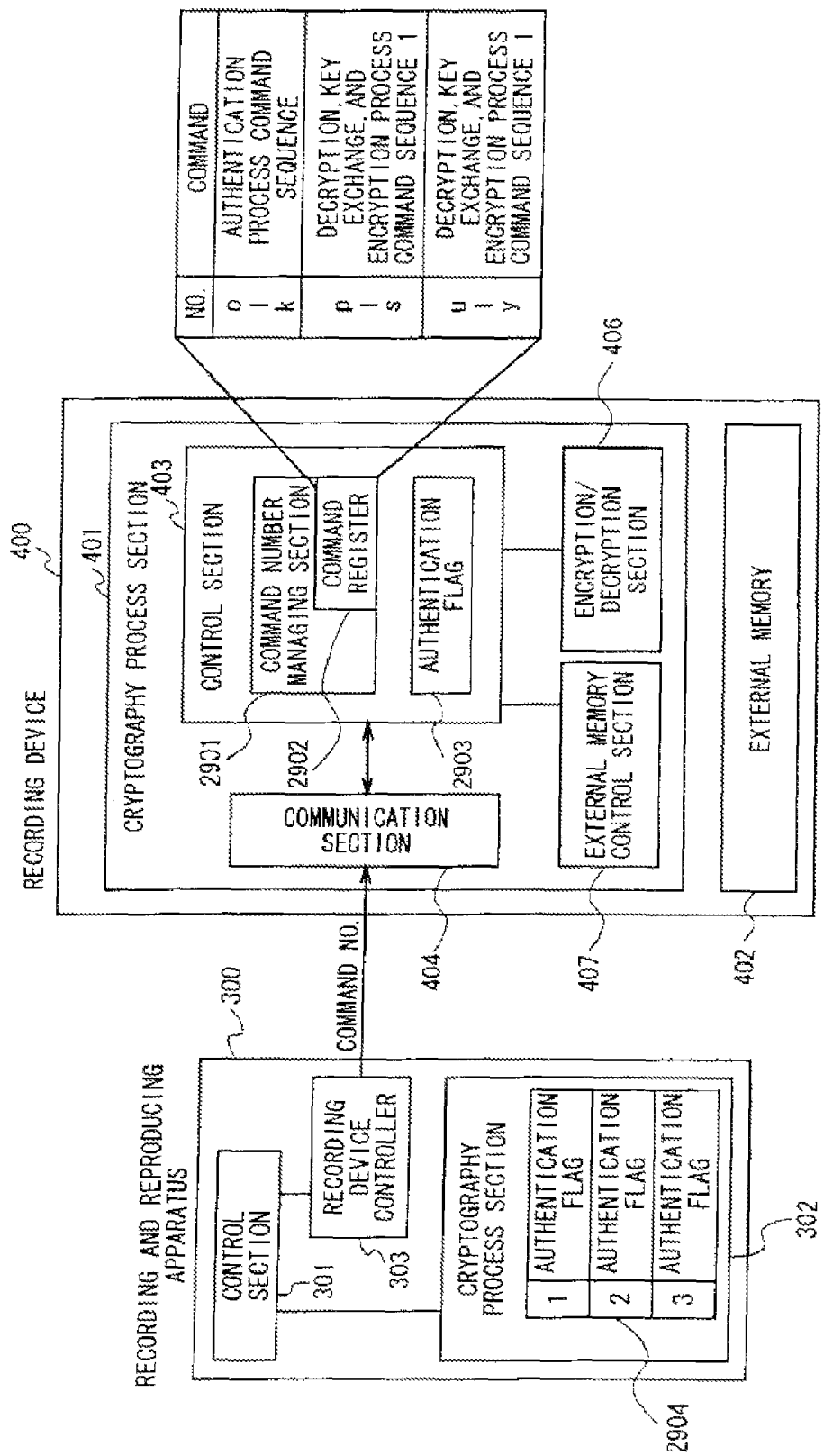
FIG. 29 is a view depicting a method by which the recording device executes commands.

To achieve the above restrictive process, according to the present data processing apparatus, all the processes in the cryptography process section 401 of the recording device 400 are executed based on preset command strings. That is, the recording device 400 has such a command process configuration that it sequentially obtains commands from a register based on command numbers. FIG. 29 is a view illustrating the command process configuration of the recording device 400.

As shown in FIG. 29, between the recording and reproducing device 300 having the recording and reproducing device cryptography process section 302 and the recording device 400 having the recording device cryptography process section 401, command numbers (No.) are output from the recording device controller 303 to the communication section (including a reception register) 404 of the recording device 400 under the control of the control section 301 of the recording and reproducing device 300.

The recording device 400 has a command number managing section 2901 in the control section 403 of the cryptography process section 401. The command number managing section 2901 holds a command register 2902. Command register 2902 stores command strings corresponding to command numbers output from the recording and reproducing device 300. In the command strings, command numbers 0 to y are sequentially associated with execution commands (as shown in the right of FIG. 29). The command number managing section 2901 monitors command numbers output from the recording and reproducing device 300 to take corresponding commands out from a command register 2902 for execution.

In command sequences stored in the command register 2902, a command string for an "authentication process sequence" is associated with the leading command numbers 0 to k. Furthermore, command numbers p to s following the command string for the authentication process sequence are associated with a "decryption, key exchange, and encryption process command sequence 1," and the following command numbers u to y are associated with a "decryption, key exchange, and encryption process command sequence 2."

As previously described for the authentication process flow in FIG. 20, when the recording device 400 is installed in the recording and reproducing device 300, the control section 301 of the recording and reproducing device 300 transmits an initialization command to the recording device 400 via the recording device controller 303. On receiving the command, the recording device 400 causes the control section 403 of the recording device cryptography process section 401 to receive the command via the communication section 404. It then clears an authentication flag 2903. That is, an unauthenticated state is set. Alternatively, in such a case that power is supplied from the recording and reproducing device 300 to the recording device 400, the unauthenticated state may be set upon power-on.

Then, the control section 301 of the recording and reproducing device 300 transmits an initialization command to the recording and reproducing device cryptography process section 302. At this point, it also transmits a recording device insertion port number. When the recording device insertion port number is transmitted, even if a plurality of recording devices 400 are connected to the recording and reproducing device 300, the recording and reproducing device 300 can simultaneously execute authentication with these recording devices 400 and transmit and receive data thereto and therefrom.

On receiving the initialization command, the recording and reproducing device cryptography process section 302 of the recording and reproducing device 300 causes the control section thereof to clear the authentication flag 2903 corresponding to the recording device insertion port number. That is, the unauthenticated state is set.

Once this initialization process has been completed, the control section 301 of the recording and reproducing device 300 sequentially outputs command numbers via the recording device controller 303. This is done in an ascending order starting with the command number 0. The command number managing section 2901 of the recording device 400 monitors the command numbers input from the recording and reproducing device 300 to ascertain that they are sequentially input starting with the command number 0. It obtains the corresponding commands from the command register 2902 to execute various processes, such as the authentication process. If the input command numbers are not in a specified order, an error occurs and a command number acceptance value is reset to an initial state. That is, an executable command number is reset at 0.

In the command sequences stored in the command register 2902, the command numbers are imparted so as to carry out the authentication process first. Following this process sequence, the key exchange is decrypted, and an encryption process sequence is stored.

A specific example of decrypting the key exchange and the encryption process sequence will be explained with reference to FIGS. 30 and 31.

Figure 30:
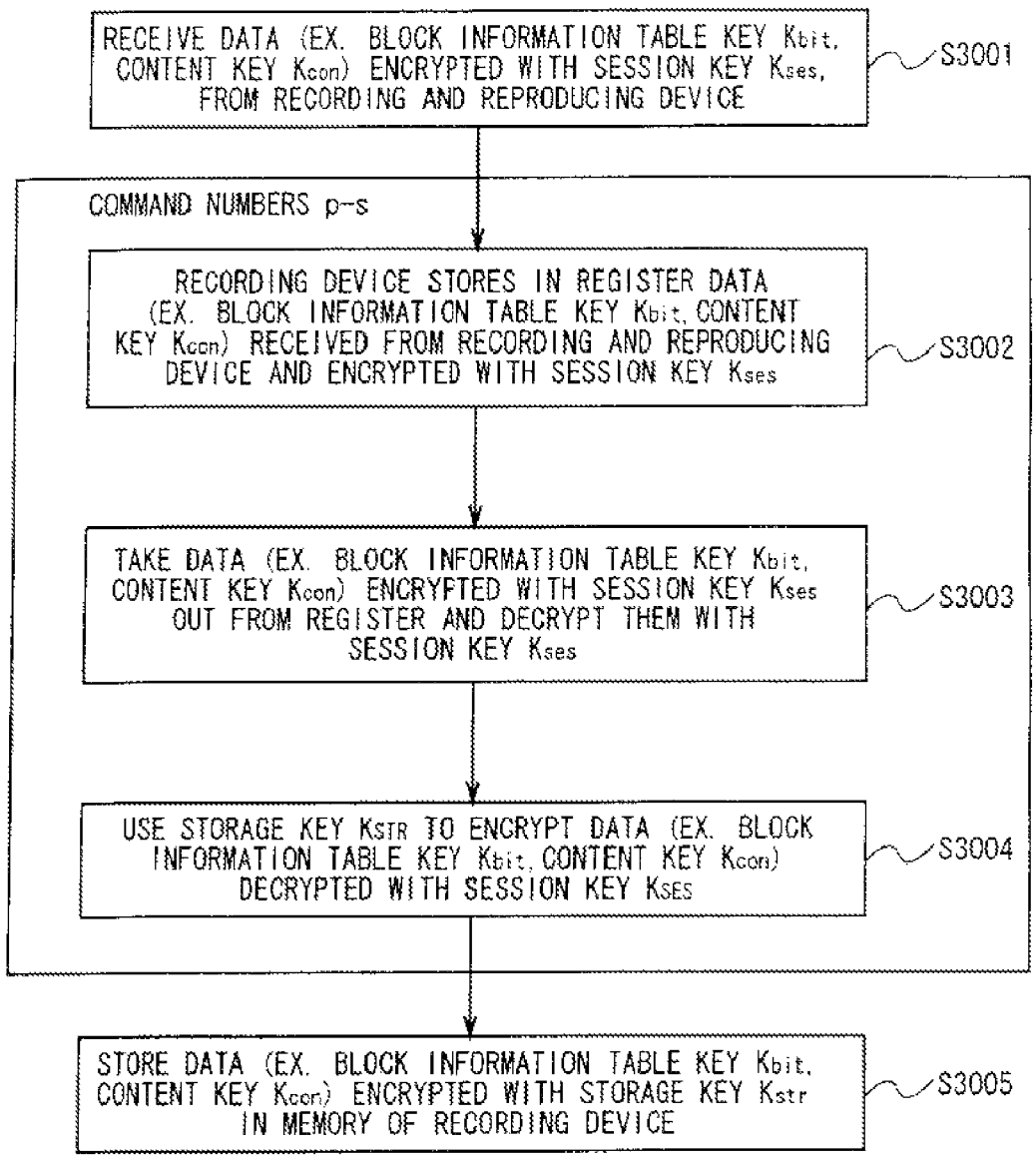
FIG. 30 is a view depicting a method by which the recording device executes commands in a content storage process.

FIG. 30 shows part of the process executed in downloading content from the recording and reproducing device 300 to the recording device 400 as previously described in FIG. 22. Specifically, this process is executed between steps 59 and 60 in FIG. 22.

In FIG. 30, at step S3001, the recording device 400 receives data (ex. the block information table Kbit and the content key Kcon) encrypted with the session key Kses, from the recording and reproducing device 300. Thereafter, the command strings p to s (shown in the above described FIG. 29) are started. The command strings p to s are started after the authentication process commands 0 to k have been completed to cause authentication flag 2903 (shown in FIG. 29) to be set to indicate the completion. This is ensured by the command number managing section 2901 by accepting the command numbers only in the ascending order starting with 0.

At step S3002, the recording device stores the data (ex. the block information table Kbit and the content key Kcon) received from the recording and reproducing device 300 and encrypted with the session key Kses, in the register.

At step S3003, a process is executed which takes the data (ex. the block information table Kbit and the content key Kcon) encrypted with the session key Kses out from the register and decrypts them with the session key Kses.

At step S3004, a process is executed which encrypts the data (ex. the block information table Kbit and the content key Kcon) decrypted with the session key Kses, using the storage key Kstr.

The above process steps 3002 to 3004 correspond to processes included in the command numbers p to s in the command register previously described in FIG. 29. These processes are sequentially executed by the recording device cryptography process section 401 in accordance with the command numbers p to s received by the command number managing section 2901 of the recording device 400 from the recording and reproducing device 300.

At the next step S3005, the data (ex. the block information table Kbit and the content key Kcon), encrypted with the storage key Kstr, are stored in the external memory of the recording device. At this step, the recording and reproducing device 300 may read the data encrypted with the storage key Kstr out from the recording device cryptography process section 401 and then stores them in the external memory 402 of the recording device 400.

The above described steps S3002 to S3004 constitute an uninterruptible, continuously-executed execution sequence. This is done even if, for example, the recording and reproducing device 300 issues a data read command at the end of the decryption process at step S3003. Since this read command differs from the command numbers p to s set in the command register 2902 in the ascending order, the command number managing section 2901 does not accept execution of the read command. Accordingly, the decrypted data resulting from the key exchange in the recording device 400 cannot be read out by an external device, for example, the recording and reproducing device 300, thereby preventing key data or contents from being illegally read out.

Figure 31:
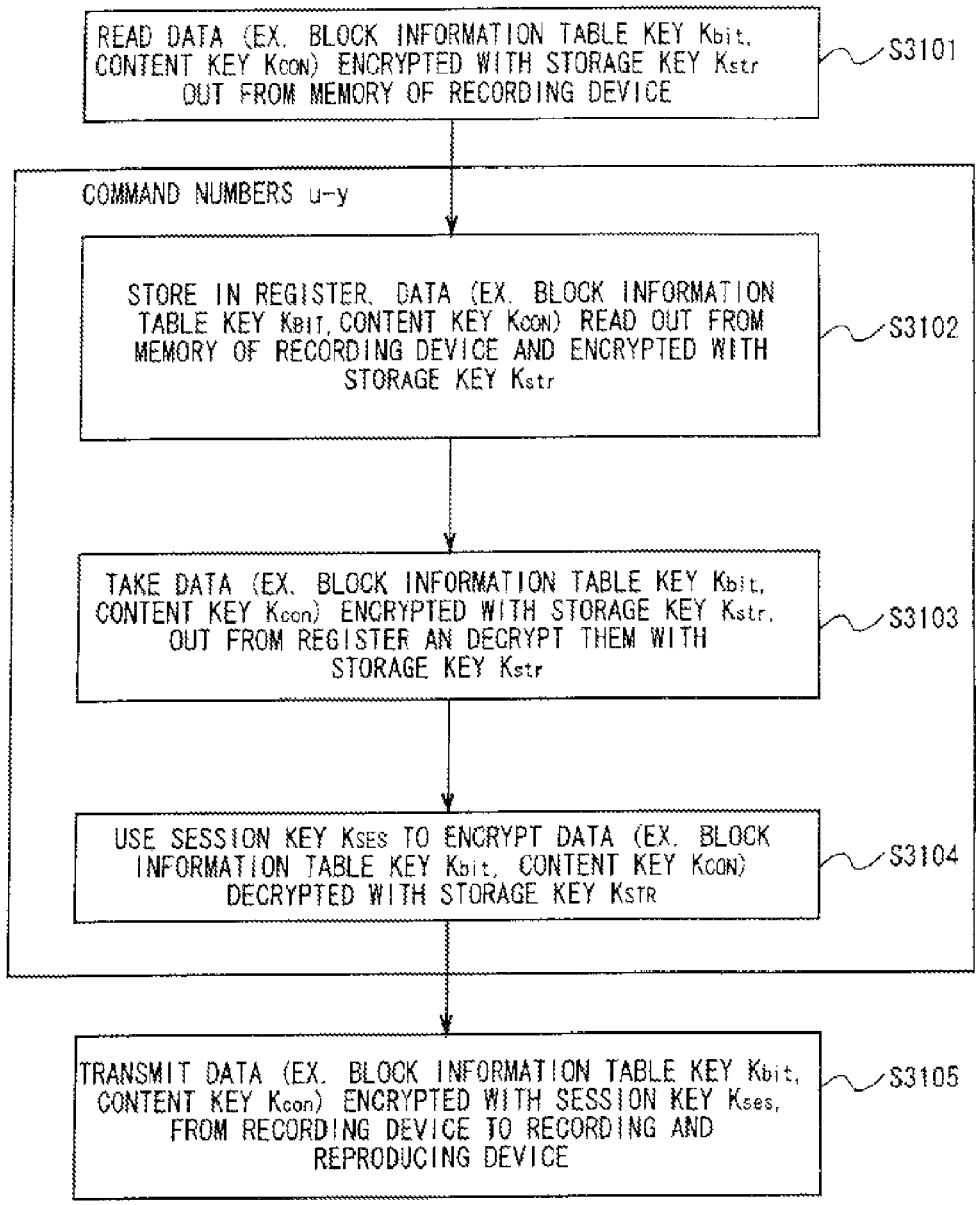
FIG. 31 is a view depicting a method by which the recording device executes commands in a content reproduction process.

FIG. 31 shows part of the content reproducing process, previously described in FIG. 28, in which content is read out from the recording device 400 and reproduced by the recording and reproducing device 300. Specifically, this process is executed at step S73 of FIG. 28.

In FIG. 31, at step S3101, the data (ex. the block information table Kbit and the content key Kcon), encrypted with the storage key Kstr, are read out from the external memory 402 of the recording device 400.

At step S3102, the data (ex. the block information table Kbit and the content key Kcon), read out from the memory of the recording device 400 and encrypted with the storage key Kstr, are stored in the register. At this step, the recording and reproducing device 300 may read the data encrypted with the storage key Kstr out from the external memory 402 of the recording device 400 and then store them in the register of the recording device 400.

At step S3103, the data (ex. the block information table Kbit and the content key Kcon), encrypted with the storage key Kstr, are taken out from the register and decrypted with the storage key Kstr.

At step S3104, the data (ex. the block information table Kbit and the content key Kcon), decrypted with the storage key Kstr, are encrypted with the session key Kses.

The above process steps 3102 to 3104 correspond to processes included in the command numbers u to y in the command register previously described in FIG. 29. These processes are sequentially executed by the recording device cryptography process section 406 in accordance with the command numbers u to y received by the command number managing section 2901 of the recording device from the recording and reproducing device 300.

At the next step S3105, the data (ex. the block information table Kbit and the content key Kcon) encrypted with the session key Kses are transmitted from the recording device 400 to the recording and reproducing device 300.

The above described steps S3102 to S3104 constitute an uninterruptible continuously-executed execution sequence. This is done even if, for example, the recording and reproducing device 300 issues a data read command at the end of the decryption process at step S3103. Since this read command differs from the command numbers u to y set in the command register 2902 in the ascending order, the command number managing section 2901 does not accept execution of the read command. Accordingly, the decrypted data resulting from the key exchange in the recording device 400 cannot be read out by an external device, for example, the recording and reproducing device 300, thereby preventing key data or contents from being illegally read out.

For the process shown in FIGS. 30 and 31, the example is shown where the block information table key Kbit and the content key Kcon are decrypted and encrypted by means of key exchange. These command sequences, stored in the command register 2902 (shown in FIG. 29), may include decryption and encryption processes involving key exchanges for the content itself. The object to be decrypted or encrypted by means of key exchanges is not limited to the above-described example.

The key exchange process after the mutual authentication in the present data processing apparatus has been described. Thus, the key exchange process in the present data processing apparatus can be carried out only after the authentication process between the recording and reproducing device 300 and the recording device 400 has been completed. Further, decrypted data can be prevented from being externally accessed during the key exchange process, thereby ensuring the improved security of contents and key data.

(10) Plural Content Data Formats and Download and Reproduction Processes Corresponding to Each Format In the above-described embodiment, for example, the data format for the medium 500 or communication means 600 shown in FIG. 3 is of the type shown in FIG. 4. The data format for the medium 500 or the communication means 600 is not limited to the one shown in FIG. 4, but preferably depends on the content (e.g., music, image data, a program such as a game, or the like). A plurality of data formats as well as processes for downloading and reproducing data from and to the recording device 400 will be explained.

FIGS. 32 to 35 show four different data formats. A data format used on the medium 500 or the communication means 600 (shown in FIG. 3) is shown in the left of each figure, while a data format used in storing data in the external memory 402 of the recording device 400 is shown in the right of each figure. An outline of the data formats shown in FIGS. 32 to 35 will first be provided, and the contents of each data in each format and differences among data in each format will be explained.

Figure 32:
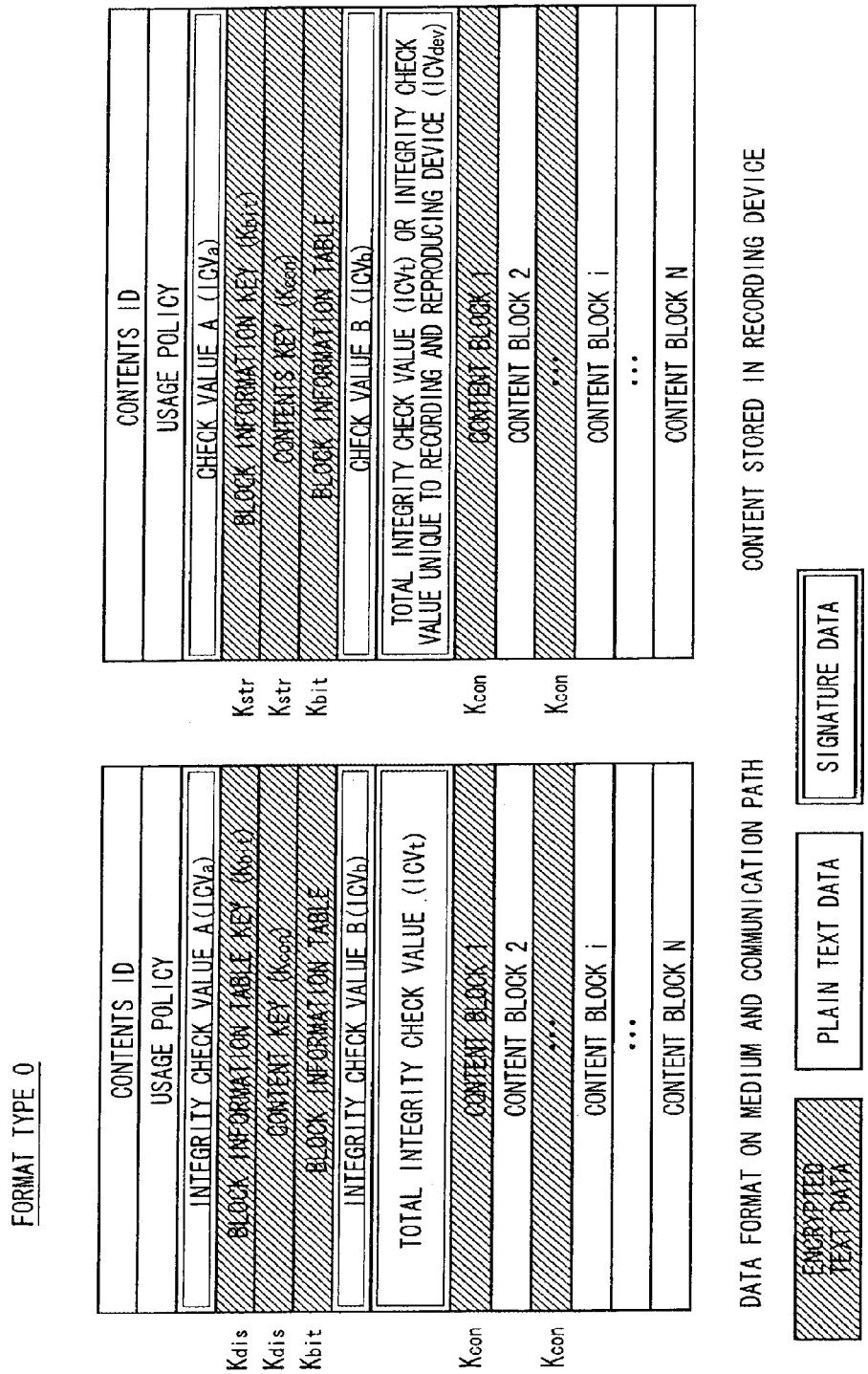
FIG. 32 is a view depicting the configuration of a content data format type 0.

FIG. 32 shows a format type 0, which is of the same type as that shown as an example in the above description. The format type 0 is characterized in that the entire data is divided into N data blocks each having an arbitrary size. That is, blocks 1 to N, each of which is arbitrarily encrypted so that data can be configured by mixing together encrypted blocks and non-encrypted blocks (i.e., plain text blocks). The blocks are encrypted with the content key Kcon, which is encrypted with the distribution key Kdis on the medium 500 or with the storage key Kstr stored in the internal memory 405 of the recording device 400 when it is stored in the recording device 400. The block information key Kbit is also encrypted with the distribution key Kdis on the medium 500 or with the storage key Kstr stored in the internal memory 405 of the recording device 400 when it is stored in the recording device 400. These key exchanges are carried out in accordance with the process described in "(9) Key Exchange Process after Mutual Authentication."

Figure 33:
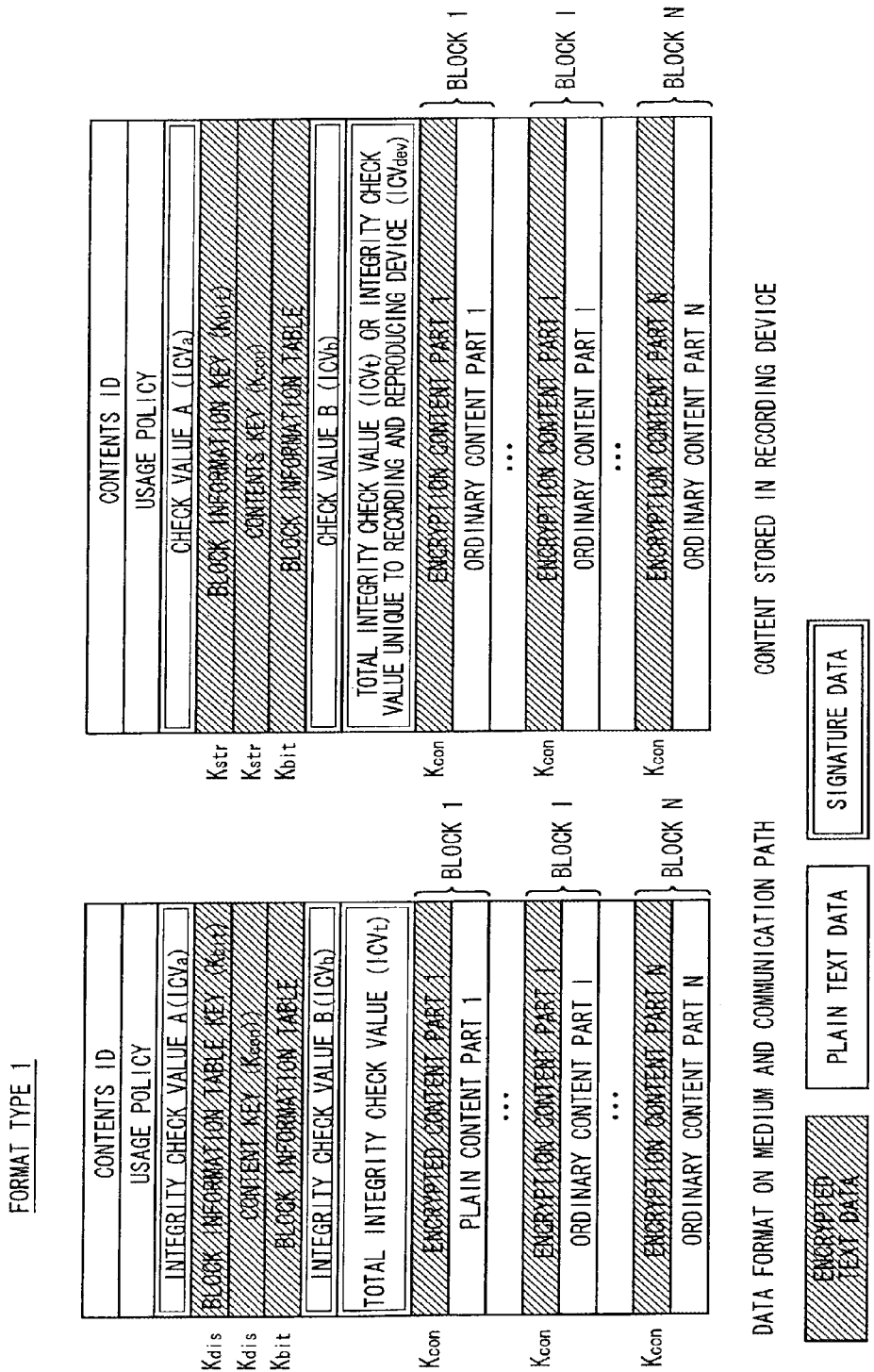
FIG. 33 is a view depicting the configuration of a content data format type 1.

FIG. 33 shows a format type 1, in which the entire data is divided into N data blocks. That is, blocks 1 to N, as in the format type 0, but which differ from the format type 0 in that the N blocks are all of the same size. The aspect of the process for encrypting blocks with the content key Kcon is similar to that in the format type 0. Additionally, as in the above described format type 0, the content key Kcon and the block information table key Kbit are encrypted with the distribution key Kdis on the medium 500 or with the storage key Kstr stored in the internal memory 405 of the recording device 400 when it is stored in the recording device 400. Unlike the format type 0, the format type 1 has a fixed block configuration to simplify configuration data such as data length for each block, thereby enabling a memory size for block information to be reduced compared to the format type 0.

In the example shown in FIG. 33, each block comprises a set of an encrypted part and a non-encrypted (plain text) part. If the length and configuration of the block are thus regular, each block length or configuration need not be checked during the decryption process or the like, thereby enabling efficient decryption and encryption processes. In the format 1, the parts constituting each block, the encrypted part and the non-encrypted (plain text) part, can each be defined as an object to be checked, so that the content integrity check value ICVi is defined for a block containing a part that must be checked.

Figure 34:
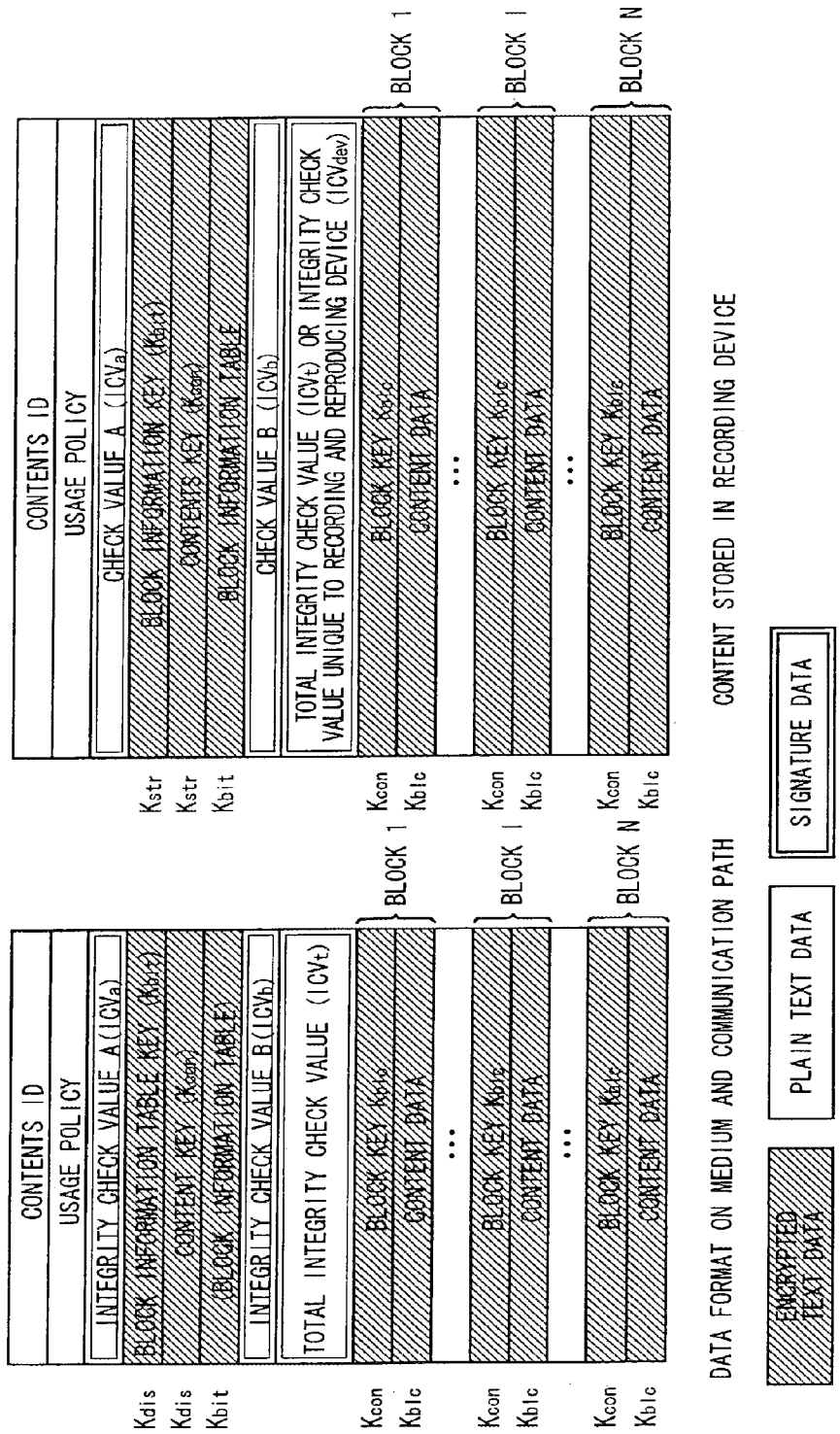
FIG. 34 is a view depicting the configuration of a content data format type 2.

FIG. 34 shows a format type 2. Format type 2 is characterized in that the data is divided into N data blocks all having the same size. Blocks 1 to N are each encrypted with an individual block key Kblc. Each block key Kblc is encrypted with the content key Kcon. Kcon is encrypted with the distribution key Kdis on the medium 500 or with the storage key Kstr stored in the internal memory 405 of the recording device 400 when it is stored in the recording device 400. The block information table key Kbit is also encrypted with the distribution key Kdis on the medium or with the storage key Kstr stored in the internal memory of the recording device when it is stored in the recording device.

Figure 35:
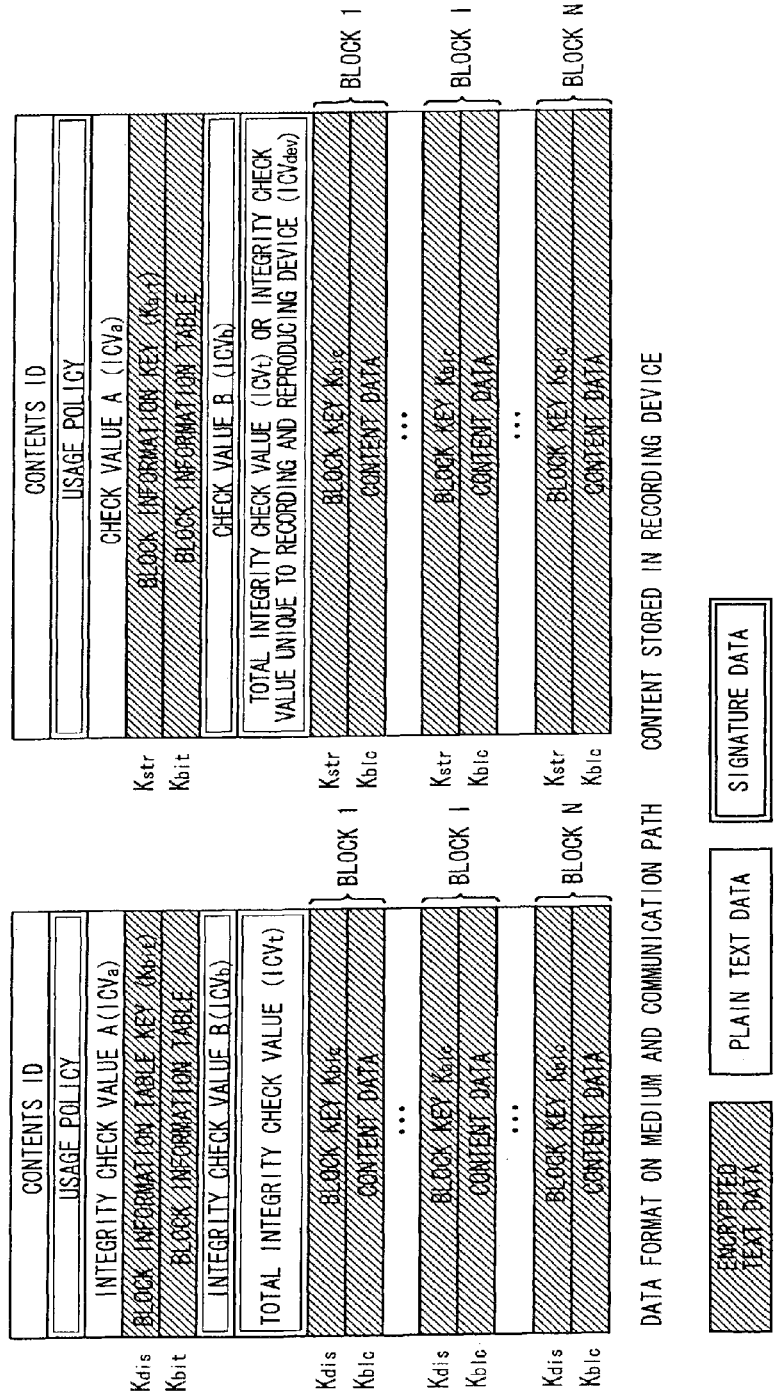
FIG. 35 is a view depicting the configuration of a content data format type 3.

FIG. 35 shows a format type 3. Format type 3 is characterized in that the data is divided into N data blocks all having the same size. Blocks 1 to N, are each encrypted with an individual block key Kblc, as in the format type 2. Each block key Kblc is encrypted with the distribution key Kdis on the medium 500 or with the storage key Kstr on the recording device 400, without the use of the content key. No content key Kcon is present on the medium 500 or on the device 400. The block information table key Kbit is encrypted with the distribution key Kdis on the medium 500 or with the storage key Kstr stored in the internal memory 405 of the recording device 400 when it is stored in the recording device 400.

Next, the contents of the data in the above format types 0 to 3 will be described. As previously described, the data are roughly divided into two sections, namely, the header section and the content section. The header section contains the content ID, the usage policy, the integrity check values A and B, the total integrity check value, the block information table key, the content key, and the block information table.

The usage policy stores the data length of content, its header length, its format type (formats 0 to 3 described below), and content type indicating whether the content is a program or data. It also stores a localization flag. The localization flag determines whether the content can be used only by a particular recording and reproducing device 300 (as described in the section relating to the processes for downloading and reproducing a content to and from the recording device 400). The usage policy also stores a permission flag for a content copying or moving process, and various localization and process information for the content (such as a content encryption algorithm and a mode).

The integrity check value A, ICVa, is used to check the content ID and the usage policy. ICVa is generated using, for example, the method described in the above-described FIG. 23.

The block information table key Kbit is used to encrypt a block information table. It is encrypted with the distribution key Kdis on the medium 500 or with the storage key Kstr stored in the internal memory 405 of the recording device 400 when it is stored in the recording device 400, as previously described.

The content key Kcon is used to encrypt content. For the format types 0 and 1, it is encrypted with the distribution key Kdis on the medium 500 or with the storage key Kstr stored in the internal memory 405 of the recording device 400 when it is stored in the recording device 400, similarly to the block information table key Kbit. For the format type 2, the content key Kcon is also used to encrypt the block key Kblc configured for each content block. Additionally, for the format type 3, no content key Kcon is present.

The block information table describes information on the individual blocks and stores the size of each block and a flag indicating whether the block has been encrypted. That is, the block information table stores information indicating whether or not the block is to be checked (ICV). If the block is to be checked, the block integrity check value ICVi (the integrity check value for the block i) is defined and stored in the table. This block information table is encrypted with the block information table key Kbit.

Figure 36:
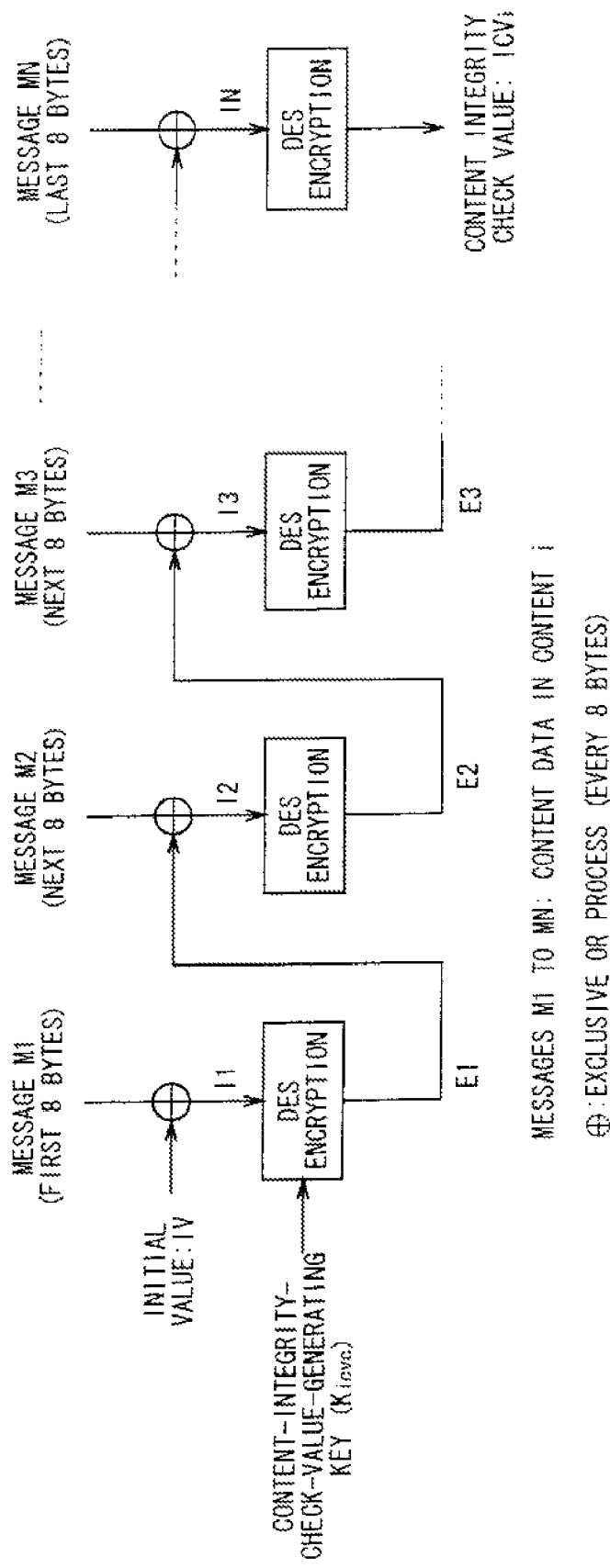
FIG. 36 is a view depicting a method for generating a content integrity check value ICVi for the format type 0.

If the block has been encrypted, the block integrity check value (the content integrity check value ICVi) is generated by exclusive-ORing the entire plain text (decrypted text) every 8 bytes, and then encrypting the obtained value with the content-integrity-check-value-generating key Kicvc stored in the internal memory 307. Additionally, if the block has not been encrypted, the block integrity check value is generated by sequentially inputting the entire block data (plain text) to a tamper-check-value-generating function shown in FIG. 36 (DES-CBC-MAC using the content-integrity-check-value-generating key Kicvc) in such a manner that 8 bytes are input each time. FIG. 36 shows an example of a configuration for generating the content block integrity check value ICVi. Each message M constitutes a set of 8 bytes of decrypted text data or plain text data.

For the format type 1, if at least one of the parts in the block is data to be processed with the integrity check value ICVi, (that is, a part to be checked), the content integrity check value ICVi is defined for that block. An integrity check value P-ICVij (for a part j of a block I) is generated by exclusive ORing the entire plain text (decrypted text) every 8 bytes and then encrypting the obtained data with the content-integrity-check-value-generating value Kicvc. In addition, if a part j has not bee encrypted, the integrity check value P-ICVij is generated by sequentially inputting the entire block data (plain text) to the tamper-check-value-generating function shown in FIG. 36 (DES-CBC-MAC using the content-integrity-check-value-generating key Kicvc) in such a manner that 8 bytes are input each time.

Figure 37:
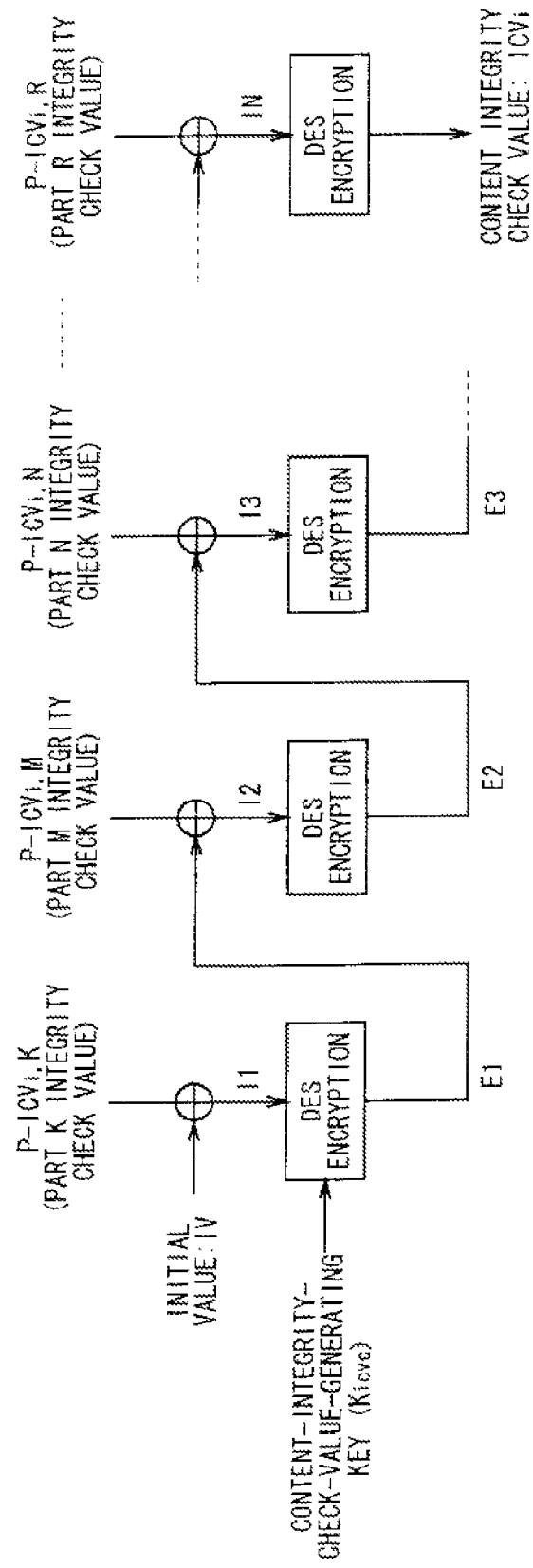
FIG. 37 is a view depicting a method for generating a content integrity check value ICVi for the format type 1.

Further, if the block i contains one part having [ICV flag=subject of ICV] indicating that it is to be checked, the integrity check value P-ICVij generated using the above method is directly used as the block integrity check value ICVi. If the block i contains a plurality of parts having [ICV flag=subject of ICV] indicating that they are to be checked, the integrity check value P-ICVij is generated by connecting a plurality of parts integrity check values P-ICVij together in accordance with part numbers to obtain data and sequentially inputting the entire data (plain data) to the temper-check-value-generating function shown in FIG. 37 (DES-CBC-MAC using the content-integrity-check-value-generating key Kicvc) in such a manner that 8 bytes are input each time. FIG. 37 shows an example of configuration for generating the content block content integrity check value ICVi.

The block integrity check value ICVi is not defined for the format types 2 or 3.

The integrity check value B, ICVb, is used to check the block information table key, the content key, and the entire block information table. It is generated using, for example, the method described in FIG. 24.

The total integrity check value, ICVt, is used to check the entirety of the previously described ICVa and ICVb, and the integrity check value ICVi contained in each block of the content to be checked. ICVt is generated by applying the system signature key Ksys to the intermediate integrity check value generated from each integrity check value, such as the integrity check value ICVa, to execute the encryption process as described in FIG. 25.

Figure 38:
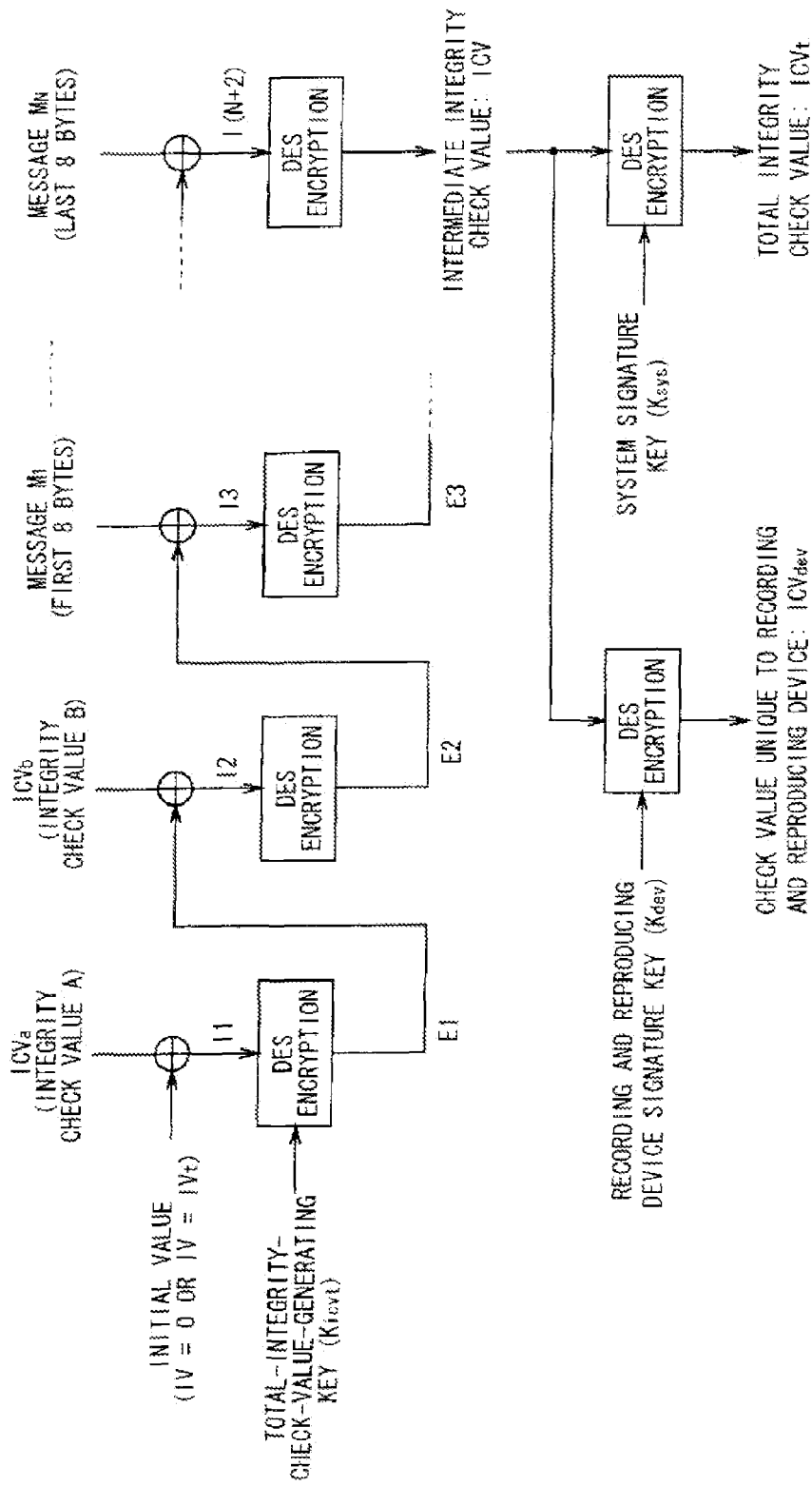
FIG. 38 is a view depicting a total integrity check value and an integrity check value unique to the recording and reproducing device for the format types 2 and 3.

For the format types 2 and 3, the total integrity check value ICVt is generated by applying the system signature key Ksys to the intermediate integrity check value generated by connecting the previously described integrity check values ICVa and ICVb to the content data (the entire content data between the block key in block 1 and the final block), to execute the encryption process. FIG. 38 shows an example of a configuration for generating the total integrity check value ICVt for the format types 2 and 3.

The unique integrity check value ICVdev is substituted with the total integrity check value ICVt if the previously described localization flag is set to 1. That is, it indicates that the content can be used only by a particular recording and reproducing device. For the format types 0 and 1, the unique integrity check value ICVdev is generated to check the previously described integrity check values ICVa and ICVb and the integrity check value ICVi contained in each block of the content to be checked. Specifically, the unique integrity check value ICVdev is generated by applying the recording and reproducing device signature key Kdev to the intermediate integrity check value generated from the integrity check values such as the integrity check value ICVa, as explained in the description of FIG. 25 or 38.

Next, processes for downloading content of each of the format types 0 to 3 from the recording and reproducing device 300 to the recording device 400, and processes executed by the recording and reproducing device 300 to reproduce a content of each of the format types 0 to 3 from the recording device 400, will be described with reference to the flow charts in FIGS. 39 to 44.

First, the process for downloading content of the format type 0 or 1 will be explained with reference to FIG. 39.

Figure 39:
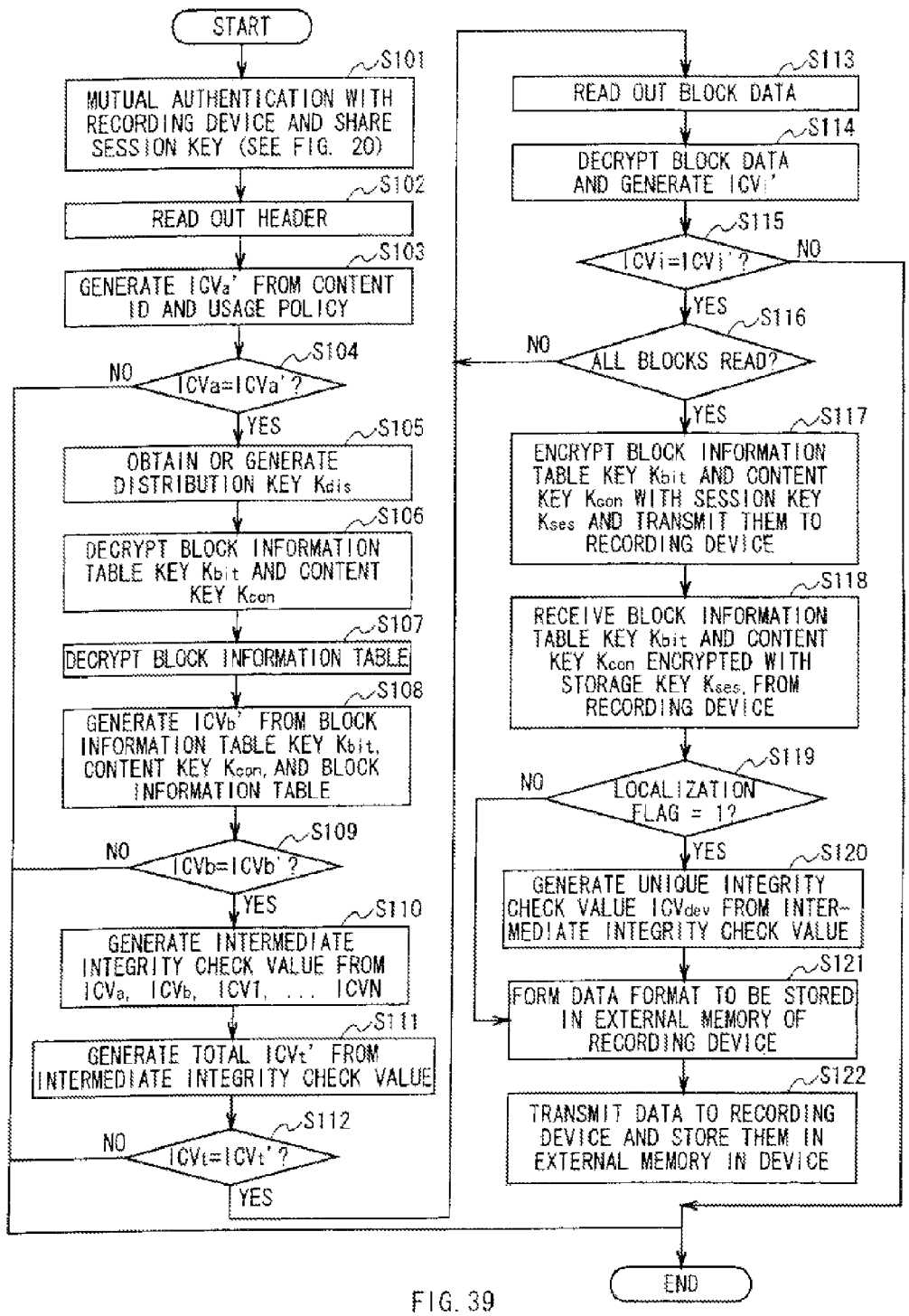
FIG. 39 is a view showing a process for downloading content of the format type 0 or 1.

The process shown in FIG. 39 is started, for example, by installing the recording device 400 into the recording and reproducing device 300. At step S101, authentication is executed between the recording and reproducing device 300 and the recording device 400, and this step is carried out in accordance with the authentication process flow previously described in FIG. 20.

If the authentication process at step S101 has been completed to set the authentication flag, then at step S102, the recording and reproducing device 300 reads data of a predetermined format from the medium 500 via the read section 304, the medium 500 storing content data, or uses the communication section 305 to receive data from the communication means 600 in accordance with a predetermined format. Then, the control section 301 of the recording and reproducing device 300 transmits the header section of the data to the recording and reproducing device cryptography process section 302 of the recording and reproducing device 300.

Next, at step S103, the control section 306 of the recording and reproducing device cryptography process section 302 causes the encryption/decryption section 308 of the recording and reproducing device cryptography process section 302 to calculate the integrity check value A. The integrity check value A is calculated in accordance with the ICV calculation method described in FIG. 7. It uses as a key the integrity-check-value-A-generating key Kicva stored in the internal memory 307 of the recording and reproducing device cryptography process section 302. It uses the content ID and the usage policy as a message, as shown in FIG. 23. Then at step S104, the integrity check value A and the check value ICVa stored in the header are compared together. If they are equal, the process proceeds to step S105.

As previously described, the check value A, ICVa is used to verify that the content ID and the usage policy have not been tampered with. If the integrity check value A calculated, for example, in accordance with the ICV calculation, (using as a key the integrity-check-value-A-generating key Kicva stored in the internal memory 307 and using the content ID and the usage policy as a message), equals the check value ICVa stored in the header, it is determined that the content ID and the usage policy have not been tampered with.

Next, at step S105, the control section 306 of the recording and reproducing device cryptography process section 302 causes the encryption/decryption section 308 of the recording and reproducing device cryptography process section 302 to obtain or generate the distribution key Kdis. The distribution key Kdis is generated using, for example, the master key MKdis for the distribution key, as in step S53 in the previously described FIG. 22.

Then at step S106, the control section 306 of the recording and reproducing device cryptography process section 302 uses the encryption/decryption section 308 as well as the generated distribution key Kdis, to decrypt the block information table key Kbit and content key Kcon stored in the header section of the data obtained from the medium 500 via the read section 304 or received from the communication means 600 via the communication section 305.

Further, at step S107, the control section 306 of the recording and reproducing device cryptography process section 302 uses the encryption/decryption section 308 of the recording and reproducing device cryptography process section 302 to decrypt the block information table with the decrypted block information table key Kbit.

Further, at step S108, the control section 306 of the recording and reproducing device cryptography process section 302 calculates the integrity check value B (ICVb') from the block information table key Kbit, the content key Kcon, and the block information table (BIT). The integrity check value B is generated, as shown in FIG. 24, to decrypt an exclusive-ORed value based on the DES. This is done by using the integrity-check-value-B-generating key Kicvb stored in the internal memory 307. The exclusive-ORed value comprises the block information table key Kbit, the content key Kcon, and the block information table (BIT). Then at step S109, the ICVb' and the ICVb in the header are compared together, and if they are equal, the process proceeds to step S110.

As previously described, the check value B, ICVb, is used to verify that the block information table key Kbit, the content key Kcon, and the block information table have not been tampered with. If the integrity check value B ICVb' equals the check value ICVb stored in the header, it is determined that the block information table key Kbit, the content key Kcon, and the block information table have not been tampered with. As described earlier, ICVb' is generated by using the integrity-check-value-B-generating key Kicvb; dividing the block information table key Kbit, the content key Kcon, and the block information table (BIT) into 8-byte pieces; exclusive-ORing these data; and encrypting the exclusive-ORed data based on the DES.

At step S110, the control section 306 of the recording and reproducing device cryptography process section 302 causes the encryption/decryption section 308 of the recording and reproducing device cryptography process section 302 to calculate the intermediate integrity check value. The intermediate value is calculated in accordance with the ICV calculation method described in FIG. 7 or the like. This is done using the total-integrity-check-value-generating key Kicvt as a key and using the integrity check values A and B and all the held content integrity check values as a message. Kicvt is stored in the internal memory 307. The intermediate integrity check value generated is stored in the recording and reproducing device cryptography process section 302 of the recording and reproducing device 300, as required.

Next, at step S111, the control section 306 of the recording and reproducing device cryptography process section 302 causes the encryption/decryption section 308 of the recording and reproducing device cryptography process section 302 to calculate the total integrity check value ICVt'. As shown in FIG. 25, the total integrity check value ICVt is generated by using a system signature key Ksys as a key to encrypt the intermediate integrity check value based on the DES. Ksys is stored in the internal memory. Then at step S112, the total integrity check value ICVt generated and the ICVt' in the header stored at step S112 are compared together, and if they are equal, the process proceeds to step S113.

As previously described in FIG. 4, the total integrity check value ICVt is used to verify that all of the integrity check values ICVa and ICVb and the integrity check value for each content block have not been tampered with. Thus, if the total integrity check value generated by means of the above described process equals the integrity check value ICVt stored in the header, it is determined that all of the integrity check values ICVa and ICVb and the integrity check value for each content block have not been tampered with.

Then at step S113, the control section 301 of the recording and reproducing device 300 takes content block information out from the block information table (BIT) and checks whether any content block is to be verified. If any content block is to be verified, the content integrity check value has been stored in the block information in the header.

If any content block is to be verified, then at step S114, the control section 301 reads this content block out from the medium 500 (using the read section 304 of the recording and reproducing device 300) or receives it from the communicating means 600 (by using the communication section 305 of the recording and reproducing device 300), and transmits the content block to the recording and reproducing device cryptography process section 302 of the recording and reproducing device 300. On receiving the content block, the control section 306 of the recording and reproducing device cryptography process section 302 causes the encryption/decryption section 308 of the recording and reproducing device cryptography process section 302 to calculate the content integrity check value ICVi'.

If the block has been encrypted, the content integrity check value ICVi is generated by decrypting the input content block in the DES CBC mode using the content key Kcon Then it exclusive-ORs all of the decrypted text every 8 bytes. And then it encrypts the generated content intermediate value with the content-integrity-check-value-generating key Kicvc stored in the internal memory 307 of the recording and reproducing device 300. Additionally, if the block has not been encrypted, the content integrity check value is generated by sequentially inputting the entire block data (plain text) to the tamper-check-value-generating function shown in FIG. 36 (DES-CBC-MAC using the content-integrity-check-value-generating key Kicvc) in such a manner that 8 bytes are input each time.

Then at step S115, the control section 306 of the recording and reproducing device cryptography process section 302 compares this content integrity check value with the ICV in the content block received from the control section 301 of the recording and reproducing device 300 at step S102. And it passes the result to the control section 301 of the recording and reproducing device 300. On receiving the result (and if the verification has been successful), the control section 301 of the recording and reproducing device 300 takes out the next content block to be verified and causes the recording and reproducing device cryptography process section 302 of the recording and reproducing device 300 to verify this content block. Similar verification processes are repeated until all the content blocks are verified (step S116).

In this regard, if the check values are not equal at any of steps 104, 109, 112, and 115, an error occurs to end the download process.

Then at step S117, the recording and reproducing device cryptography process section 302 of the recording and reproducing device 300 causes the encryption/decryption section 308 of the recording and reproducing device cryptography process section 302 to encrypt the block information key Kbit and content key Kcon decrypted at step S106. This is performed using the session key Kses made sharable during the mutual authentication. The control section 301 of the recording and reproducing device 300 reads the block information table key Kbit and the content key Kcon out from the recording and reproducing device cryptography process section 302 of the recording and reproducing device 300 and then transmits them to the recording device 400 via the recording device controller 303 of the recording and reproducing device 300.

Then at step S118, the recording device 400 causes the encryption/decryption section 406 of the recording device cryptography process section 401 to decrypt the received data with the session key Kses (made sharable during the mutual authentication). Step 118 is performed upon receiving the block information table key Kbit and the content key Kcon that is transmitted from the recording and reproducing device 300. The decrypted data in then reencrypted using the storage key Kstr, which is unique to the recording device which is stored in the internal memory 405 of the recording device cryptography process 401. Then, the control section 301 of the recording and reproducing device 300 reads the block information key Kbit and the content key Kcon out from the recording device 400 via the recording device controller 303 of the recording and reproducing device 300. The block information key Kbit and the content key Kcon can be reencrypted with the storage key Kstr. That is, the block information table key Kbit encrypted with the distribution key Kdis is exchanged with the content key Kcon.

Then at step S119, the control section 301 of the recording and reproducing device 300 takes the localization field out from the usage policy in the header section of the data. This is done to determine whether the downloaded content can be used only in this recording and reproducing device 300. If the localization field is set to 1, the downloaded content can be used only by the recording and reproducing device 300. If the localization field is set to 0, the downloaded content can also be used by other similar recording and reproducing devices 300. If the result of the determination shows that the localization field is set to 1, the process proceeds to step S120.

At step S120, the control section 301 of the recording and reproducing device 300 causes the recording and reproducing device cryptography process section 302 of the recording and reproducing device 300 to calculate the integrity check value unique to the recording and reproducing device 300. The integrity check value unique to the recording and reproducing device 300 is generated by using as a key a recording and reproducing device signature key Kdev stored in the internal memory 307 of the recording and reproducing device cryptography process section 302. This is performed to encrypt the intermediate integrity check value based on the DES. The intermediate integrity check value can be generated at step S110. The calculated integrity check value ICVdev unique to the recording and reproducing device 300 substitutes for the total integrity check value ICVt.

As previously described, the system signature key Ksys is used to add a common signature or ICV to the distribution system. The recording and reproducing device signature key Kdev varies depending on the recording and reproducing device 300 and is used by the recording and reproducing device 300 to add a signature or ICV. That is, data signed with the system signature key Ksys is successfully checked by a system (recording and reproducing device 300) having the same system signature key. In other words, such data have the same total integrity check value ICVt so as to be sharable. If, however, data are signed with the recording and reproducing device signature key Kdev (since this signature key is unique to the recording and reproducing device) the data stored in a recording device after the signing cannot be reproduced if an attempt is made to reproduce them after this recording device 400 has been inserted in another recording and reproducing device 300 In other words, an error occurs due to the unequal integrity check values ICVdev unique to the recording and reproducing device 300. In the data processing apparatus according to the present invention, the setting of the localization field enables content to be arbitrarily set so as to be shared throughout the entire system or used only by particular recording and reproducing devices 300.

Next, at step S121, the control section 301 of the recording and reproducing device 300 causes the recording and reproducing device cryptography process section 302 to form a storage data format. As previously described, one of the three format types, 0 to 3, is set in the usage policy (see FIG. 5) in the header. This is done so that data are formed in accordance with the storage format of one of the previously described FIGS. 32 to 35 depending on the set type. The flow shown in FIG. 39 is for the format 0 or 1, so that the data are formed into one of the formats in FIGS. 32 and 33.

Once the storage data format has been completed at step S121, the control section 301 of the recording and reproducing device 300 stores the content in the external memory 402 of the recording device 400 at step S122. How the process for downloading content data of the format type 0 or 1 is carried out has been described.

Figure 40:
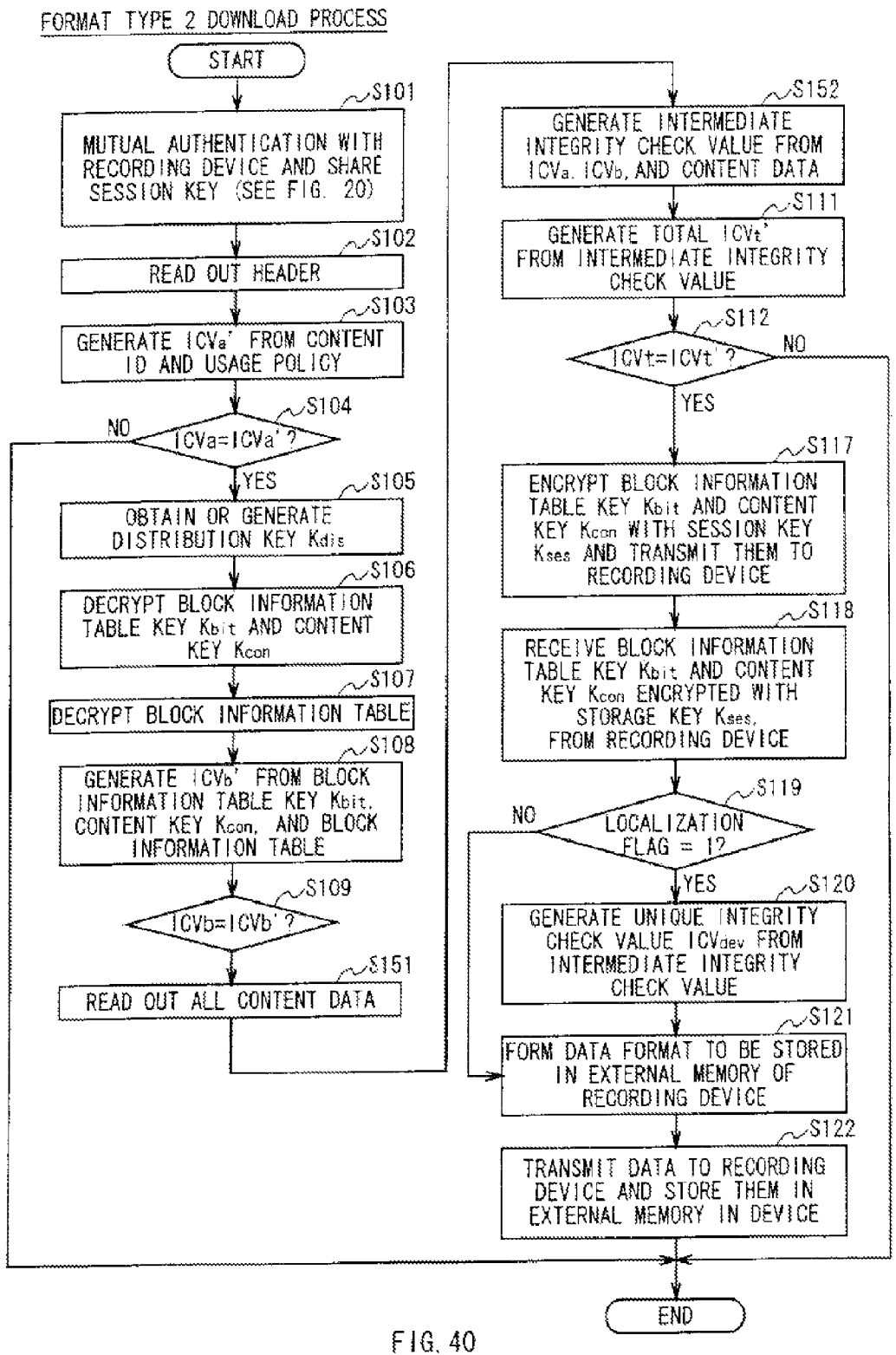
FIG. 40 is a view showing a process for downloading content of the format type 2.

The process for downloading content data of the format type 2 will be explained with reference to FIG. 40. Differences from the above described process for downloading data of the format type 0 or 1 will be focused on.

Steps S101 to S109 are similar to the above described process for downloading data of the format type 0 or 1, so description thereof is omitted.

Since the format type 2 has no content integrity check value ICVi defined therefor as previously described, the block information table contains no content integrity check value ICVi. The intermediate integrity check value in the format type 2 is generated by applying the system signature key Ksys to the intermediate integrity check value (generated by connecting the integrity check values A and B to the entire content data between the leading data of the first block (the block key in the block 1) and the final block), to execute the encryption process.

Thus, in the process for downloading data of the format type 2, the content data is read out at step S151. The intermediate integrity check value is generated based on the integrity check values A and B and the read-out content data at step S152. In this regard, the content data is not decrypted even if it has been encrypted.

For the format type 2, the processes for decrypting the block data and collating the content integrity check values are omitted, contrary to the previously described process for the format type 0 or 1, thereby increasing the processing speed.

The processing at step S111 and subsequent steps is similar to that for the format type 0 or 1, so description thereof is omitted.

How the process for downloading content data of the format type 2 is carried out has been described. As described above, the process for downloading data of the format type 2 omits the processes for decrypting the block data and collating the content integrity check values contrary to the process for the format type 0 or 1, thereby increasing the processing speed. This format is thus suitable for processing of music data or the like which must be executed in real time.

Figure 41:
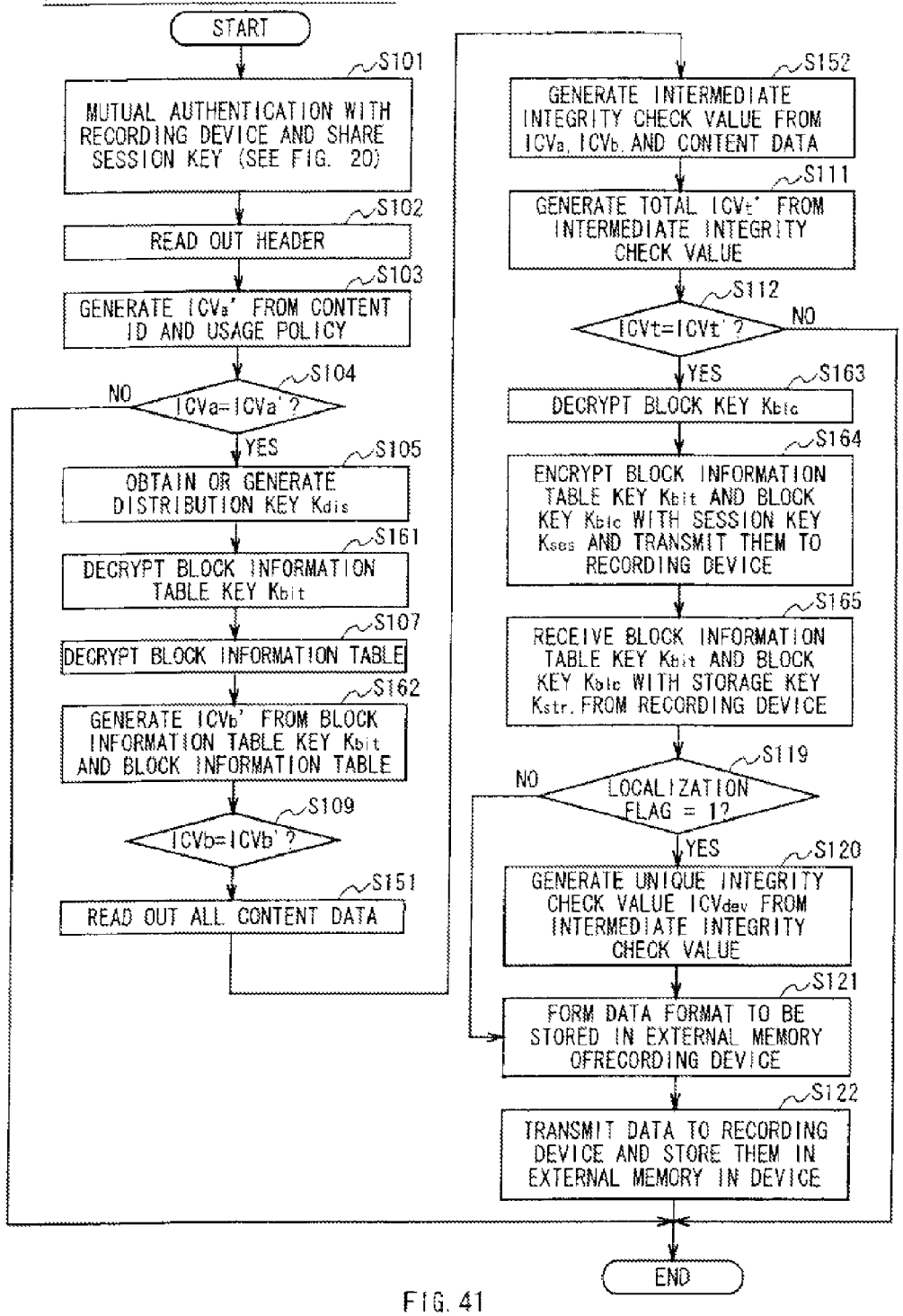
FIG. 41 is a view showing a process for downloading content of the format type 3.

Next, the process for downloading content data of format type 3 will be described with reference to FIG. 41. The following description will focus on differences from the above described download process for the format types 0, 1, and 2.

Steps S101 to S105 are similar to those of the above described download process for the format types 0, 1, and 2, so description thereof is omitted.

The process for the format type 3 essentially has many characteristics in common with that for the format type 2, but differs therefrom in that the format type 3 has no content key in that the block key Kblc is stored in the recording device 400 after encryption with the storage key Kstr.

The following description will focus on the differences between the download process for the format type 3 and that for the format type 2. With the format type 3, at step S161 (which follows step S105), the block information table key is decrypted. The control section 306 of the recording and reproducing device cryptography process section 302 uses the encryption/decryption section 308 of the recording and reproducing device cryptography process section 302, as well as the distribution key Kdis generated at step S105, to decrypt the block information table key Kbit. Kbit is stored in the header section of the data obtained from the medium 500 via the read section 304, or received from the communication means 600 via the communication section 305. With the format type 3, data contains no content key Kcon, so that the process for decrypting the content key Kcon is not executed.

At the next step S107, the block information table key Kbit (decrypted at step S161) is used to decrypt the block information table. At step S162, the control section 306 of the recording and reproducing device cryptography process section 302 generates integrity check value B(ICVb') from the block information table key Kbit and block information table (BIT). The integrity check value B is generated by using the integrity-check-value-B-generating key Kicvb. This is performed to encrypt the exclusive-ORed value comprising the block information table key Kbit and block information table (BIT), based on the DES. Kicvb is stored in the internal memory 307. Next, at step S109, the integrity check value B (ICVb) and the ICVb in the header are compared together. If they are equal, the process proceeds to step S151.

With the format type 3, the check value B, ICVb functions to verify that the block information table key Kbit and the block information table have not been tampered with. If the integrity check value B generated equals the check value ICVb stored in the header, it is determined that the block information table key Kbit and the block information table have not been tampered with.

Steps S151 to S112 are similar to those of the process for the format type 2, and description thereof is omitted.

At step S163, the block key Kblc, contained in the content data read out at step S151, is decrypted with the distribution key Kdis generated at step S105.

Then at step S164, the recording and reproducing device cryptography process section 302 of the recording and reproducing device 300 causes the encryption/decryption section 308 of the recording and reproducing device cryptography process section 302 to encrypt the block information key Kbit (decrypted at step S161) and the block key Kblock (decrypted at step S163), using the session key Kses made sharable during the mutual authentication. The control section 301 of the recording and reproducing device 300 reads the block information table key Kbit and the block key Kblc out from the recording and reproducing device cryptography process section 302 of the recording and reproducing device 300 and then transmits this data to the recording device 400 via the recording device controller 303 of the recording and reproducing device 300.

Then at step S165, the recording device 400 causes the encryption/decryption section 406 of the recording device cryptography process section 401 to decrypt the received data with the session key Kses. Step 165 occurs upon receiving the block information table key Kbit and the block key Kblc that are transmitted from the recording and reproducing device 300. Kses was made sharable during the mutual authentication. The decrypted data is then reencrypted using the storage key Kstr which is unique to the recording device 400 which is stored in the internal memory 405 of the recording device cryptography process 401. The control section 301 of the recording and reproducing device 300 reads the block information table key Kbit and the block key Kblc reencrypted by a storage key Kstr from the recording device 400 via the recording device controller of the recording and reproducing device 300. That is, the block information table key Kbit and block key Kblc initially encrypted with the distribution key Kdis are replaced with the block information table key Kbit and block key Kblc reencrypted with the storage key Kstr.

The subsequent steps S119 to S122 are similar to those for the format types 0, 1, and 2, so description thereof is omitted.

The aspect of the process for downloading content data of the format type 3 has been described. As described above, the download process for the format type 3 omits the decryption of the block data and the process for collating the content integrity check value as for the format type 2, thereby enabling prompt processing. The format type 3 is thus suitable for processing data such as music data, which requires real-time processing. In addition, since the range within which the encrypted content is protected is localized by the block key Kblc, advanced security is achieved compared to the format type 2.

Next, processes for reproducing data of each of the format types 0 to 3 from the recording device 400 will be explained with reference to the flow charts in FIGS. 42 to 45.

Figure 42:
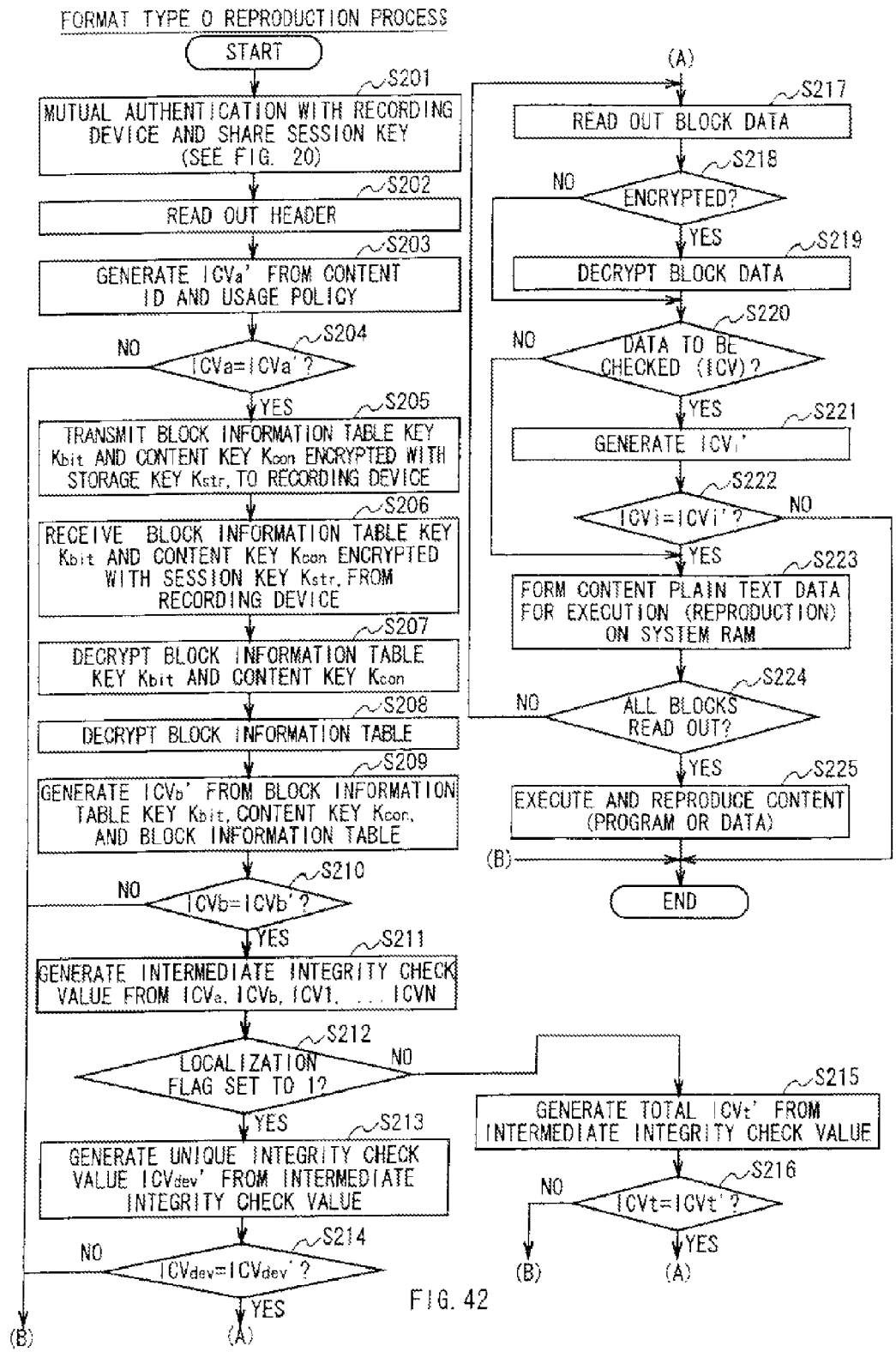
FIG. 42 is a view showing a process for reproducing content of the format type 0.

First, a process for reproducing content of the format type 0 will be explained with reference to FIG. 42.

Step S201 corresponds to an authentication process between the recording and reproducing device 300 and the recording device 400. It is executed in accordance with the authentication process flow previously described in FIG. 20.

Once the authentication process at step S201 has been completed to set the authentication flag, the recording and reproducing device 300, at step S202, reads the header of data of a predetermined format out from the recording device 400 and transmits it to the recording and reproducing device cryptography process section 302 of the recording and reproducing device 300.

Then at step S203, the control section 306 of the recording and reproducing device cryptography process section 302 causes the encryption/decryption section 308 of the recording and reproducing device cryptography process section 302 to calculate the integrity check value A. The integrity check value A, IVCa', is calculated using as a key the integrity-check-value-A-generating key Kicva stored in the internal memory 307 of the recording and reproducing device cryptography process section 302 and using the content ID and the usage policy as a message, as shown in the previously described FIG. 23. Then, the integrity check value A, IVCa', and the check value ICVa stored in the header are compared together at step S204. If they are equal, the process proceeds to step S205.

The check value A, ICVa, is used to verify that the content ID and the usage policy have not been tampered with. If the calculated integrity check value A, IVCa', equals the check value ICVa stored in the header, it is determined that the content ID and the usage policy have not been tampered with.

Then at step S205, the control section 301 of the recording and reproducing device 300 takes out, from the read-out header section, the block information table key Kbit and content key Kcon (encrypted with the storage key Kstr unique to the recording device) and then transmits them to the recording device 400 via the recording device controller 303 of the recording and reproducing device 300.

On receiving the block information table key Kbit and the content key Kcon (transmitted from the recording and reproducing device 300), the recording device 400 causes the encryption/decryption section 406 of the recording device cryptography process section 401 to decrypt the received data with the storage key Kstr (unique to the recording device which is stored in the internal memory 405 of the recording device cryptography process) and to then reencrypt the decrypted data using the session key Kses (made sharable during the mutual authentication). This process is as previously described in detail in (9) Key Exchange Process after Mutual Authentication.

At step S206, the control section 301 of the recording and reproducing device 300 receives the block information table key Kbit and content key Kcon reencrypted with the session key Kses, from the recording device 400, via the recording device controller 303 of the recording and reproducing device 300.

Then at step S207, the control section 301 of the recording and reproducing device 300 transmits the received block information table key Kbit and content key Kcon (which are reencrypted with the session key Kses), to the recording and reproducing device cryptography process section 302 of the recording and reproducing device 300. On receiving the block information table key Kbit and content key Kcon reencrypted with the session key Kses the content block, the cryptography process section 302 of the recording and reproducing device 300 causes the encryption/decryption section 308 of the recording and reproducing device cryptography process section 302 to decrypt these keys Kbit and Kcon with the session key Kses (made sharable during the mutual authentication).

Further at step S208, the decrypted block information table key Kbit is used to decrypt the block information read out at step S202. The recording and reproducing device cryptography process section 302 of the recording and reproducing device 300 replaces the decrypted block information table key Kbit, content key Kcon, and block information table BIT with the block information table key Kbit, content key Kcon, and block information table BIT contained in the header read out at step S202, to hold the latter. Additionally, the control section 301 of the recording and reproducing device 300 reads the decrypted block information table BIT out from the recording and reproducing device cryptography process section 302 of the recording and reproducing device 300.

Further, at step S209, the control section 306 of the recording and reproducing device cryptography process section 302 generates the integrity check value B(ICVb') from the block information table key Kbit, the content key Kcon, and the block information table (BIT). The integrity check value B is generated, as shown in FIG. 24, by using as a key the integrity-check-value-B-generating key Kicvb to decrypt the exclusive-ORed value comprising the block information table key Kbit, the content key Kcon, and the block information table (BIT), based on the DES. Kicvb is stored in the internal memory 307. Then at step S210, the integrity check value B, ICVb', and the ICVb in the header are compared together. If they are equal, the process proceeds to step S211.

The check value B, ICVb is used to verify that the block information table key Kbit, the content key Kcon, and the block information table have not been tampered with. If the integrity check value B generated equals the check value ICVb stored in the header, it is determined that the block information table key Kbit, the content key Kcon, and the block information table stored in the recording device 400 have not been tampered with.

At step S211, the control section 306 of the recording and reproducing device cryptography process section 302 causes the encryption/decryption section 308 of the recording and reproducing device cryptography process section 302 to calculate the intermediate integrity check value. The intermediate value is calculated in accordance with the ICV calculation method described in FIG. 7, using the total-integrity-check-value generating key Kicvt as a key. Kicvt is stored in the internal memory 307 of the recording and reproducing device cryptography process section 302. The integrity check values A and B in the verified header and all the content integrity check values in the block information table are used as a message, as shown in FIG. 25. In this regard, the intermediate integrity check value generated is stored in the recording and reproducing device cryptography process section 302 of the recording and reproducing device 300 as required.

Next, at step S212, the control section 301 of the recording and reproducing device 300 takes the localization field out from the usage policy to determine whether the content to be reproduced can be used only by this recording and reproducing device 300 (in this case, the localization field is set to 1) or also by other similar recording and reproducing devices 300 (in this case, the localization field is set to 0). The usage policy is contained in the header section of the data read from the external memory 402. If the result of the determination shows that the localization field is set to 1, that is, the reproduced content can be used only by this recording and reproducing device 300, the process proceeds to step S213. If the localization field is set to 0, that is, the reproduced content can also be used by other similar recording and reproducing devices 300, the process proceeds to step S215. The processing at step S211 may be executed by the cryptography process section 302.

At step S213, the control section 301 of the recording and reproducing device 300 causes the recording and reproducing device cryptography process section 302 of the recording and reproducing device 300 to calculate the integrity check value ICVdev'. ICVdev' is unique to the recording and reproducing device 300. The integrity check value ICVdev', unique to the recording and reproducing device, is generated as shown in FIG. 25, by using a recording and reproducing device signature key Kdev as a key to decrypt the intermediate integrity check value based on the DES. The intermediate integrity check value can be held at step S58. Kdev is stored in the internal memory 307.

Then at step S214, the integrity check value ICVdev' (unique to the recording and reproducing device 300) calculated at step S213, and the ICVdev in the header read out at step S202, are compared together. If they are equal, the process proceeds to step S217.

At step S215, the control section 306 of the recording and reproducing device cryptography process section 302 causes the encryption/decryption section 308 of the recording and reproducing device cryptography process section 302 to calculate the total integrity check value ICVt. The total integrity check value ICVt' is generated by using the system signature key Ksys as a key to decrypt the intermediate integrity check value based on the DES, as shown in FIG. 25. Ksys is stored in the internal memory 307. Then at step S216, the generated total integrity check value ICVt' and the ICVt in the header are compared together. If they are equal, the process proceeds to step S217.

The total integrity check value ICVt and the integrity check value ICVdev unique to the recording and reproducing device are used to verify that all of the integrity check values ICVa and ICVb and the integrity check value for each content block have not been tampered with. Thus, if the total integrity check value generated by means of the above described process equals the integrity check value: ICVt or ICVdev stored in the header, it is determined that all of the integrity check values for each content block have not been tampered.

Next, at step S217, the control section 301 of the recording and reproducing device 300 reads the block data out from the recording device 400. Furthermore, at step S218, it is determined whether or not the data has been encrypted. If the data has been encrypted, the cryptography process section 302 of the recording and reproducing device 300 decrypts the block data. If the data has not been encrypted, the process skips step S219 and advances to step S220.

Then at step S220, the control section 301 of the recording and reproducing device 300 checks whether any content block is to be verified. This is done based on the content block information table in the block information table (BIT). If any content block is to be verified, the content integrity check value has been stored in the block information in the header. In this case, the content integrity check value ICVi for this content block is calculated at step S221. If no content block is to be verified, the process skips steps S221 and S222 to advance to step S223.

If the block has been encrypted as previously described in FIG. 36, the content integrity check value ICVi' is generated by decrypting the input content block with the content key Kcon in the DES CBC mode, exclusive-ORing all of the results every 8 bytes to generate the content intermediate value. Then the process encrypts the obtained value with the content-integrity-check-value-generating key Kicvc (stored in the internal memory 307 of the recording and reproducing device 300). Additionally, if the block has not been encrypted, the content integrity check value is generated by sequentially inputting the entire data (plain text) to the tamper-check-value-generating function shown in FIG. 36 (DES-CBC-MAC using the content-integrity-check-value-generating key Kicvc) in such a manner that 8 bytes are input each time.

At step S222, the control section 306 of the recording and reproducing device cryptography process section 302 compares the generated content integrity check value ICVi' with the ICVi stored in the content block received from the recording device 400 at step S202, and passes the result to the control section 301 of the recording and reproducing device 300. On receiving the result (and if the verification has been successful), the content plain data for execution (reproduction) on the RAM of the recording and reproducing device system is formed at step S223. The control section 301 of the recording and reproducing device 300 takes out the next content block to be verified and causes the recording and reproducing device cryptography process section 302 of the recording and reproducing device 300 to verify this content block. Similar verification processes and RAM storage processes are repeated until all the content blocks are verified (step S224).

If the check values do not match at any of steps S204, S210, S214, S216, or S222, an error occurs to end the reproduction process.

When it is determined at step S224 that all the blocks have been read out, the process proceeds to step S225 to start executing and reproducing the content (program or data).

The aspect of the process for reproducing content data of the format type 0 has been explained.

Figure 43:
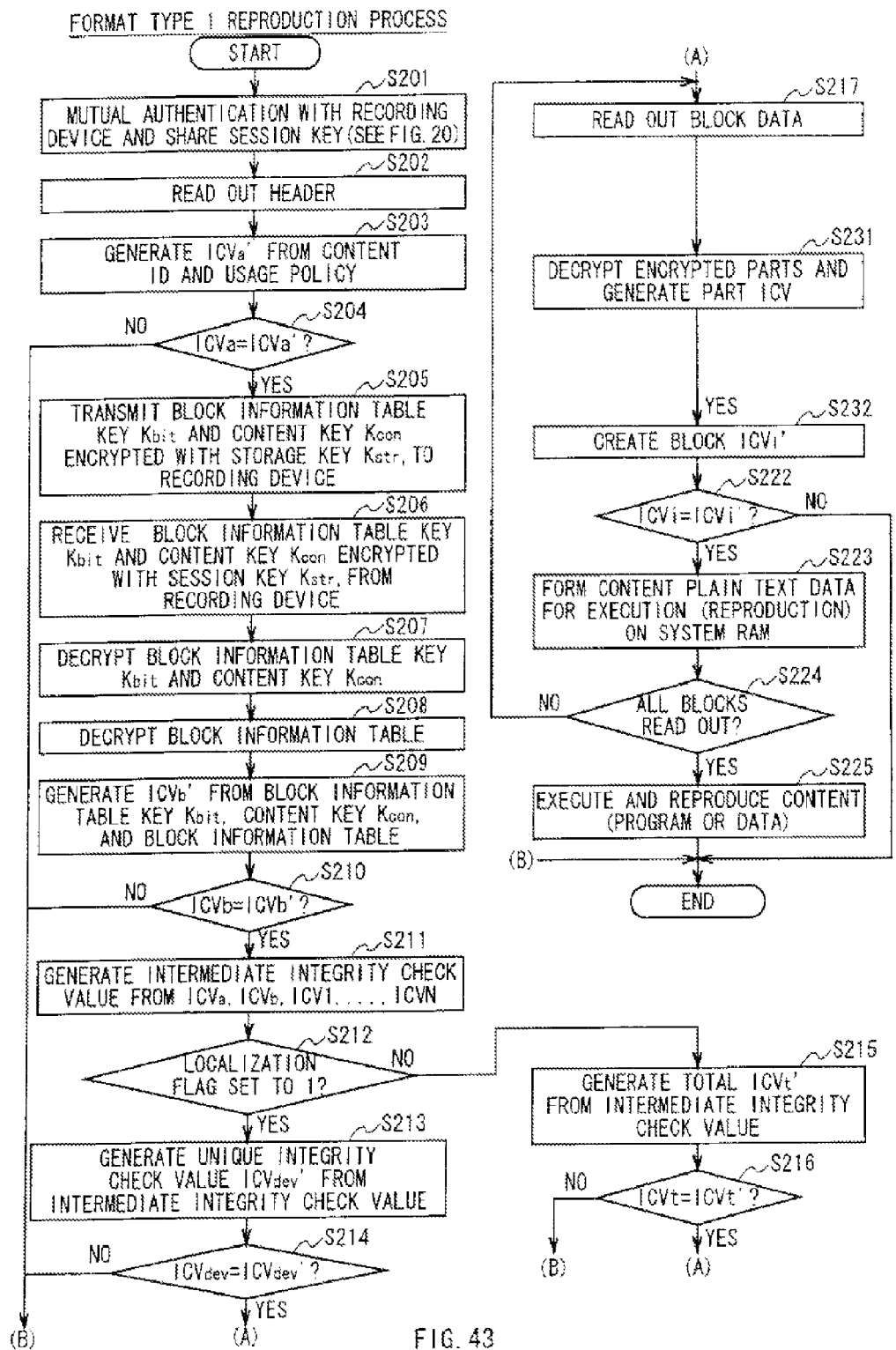
FIG. 43 is a view showing a process for reproducing content of the format type 1.

Next, the process for downloading content data of the format type 1 will be explained with reference to FIG. 43. The following description will focus on differences from the above described download process for the format type 0.

The processing from steps S201 to S217 is similar to that in the above described download process for the format type 0, so description thereof is omitted.

For the format type 1, at step S231, encrypted parts are decrypted to generate a part ICV. Further at step S232, the block ICVi' is generated. As previously described with the format type 1, if at least one of the parts in a block contains data to be verified with the integrity check value ICVi, the content integrity check value ICVi is defined for this block. For example, if the part j has been encrypted, an integrity check value P-ICVij for a part j of a block i is generated by exclusive-ORing the entire plain text (decrypted text) every 8 bytes and decrypting the obtained value with the content-integrity-check-value-generating key Kicvc. Additionally, if the part j has not been encrypted, the integrity check value P-ICVij is generated by sequentially inputting the entire data (plain text) to the tamper-check-value-generating function shown in FIG. 36 (DES-CBC-MAC using the content-integrity-check-value-generating key Kicvc) in such a manner that 8 bytes are input each time.

Further, if the block i contains only one part having [ICV flag=subject of ICV] indicating that it is to be checked, the integrity check-value P-ICVij generated using the above method is directly used as the block integrity check value ICVi. If the block i contains a plurality of parts having [ICV flag=subject of ICV] indicating that they are to be checked, the integrity check value P-ICVij is generated by connecting a plurality of part integrity check values P-ICVij together in accordance with part numbers to obtain data. and the process then sequentially inputs the entire data (plain text) to the tamper-check-value-generating function shown in FIG. 36 (DES-CBC-MAC using the content-integrity-check-value-generating key Kicvc) in such a manner that 8 bytes are input each time. This is the same as explained in FIG. 37.

For the format type 1, the content integrity check value generated by means of the above described procedure undergoes comparison at step S222. Processing at the next step S223 and the subsequent steps is similar to that for the format type 0, so description thereof is omitted.

Figure 44:
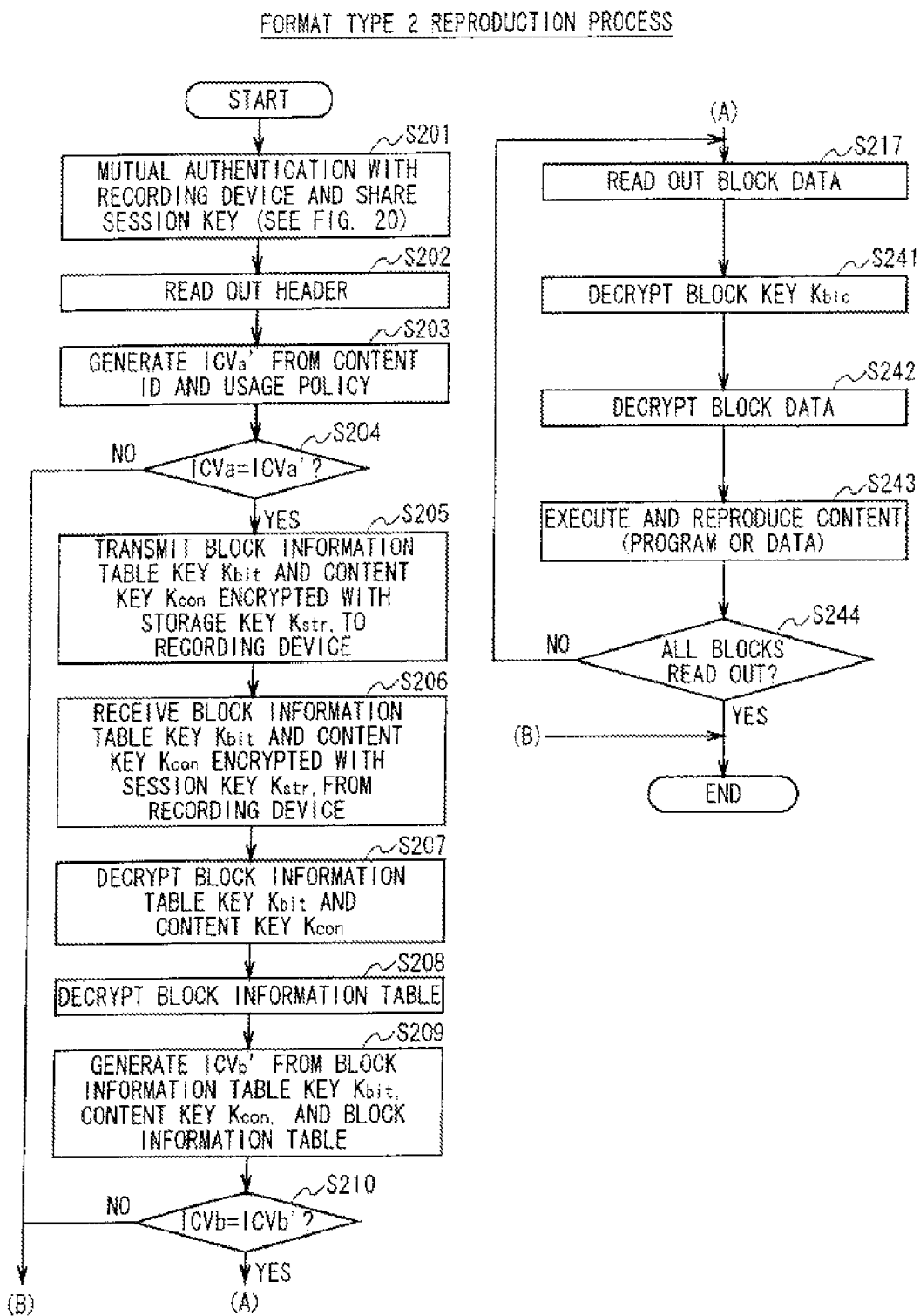
FIG. 44 is a view showing a process for reproducing content of the format type 2.

Next, the process for reproducing content data of the format type 2 will be explained with reference to FIG. 44. The following description will focus on differences from the above described reproduction processes for the format types 0 and 2.

Steps S201 to S210 are similar to that in the above-described reproduction processes for the format types 0 and 1, so description thereof is omitted.

For the format type 2, the processing at steps S211 to S216, which is executed for the format types 0 and 1, is not executed. In addition, the format type 2 has no content integrity check value, so that verification of the content integrity check value, which is executed for the format types 0 and 1, is not executed.

In the data reproduction process for the format type 2 (performed after step S210 for verifying the integrity check value B), the process proceeds to step S217, where the block data are read out under the control of the control section 301 of the recording and reproducing device 300. Further, at step S241, the cryptography process section 306 of the recording and reproducing device 300 decrypts the block key Kblc contained in the block data. The block key Kblc, stored in the recording device 400, has been encrypted with the content key Kcon as shown in FIG. 34. Kblc is thus decrypted with the content key Kcon decrypted, which has been decrypted at step S207.

Then at step S242, the block key Kblc (decrypted at step S241) is used to decrypt the block data. Furthermore, at step S243, the content (program or data) is executed and reproduced. The processing from steps S217 to S243 is repeated for all the blocks. When it is determined at step S244 that all the blocks have been read out, the reproduction process is ended.

As described above, the process for the format type 2 omits the process for verifying the integrity check value, such as the total integrity check value. It thus provides a configuration suitable for executing the decryption process at a high speed, and a format suitable for processing data such as music data which requires real-time processing.

Figure 45:
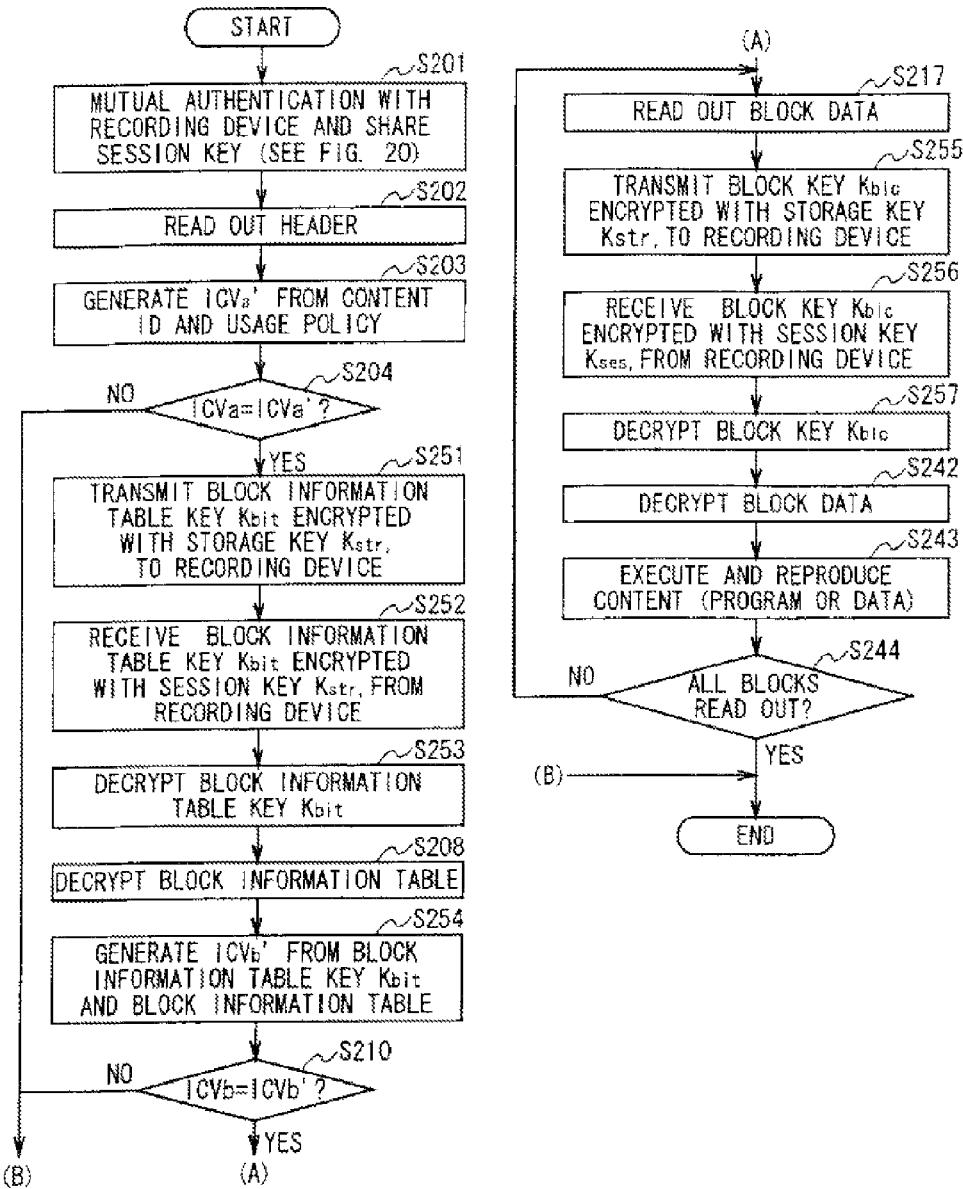
FIG. 45 is a view showing a process for reproducing content of the format type 3.

Next, the process for reproducing content data of format type 3 will be described with reference to FIG. 45. The following description will focus on differences from the above described reproduction process for the format types 0, 1, and 2.

The process for the format type 3 essentially has many characteristics in common with that for the format type 2. Format type 3 differs therefrom in that, as described in FIG. 35, the format type 3 has no content key. The block key Kblc is stored in the recording device 400 after encryption with the storage key Kstr.

Between steps S201 and S210, processing at steps S251, S252, S253, and S254 is configured to omit the use of the content key, which is contrary to the corresponding processing for the formats 0, 1, and 2.

At step S251, the control section 301 of the recording and reproducing device 300 takes out, from the read-out header, the block information table key Kbit and then transmits this key to the recording device 400. This is done via the recording device controller 303 of the recording and reproducing device 300. Kbit is encrypted with the storage key Kstr unique to the recording device 400.

On receiving the block information table key Kbit transmitted from the recording and reproducing device 300, the recording device 400 causes the encryption/decryption section 406 of the recording device cryptography process section 401 to decrypt the received data with the storage key Kstr and to then reencrypt the decrypted data using the session key Kses. Kses is unique to the recording device 400, and is stored in the internal memory 405 of the recording device cryptography process section 401. Kses is made sharable during mutual authentication. This process is as previously described in detail in (9) Key Exchange Process after Mutual Authentication.

At step S252, the control section 301 of the recording and reproducing device 300 receives the block information table key Kbit (reencrypted with the session key Kses), from the recording device 400. Kbit is received via the recording device controller 303 of the recording and reproducing device 300.

Then at step S253, the control section 301 of the recording and reproducing device 300 transmits the received block information table key Kbit (reencrypted with the session key Kses), to the recording and reproducing device cryptography process section 302 of the recording and reproducing device 300. On receiving the block information table key Kbit (reencrypted with the session key Kses the content block), the recording and reproducing device cryptography process section 302 of the recording and reproducing device 300 causes the encryption/decryption section 308 of the recording and reproducing device cryptography process section 302 to decrypt this block information table key Kbit with the session key Kses.

Further at step S208, the decrypted block information table key Kbit is used to decrypt the block information read out at step S202. The recording and reproducing device cryptography process section 302 of the recording and reproducing device 300 replaces the decrypted block information table key Kbit and block information table BIT with the block information table key Kbit and block information table BIT, contained in the header read out at step S202, to hold the latter. Additionally, the control section 301 of the recording and reproducing device 300 reads the decrypted block information table BIT out from the recording and reproducing device cryptography process section 302 of the recording and reproducing device 300.

Further, at step S254, the control section 306 of the recording and reproducing device cryptography process section 302 generates the integrity check value B(ICVb') from the block information table key Kbit and the block information table (BIT). The integrity check value B, ICVb', is generated, as shown in FIG. 24, by using as a key the integrity-check-value-B-generating key Kicvb to decrypt the exclusive-ORed value comprising the block information table key Kbit and the block information table (BIT), based on the DES. Kicvb is stored in the internal memory 307 of the recording and reproducing device cryptography process section 302. Then at step S210, the integrity check value B, ICVb', and the ICVb in the header are compared together, and if they are equal, the process proceeds to step S211.

With the format type 3, the block key is further encrypted with the storage key when stored in the recording device 400, thereby requiring the recording device 400 to execute a decryption processes with the storage key and the session key Kses. It also requires the recording and reproducing device 300 to execute a decryption process with the session key. This series of steps corresponds to the process steps shown as steps S255 and S256.

At step S255, the control section 301 of the recording and reproducing device 300 takes out, from the read-out header, the block key Kblc (encrypted with the storage key Kstr, which is unique to the recording device that has been read out at step S217) and then transmits this key to the recording device 400 via the recording device controller 303 of the recording and reproducing device 300.

On receiving the block key Kblc transmitted from the recording and reproducing device 300, the recording device 400 causes the encryption/decryption section 406 of the recording device cryptography process section 401 to decrypt the received data with the storage key Kstr. It then reencrypts the decrypted data using the session key Kses that was made sharable during the mutual authentication. Kstr is unique to the recording device which is stored in the internal memory 405 of the recording device cryptography process section 401. This process is as previously described in detail in (9) Key Exchange Process after Mutual Authentication.

At step S256, the control section 301 of the recording and reproducing device 300 receives the block key Kblc (reencrypted with the session key Kses), from the recording device 400 via the recording device controller 303 of the recording and reproducing device 300.

Then, at step S257, the cryptography process section 306 of the recording and reproducing device 300 decrypts the block key Kblc using the session key Kses.

Then at step S242, the block key Kblc, decrypted at step S257, is used to decrypt the block data. Furthermore, at step S243, the content (program or data) is executed and reproduced. The processing from steps S217 to S243 is repeated for all the blocks. When it is determined at step S244 that all the blocks have been read out, the reproduction process is ended.

The process for reproducing a content of the format type 3 has been described. The format type 3 is similar to the format type 2 in that the process for verifying the total integrity check value is omitted. However, format type 3 provides a processing configuration with a higher security level due to the inclusion of the process for exchanging the block key Kblc.

(11) Process Executed by Content Provider to Generate Integrity Check Value (ICV)

In the above described embodiments, the verification processes with the various integrity check values ICV are executed during downloading or reproducing content. Aspects of the process for generating the integrity check values ICV and the verification process will be described below.

First, each of the integrity check values explained in the embodiments will be described in brief. The following integrity check values, ICV, are used in the data processing apparatus according to the present invention.

Integrity check value A, ICVa is the integrity check value for verifying that the content ID and usage policy in the content data have not been tampered with.

Integrity check value B, ICVb is the integrity check value for verifying that the block information table key Kbit, the content key Kcon, and the block information table have not been tampered with.

Content integrity check value ICVi is the integrity check value for verifying that each content block of the content has not been tampered with.

Total integrity check value ICVt is the integrity check value for verifying that the integrity check value ICVa, the integrity check value ICVb, and all the integrity check values for the content blocks have not been tampered with.

Integrity check value ICVdev, unique to the recording and reproducing device 300 is the integrity check value that is replaced with the total integrity check value ICVt if the localization flag is set to 1. That is, the content can be used only by a particular recording and reproducing device 300. It is generated as an integrity check value for the previously described integrity check value A, ICVa, integrity check value B, ICVb, and integrity check value ICVi contained in each block of the content to be checked.

Depending on the format, the integrity check values ICVt and ICVdev check the content itself, not the check value for each content block.

Each of the above integrity check values is used in the data processing apparatus according to the present invention. Of these integrity check values, the integrity check values A (IVCa) and B (IVCb), the total integrity check value (IVCt), and the content integrity check value are generated by a content provider (for providing content data) or a content manager (based on data to be verified), as shown, for example, in FIGS. 32 to 35 and 6. They are stored in the data together with the content before being provided to a user of the recording and reproducing device 300. When downloading or reproducing the content to or from the recording device, the user of the recording and reproducing device 300 (i.e., the content user) generates verifying ICVs (based on each data to be verified), to compare them with the stored ICVs. Additionally, the integrity check value ICVdev, unique to the reproducing device 400, is replaced with the total integrity check value ICVt. It is then stored in the recording device 400 if it is shown that the content can be used only by this recording and reproducing device 300.

In the above-described embodiments, the processes for generating the integrity check values are principally based on the DES-CBC. The present invention, however, is not limited to the above-described method, but includes various ICV-generating and verifying process aspects. In particular, for the relationship between the content provider or manager and the content user, the following various ICV-generating and verifying process configurations are possible.

Figure 46:
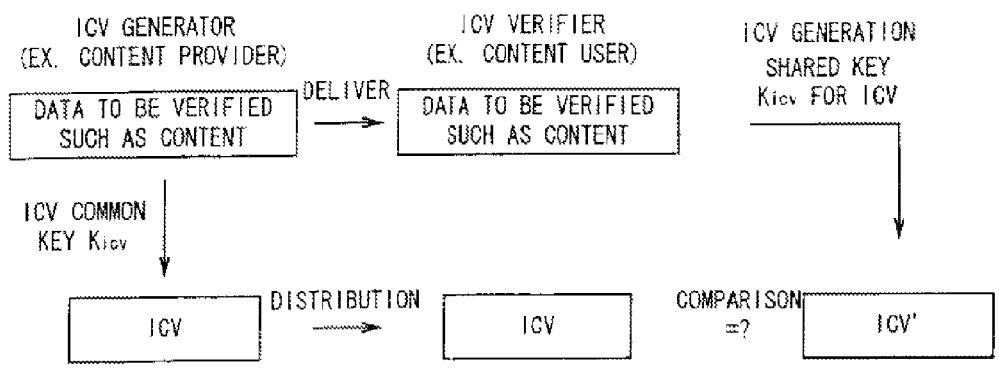
FIG. 46 is a view (1) depicting a method by which a content generator and a content verifier generate integrity check values and execute verification using them.
Figure 47:
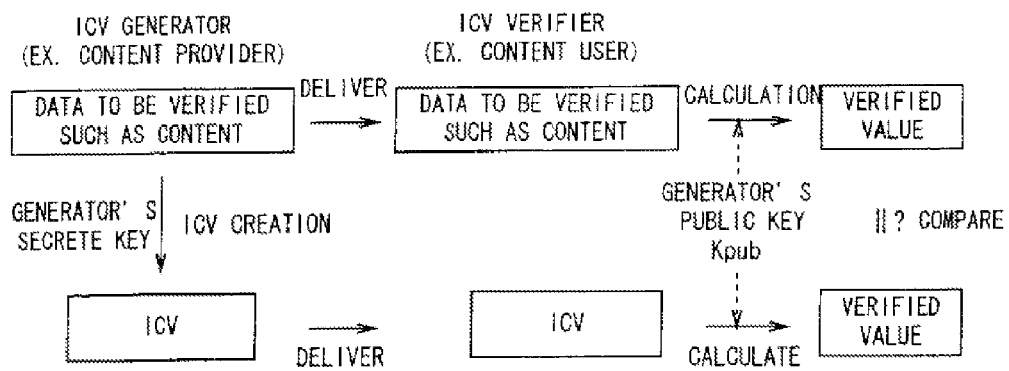
FIG. 47 is a view (2) depicting a method by which the content generator and the content verifier generate integrity check values and execute verification using them.
Figure 48:
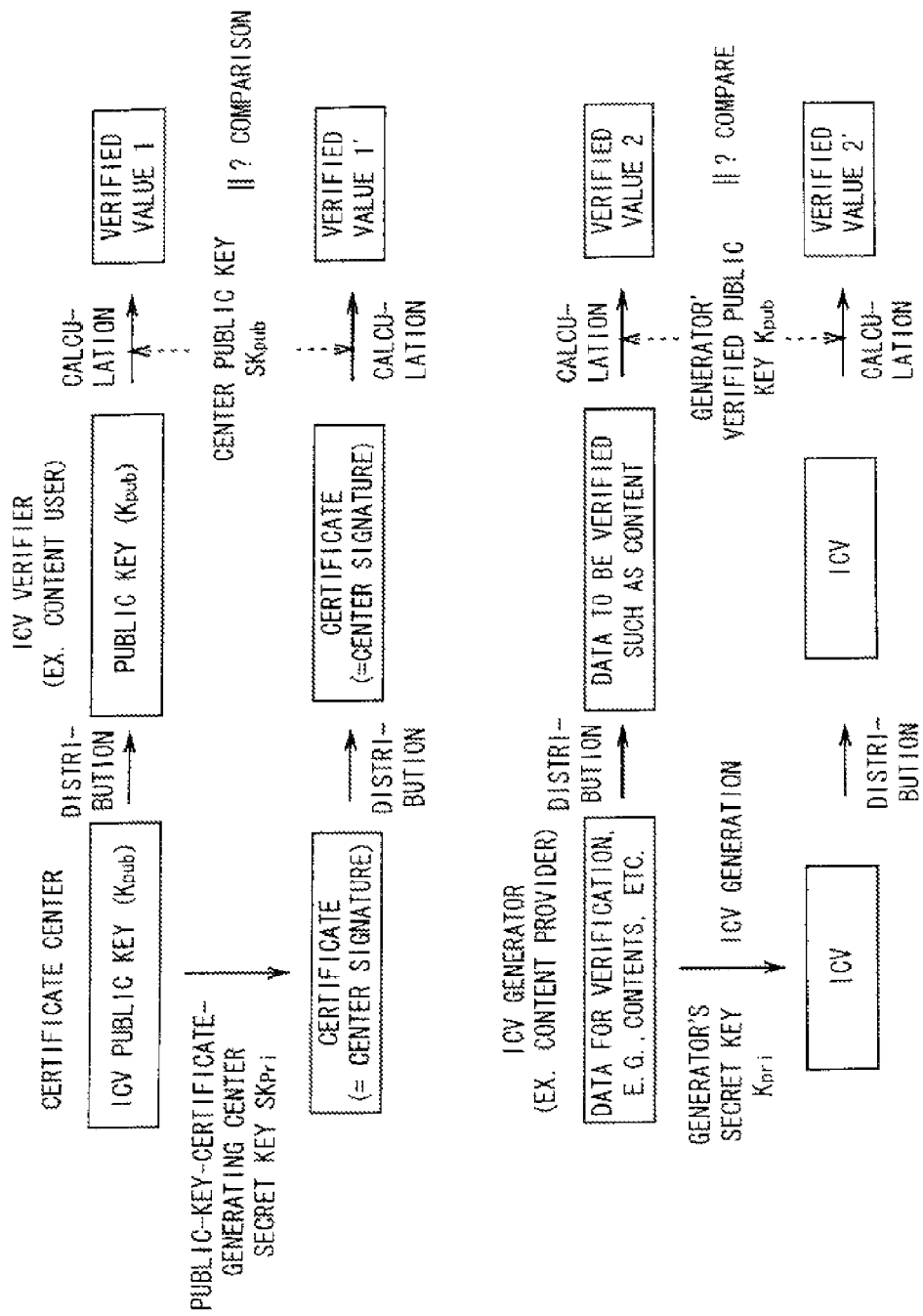
FIG. 48 is a view (3) depicting a method by which the content generator and the content verifier generate integrity check values and execute verification using them.

FIGS. 46 to 48 are views illustrating a generation process executed by a generator of the integrity check value ICV and a verification process executed by a verifier.

FIG. 46 shows a configuration wherein, for example, an ICV generator (who is a content provider or manager) executes the process for generating the ICV based on the DES-CBC as described in the above embodiments. It then provides the generated ICV to a recording and reproducing device user, that is, a verifier together with the content. In this case, for the verification process, the recording and reproducing device user requires the keys stored in the internal memory 307 (shown in FIG. 18) for generating the corresponding integrity check values. The verifier (recording and reproducing device user) who is the content user uses the integrity-check-value-generating key stored in the internal memory 307 to apply the DES-CBC to data to be verified in order to generate the integrity check values. It then compares these values with stored integrity check values. In this case, each integrity-check-value-generating key is configured so as to be secretly shared by the ICV creator and the verifier.

FIG. 47 shows a configuration wherein the ICV creator (who is the content provider or manager) generates ICVs using a digital signature of a public key cryptosystem and then provides the generated ICVs to the content user. The content user stores the public key of the ICV creator and uses this key to verify the ICVs. In this case, the public key of the ICV creator, which is held by the content user (recording and reproducing device user), need not be secret this results in easier management. This aspect is thus suitable for ICV generation and management executed at a high security management level, for example, that executed in one entity.

In FIG. 48, the ICV creator (who is the content provider or manager) generates ICVs using a digital signature of a public key cryptosystem. It then provides the generated ICVs to the content user together with the content; further stores a public key in a public key certificate (see, for example, FIG. 14); and then provides this key to the recording and reproducing device user. With a plurality of ICV creators, each creator has a key managing center create data (a public key certificate) for certifying the validity of the public key.

The content user (the ICV verifier) has a public key of the key managing center. The IVC verifier verifies the public key certificate using the public key of the key managing center, and, if its validity has been ascertained, takes out the public key of the ICV creator stored in the public key certificate. The verifier further verifies the ICVs using the taken-out public key of the ICV creator.

This method is useful if a plurality of ICV creators are present and if a center for managing these creators has an established management system.

(12) Configuration for Generating Cryptography Process Keys Based on Master Keys A configuration for generating various cryptography process keys based on the master keys will be described below.

As previously described with reference to FIG. 18, the internal memory 307 of the recording and reproducing device 300 in the present data processing apparatus stores the various master keys. Each of the various master keys which can be used, for example, to generate the authentication key Kate (see Equation 3) or the distribution key Kdis (see Equation 4).

When cryptography communication, mutual authentication, MAC generation, verification, or the like is carried out between two entities, these entities conventionally hold secret information common to them, such as, key information. The entities may be, for example, the content provider, the recording and reproducing device 300 and the recording device 400 in the present data processing apparatus. Additionally, when the above process is carried out between one and many entities, (for example, one content provider and many content users, or one recording and reproducing device and many recording media) these entities conventionally store and hold secret information common to all the entities. That is, secret information common to many content users or many recording media, or one content provider individually manages and uses secret information (ex. key) for each of many content users.

With the one-to-many relationship as described above, however, the configuration owning secret information (key) shared by all the entities is disadvantageous in that leakage of the secret from one entity affects all the other entities using the same secret information (ex. key). In addition, when one manager, such as a content provider individually manages and uses secret information for each content user, a list is required that serves to identify all the users and that associates this identification data with unique secret information (ex. keys). This increases list maintaining and managing burdens in proportion to the number of users.

The data processing apparatus according to the present invention has solved a problem with sharing secret information between entities using a configuration for holding the master keys and generating various individual keys therefrom. This configuration will be described below.

In the data processing apparatus according to the present invention, if different individual keys are required for various cryptography processes, authentication processes, and the like between recording devices, media storing contents, or recording and reproducing devices, these individual keys are generated using individual information such as identifier data (ID) unique to the devices or media and an individual-key generating method (previously determined in the recording and reproducing device 300). With this configuration, if any individual key generated should be identified, damage to the entire system can be precluded by preventing the corresponding master key from leaking. In addition, the configuration for generating the keys from the master keys eliminates the needs for the association list.

Figure 49:
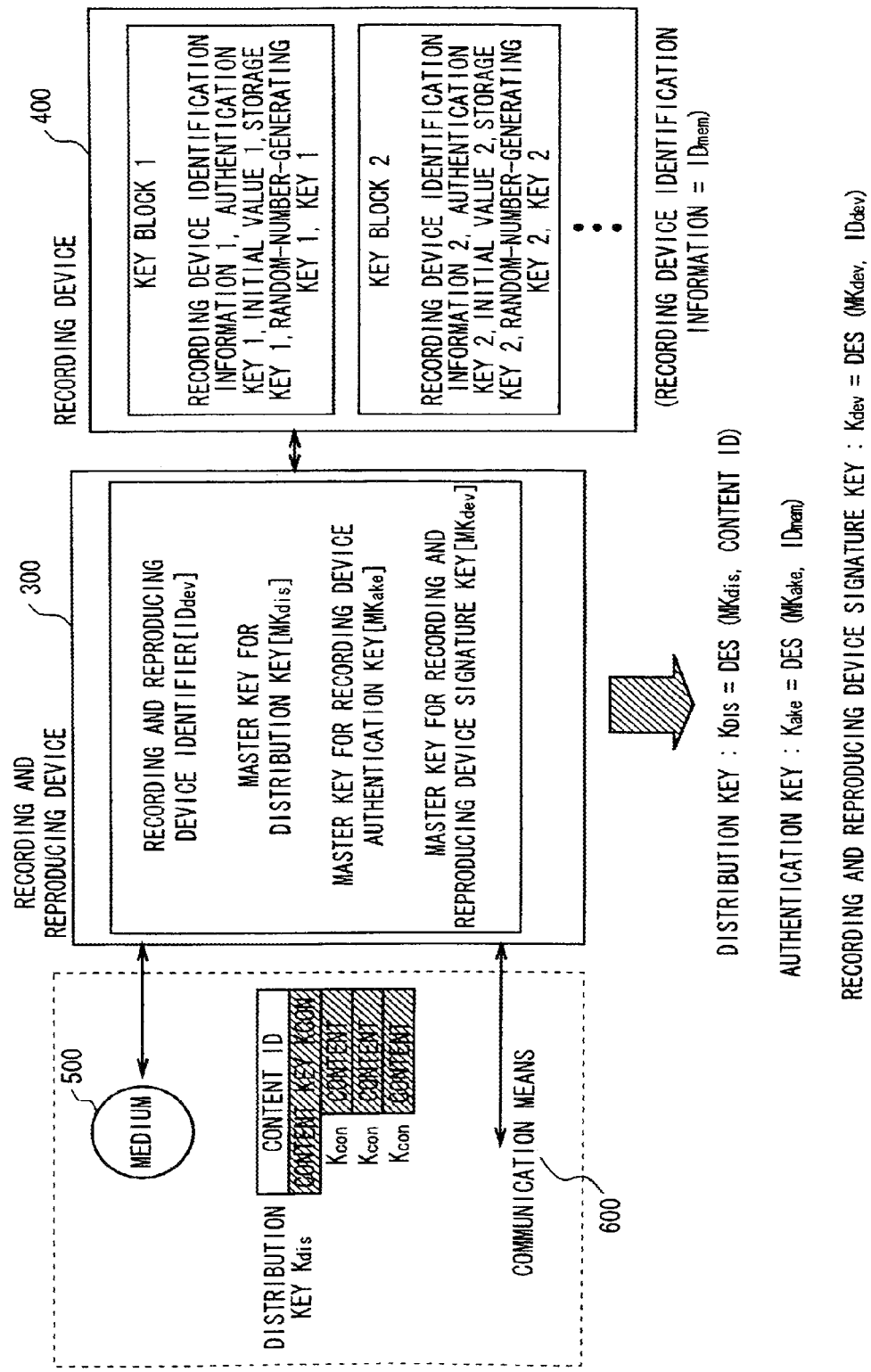
FIG. 49 is a view depicting a method for individually generating various keys using master keys.

A specific example of configuration will be described with reference to the drawings. FIG. 49 illustrates a configuration for generating various keys using the various master keys held by the recording and reproducing device 300. The medium 500 and the communication means 600 input content as in the already described embodiments. The content is encrypted by the content key Kcon, which is in turn encrypted by the distribution key Kdis.

For example, if the recording and reproducing device 300 attempts to take a content out from the medium 500 or the communication means 600 and download it to the recording device 400, the recording and reproducing device 300 must obtain the distribution key Kdis that has encrypted the content key as previously described in FIGS. 2 and 39 to 41. Although the key Kdis can be directly obtained from the medium 500 or the communication means 600 or the recording and reproducing device 300 can obtain and store it in its memory beforehand, the configuration for distributing such a key to many users may be subjected to leakage, which may affect the entire system, as described above.

The data processing system according to the present invention is configured to generate the distribution key Kdis by applying a master key MKdis for the distribution key stored in the memory of the recording and reproducing device 300 as well as a process based on the content ID. That is, Kdis=DES (MKdis, content ID), as shown in the lower part of FIG. 49. In a content distributing configuration between a content provider providing contents from the medium 500 or the communication means 600 and the recording and reproducing device 300 (where recording and reproducing device 300 is a content user), despite a large number of content providers, this configuration enables advanced security to be maintained without the need to distribute the individual distribution keys Kdis via the medium 500, the communication means 600 or the like, or to store them in each recording and reproducing device 300.

Next, the generation of the authentication key Kaka will be explained. In downloading a content from the recording and reproducing device 300 to the recording medium 400 (as previously described in FIGS. 22 and 39 to 41), or causing the recording and reproducing device 300 to execute and reproduce a content stored in the recording medium 400 (as described in FIGS. 42 to 45), the recording and reproducing device 300 and the recording medium 400 must execute the mutual authentication process (see FIG. 20).

As described in FIG. 20, this authentication process requires the recording and reproducing device 300 to have the authentication key Kake. Although the recording and reproducing device 300 can obtain the authentication key directly from, for example, the recording medium 400 or can obtain and store it in its memory beforehand, the configuration for distributing such a key to many users may be subjected to leakage. Leakage may affect the entire system, as in the above-described configuration for the distribution key.

The data processing system according to the present invention is configured to obtain the authentication key Kake by applying a master key MKake for the distribution key stored in the memory of the recording and reproducing device 300, as well as a process based on the recording device ID: IDmem. That is, Kake=DES (MKake, IDmem), as shown in the lower part of FIG. 49.

Further, in downloading content from the recording and reproducing device 300 to the recording medium 400 (as previously described in FIGS. 22 and 39 to 41) or causing the recording and reproducing device 300 to execute and reproduce content stored in the recording medium 400 (as described in FIG. 28, FIGS. 42 to 45), a configuration similar to that for the distribution or authentication key described above can be used for the recording and reproducing device signature key Kdev that is required to generate the integrity check value ICVdev unique to the recording and reproducing device 300 if the content can be used only by a particular recording and reproducing device 300. In the above described embodiments, the recording and reproducing device signature key Kdev is stored in the internal memory. However, if the master key Mkdev for the recording and reproducing device signature key is stored in the memory whereas the recording and reproducing device signature key Kdev is not stored therein, and if the recording and reproducing device signature key Kdev is obtained by means of Kdes=DES (MKdev, IDdev) based on the recording and reproducing device identifier Iddev, and the master key MKdev for the recording and reproducing device signature key, as required (as shown in the lower part of FIG. 49), then it advantageously becomes unnecessary for each apparatus to have the recording and reproducing device signature key Kdev.

In this manner, the data processing apparatus according to the present invention is configured to sequentially generate information from the master keys and each ID. The information is, for example, a key which is required for the cryptography information process between two entities. The entities may be, by way of example, the provider and the recording and reproducing device 300, or the recording and reproducing device 300 and the recording device 400. Consequently, even if the key information leaks from each entity, the range of damage incurred by the individual keys is further limited. It also becomes unnecessary to manage key lists for the individual entities as described above.

A plurality of examples of processes relating to this configuration will be explained with flowcharts. FIG. 50 shows examples of a process executed by the content producer or manager to decrypt content or the like using a master key. FIG. 50 also illustrates process executed by a user device (for example, the recording and reproducing device 300 in the above described embodiment) to decrypt the encrypted data using the master key.

At step S501, a content producer or manager imparts an identifier (content identifier) to content. At step S502, the content producer or manager generates a key for encrypting content or the like, based on its owned master key and a content ID. At this step, if the distribution key Kdis is to be generated, it is generated based on the above-described Kdis=DES (MKdis, medium ID). Then at step S503, the content producer or manager uses a key (for example, the distribution key Kdis) to encrypt part or all of the content stored in the medium. The content producer supplies the content encrypted through these steps, via the medium 500 such as a DVD, the communication means 600, or the like.

At step S504, a user device (such as the recording and reproducing device 300) reads the content ID from the content data received via the medium 500 such as a DVD, the communication means 600, or the like. Then at step S505, the user device generates a key applied to decryption of the encrypted content based on the read-out medium ID and its owned master key. If the distribution key Kdis is to be obtained, this generation process corresponds to, for example, the distribution key Kdis=DES (MKdis, medium ID). At step S506, the user device uses this key to decrypt the content. At step S507, the user device reproduces the decrypted device content or execute the program.

In this example, as shown in the lower part of FIG. 50, both the content producer or manager and the user device have the master key (for example, the distribution-key-generating master key MKdis) to sequentially generate the distribution key required to encrypt or decrypt the content based on their owned master key and each ID (medium ID).

With this system, if the distribution key leaks to a third person, the third person can decrypt that content. However, content stored in other media 500 with different content IDs can be prevented from decryption. This thereby minimizes the adverse effects of the leakage of one content key on the entire system. Additionally, this system does not require the user device (that is, the recording and reproducing device 300) to hold a key associating list for each medium 500.

Figure 51:
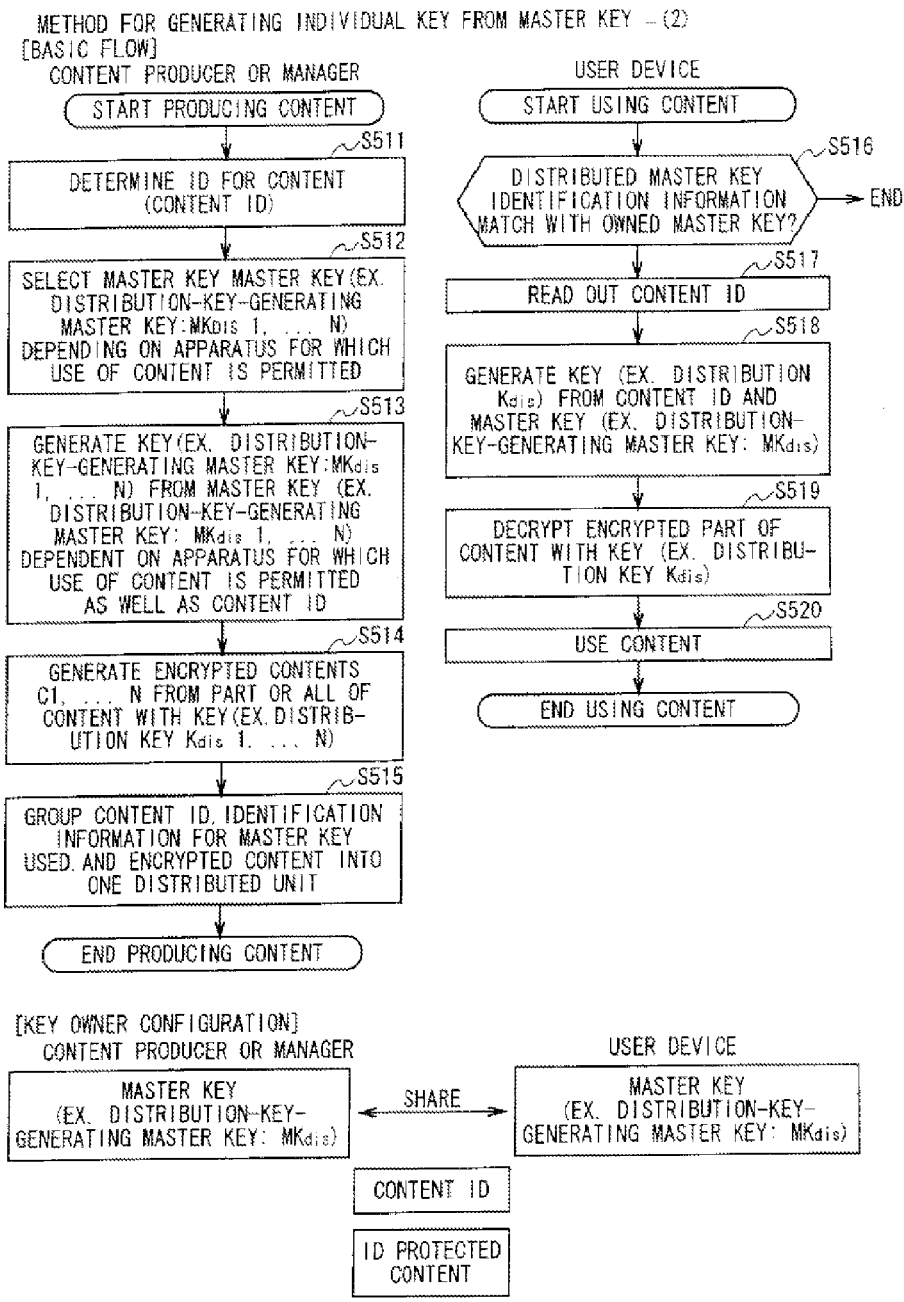
FIG. 51 is a view (example 2) showing an example of a process executed by the content provider and the user in conjunction with the method for individually generating various keys using master keys.
Figure 52:
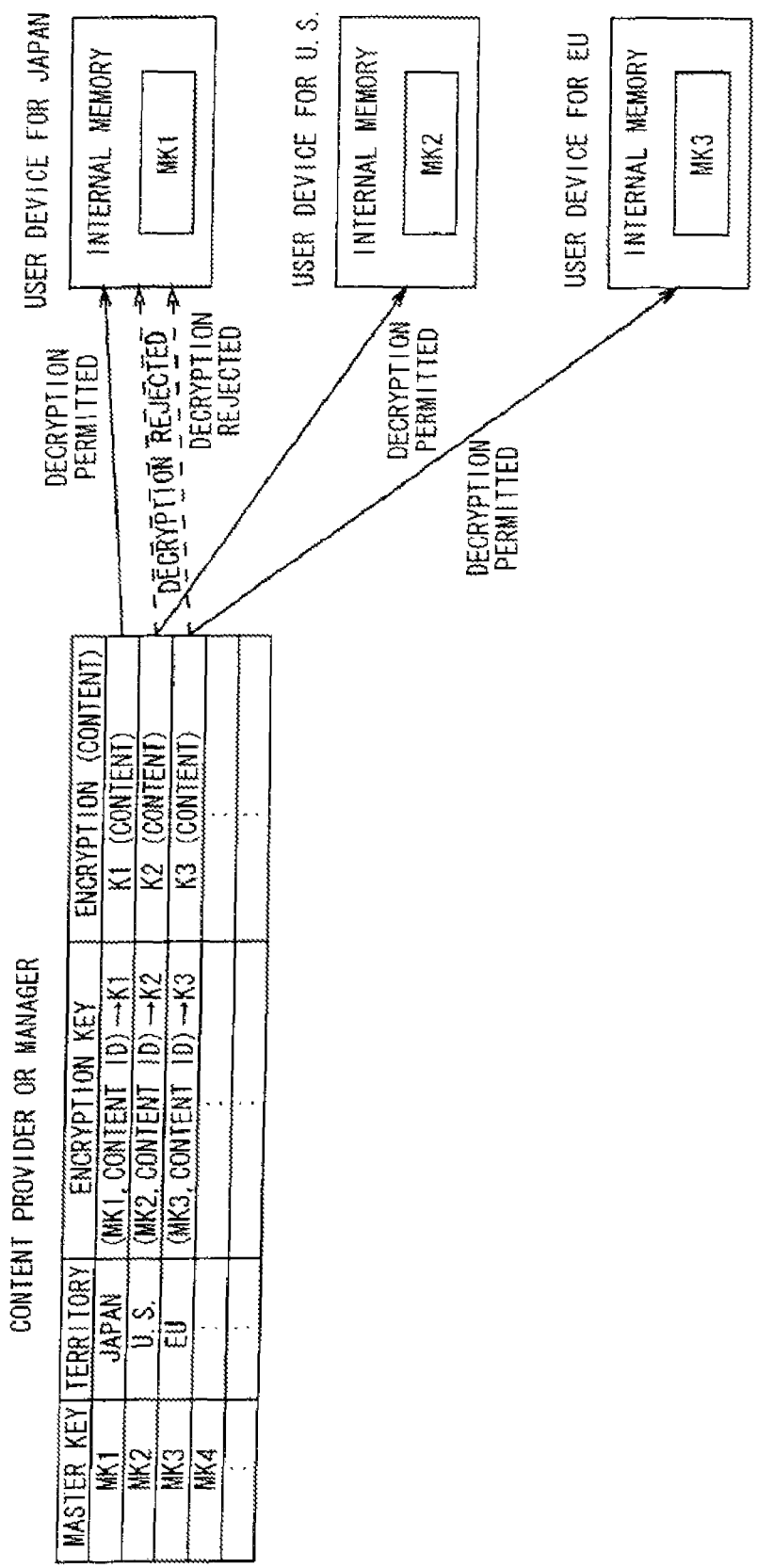
FIG. 52 is a view illustrating a configuration for executing localization using different master keys.

An example where the content producer or manager holds a plurality of master keys to execute a process depending on a content distribution destination is provided with reference to FIGS. 51-52.

In FIG. 51, step S511, executed by the content producer or manager, comprises imparting an identifier (content ID) to the content. Step S512 comprises selecting one of a plurality of master keys (for example, a plurality of distribution-key-generating master keys MKdis) held by the content producer or manager. Although described in further detail with reference to FIG. 52, this selection process comprises setting an applied master key beforehand for each of the countries to which content users belong, each apparatus type, or each apparatus version, and executing the master keys in accordance with the settings.

Then at step S513, the content producer or manager generates an encryption key based on the master key selected at step S512 and the content ID determined at step S511. If, for example, the distribution key Kdis is to be generated, it is generated based on the above described Kdis=DES (MKdis, medium ID). Then at step S514, the content producer or manager uses a key (for example, the distribution key Kdisi) to encrypt part or all of the content stored in the medium. At step S515, the content producer distributes the encrypted content via the medium 500 such as a DVD, the communication means 600, or the like, using a distribution unit. The distribution unit comprises the content ID, the master-key-generating information used and the encrypted content.

On the other hand, at step S516, for example, the user device (such as a recording and reproducing device 300) determines whether or not its holds the master key corresponding the master key ID in the content data distributed by the medium 500 (such as a DVD) or by the communication means 600. If it does not have the master key corresponding to the master key ID in the content data, the distributed content cannot be used by this user device and the process is ended.

If the user device has the master key corresponding to the master key ID in the content data, then at step S517 it reads the content ID out from the content data received via the medium 500, the communication means 600, or the like. Then at step S518, the user device generates a key applied to decryption of the encrypted content based on the read-out content ID and its held master key. This process is a distribution-key Kdisi=DES (Mkdisi, contents ID) if it intends to get a distribution key Kdisi. At step S519, content is decrypted by means of the Kdisi key. At step S520 decrypted contents are used.

In this example, as shown in the lower part of FIG. 51, the content producer or manager has a master key set comprising a plurality of master keys. The master key set includes, for example, distribution-key-generating master keys MKdis 1 to N. On the other hand, the user device has one master key. For example, the user device has one distribution-key-generating master key MKdisi so that it can decrypt the content only when the content producer or manager has used the key MKdisi for the encryption.

FIG. 52 shows an example where master keys vary depending on the country, as a specific example of the aspect shown in the flow in FIG. 51. The content provider has master keys MK1 to MKN, of which the key MK1 is used to generate keys for encrypting content distributed to user devices for Japan. For example, an encryption key K1 is generated from a content ID and the key MK1 and then used to encrypt content. The master keys MK1 to MKN are further set such that the key MK2 is used to generate keys for encrypting content distributed to user devices for the U.S., and the key MK3 is used to generate keys for encrypting content distributed to user devices for the EU (Europe).

For user devices for Japan, for instance, recording and reproducing devices 300 such as PCs or game apparatuses which are sold in Japan, the master key MK1 is stored in their internal memories, for user devices for the U.S., the master key MK2 is stored in their internal memories 307, and for user devices for the EU, the master key MK3 is stored in their internal memories 307.

With this configuration, the content provider selectively uses one of the master keys MK1 to MKN depending on user devices that can use one content, in order to encrypt the content to be distributed to the user devices. For example, to allow the content to be used only by the user devices for Japan, the master key K1 (generated using the master key MK1) is used to encrypt the content. This encrypted content can be decrypted using the master key MK1 stored in the user devices for Japan. That is, MK1 allows a decryption key to be generated. In contrast, the key K1 cannot be obtained from the master keys MK2 and MK3 (stored in the user devices for the U.S. and EU, respectively), thereby preventing the encrypted content from being decrypted.

In this manner, the content provider can selectively use a plurality of master keys to set localization for various content. FIG. 52 shows an example where the different master keys are used for the different countries to which the user devices belong, but various use forms are possible. For example, the master key can be switched depending on the type of the user device or its version, as described above.

Next, FIG. 53 shows an example of a process where an identifier unique to a medium 500, (i.e., a medium ID) and a master key are combined together. Here, the medium 500 refers to, for example, DVDs or CDs in which content is stored. The medium ID may be unique to individual media 500, the titles of contents such as movies, or individual medium manufacturing lots. In this manner, medium IDs may be assigned in various manners.

At step S521, a medium producer or manager determines an identifier (medium identifier) for a medium 500. At step S522, the medium producer or manager generates a key for encrypting content stored in the medium 500 based on its owned master key and a medium ID. At this step, if, for example, the distribution key Kdis is to be generated, it is generated based on the above described Kdis=DES (MKdis, medium ID). Then at step S523, the medium producer or manager uses a key (for example, the distribution key Kdis) to encrypt part or all of the content stored in the medium 500. The medium producer supplies, through these steps the medium 500 storing the content encrypted.

On the other hand, at step S524, a user device such as the recording and reproducing device 300 reads the medium ID from the supplied medium 500. Then at step S525, the user device generates a key applied to decryption of the encrypted content based on the read-out medium ID and its owned master key. If the distribution key Kdis is to be obtained, this generation process corresponds to, for example, the distribution key Kdis=DES (MKdis, medium ID). At step S526, the user device uses this key to decrypt the content. At step S527, the user device uses the content. That is, the user device reproduces the decrypted content or executes the program.

In this example, as shown in the lower part of FIG. 53, both the medium producer or manager and the user device have the master key (for example, the distribution-key-generating master key MKdis) to sequentially generate the distribution key required to encrypt or decrypt the content based on their owned master key and each ID (medium ID).

With this system, if any medium key leaks to a third person, the third person can decrypt the content in the medium 500, but content stored in other media 500 with different medium IDs can be prevented from decryption. This minimizes the adverse effects of the leakage of one medium key on the entire system. Additionally, this system does not require the user device, that is, the recording and reproducing device 300, to hold a key associating list for each medium 500. Further, the size of content encrypted with one medium key is limited to a capacity that can be stored within that medium 500, so that there is a slim possibility that the content reaches the amount of information required to attack the encrypted text. This further reduces the possibility of decrypting the encrypted text.

Next, FIG. 54 shows an example of a process where an identifier unique to the recording and reproducing device 300, and a master key are combined together.

At step S531, a recording and reproducing device user generates a key for encrypting content or the like based on a master key and a recording and reproducing device ID. This information can be stored, for example, in the internal memory 307 of the recording and reproducing device 300. If, for example, the content key Kcon is to be obtained, this generation process corresponds to Kcon=DES (MKcon, recording and reproducing device ID). Then at step S532, the user uses a key (form example, the distribution key Kcon) to decrypt the content. At step S533, the user stores the encrypted content in the recording and reproducing device 300, such as a hard disk.

On the other hand, when the recording and reproducing device user that has stored the content requests the stored data to be recovered, a system manager for managing the recording and reproducing device 300 reads a recording and reproducing device ID from the recording and reproducing device in step S534. Then at step S535, the system manager generates a key applied to recovery of the encrypted content, based on the read-out recording and reproducing device ID and its owned master key. If the content key Kcon is to be obtained, this generation process corresponds to, for example, the content key Kcon=DES (MKcon, recording and reproducing device ID). At step S536, the user device uses this key to decrypt the content.

In this example, as shown in the lower part of FIG. 54, both the recording and reproducing device user and the system manager have the master key (for example, the content-key-generating master key MKcon) to sequentially generate the distribution key required to encrypt or decrypt the content based on their owned master key and each ID (recording and reproducing device ID).

With this system, if the content key leaks to a third person, the third person can decrypt that content, but content stored in other media 500 with different recording and reproducing device IDs can be prevented from decryption. This minimizes the adverse effects of the leakage of one content key on the entire system. Additionally, this system does not require the system manager or the user device to hold a key associating list for each medium 500.

FIG. 55 shows a configuration wherein an authentication key used for a mutual authentication process between a slave device, (for example, the recording device 400, such as a memory card) and a host device, (for example, the recording and reproducing device 300) is generated based on a master key. Although in the previously described authentication process (see FIG. 20), the authentication key is stored in the internal memory 405 of the slave device in advance, it can be generated during the authentication process based on the master key as shown in FIG. 55.

For example, at step S541, the slave device that is the recording device 400 generates, as an initialization process before starting the authentication process, the authentication key Kake. Kake is for use in the mutual authentication process based on the master key and slave device ID stored in the internal memory 105 of the slave device that is the recording device 400. The authentication key is generated based on Kake=DES (MKake, slave device ID). Then at step S542, the generated authentication key is stored in the memory.

On the other hand, at step S543, the host device such as the recording and reproducing device 300, reads a slave device ID out from the installed recording device 400 (that is, the slave device), via the communication means. Then at step S544, the host device generates a authentication key applied to a mutual authentication process based on the read-out slave device ID and its owned authentication-key-generating master key. This generation process corresponds to, for example, the authentication key Kake=DES (MKake, slave device ID). At step S545, this authentication key is used to execute the authentication process.

In this example, as shown in the lower part of FIG. 55, both the slave device and the master device have the master key (that is, the authentication-key-generating master key Mkake) to sequentially generate the distribution key required for the authentication process based on their owned master key and the slave device ID.

With this system, if the authentication key leaks to a third person, this authentication key is effective only on the corresponding slave device and authentication is not established with other slave devices, thereby minimizing the adverse effects of the leakage of the key.

As described above, the data processing apparatus according to the present invention is configured so that the information such as the key which is required for the procedure for the cryptography information process between the two entities such as the content provider and the recording and reproducing device, or the recording and reproducing device and the recording device. Thus, even if the key information leaks from each entity, the range of damage incurred by the individual keys is further limited. It also becomes unnecessary to manage key lists for the individual entities as described above.

(13) Control of Cryptography Intensity in Cryptography Process

In the above described embodiments, the cryptography process between the recording and reproducing device 300 and the recording device 400 is principally described in conjunction with the example using the cryptography process based on the single DES configuration described with reference to FIG. 7. The encryption process method applied to the present data processing apparatus is not limited to the above described Single DES. Any encryption method may be employed depending on a required security state.

For example, the Triple DES method, configured as shown in the previously described FIGS. 8 to 10, is applicable. For example, both the cryptography process section 302 of the recording and reproducing device 300 and the cryptography process section 401 of the recording device 400 shown in FIG. 3 can be configured so as to execute the Triple DES method so that a process can be executed which corresponds to the cryptography process based on the Triple DES method described in FIGS. 8 to 10.

The content provider, however, may give top priority to processing speed (dependent on the content) to use a 64-bit content key Kcon based on the Single DES method, or give top priority to security to use a 128- or 192-bit content key Kcon based on the Triple DES method. Accordingly, it is not preferable to configure the cryptography process section 302 of the recording and reproducing device 300 and the cryptography process section 401 of the recording device 400 so as to accommodate only one of the Triple and Single DES methods. Therefore, the cryptography process section 302 of the recording and reproducing device 300 and the cryptography process section 401 of the recording device 400 are desirably configured so as to accommodate both the Triple and Single DES methods.

However, to configure the cryptography process section 302 of the recording and reproducing device 300 and the cryptography process section 401 of the recording device 400 so as to execute both the Triple and Single DES methods, different circuits and logics must be configured for these cryptography process sections. For example, to allow the recording device 400 to execute a process corresponding to the Triple DES, a command set for the Triple DES must be stored in the command register as shown in FIG. 29. This may complicate the process section configured in the recording device 400.

Thus, for the present data processing apparatus, a configuration is proposed wherein the logic of the cryptography process section 401 of the recording device 400 is configured to accommodate the Single DES, while executing a process corresponding to the Triple DES process to store data (keys, contents, or the like) encrypted based on the Triple DES method, in the external memory 402 of the recording device 400.

For example, for the data format type 0 shown in FIG. 32, when content data is downloaded from the recording and reproducing device 300 to the recording device 400, the authentication process is executed at step S101 in FIG. 39 (showing the flow of downloading data of the format type 0), and the session key Kses is generated. Further, at step S117, the cryptography process section 302 of the recording and reproducing device 300 encrypts the content key Kcon with the session key Kses. It then transmits the encrypted key to the recording device 400 via the communication means 600. At step S118, the cryptography process section 403 of the recording device 400 (which has received the encrypted key) decrypts the content key Kcon with the session key Kses. Cryptography process section 403 then further encrypts it with the storage key Kstr, and transmits the resulting key to the cryptography process section 302. The recording and reproducing device 300 subsequently forms a data format (step S121). It transmits formatted data to the recording device 400. The recording device 400 stores the received data in the external memory 402.

If the cryptography process executed between steps S117 and S118 of the above process (by the cryptography process section 401 of the recording device 400) is configured to selectively execute either the Single or Triple DES method, the cryptography process section 401 works whether the content provider provides content data using the content key Kcon in accordance with the Triple DES or the Single DES.

Figure 56:
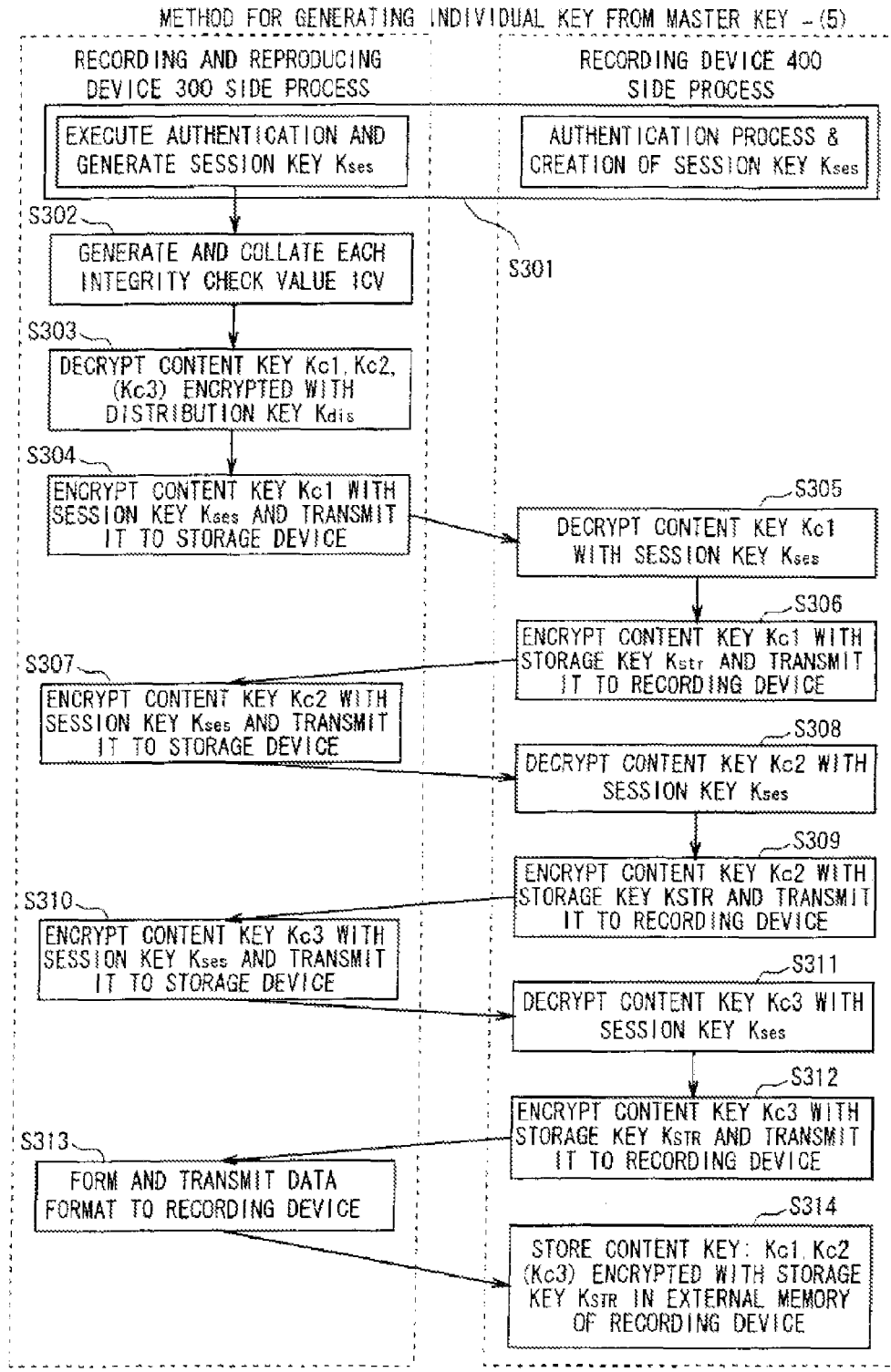
FIG. 56 is a view showing a flow of a process for storing a cryptography key with Triple DES applied thereto, using the Single DES algorithm.

FIG. 56 illustrates a configuration for executing the cryptography process method in accordance with the Triple DES method. This is done using both the cryptography process section 302 of the recording and reproducing device 300 and the cryptography process section 401 of the recording device 400. FIG. 56 shows an example of a process for encrypting the content key Kcon with the storage key Kstr. The process is executed in downloading content data from the recording and reproducing device 300 to the recording device 400. The content key Kcon is based on the Triple DES method. Here, the example of the process for the content key Kcon is shown, but other keys or other data, such as content, can be similarly processed.

The Triple DES method uses two or three keys in such a manner that a 64-bit key is used for the Single DES, while a 128- or 192-bit key is used for the Triple DES, as previously described in FIGS. 8 to 10. These three content keys Kcon are referred to as Kcon1, Kcon2, and (Kcon3) or, alternatively, Kc1, Kc2 and (Kc3) as shown in FIG. 56. The Kcon3 is shown in the parentheses because it may not be used.

The process in FIG. 56 will be explained as follows. At step S301, the mutual authentication process is carried out between the recording and reproducing device 300 and the recording device 400. This mutual authentication process step is executed during the process as in the previously described FIG. 20. During this authentication process, the session key Kses is generated.

Once the authentication process at step S301 has been completed, the integrity check values ICV (including the integrity check values A and B, the content integrity check value, and the total integrity check value) are collated.

When all the check values, ICV, have been collated, and it has been determined that no data have been tampered with, the process proceeds to step S303. In step S303, the control section 306 of the recording and reproducing device cryptography process section 302 uses the encryption/decryption section 308, as well as the previously obtained or generated distribution key Kdis, to decrypt the content Kcon. Kcon may be stored in the header section of the data obtained from the medium 500, or received from the communication means 600 via the communication section 305. The content key in this case is a triple DES type key, such as content keys Kcon1, Kcon2, and (Kcon3).

Then at step S304, the control section 306 of the recording and reproducing device cryptography process section 302 causes the encryption/decryption section 308 of the recording and reproducing device cryptography process section 302 to encrypt only the content key Kcon1 of the content keys Kcon1, Kcon2, and (Kcon3) decrypted at step S303. This is done using the session key Kses made sharable during the mutual authentication.

The control section 301 of the recording and reproducing device 300 reads data containing the content key Kcon1 (encrypted with the session key Kses). The data is read out from the recording and reproducing device cryptography process section 302 of the recording and reproducing device 300. The control section 301 then transmits this data to the recording device 400 via the recording device controller 303 of the recording and reproducing device 300.

Then at step S305 (on receiving the content key Kcon1 transmitted from the recording and reproducing device 300), the recording device 400 causes the encryption/decryption section 406 of the recording device cryptography process section 401 to decrypt the received content key Kcon1 using the session key Kses. Kses was made sharable during the mutual authentication. Further at step S306, the recording device 400 causes the encryption/decryption section 406 to reencrypt the decrypted content key with the storage key Kstr. Kstr is unique to the recording device 400. It is stored in the internal memory 405 of the recording device cryptography process. The recording device 400 then transmits the reencrypted key to the recording and reproducing device 300 via the communication section 404.

Then at step S307, the control section 306 of the recording and reproducing device cryptography process section 302 causes the encryption/decryption section 308 of the recording and reproducing device cryptography process section 302 to encrypt only the content key Kcon2 of the content keys Kcon1, Kcon2, and (Kcon3). This is done using the session key Kses, which was made sharable during the mutual authentication.

The control section 301 of the recording and reproducing device 300 reads data containing the content key Kcon2 encrypted with the session key Kses, out from the recording and reproducing device cryptography process section 302 of the recording and reproducing device 300. The control section 301 then transmits this data to the recording device 400 via the recording device controller 303 of the recording and reproducing device 300.

Then at step S308, on receiving the content key Kcon2 transmitted from the recording and reproducing device 300, the recording device 400 causes the encryption/decryption section 406 of the recording device cryptography process section 401 to decrypt the received content key Kcon2. It is decrypted using the session key Kses, which was made sharable during the mutual authentication. Further at step S309, the recording device 400 causes the encryption/decryption section 406 to reencrypt the decrypted content key with the storage key Kstr. Kstr is unique to the recording device, and is stored in the internal memory 405 of the recording device cryptography process section 401. Recording device 400 then transmits the reencrypted key to the recording and reproducing device 300 via the communication section 404.

Then at step S310, the control section 306 of the recording and reproducing device cryptography process section 302 causes the encryption/decryption section 308 of the recording and reproducing device cryptography process section 302 to encrypt only the content key Kcon3 of the content keys Kcon1, Kcon2, and (Kcon3). This is performed using the session key Kses, which was made sharable during the mutual authentication.

The control section 301 of the recording and reproducing device 300 reads data containing the content key Kcon3 (encrypted with the session key Kses) out from the recording and reproducing device cryptography process section 302 of the recording and reproducing device 300. The control section 301 then transmits this data to the recording device 400 via the recording device controller 303 of the recording and reproducing device 300.

Then at step S311, the recording device 400 causes the encryption/decryption section 4060 of the recording device cryptography process section 401 to decrypt the received content key Kcon3 using the session key Kses. This is done on receiving the content key Kcon3 that is transmitted from the recording and reproducing device 300. Further, at step S312, the recording device 400 causes the encryption/decryption section 406 to reencrypt the decrypted content key with the storage key Kstr. Kstr is unique to the recording device, and is stored in the internal memory 405 of the recording device cryptography process. Recording device 400 then transmits the reencrypted key to the recording and reproducing device 300 via the communication section 404.

Then at step S313, the cryptography process section of the recording and reproducing device 300 forms the various data formats described in FIGS. 32 to 35 and transmits them to the recording device 400.

Finally, at step S314, the recording device 400 stores the received formatted data in the external memory 402. This format data contains the content keys Kcon1, Kcon2, and (Kcon3) that were encrypted with the storage key Kstr.

This process enables the content keys stored in the recording device 400 to be stored as keys based on the Triple DES cryptosystem. If only two content keys Kcon1 and Kcon2 are used, the processing from steps S310 to S312 is omitted.

As described above, the recording device 400 can store the keys with the Triple DES applied thereto in the memory by repeating processing of the same aspect. That is, the process steps S305 and S306 can be performed plural times with only the target changed. If the Single DES is applied to the content keys Kcon, steps S305 and S306 may be executed to carry out the formatting process at step S313 before storing the keys in the memory. Such a configuration may store commands for executing the processing at steps S305 and S306 in the command register, as in the previously described FIG. 29, and execute this processing one to three times depending on the aspect of the key. That is, repeating the processing depends upon whether the key is based on the Triple or Single DES method. Accordingly, the processes based on both the Triple and Single DES methods can be executed without containing the Triple DES process method in the process logic of the recording device 400. In this regard, the cryptosystem may be recorded in the usage policy in the header section of the content data so as to be determined by referencing the usage policy.

(14) Program Activation Process Based on Activation Priority in Usage Policy in Content Data As understood from the content data configurations in the previously described FIGS. 4 to 6, the usage policy stored in the header section of the content data used in the present data processing apparatus contains the content type and the activation priority. With a plurality of accessible content data recorded in various recording media 500 such as the recording device 400, a DVD, a CD, a hard disk, or a game cartridge, the recording and reproducing device 300 in the present data processing apparatus determines the order in which these contents are activated, in accordance with the activation priority.

The recording and reproducing device 300 executes the mutual authentication with various recording devices 400, such as a DVD device, a CD drive device, and a hard disk drive device. Recording and reproducing device 300 then executes the program in the content data with the top priority in accordance with the priority in the content data. The "Program Activation Process Based on Activation Priority in Usage Policy in Content Data" will be explained below.

The above description of the present data processing apparatus focuses on the process executed if the recording and reproducing device 300 reproduces and executes content data from one recording device 400. However, the recording and reproducing device 300 is generally configured so as to access, in addition to the recording device 400, a DVD, a CD, and a hard disk via the read section 304 as well as recording media 500 (such as a memory card and a game cartridge) that are connected via the PIO 111 or SIO 112. In FIG. 2, only one read section 304 is described in order to avoid complicating the drawing. The recording and reproducing device 300 can have different recording media 500, for example, a DVD, a CD, a floppy disk, and a hard disk, installed therein in parallel.

The recording and reproducing device 300 can access a plurality of recording media 500, each of which store content data. Content data supplied by an external content provider, such as a CD, are stored in the medium 500 in the data configuration shown in the previously described FIG. 4 or in each recording medium 500 (such as a memory card) in the content data configuration shown in FIG. 26 or 27, if the data are taken out from the medium 500 or downloaded via the communication means 600. Furthermore, the content data is stored on the medium 500 and the recording device 400 in different formats depending on the format type thereof, as shown in FIGS. 32 to 35. In either case, the usage policy in the header of the content data contains the content type and the activation priority.

A process executed by the recording and reproducing device 300, to activate content if a plurality of content data is accessible, will be explained in accordance with the FIG. 57.

Figure 57:
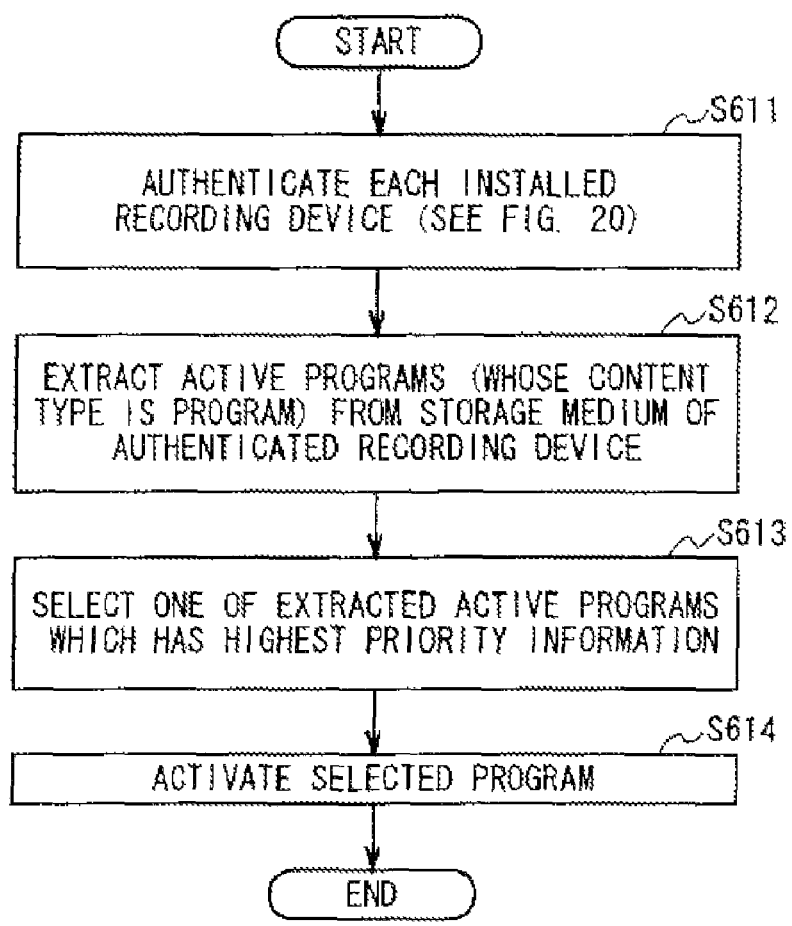
FIG. 57 is a view showing a content reproduction process flow (example 1) based on priority.

FIG. 57 shows a process flow showing an example (1) of a process where there is a plurality of content that can be activated. At step S611, recording devices 400 that are accessible to the recording and reproducing device 300 are authenticated. The accessible recording devices 400 include a memory card, a DVD device, a CD drive, a hard disc device, and a game cartridge or the like. They are connected, for example, via the parallel I/O, PIO 111, or the serial I/O, SIO 112, as shown in FIG. 2. Each recording device is authenticated under the control of the control section 301 shown in FIG. 2, for example, in accordance with the procedure previously explained in FIG. 20.

Next, at step S612, programs that can be activated are detected from the content data stored in the memory of the successfully authenticated recording device 400. Specifically, this is executed as a process of extracting content for which the content type contained in the usage policy of the content data indicates a program.

Then at step S613, the priority of the program that can be activated and which has been extracted at step S612 is determined. Step S613 selects the top priority. Specifically, this corresponds to a process of comparing the priorities contained in the usage policies in the headers of the plurality of content data that can be activated in step S612.

Then at step S614, the selected program is activated. If the plurality of programs that can be activated have the same priority, default priorities are set for the recording devices 400 so that the content program stored in the device with the top priority is executed.

Figure 58:
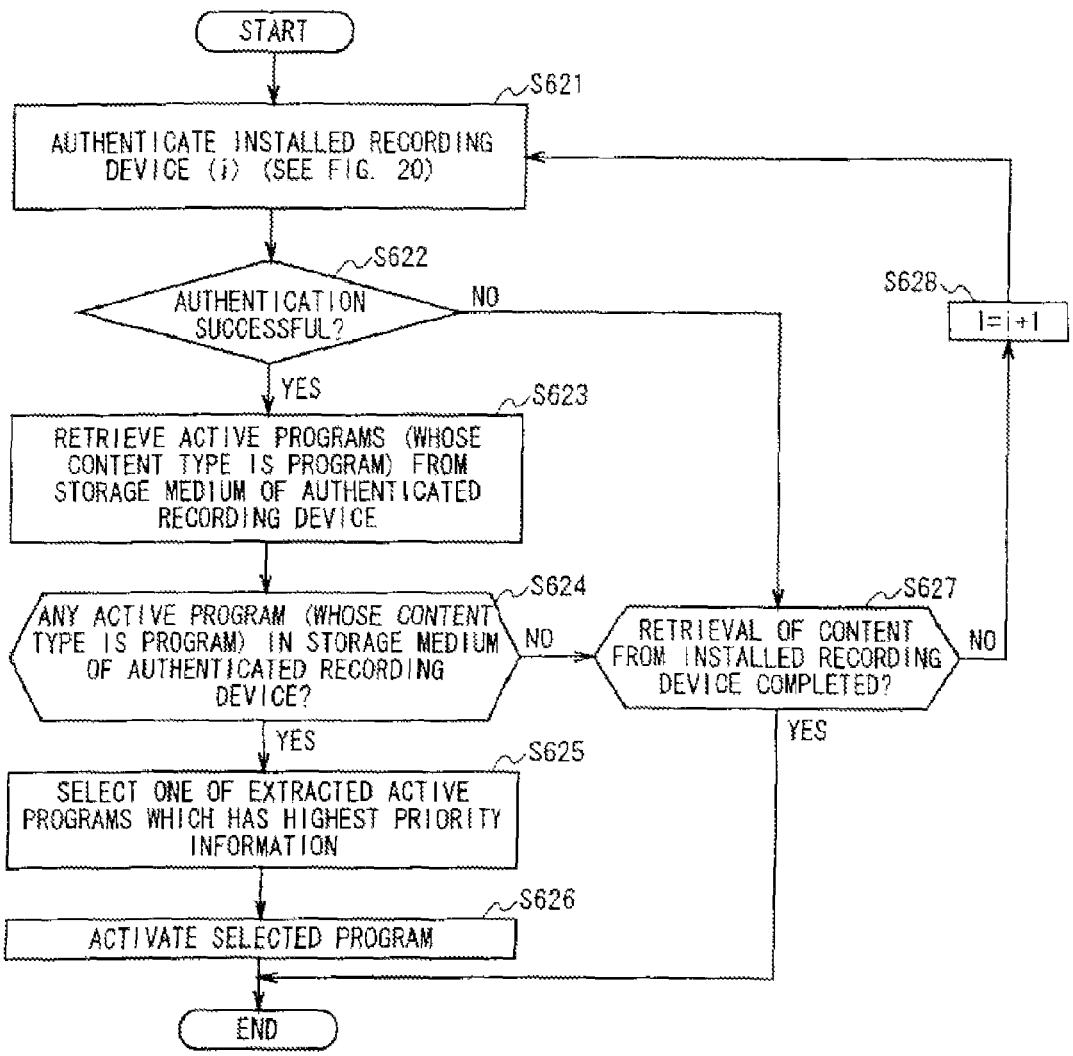
FIG. 58 is a view showing a content reproduction process flow (example 2) based on priority.

FIG. 58 shows an example (2) of a process where identifiers are set for a plurality of recording devices 400 so that the authentication and the retrieval of a content program are sequentially executed for the recording devices 400 with the identifiers. That is, FIG. 58 illustrates a process for a plurality of content that can be activated.

At step S621, recording devices 400 (*i*) installed in the recording and reproducing device 300 are authenticated. A plurality of (n) recording devices 400 are sequentially imparted with identifiers 1 to n.

At step S622, it is determined whether or not the authentication at step S621 has been successful. If so, the process proceeds to step S623, where programs that can be activated are retrieved from the recording media of the recording devices 400 (*i*). If the authentication has failed, the process proceeds to step S627 where it is determined whether or not there is a new recording device 400 from which content can be retrieved. Without such a recording device 400, the process is ended. Otherwise, the process advances to step S628 to update the recording device identifier i and repeat step S621 and the subsequent authentication process steps.

At step S623, programs that can be activated are detected from the content data stored in the recording devices 400 (*i*). Specifically, this is executed as a process of extracting content for which the content type contained in the usage policy of the content data indicates a program.

At step S624, it is determined whether or not the content (of which the content type is a program) has been extracted. If such content has been extracted, one of the extracted programs which has the top priority is selected at step S625, and the selected program is executed at step S626.

If it is determined at step S624 that no content (of which the content type is a program) has been extracted, the process proceeds to step S627 to determine whether or not there is a new recording device 400 from which content can be retrieved. Without such a recording device 400, the process is ended. Otherwise, the process proceeds to step S628 to update the recording device identifier i and repeat step S621 and the subsequent authentication process steps.

Figure 59:
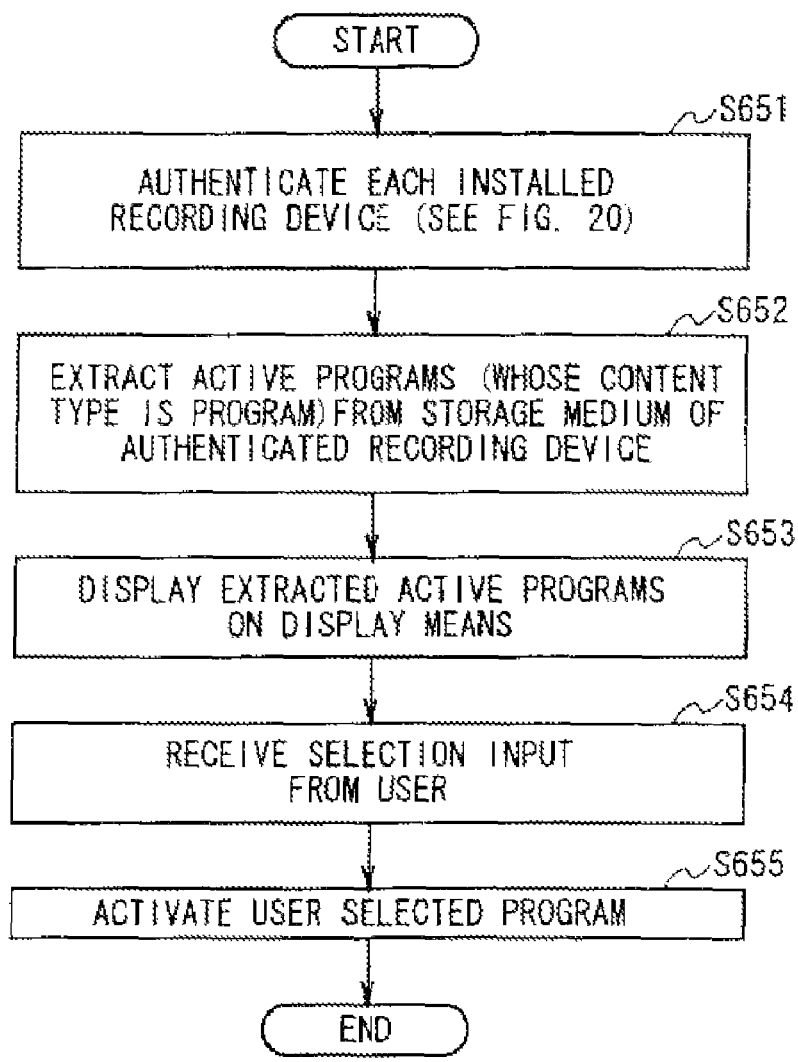
FIG. 59 is a view showing a content reproduction process flow (example 3) based on priority.

FIG. 59 illustrates an example of a process for a plurality of content that can be activated. At step S651, recording devices 400 that are accessible to the recording and reproducing device 300 are authenticated. For instance, an accessible DVD device, CD drive, hard disc device, and game cartridge or the like are authenticated. Each recording device 400 is authenticated under the control of the control section 301 (shown in FIG. 2). This is done, for example, in accordance with the procedure previously explained in FIG. 20.

Next, at step S652, programs that can be activated are detected from the content data stored in the memory of the successfully authenticated recording device 400. Specifically, this is executed as a process of extracting content for which the content type (contained in the usage policy of the content data) indicates a program.

Then at step S653, information (such as the name of the program that can be activated and which has been extracted at step S652) is displayed on a display means. Although the display means is not shown in FIG. 2, AV output data are output to the display means (not shown). User provided information, such as a program name for each content data, is stored in the content ID of the content data. This is done so that program information (such as a program name for each authenticated content data) is output to the output means via the control section 301 that is under the control of the main CPU 106 shown in FIG. 2.

Then at step S654, the main CPU 106 receives the user's program selection input from the input means. The input means can be the input interface, controller, mouse, or keyboard shown in FIG. 2. Input occurs via the interface 110. At step S655, the user selected program is executed in accordance with the selection input.

As described above, in the data processing apparatus according to the present invention, the program activation priority is stored in the usage policy (which is in the header of the content data) so that the recording and reproducing device 300 activates programs in accordance with this priority. Alternatively, the display means can display activated program information from which the user can select a desired program. This configuration eliminates the need for the user to retrieve programs, saving the amount of time and labor required for the activation. Additionally, the programs that can be activated are activated after all the recording devices 400 have been authenticated or are shown to be such programs. This thereby eliminates the complexity of the process, such as the need to validate a program after selection.

(15) Content Configuring and Reproducing (Decompressing) Process

In the data processing apparatus according to the present invention, the recording and reproducing device 300 downloads content from the medium 500 or the communication means 600, or reproduces data from the recording device 400, as described above. The above description focuses on the processing of encrypted data associated with the downloading or reproduction of content.

The control section 301 of the recording and reproducing device 300 in FIG. 3 generally controls the authentication, encryption, and decryption processes associated with the downloading or reproduction of content data from the device 500, the communication means 600, or the recording device.

Reproducible contents resulting from these processes are, for example, sound data, image data or the like. Decrypted data from the control section 301 is placed under the control of the main CPU (shown in FIG. 2) and output to the AV output section, depending on the sound or image data. If, the content is, for example, sound data that has been MP3-compressed, an MP3 decoder in the AV output section (shown in FIG. 2) decrypts and outputs the sound data. If the content data includes images that have been MPEG2-compressed, an MP2 decoder in the AV output section decompresses and outputs the image data. In this manner, the data contained in the content data may have or have not been compressed (encoded). The data is output after being processed depending on the content.

However, due to various types of compression and decompression process programs, even if the content provider provides compressed data, this data cannot be reproduced without a corresponding decompression process executing program.

Thus, the present invention discloses a data processing apparatus wherein compressed data and a decryption (decompression) process program therefor are stored in data content. Alternatively, link information for the compressed data and the decryption (decompression) process program therefor is stored as header information in the content data.

Figure 60:
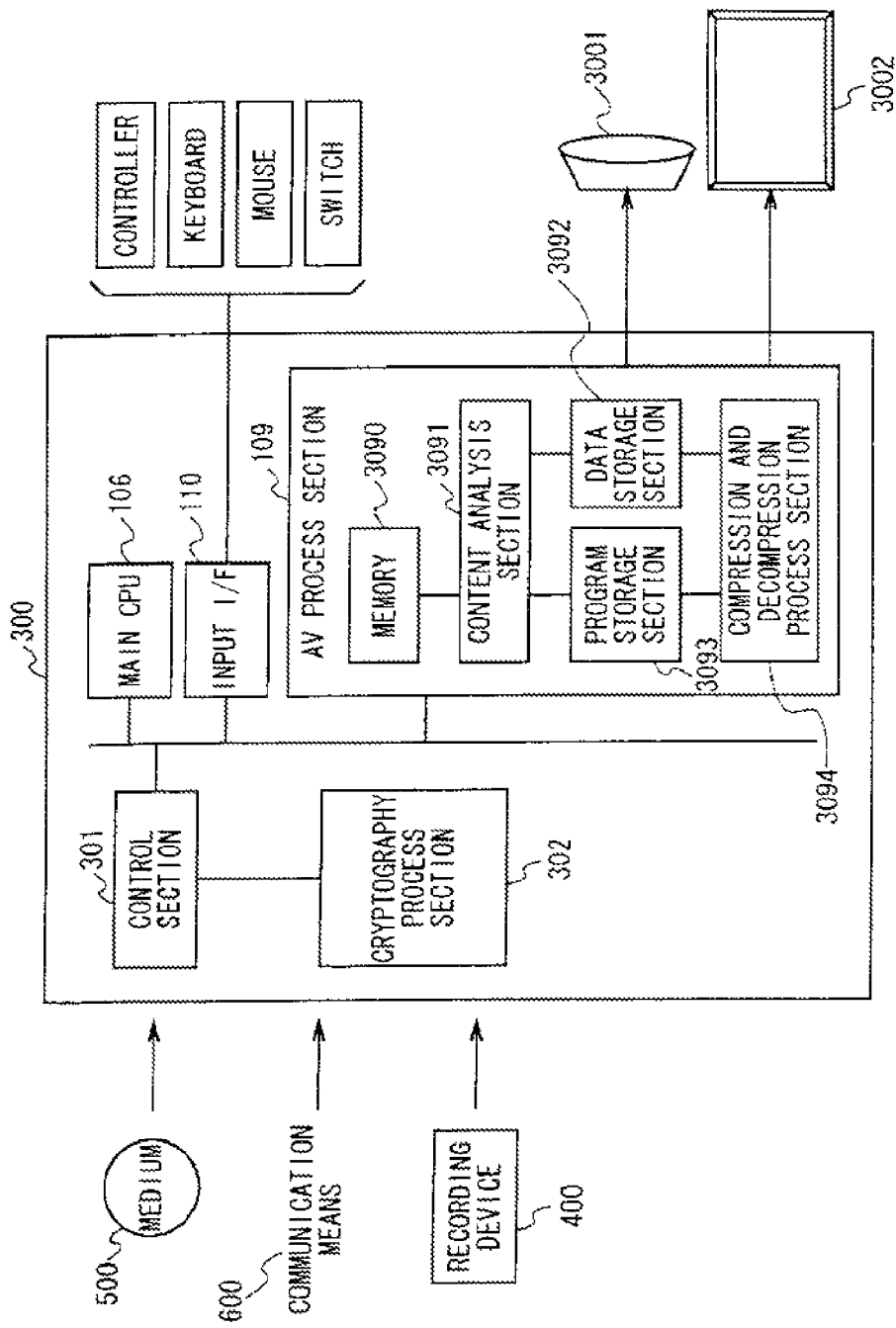
FIG. 60 is a view illustrating a configuration for executing a process for decrypting (decompressing) compressed data during the content reproduction process.

FIG. 60 is a view obtained by simplifying elements from the general view of data processing shown in FIG. 2, which relate to the present configuration. The recording and reproducing device 300 receives various content from the device 500 (such as a DVD or a CD), the communication means 600, or the recording device 400 (such as a memory card, which stores content). This content can include various data such as sound data, still images, animated image data, and program data which has or has not been encrypted or compressed.

If the received content has been encrypted, the decryption process is executed using a method such as that described above and based on the control of the control section 301 and the cryptography process of cryptography process section 302. The decrypted data is transferred to the AV process section 109 under the control of the CPU 106, where the data are stored in a memory 3090 of the AV process section 109. Then, a content analysis section 3091 analyzes the configuration of the content. If, for example, a data decompressing program is stored in the content, it is stored in a program storage section 3093. If, the content contains sound, image data or the like, this data are stored in a data storage section 3092. A decompression process section 3094 uses a decompression process program, such as MP3 (which is stored in the program storage section), to decompress compressed data stored in the data storage section 3092. The data is then output to speakers 3001 or a monitor 3002.

Next, some examples of configurations of data received by the AV process section 109 (via the control section 301) and of relevant processes will be explained. Here, sound data will be shown as an example of content. Content with the MP3 applied thereto will be described as a representative compression program. This configuration, however, is applicable to image data as well as sound data. Various programs for MPEG2 or MPEG4 can be applied thereto instead of MP3.

Figure 61:
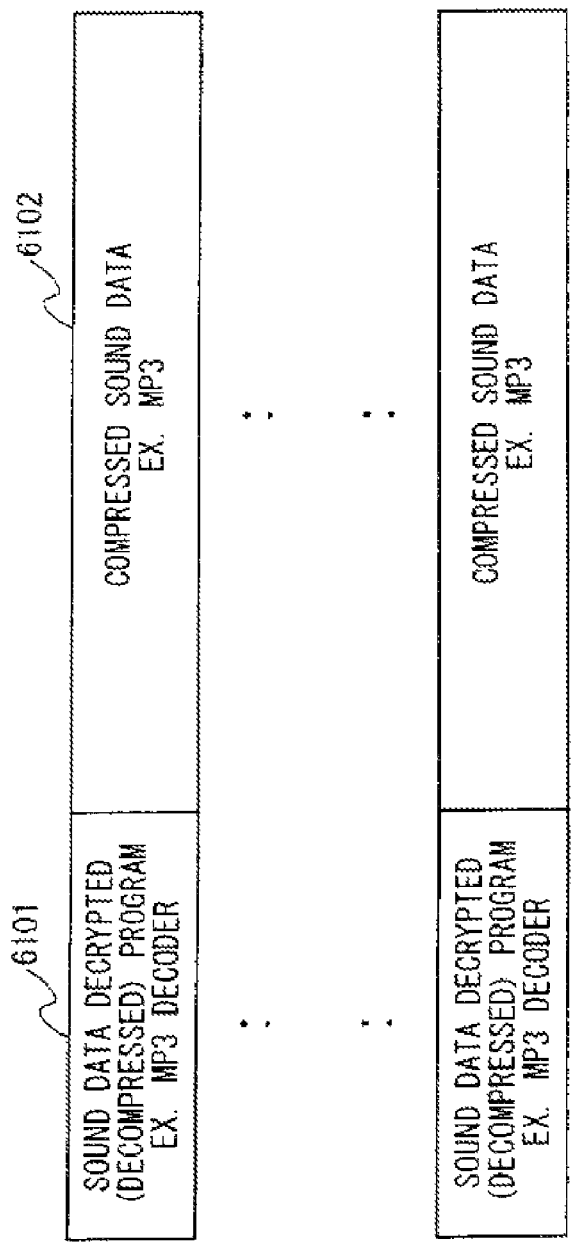
FIG. 61 is a view showing an example of the configuration of content (example 1).

FIG. 61 shows an example of the configuration of content. This figure shows sound data 6102 compressed by means of the MP3, and a MP3 decryption (decompression) process program 6101. Sound data 6102 and MP3 decryption process program 6101 are integrated together into one content block. Such content blocks are each stored in the medium 500 or the recording device 400, and are distributed from the communication means 600 as a single content block. If these content blocks have been encrypted as previously described, the recording and reproducing device 300 uses the cryptography process section 303 to decrypt the content and then transfers it to the AV process section 109.

The content analysis section 3091 of the AV process section 109 analyzes the received content, takes a sound data decompression program (MP3 decoder) section out from the content, and stores it in the program storage section 3093. The sound data decompression program comprises a sound data decompression program (MP3 decoder) section and a compressed sound data section. The compressed sound data is stored in the data storage section 3092. The content analysis section 3091 may receive information such as a content name or content configuration information in addition to the content or it may analyze the content based on identification data such as a data name, or other data such as a data length or a data configuration, which are all contained in the content. Then, a compression and decompression process section 3094 decompresses the MP3-compressed sound data stored in the data storage section 3092 in accordance with the sound data decompression program (MP3 decoder) (stored in the program storage section 3093). The AV process section 109 then outputs the decompressed sound data to the speakers 3001.

Figure 62:
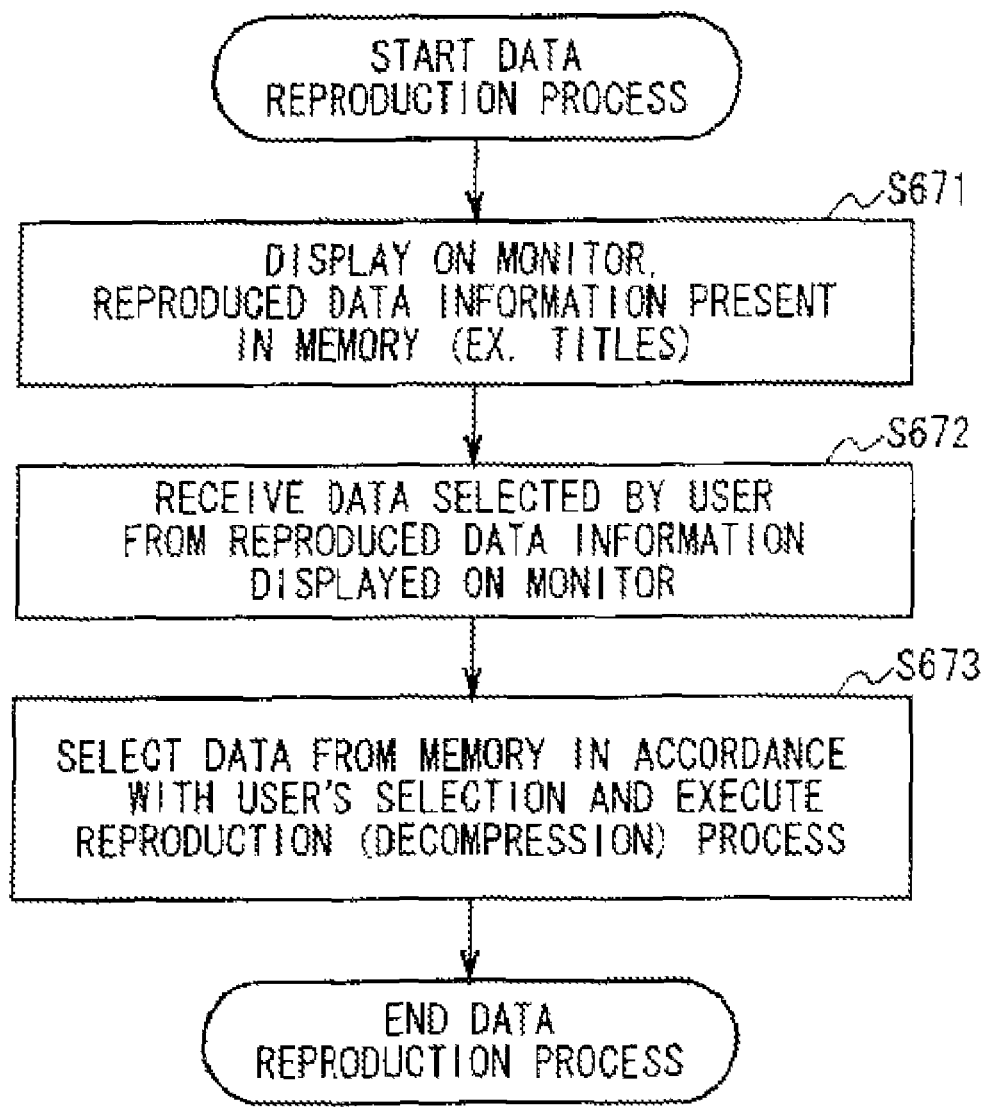
FIG. 62 is a view showing a reproduction process flow in the example 1 of the configuration of the content.

FIG. 62 shows an example of a process for reproducing data of the content configuration in FIG. 61. At step S671, a data name stored in the memory 3090 of the AV process section 109 (for example, information such as the title of music present if the content is sound data) is taken out from the information received separately from the content, or from data in the content, and is then displayed on the monitor 3002. At step S672, the user's selection is received from one of the various input means, such as the switches and the keyboard via the input interface 110. A reproduction process command, based on user input data, is then output to the AV process section 109, which is under the control of the CPU 106. At step S673, the AV process section 109 extract and decompress data selected by the user.

Figure 63:
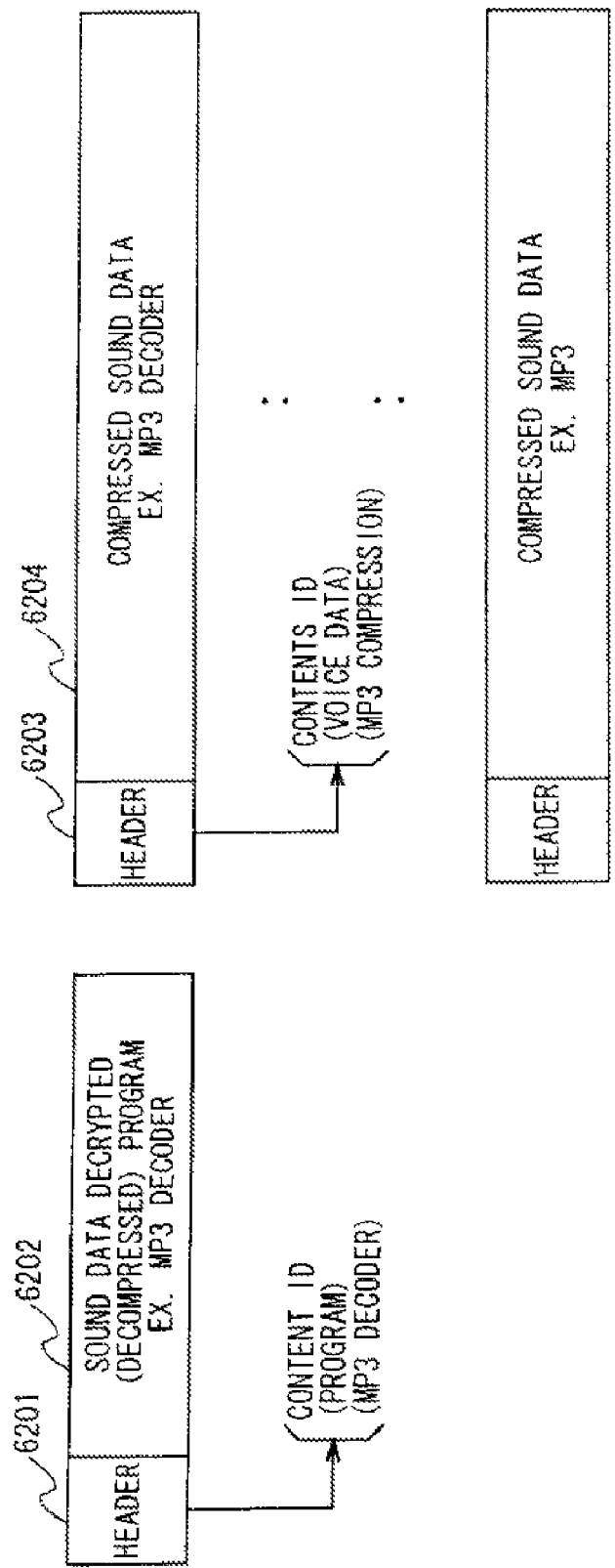
FIG. 63 is a view showing an example of the configuration of content (example 2).

Next, FIG. 63 shows an example of a configuration wherein the content contains either compressed sound data or the decompression process program. It also contains content information indicating what the content contains, such as header information for each content.

As shown in FIG. 63, if the content is a program 6202, the content contains as header information 6201, content identification information indicating that this is a program and that the type of program is to be MP3-decompressed. On the other hand, if sound data 6204 is contained as content, the content information in the header 6203 indicates that the data has been MP3-compressed. This header information can be configured by selecting only information required for reproduction from the data contained in the usage policy (see FIG. 5). This is done as shown in the above-described content data configuration, for example, in FIG. 4. This information is added to the content transferred to the AV process section 109. Specifically, identification values for usage policy data, required for the cryptography process section 302 and for data required for the AV process section 109 during the reproduction process, are added to each constituent data of the "usage policy" shown in FIG. 5. Only data indicating that these identification values are required for the AV process section 109 are extracted as header information.

On receiving each content block shown in FIG. 63, the content analysis section 3091 of the AV process section 109 stores, in accordance with the header information, a program content in the program storage section 3093, if the content is a program. Otherwise, it stores the program content in the data storage section 3092 if the content is data. Thereafter, the compression and decompression section 3094 takes the data out from the data storage section and decompresses it in accordance with the MP3 program stored in the program storage section 3093. This is done before outputting the decompressed data. If the program storage section 3093 has the same program already stored therein, the program storage process may be omitted.

Figure 64:
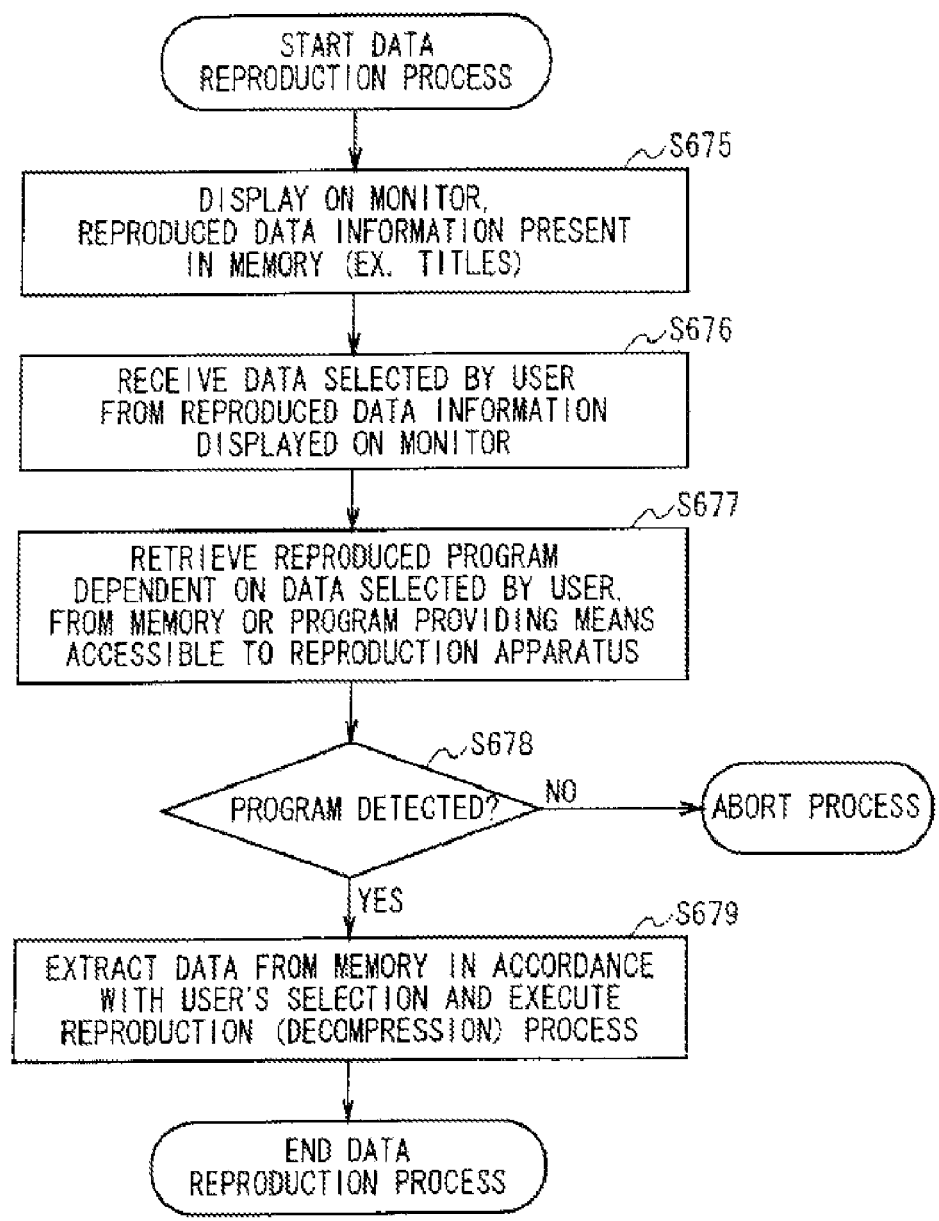
FIG. 64 is a view showing a reproduction process flow in the example 2 of the configuration of the content.

FIG. 64 shows an example of a process for reproducing data of the content configuration in FIG. 63. At step S675, a data name is taken out from the information received separately from the content or from the header in the content, and is then displayed on the monitor 3002. The data name, stored in the memory 3090 of the AV process section 109, is, for example, information such as the title of music (if the content is sound data). At step S676, the user's selection is received from one of the various input means, such as the switches and the keyboard, via the input interface 110.

Then at step S677, a data reproducing program (for example, the MP3,) corresponding to the user selection, is retrieved. The maximum range of this program retrieval is preferably set as the possible access range of the recording and reproducing device 300. For example, the media 500, communication means 600, and recording device 400 shown in FIG. 60 are included in the retrieval range.

The only content passed to the AV process section 109 is the data section. The program content may be stored in another recording medium 500 in the recording and reproducing device 300. Alternatively, the program content may be provided by the content provider via the medium 500, such as a DVD or a CD. Accordingly, the retrieval range is set as the possible access range of the recording and reproducing device 300. When a reproduction program is found as a result of the retrieval, a reproduction process command, based on the user input data, is output to the AV process section 109 (under the control of the CPU 106). At step S679, the AV process section 109 extracts and decompress data depending on the user's selection. In another embodiment, the program retrieval is executed before step S675, so that only the data in which the program has been detected are displayed at step S675.

Figure 65:
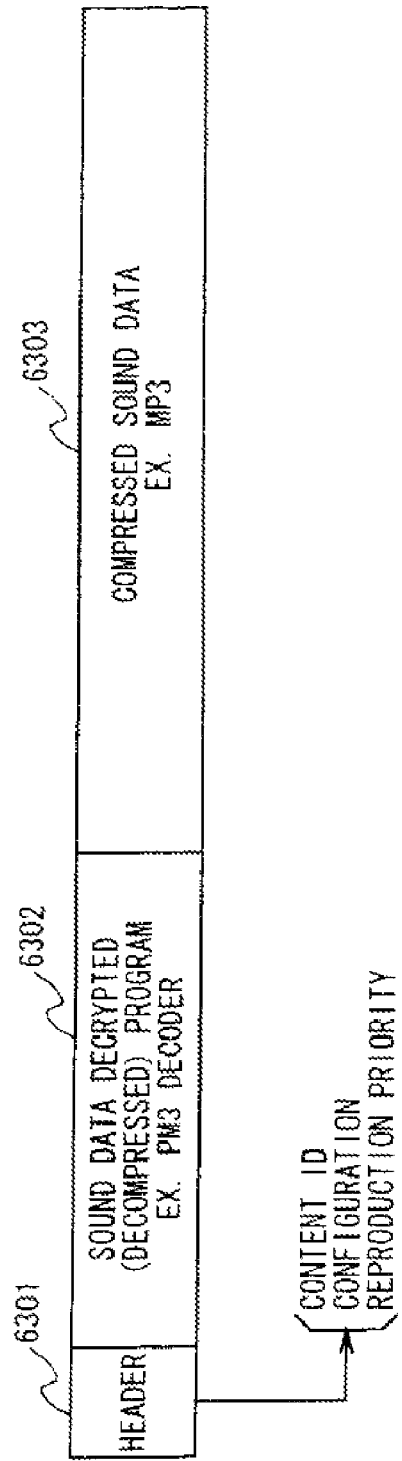
FIG. 65 is a view showing an example of the configuration of content (example 3).

Next, FIG. 65 shows an example of a configuration wherein content contains compressed sound data 6303 and decompressed process program 6302, and further contains a content reproduction priority as header information 6301 therefor. This is an example of the above content configuration in FIG. 61 with the reproduction priority added thereto as header information. As in the above described section "(14) Program Activating Process Based on Activation Priority in Usage Policy in Content Data," the order of reproduction is determined based on a reproduction priority set among content received by the AV process section 109.

Figure 66:
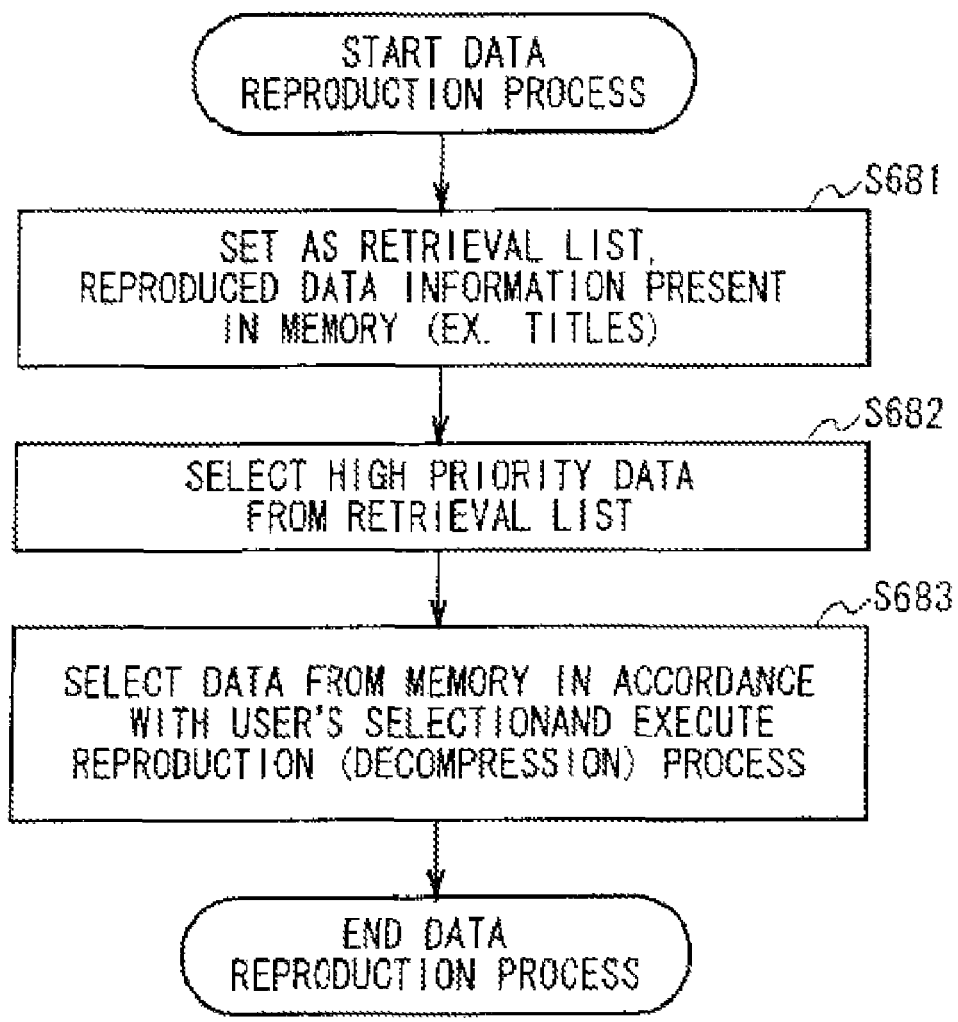
FIG. 66 is a view showing a reproduction process flow in the example 3 of the configuration of the content.

FIG. 66 shows an example of a process for reproducing data of the content configuration in FIG. 65. At step S681, data stored in the memory 3090 of the AV process section 109 (that is, data information for data to be reproduced) is set in a retrieval list. The retrieval list is set using some areas of the memory in the AV process section 109. Then at step S682, the content analysis section 3091 of the AV process section 109 selects data of top priority. At step S683, it reproduces the selected data.

Figure 67:
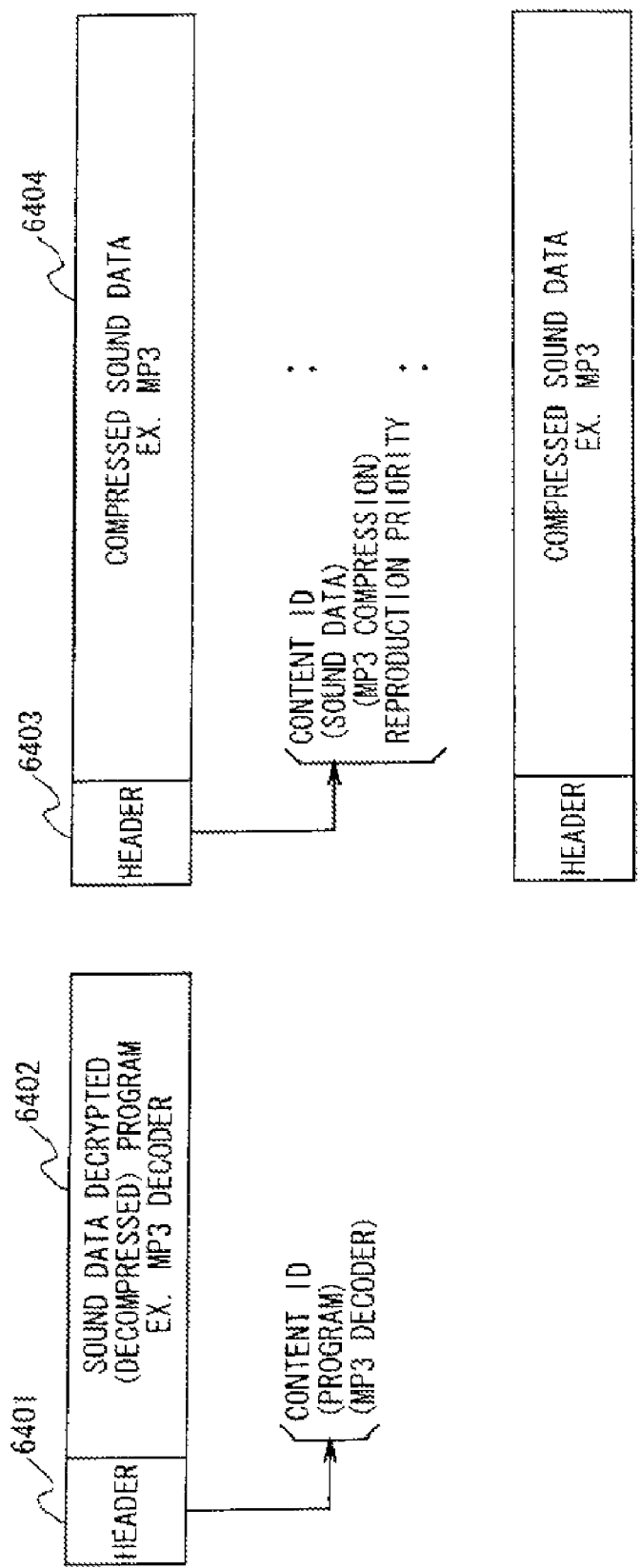
FIG. 67 is a view showing an example of the configuration of content (example 4).

Next, FIG. 67 shows an example of a configuration wherein content comprises a combination of header information and program data 6402, or header information 6403 and compressed data 6404. A reproduction priority is added only to the header 6403 of the data content.

Figure 68:
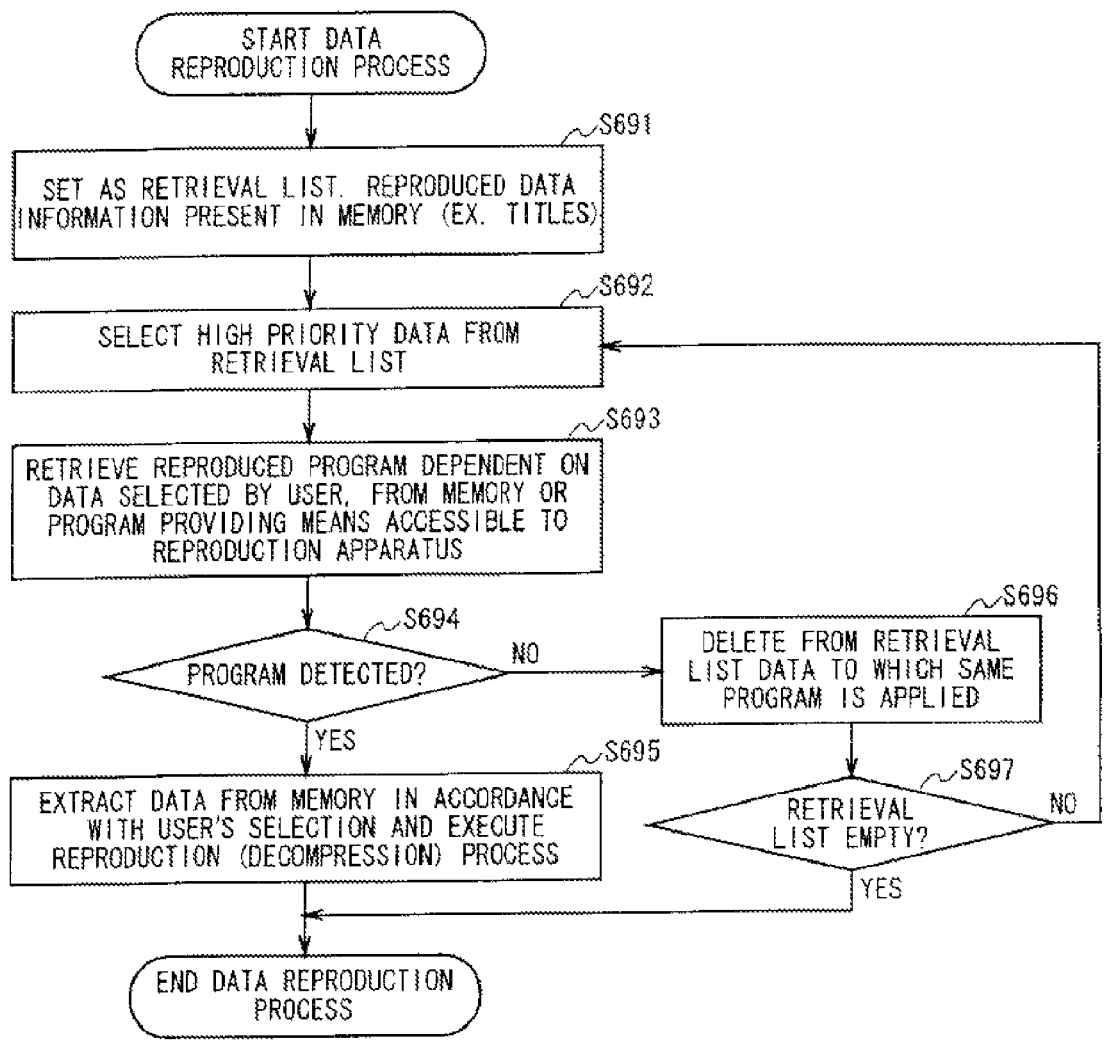
FIG. 68 is a view showing a reproduction process flow in the example 4 of the configuration of the content.

FIG. 68 shows an example of a process for reproducing data of the content configuration in FIG. 67. At step S691, data stored in the memory 3090 of the AV process section 109 (that is, data information for data to be reproduced) is set in a retrieval list. The retrieval list is set using some areas of the memory in the AV process section 109. Then at step S692, the content analysis section 3091 of the AV process section 109 selects data of top priority.

Then at step S693, a data reproducing program (for example, the MP3,) corresponding to the user selection, is retrieved. As in the process in the flow in FIG. 64, the maximum range of this program retrieval is preferably set as the possible access range of the recording and reproducing device 300. For example, the media 500, communication means 600, and recording device 400 (shown in FIG. 60) are included in the retrieval range.

When a reproduction program is found as a result of the retrieval (Yes at step S694), the selected data is decompressed and reproduced using the program obtained as a result of the retrieval.

On the other hand, if no program is found as a result of the retrieval (No at step S694), the process proceeds to step S696. Step 696 deletes the remaining data contained in the retrieval list (set at step S691) that must be reproduced using the same program. This is because it is apparent that a new attempt to retrieve a reproduction program from this data fails. Furthermore, when it is determined whether or not the retrieval list is empty (and if the list is determined not to be empty), the process returns to step S692 to extract data of the next highest priority to execute the program retrieving process.

Thus, according to this configuration, if the compressed content is constructed with its decryption (decompression) program the process section (for example, the AV process section) receiving the content uses the decompression process program attached to the compressed data in order to execute the decompression and reproduction process. Alternatively, the process section retrieves the decompression and reproduction program based on the header information in the compressed data to execute the decompression and reproduction process in accordance with the program obtained as a result of the retrieval. The compressed data can also comprise only data obtained by compressing the content or only the decompression process program, since it has the header information indicating what compressed data the content is or what process the content executes. This eliminates the needs for processes executed by the user, such as the selection and retrieval of the data decompressing program, thereby enabling efficient data reproduction. Moreover, the configuration with the reproduction priority in the header enables the reproduction order to be automatically set to allow the user to omit the operation of setting the reproduction order.

In the above described embodiments, the MP3 is taken as an example of a decompression process program for compressed sound data content and sound compressed data. This configuration is also applicable to content containing compressed data, or a decompression process program for compressed image data, and provides similar effects in other case.

(16) Generation of Save Data and Storage and Reproduction of the Same in and from Recording Device If, for example, the content executed in the recording and reproducing device 300 is a game program or the like and if the game program is to be resumed a predetermined period of time after suspension, the state of the game is saved at the time of the suspension. That is, the state of the game is stored in the recording device 400 so as to be read out on resumption, enabling the game to be continued.

In conventional recording and reproducing devices 400 for game apparatuses, personal computers, or the like, a save data preservation configuration is provided with such a configuration. This preserves save data in a recording medium 500, such as a memory card, a floppy disk, a game cartridge, or a hard disk, which can be built into the recording and reproducing device 300 or externally attached thereto. In particular, however, these recording and reproducing devices 300 have no configuration for maintaining the security of the save data and carry out the save process using, for example, specifications common to a game application program.

Thus, for example, save data saved using a recording and reproducing device A may be used or rewritten by another game program However, little attention has been paid to the security of the save data.

The data processing apparatus according to the present invention provides a configuration that can maintain the security of save data. For example, save data for a certain game program is encrypted based on information used only by this game program before being stored in the recording device 400. Alternatively, the save data is encrypted based on information unique to the recording and reproducing device 300 before being stored in the recording device 400. These methods enables the usage of the save data to be limited to particular apparatuses or programs to maintain the security of the data. "Generation of Save Data and Storage and Reproduction of the Same in and from Recording Device" in the present data processing apparatus will be explained below.

Figure 69:
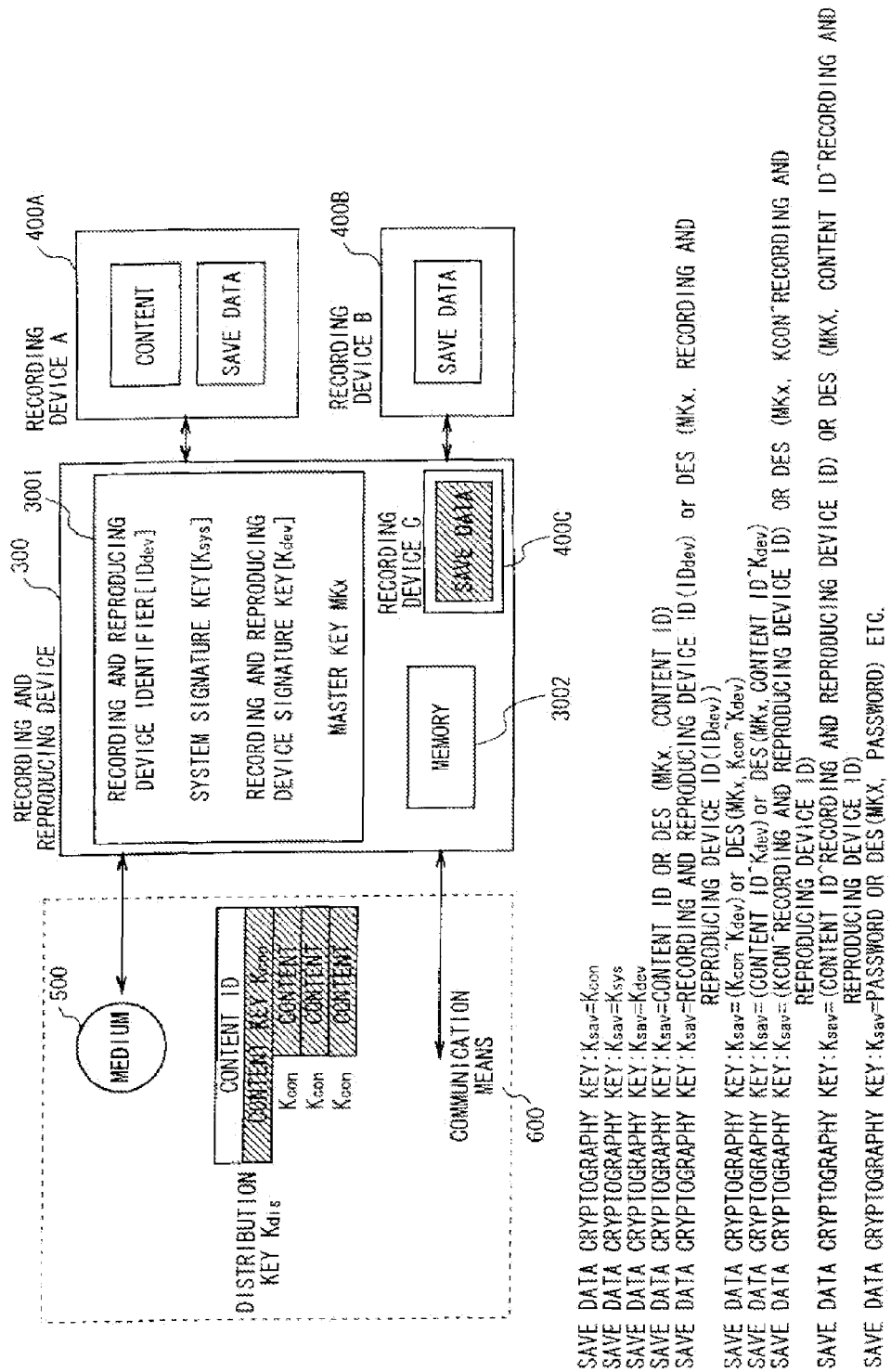
FIG. 69 is a view illustrating a process for generating and storing save data.

FIG. 69 is a block diagram illustrating a save data storage process in the present data processing apparatus. Content from the medium 500, such as a DVD or CD, or from the communication means 600, is provided to the recording and reproducing device 300. The provided content has been encrypted with the content key Kcon. Kcon is a key unique to the content as described above. The recording and reproducing device 300 obtains the content key in accordance with the process described in the above described section "(7) Process for Downloading from Recording and Reproducing Device to Recording device" (see FIG. 22), to decrypt the encrypted content, and then stores it in the recording device 400. The following description is directed to a process executed by the recording and reproducing device 300 to decrypt a content program from the medium 500 or the communication means 600. It reproduces and executes this program, and then stores the obtained save data in one of the various recording devices 400A, 400B, and 400B (such as external or built-in memory card and hard disk) for reproduction. Or it downloads content in the recording device 400A, reproduces and executes the content from the recording device 400A, and stores the resulting save data in a processing and recording device 400, for storing the save data in any one of the various recording devices 400A, 400B, and 400B (such as external or built-in memory card and hard disk for reproduction and reproducing the save data).

The recording and reproducing device 300 has the recording and reproducing device identifier IDdev, the system signature key Ksys (which is a signature key shared throughout the system), the recording and reproducing device signature key Kdev (which is unique to individual recording and reproducing devices), and the master keys for generating various individual keys, as previously described. The master keys are used to generate, for example, the distribution key Kdis or the authentication key Kake, as described in detail in "(12) Configuration for Generating Cryptography Process Keys Based on Master Keys." Here, the type of the master key is not particularly limited, but a key representing the master keys of the recording and reproducing device 300 is denoted by MKx. FIG. 69 shows an example of the cryptography key, Ksav, for save data in the lower part of the figure. The save data cryptography key, Ksav, is used for the encryption process executed to store save data in one of the various recording device 400A to C, and for the decryption process executed to reproduce these data therefrom. The processes for storing and reproducing save data will be explained with reference to FIG. 70 and subsequent figures.

Figure 70:
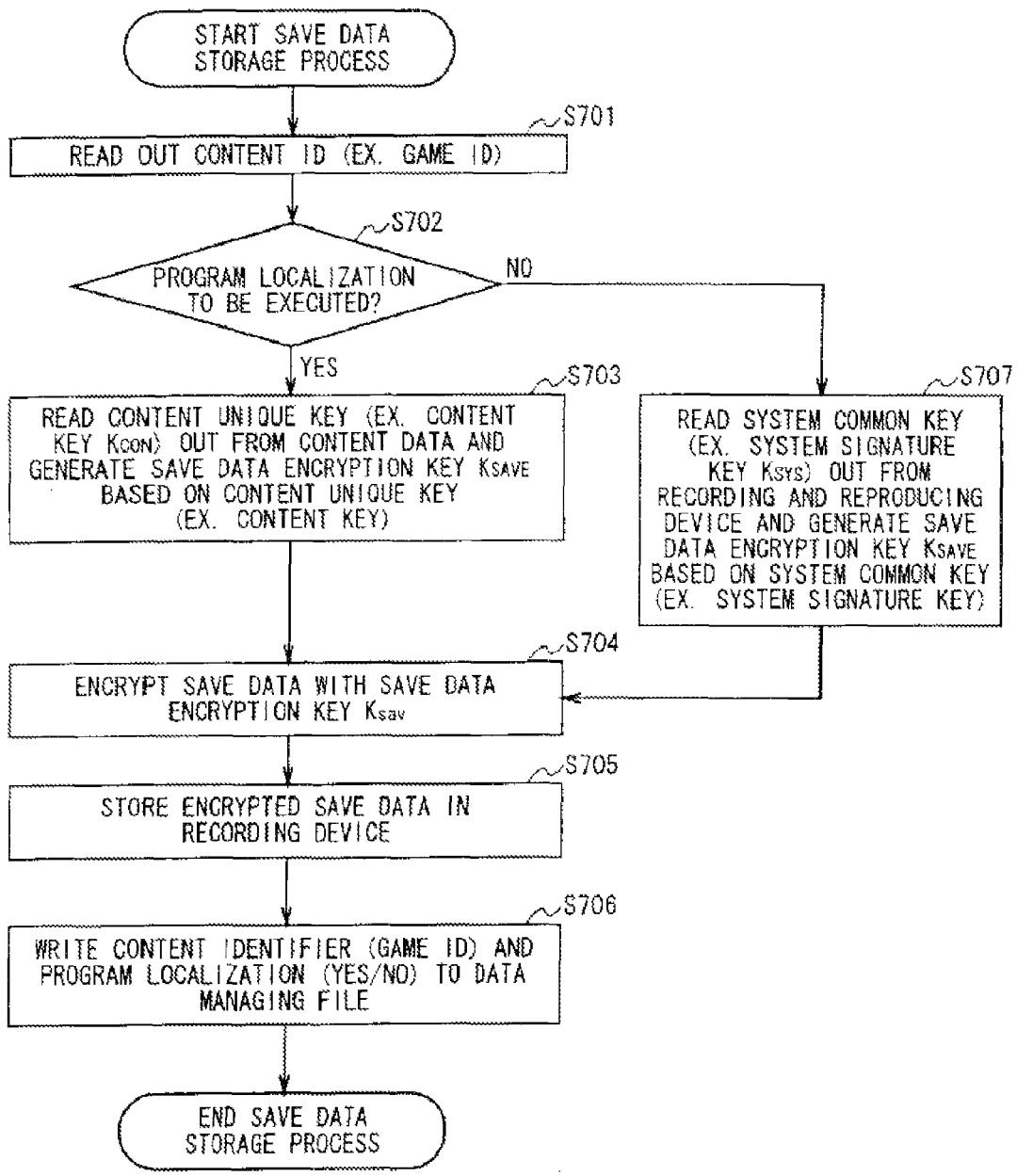
FIG. 70 is a view showing a process flow for an example (example 1) of the process for storing saved data.

FIG. 70 is a flow chart of a process of storing save data in one of the recording device 400A to C using either the content unique key or the system common key. The process in each flow is executed by the recording and reproducing device 300. The recording device 400 storing the save data in each flow may be any of the external recording devices 400A to C, but is not limited to a particular one.

At step S701, the recording and reproducing device 300 reads out the content ID, for example, the game ID. This ID is the data contained in the identification information in the content data shown in the previously described FIGS. 4, 26, 27, and 32 to 35. On receiving a command for storage of save data via the interface 110 (shown in FIG. 2), the main CPU 106 commands the control section 301 to read the content ID.

The control section 301 takes the identification information out from the header in the content data via the read section if the execution program is content from a DVD, a CD-ROM, or the like (which is executed via the read section 304), or takes it out via the recording device controller 303 (if the execution program is a content stored in the recording device 400). If the recording and reproducing device 300 is executing the content program and the content ID has already been stored in RAM or another accessible recording medium in the recording and reproducing device 300, the identification information contained in the loaded data may be used without executing a new read process.

Then at step S702, the process is changed depending on whether or not the program is to be localized. The program localization is used to set whether or not a limitation is added that allows save data to be used only by this program. To allow the save data to be used only by this program, "Program Localization" is set to "Yes." To prevent the usage of the data from being limited to this program, "Program Localization" is set to "No." This may be arbitrarily set by the user or may be set and stored in the content program by the content producer. The set localization is stored in one of the recording devices 400A to C (of FIG. 69) as a data managing file.

FIG. 71 shows an example of the data managing file. The data managing file is generated as a table. The table contains entries including data numbers, content IDs, recording and reproducing device IDs, and program localization. The content ID is identification data for a content program for which save data is saved. The recording and reproducing device ID indicates a recording and reproducing device 300 that has stored the save data. An example thereof is [IDdev], shown in FIG. 69. The program localization is set to "Yes" in order to allow the save data to be used only by this program, or to "No" in order to prevent the usage of the data from being limited to this program. The program localization may be arbitrarily set by the user using the content program, or may be set and stored in the content program by the content producer.

Referring back to FIG. 70, if the program localization is set to "Yes" at step S702, the process proceeds to step S703. At step 703, the key unique to the content, for example, the content key Kcon, is read out from the content data and used as the save data cryptography key Ksav. Otherwise, the save data cryptography key, Ksav, is generated based on the content unique key.

On the other hand, if the program localization is set to "No" at step S702, the process proceeds to step S707. At step 707, the system common key stored in the recording and reproducing device 300 (for example, the system signature key), Ksys is read out from the internal memory 307 of the recording and reproducing device 300 and is used as the save data cryptography key Ksav. Otherwise, the save data cryptography key, Ksav, is generated based on the system signature key Ksys. Alternatively, a cryptography key different from the other keys (which have been separately saved to the internal memory 307 of the recording and reproducing device 300) may be used as the save data cryptography key Ksav.

Then at step S704, the save data cryptography Ksav selected or generated at step S703 or S707, is used to execute a process for encrypting save data. This encryption process is executed by the cryptography process section 302 (see FIG. 2) by applying, for example, the above described DES algorithm.

The save data encrypted at step S704 is stored in the recording device at step S705. If there are a plurality of recording devices 400 that can store save data (as shown in FIG. 69), the user selects one of the recording devices 400A to C in advance as a save data storage destination. Further, at step S706, the program localization set at step S702 (that is, "Yes" or "No" for the program localization) is written to the data managing file described with reference to FIG. 71.

The process for storing the save data is thus completed. At step S702, save data for which "Yes" is selected for the program localization at step S702, and which are encrypted at step S703 with the save data encryption key Ksav (generated based on the content unique key) is prevented from being decrypted by content programs having no content unique key information. Thus, these save data can be used only by content programs having the same content key information. In this case, however, the save data encryption key Ksav is not generated based on information unique to the recording and reproducing device 300, so that save data stored in a removable recording device 400 (such as a memory card) can be reproduced even from a different recording and reproducing device 300, as long as they are used together with a corresponding content program.

Additionally, save data for which "No" is selected for the program localization at step S702 (and which are encrypted at step S707 with the save data encryption key Ksav) can be reproduced and used, even if a program with a different content identifier is used, or if a different recording and reproducing device 300 is used.

Figure 72:
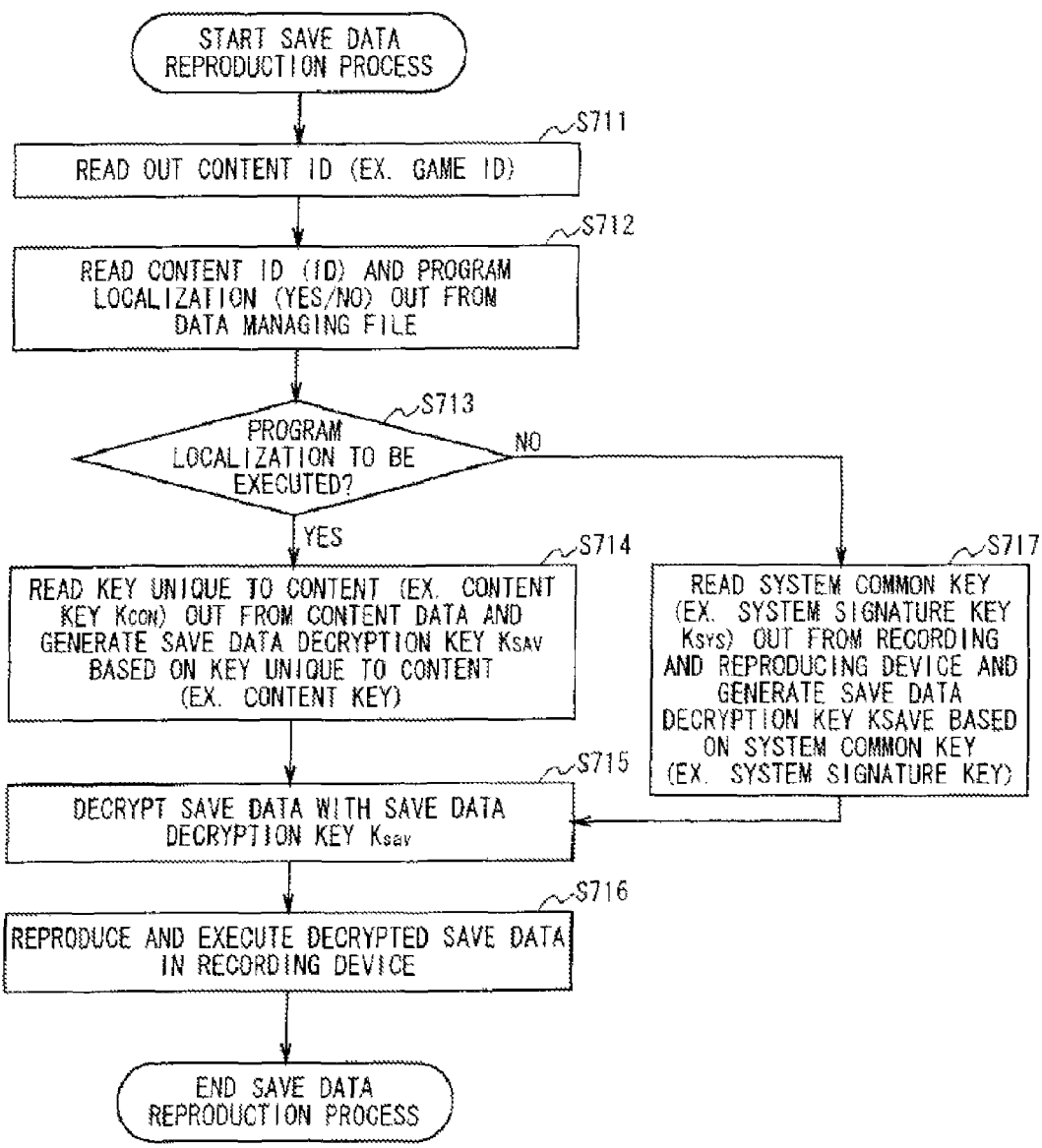
FIG. 72 is a view showing a process flow for an example (example 1) of the process for reproducing save data.

FIG. 72 illustrates a process for reproducing save data stored by means of the save data storage process in FIG. 20.

At step S711, the recording and reproducing device 300 reads out the content ID, for example, the game ID. This is a process similar to step S701 previously described in FIG. 70, and which reads out data contained in the identification information of the content data.

Then at step S712, the data managing file (described with reference to FIG. 71) is read out from one of the recording devices 400A to C (shown in FIG. 69). The content ID (read out at step S711) and correspondingly set program localization are extracted therefrom. In step S713, if the data managing file has the program localization set to "Yes," the process proceeds to step S714. If the data managing file has the program localization set to "No," the process advances to step S717.

At step S714, the key unique to the content (for example, the content key Kcon) is read out from the content data and is used as the save data decryption key Ksav. Or, the save data decryption key Ksav is generated based on the content unique key. This decryption key generating process uses a process algorithm corresponding to the encryption key generating process. That is, a decryption key generating algorithm that enables data encrypted based on a certain content unique key to be decrypted with a decryption key generated based on the same content unique key.

On the other hand, if it is determined at step S713 that the data managing file has the program localization set to "No," then at step S717, the system common key (stored in the recording and reproducing device 300), is read out from the internal memory 307 of the recording and reproducing device 300 and is used as the save data decryption key Ksav. Or, the save data decryption key Ksav is generated based on the system signature key Ksys. Alternatively, a cryptography key different from the other keys that have been separately saved to the internal memory 307 of the recording and reproducing device 300 may be used as the save data cryptography key Ksav.

Then at step S715, the save data decryption key Ksav, selected or generated at step S714 or S717, is used to execute a process for decrypting save data, At step S716, the decrypted save data is reproduced and executed in the recording and reproducing device 300.

The save data reproduction process is thus completed. As described above, the save data decryption key is generated based on the content unique key if the data managing file has the program localization set to "Yes," otherwise, the save data decryption key is generated based on the system common key if the data managing file has the program localization set to "No." If the program localization is set to "Yes," a decryption key cannot decrypt the save data without the same content ID for the content, thereby enabling the security of the save data to be improved.

Figure 73:
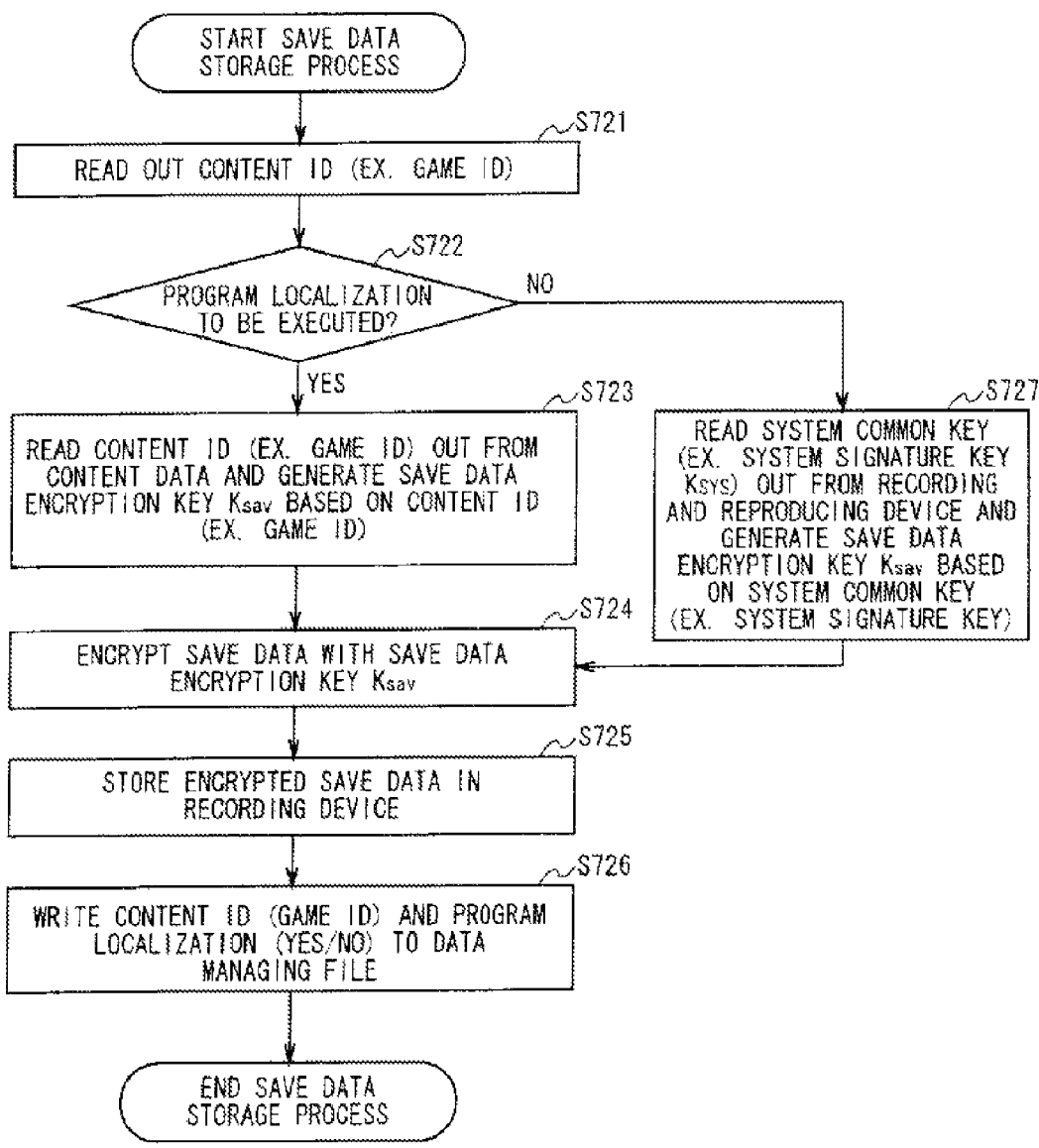
FIG. 73 is a view showing a process flow for an example (example 2) of the process for storing save data.
Figure 74:
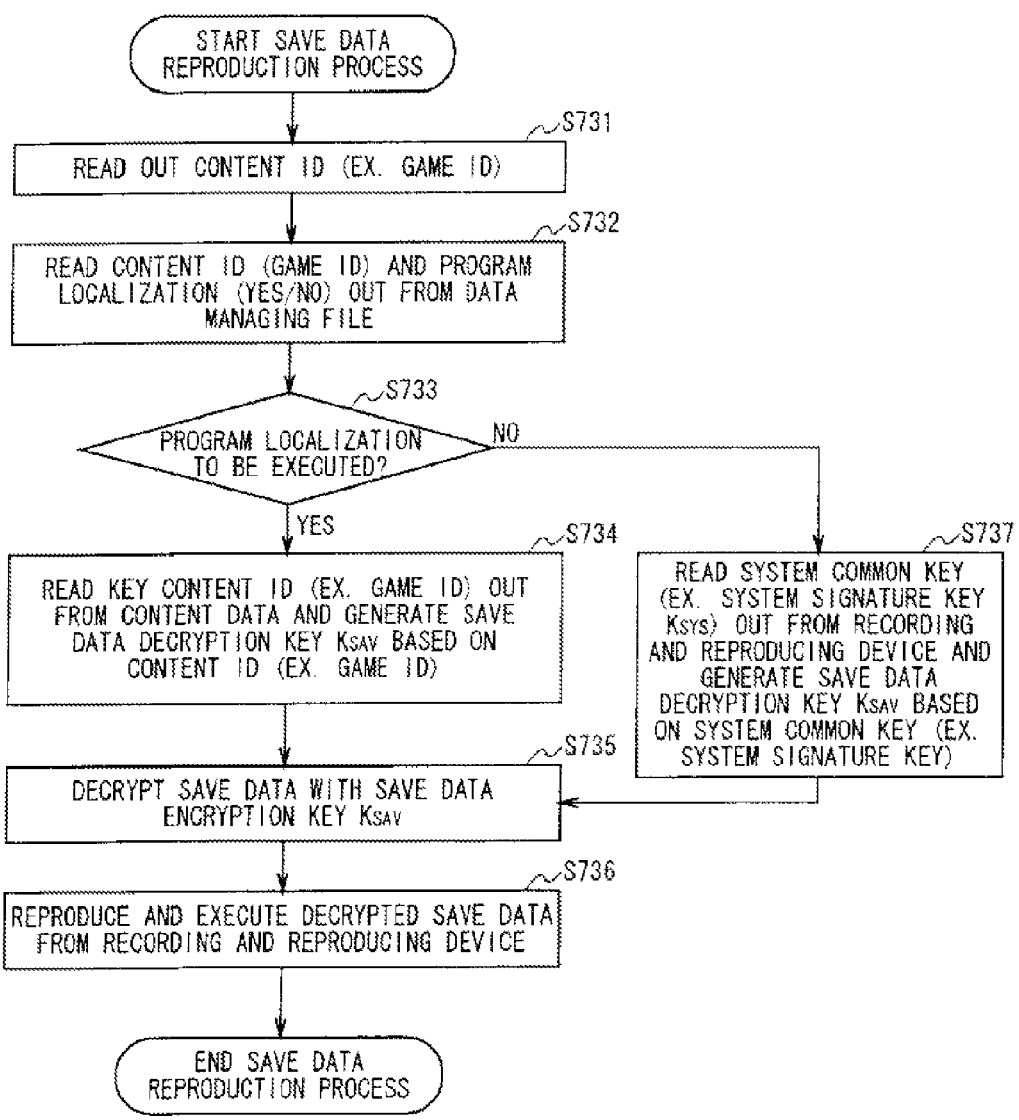
FIG. 74 is a view showing a process flow for an example (example 2) of the process for reproducing save data.

FIGS. 73 and 74 show save data storage and reproduction flows, respectively, that generate save data encryption and decryption keys using the content ID.

In FIG. 73, steps S721 to S722 are similar to steps S701 and S702 in FIG. 70, so description thereof is omitted.

If the program localization is set to "Yes" at step S722, then at step S723, the content ID is read out from the content data and is used as the save data decryption key Ksav, or the save data decryption key Ksav is generated based on the content ID. For example, the cryptography process section 307 of the recording and reproducing device 300 can apply the master key MKx (stored in the internal memory of the recording and reproducing device 300), to the content ID read out from the content data. This is done to obtain the save data decryption key Ksav that is based, for example, on the DES (MKx, content ID). Alternatively, a cryptography key different from the other keys (which have been separately saved to the internal memory 307 of the recording and reproducing device 300) may be used as the save data decryption key Ksav.

On the other hand, if the program localization is set to "No" at step S722, then at step S727, the system common key stored in the recording and reproducing device 300 (for example, the system signature key Ksys) is read out from the content data and is used as the save data encryption key Ksav, or the save data encryption key Ksav is generated based on the system signature key. Alternatively, a cryptography key different from the other keys (which have been separately saved to the internal memory 307 of the recording and reproducing device 300) may be used as the save data decryption key Ksav.

The processing at step S724 and the subsequent steps is similar to that at step S704 and the subsequent steps in the process flow in FIG. 70, and description thereof is thus omitted.

FIG. 74 shows a process flow for reproducing and executing save data stored in the recording device 400 during the save data storage process flow in FIG. 73. Steps S731 to S733 are similar to the corresponding processing in the above-described FIG. 72, except for step S734. At step 734, the content ID is read out from the content data and is used as the save data decryption key Ksav, or the save data decryption key, Ksav is generated based on the content ID. This decryption key generating process uses a process algorithm corresponding to the encryption key generating process. That is, a decryption key generating algorithm that enables data encrypted based on a certain content ID to be decrypted with a decryption key generated based on the same content ID.

The subsequent processing, steps S735, S736, and S737 are similar to the corresponding processing in FIG. 72, and description thereof is thus omitted. According to the save data storage and reproduction processes in FIGS. 73 and 74, if the program localization is set to "Yes," the content ID is used to generate the save data encryption and decryption keys, so that as in the above save data storage and reproduction processes using the content unique key, save data cannot be obtained without matching the corresponding content program, thereby enabling save data to be saved more securely.

Figure 75:
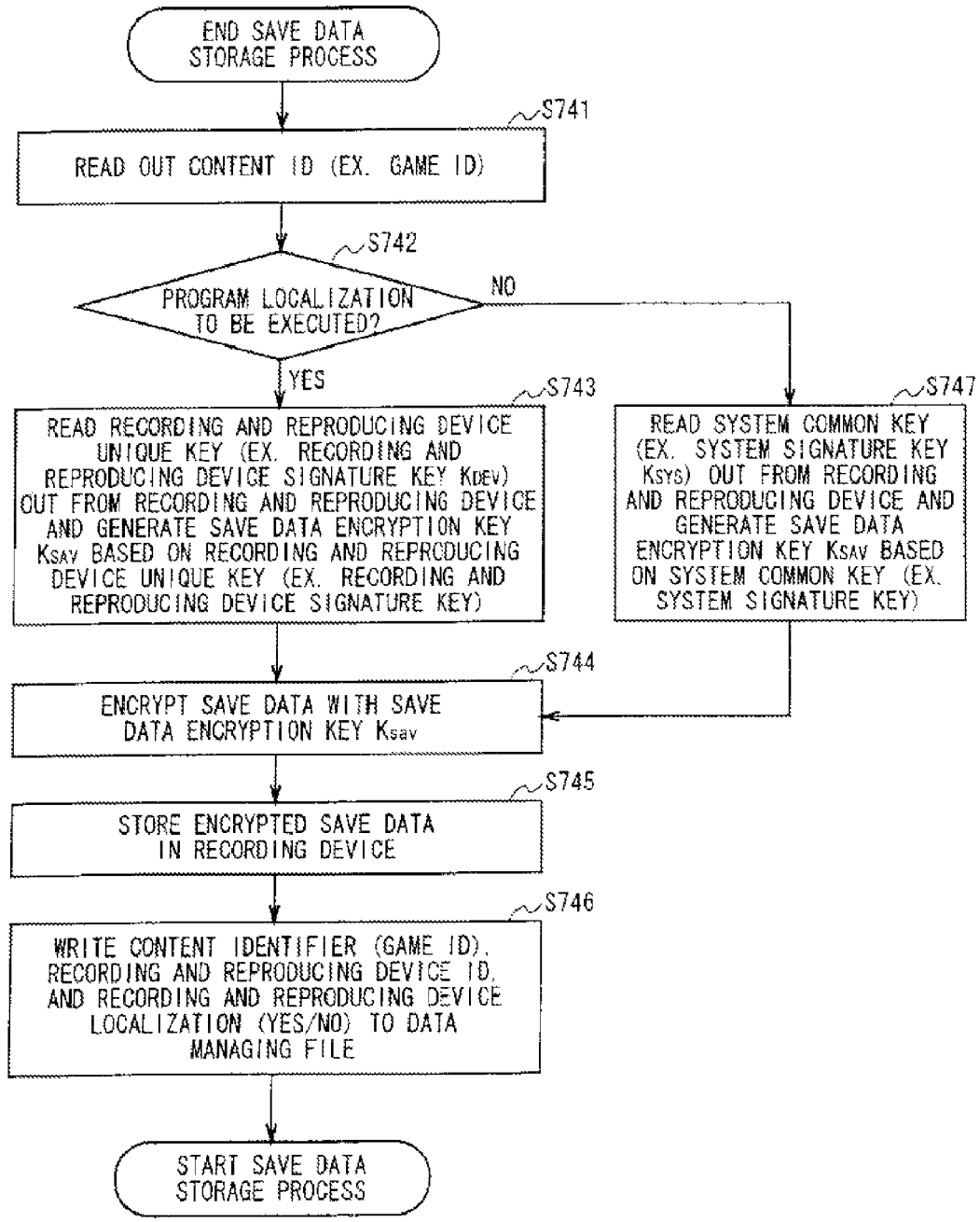
FIG. 75 is a view showing a process flow for an example (example 3) of the process for storing save data.
Figure 77:
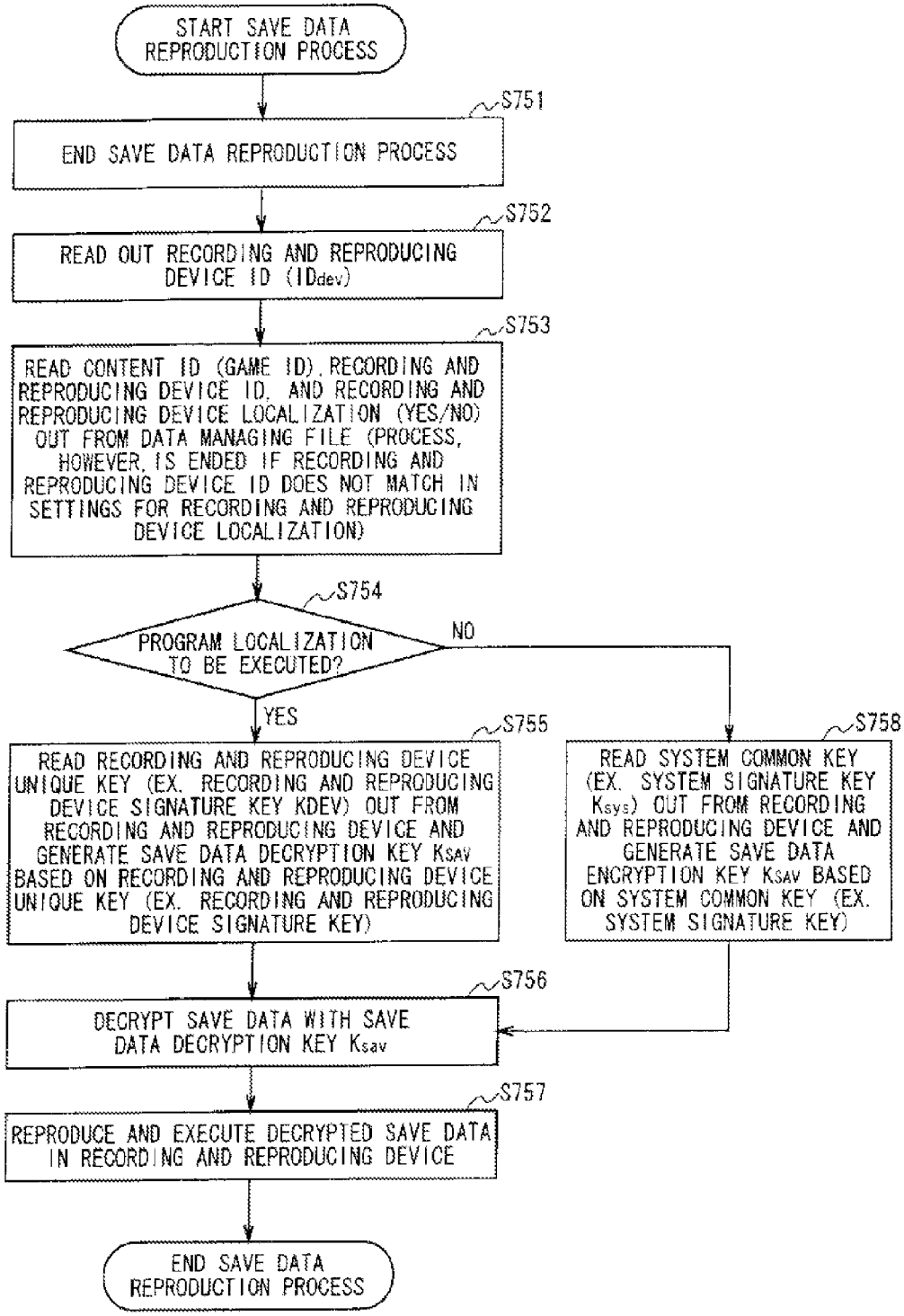
FIG. 77 is a view showing a process flow for an example (example 3) of the process for reproducing save data.

FIGS. 75 and 77 show save data storage (FIG. 75) and reproduction (FIG. 77) flows, respectively, that generate save data encryption and decryption keys using the recording and reproducing device unique key.

In FIG. 75, step S741 is similar to step S701 in FIG. 70, so description thereof is omitted. At step S742, localization is or is not set for the recording and reproducing device 300. In the case of localizing a particular recording and reproducing device 300 capable of utilizing the save data, a recording and reproducing device localization, is set to "Yes." That is, the save data is allowed to be used only by the recording and reproducing device that has generated and stored the data. To allow other recording and reproducing device to use the save data, the recording and reproducing device localization is set to "No." If the recording and reproducing device localization is set to "Yes" at step S742, the process proceeds to step S743, and if this localization is set to "No," the process proceeds to step S747.

An example of the data managing file is shown in FIG. 76. The data managing file is generated as a table. The table contains entries including data numbers, content IDs, recording and reproducing device IDs, and recording and reproducing device localization. The content ID is identification data for a content program for which save data is saved. The recording and reproducing device ID indicates a recording and reproducing device 300 that has stored the save data. An example thereof is [IDdev], shown in FIG. 69. The recording and reproducing device localization is set to "Yes" in order to limit the usage of the save data to a particular recording and reproducing device 300. That is, the save data is allowed to be used only by the recording and reproducing device that has generated and stored the data. Recording and reproducing device localization is set to "No" in order to allow other recording and reproducing devices 300 to use the save data. The recording and reproducing device localization may be arbitrarily set by the user using the content program, or may be set and stored in the content program by the content producer.

In the save data storage process flow in FIG. 75, if the recording and reproducing device localization is set to "Yes" at step S742, the recording and reproducing device unique key (for example, the recording and reproducing device signature key, Kdev) is read out from the internal memory 307 of the recording and reproducing device 300 data, and is used as the save data encryption key, Ksav, or the save data encryption key Ksav is generated based on the recording and reproducing device signature key Kdev. Alternatively, a cryptography key, different from the other keys which has been separately saved to the internal memory 307 of the recording and reproducing device 300, may be used as the save data decryption key Ksav.

On the other hand, if the recording and reproducing device localization is set to "No" at step S742, then at step S747 the system common key (stored in the recording and reproducing device 300—for example, the system signature key Ksys) is read out from internal memory 307 of the recording and reproducing device 300 and used as the save data encryption key Ksav, or the save data encryption key Ksav is generated based on the system signature key. Alternatively, a cryptography key, different from the other keys which has been separately saved to the internal memory 307 of the recording and reproducing device 300, may be used as the save data decryption key Ksav.

The processing at steps S744 and S745 is similar to the corresponding processing in the process flow in FIG. 72, and description thereof is thus omitted.

At step S746, the content ID, the recording and reproducing device ID, and the recording and reproducing device localization "Yes/No" (set by the user at step S742) are written to the data managing file (see FIG. 76).

Furthermore, FIG. 77 shows a process flow for reproducing and executing save data stored in the recording device 400 during the save data storage process flow in FIG. 75. At step S751, the content ID is read out as in the corresponding processing in the above described in relation to FIG. 72. Then at step S752, the recording and reproducing device ID (IDdev). stored in the memory of the recording and reproducing device 300. is read out.

At step S753, the content ID, the recording and reproducing device ID, and the set recording and reproducing device localization "Yes/No" are read out from the data managing file (see FIG. 76). If any entry in the data managing file (which has the same content ID) has the recording and reproducing device localization set to "Yes," the process is ended if the table entry has a recording and reproducing device ID different from that read out at step S752.

Next, if it is determined at step S754 that the data managing file has the recording and reproducing device localization set to "Yes," the process proceeds to step S755. If the data managing file has the recording and reproducing device localization set to "No," the process proceeds to step S758.

At step S755, the recording and reproducing device unique key (for example, the recording and reproducing device signature key Kdev) is read out from the internal memory 307 of the recording and reproducing device 300 data and is used as the save data decryption key Ksav. Or, the save data encryption key Ksav is generated based on the recording and reproducing device signature key Kdev. This decryption key generating process uses a process algorithm corresponding to the encryption key generating process. That is, a decryption key generating algorithm is used that enables data encrypted based on a certain recording and reproducing device unique key to be decrypted with a decryption key (that was generated based on the same recording and reproducing device unique key) Alternatively, a cryptography key, different from the other keys, which has been separately saved to the internal memory 307 of the recording and reproducing device 300, may be used as the save data decryption key Ksav.

On the other hand, at step S758, the system common key stored in the recording and reproducing device 300 (for example, the system signature key Ksys) is read out from internal memory 307 of the recording and reproducing device 300 and used as the save data decryption key Ksav. Or, the save data decryption key Ksav is generated based on the system signature key. Alternatively, a cryptography key different from the other keys (which has been separately saved to the internal memory 307 of the recording and reproducing device 300) may be used as the save data decryption key Ksav. The processing at the subsequent steps S756 and 757 are similar to that at the corresponding steps in the above described save data reproduction process flow.

According to the save data storage and reproduction process flows shown in FIGS. 75 and 77, save data for which the recording and reproducing device localization is set to "Yes" is encrypted and decrypted using the recording and reproducing device unique key. This save data can thus be decrypted and used only by the recording and reproducing device 300 having the same recording and reproducing device unique key, i.e., the same recording and reproducing device 300.

Figure 78:
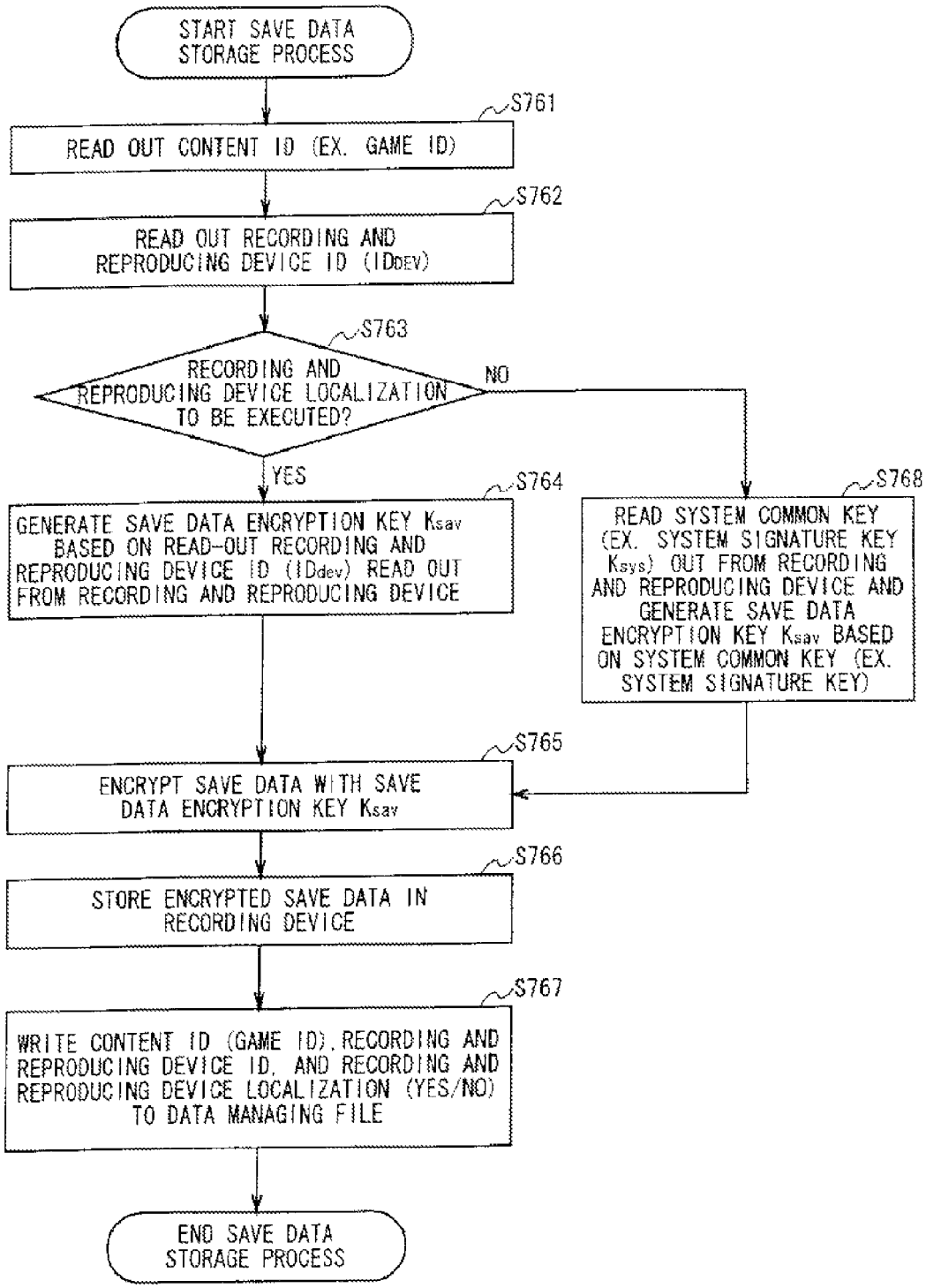
FIG. 78 is a view showing a process flow for an example (example 4) of the process for storing save data.
Figure 79:
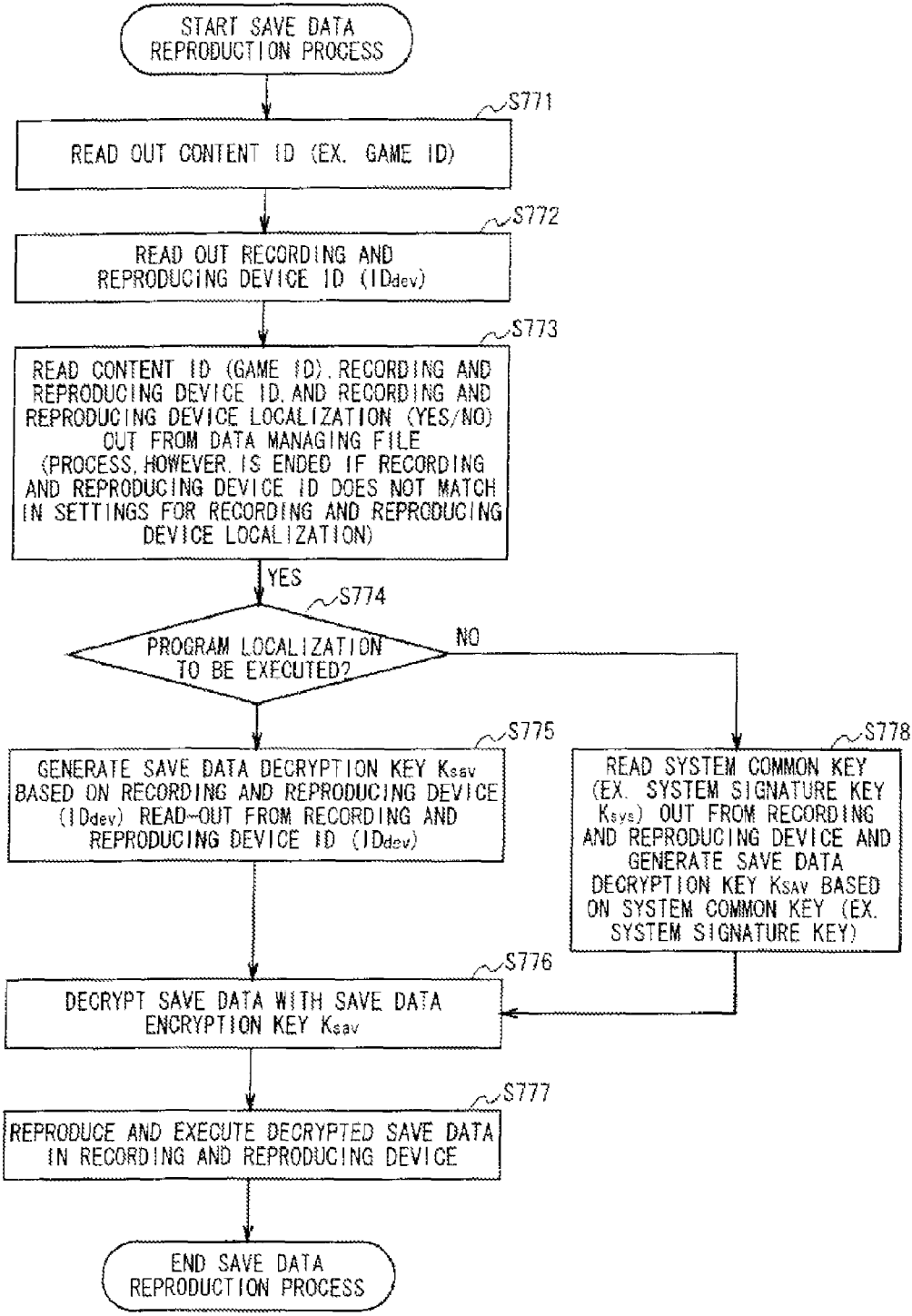
FIG. 79 is a view showing a process flow for an example (example 4) of the process for reproducing save data.

Next, FIGS. 78 and 79 show process flows for generating encryption and decryption keys, for save data using the recording and reproducing device ID and storing and reproducing the save data.

In FIG. 78, the recording and reproducing device ID is used to encrypt and store save data in the recording device 400. Steps S761 to S763 are similar to those in the above FIG. 75. At step S764, the recording and reproducing device ID (IDdev), read out from the recording and reproducing device, is used to generate the save data encryption key Ksav. The save data encryption key Ksav is obtained based on the Iddev. This is done, for example, applying the IDdev as the save data encryption key Ksav, or applying the master key MKx (stored in the internal memory of the recording and reproducing device 300) to obtain the save data encryption key Ksav based on the DES (MKx, IDdev). Alternatively, a cryptography key different from the other keys which have been separately saved to the internal memory 307 of the recording and reproducing device 300, may be used as the save data decryption key Ksav.

The subsequent process steps S765 to S768 are similar to the corresponding processing in the above described FIG. 75, so description thereof is omitted.

FIG. 79 shows a process flow for reproducing and executing the save data stored in the recording device 400 by means of the process in FIG. 78. Steps S771 to S774 are similar to the corresponding processing in FIG. 77.

At step S775, the recording and reproducing device ID (Iddev), read out from the recording and reproducing device, is used to generate the save data decryption key Ksav. The save data encryption key Ksav is obtained based on the Iddev. This is performed by, for example, applying the IDdev as this key Ksav, or applying the master key MKx (stored in the internal memory of the recording and reproducing device 300) to obtain this key Ksav based on the DES (MKx, IDdev). This decryption key generating process uses a process algorithm corresponding to the encryption key generating process. That is, a decryption key generating algorithm that enables data encrypted based on a certain recording and reproducing device unique key to be decrypted with a decryption key generated based on the same recording and reproducing device unique key. Alternatively, a cryptography key, different from the other keys which has been separately saved to the internal memory 307 of the recording and reproducing device 300, may be used as the save data decryption key Ksav.

The subsequent process steps S776 to S778 are similar to the corresponding processing in the above described FIG. 76.

According to the save data storage and reproduction process flows shown in FIGS. 78 and 79, save data for which the recording and reproducing device localization is set to "Yes" is encrypted and decrypted using the recording and reproducing device unique key. This save data can thus be decrypted and used only by the recording and reproducing device 300 having the same recording and reproducing device unique key, that is, the same recording and reproducing device 300.

Next, save data storage and reproduction processes of executing both the above described program localization and recording and reproducing device localization will be explained with reference to FIGS. 80 to 82.

Figure 80:
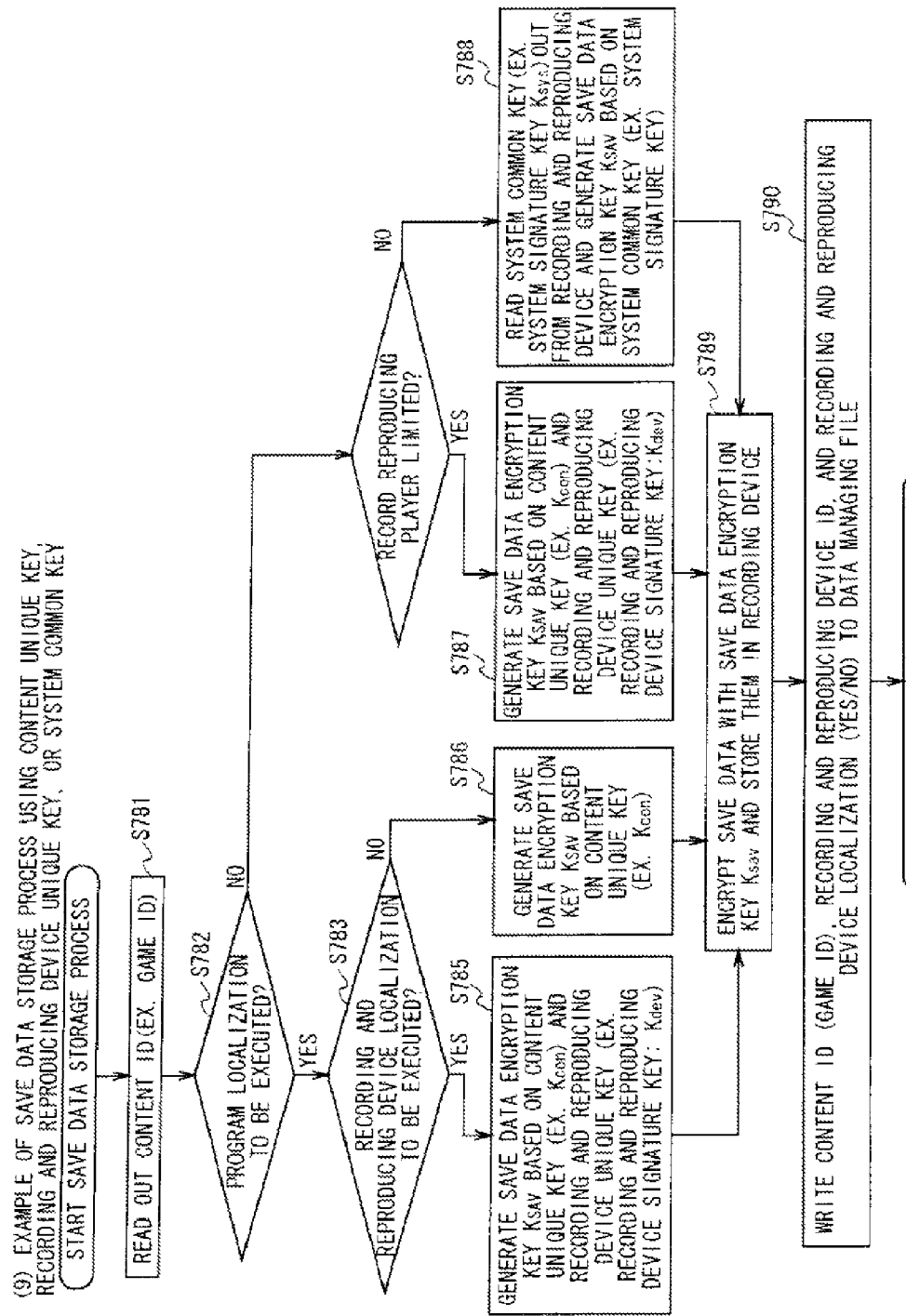
FIG. 80 is a view showing a process flow for an example (example 5) of the process for storing save data.

FIG. 80 shows a save data storage process flow. At step S781, the content ID is read out from the content data, at step S782, it is determined whether the program localization is set, and at step S783, it is determined whether the recording and reproducing device localization is set.

If both the program localization and the recording and reproducing device localization are set to "Yes", then at step S785 the save data encryption key Ksav is generated based on both the content unique key (ex. Kcon) and the recording and reproducing device unique key (Kdev). The save data encryption key is obtained, for example, based on Ksav=(Kcon XOR Kdev) or by applying the master key MKx (stored in the internal memory of the recording and reproducing device 300) to obtain this key based on Ksav=DES (MKx, Kcon XOR Kdev). Alternatively, a cryptography key, different from the other keys which have been separately saved to the internal memory 307 of the recording and reproducing device 300, may be used as the save data decryption key Ksav.

If the program localization is set to "Yes" while the recording and reproducing device localization is set to "No," then at step S786, the content unique key (ex. Kcon) is used as the save data encryption key Ksav. Or, the save data encryption key Ksav is generated based on the content unique key (ex. Kcon).

If the program localization is set to "No" while the recording and reproducing device localization is set to "Yes," then at step S787, the recording and reproducing device unique key (Kdev) is used as the save data encryption key Ksav. Or, the save data encryption key Ksav is generated based on the recording and reproducing device unique key (Kdev). Alternatively, a cryptography key, different from the other keys (which have been separately saved to the internal memory 307 of the recording and reproducing device 300), may be used as the save data decryption key Ksav.

Further, if both the program localization and the recording and reproducing device localization are set to "No," then at step S787, the system common key (for example, the system signature key Ksys) is used as the save data encryption key Ksav. Or, the save data encryption key Ksav is generated based on the system signature key Ksys. Alternatively, a cryptography key, different from the other keys (which has been separately saved to the internal memory 307 of the recording and reproducing device 300), may be used as the save data decryption key Ksav.

At step S789, the save data encryption key Ksav generated at one of the steps S785 to S788, is used to encrypt the save data, which is then stored in the recording device 400.

Furthermore, at step S790, the localization (set at steps S782 and S783) is stored in the data managing file. The data managing file is configured, for example, as shown in FIG. 81, and contains entries including data numbers, content IDs, recording and reproducing device IDs, program localization, and recording and reproducing device localization.

Figure 82:
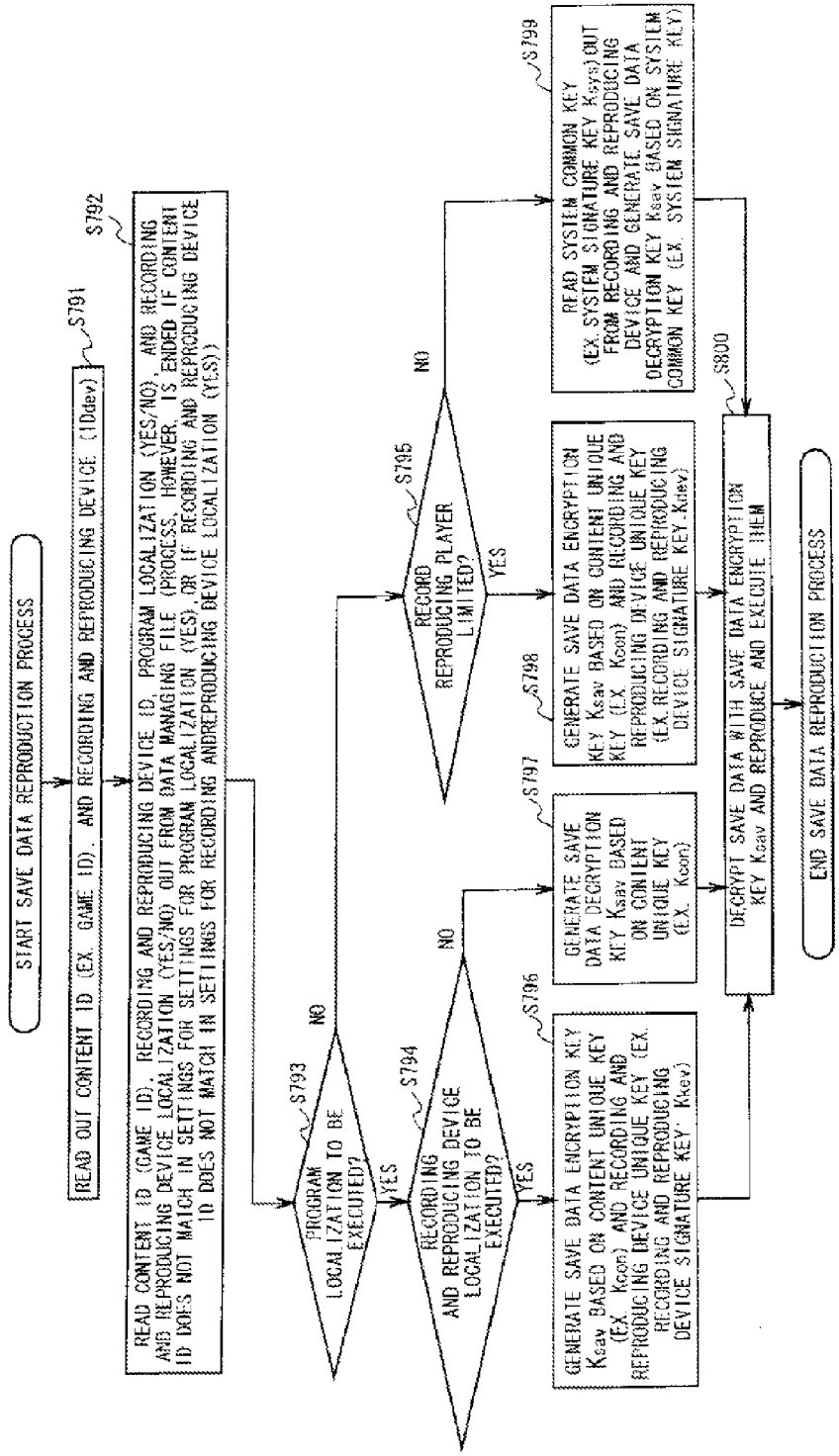
FIG. 82 is a view showing a process flow for an example (example 5) of the process for reproducing save data.

FIG. 82 shows a process flow for reproducing and executing the save data stored in the recording device 400 by means of the process in FIG. 80. At step S791, the content ID and the recording and reproducing device ID are read out from the execution program. At step S792, the content ID, the recording and reproducing device ID, the program localization, and the recording and reproducing device localization are read out from the data managing file shown in FIG. 81. In this case, if the program localization is set to "Yes" and the content IDs are not the same, or if the recording and reproducing device localization is set to "Yes" and the recording and reproducing device IDs are not the same, the process is ended.

Then at steps S793, S794, and S795, the decryption key generating process is set to one of the four manners at steps 796 to S799 in accordance with the data recorded in the data managing file.

If both the program localization and the recording and reproducing device localization are set to "Yes," then at step S796, the save data encryption key Ksav is generated based on both the content unique key (ex. Kcon) and the recording and reproducing device unique key (Kdev). Alternatively, a cryptography key different from the other keys (which have been separately saved to the internal memory 307 of the recording and reproducing device 300) may be used as the save data decryption key Ksav. If the program localization is set to "Yes" while the recording and reproducing device localization is set to "No," then at step S797, the content unique key (ex. Kcon) is used as the save data encryption key Ksav. Or, the save data encryption key Ksav is generated based on the content unique key (ex. Kcon). Alternatively, a cryptography key different from the other keys (which have been separately saved to the internal memory 307 of the recording and reproducing device 300) may be used as the save data decryption key Ksav.

If the program localization is set to "No" while the recording and reproducing device localization is set to "Yes," then at step S798, the recording and reproducing device unique key (Kdev) is used as the save data encryption key Ksav. Or, the save data encryption key Ksav is generated based on the recording and reproducing device unique key (Kdev). Alternatively, a cryptography key different from the other keys (which have been separately saved to the internal memory 307 of the recording and reproducing device 300) may be used as the save data decryption key Ksav. Further, if both the program localization and the recording and reproducing device localization are set to "No," then at step S799, the system common key (for example, the system signature key Ksys) is used as the save data encryption key Ksav. Or, the save data encryption key Ksav is generated based on the system signature key Ksys. Alternatively, a cryptography key different from the other keys (which have been separately saved to the internal memory 307 of the recording and reproducing device 300) may be used as the save data decryption key Ksav.

These decryption key generating processes uses a process algorithm corresponding to the encryption key generating process. That is, a decryption key generating algorithm that enables data encrypted based on the same content unique key and recording and reproducing device unique key to be decrypted with a decryption key generated based on the same content unique key and recording and reproducing device unique key.

At step S800, the save data encryption key Ksav, generated at one of the steps S796 to S799, is used to execute the decryption process. The decrypted save data are reproduced and executed in the recording and reproducing device 300.

According to the save data storage and reproduction process flows shown in FIGS. 80 and 82, save data for which "Yes" is selected for the program localization is encrypted and decrypted with the content unique key. This save data can be decrypted and used only if content data having the same content unique key is used. Additionally, save data for which "Yes" is selected for the recording and reproducing device localization is encrypted and decrypted with the recording and reproducing device ID. This save data can be decrypted and used only by the recording and reproducing device having the same recording and reproducing device ID, that is, the same recording and reproducing device. Consequently, both the content and the recording and reproducing device can set the localization to further improve the security of the save data.

Although FIGS. 80 and 82 show the configuration for generating the save data encryption key and the decryption key using the content unique key and the recording and reproducing device unique key, the content ID and the recording and reproducing device ID may be used instead of the content unique key and the recording and reproducing device unique key, respectively, to generate the save data encryption key and the decryption key based on these IDs.

Next, a configuration for generating encryption and decryption keys, based on a password input by the user, will be described with reference to FIGS. 83 to 85.

Figure 83:
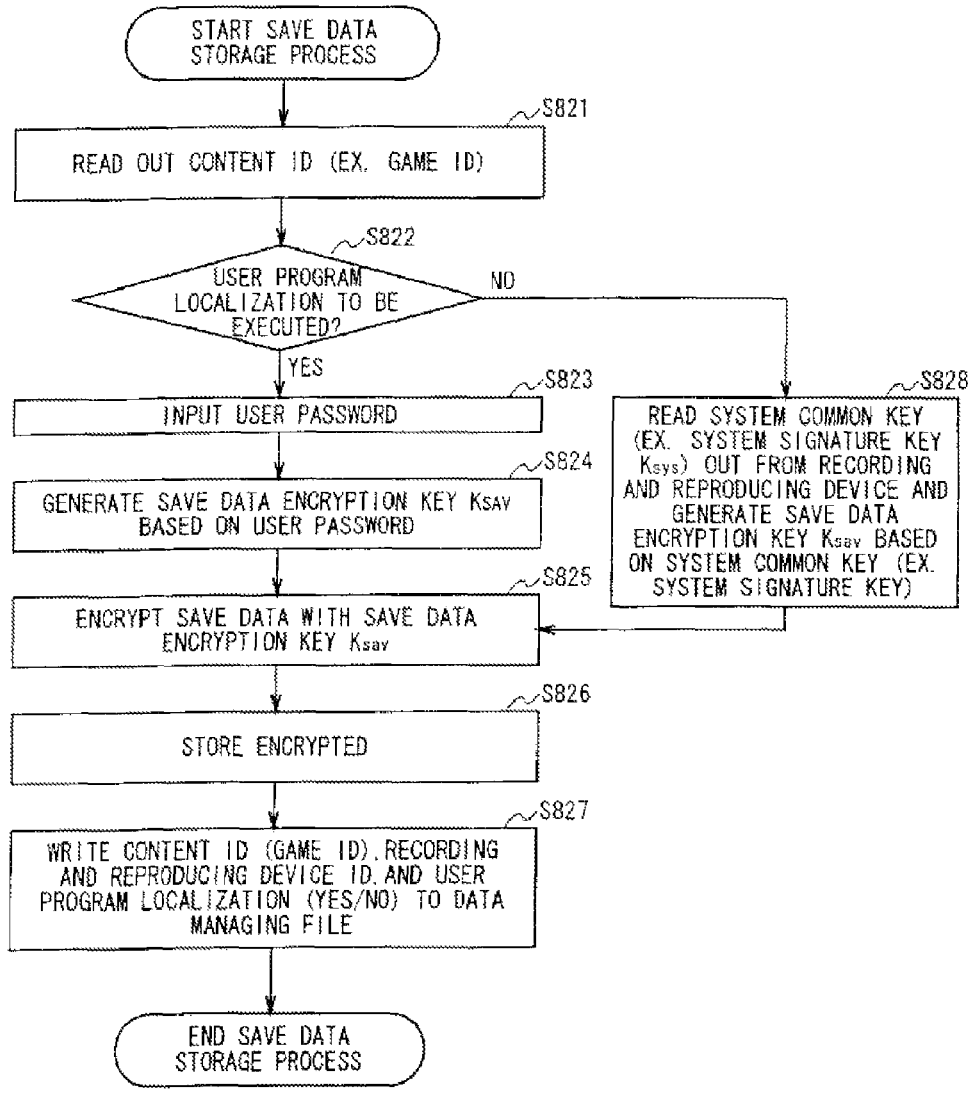
FIG. 83 is a view showing a process flow for an example (example 6) of the process for storing save data.

FIG. 83 shows a process flow for generating a save data encryption key based on a password input by the user and storing save data in the recording device.

At step S821, the content ID is read out from the content data as in each of the above described processes. At step S822, the user determines whether to set the program localization. The data managing file set in this configuration has, for example, the configuration shown in FIG. 84.

As shown in FIG. 84, the data contains data numbers, content IDs, recording and reproducing device IDs, and user set program localization. The "user set program localization" is an entry that determines whether or not the usage of the program is limited to a particular user.

If the localization is set to "Yes" at step S822 in the process flow in FIG. 83, then at step S823, the user's password is input. The password is input from an input means such as the keyboard shown in FIG. 2.

The input password is output to the cryptography process section 302 (under the control of the main CPU 106 and the control section 301) and the processing at step S824 is executed. That is, the save data encryption key Ksav is generated based on the input user password. The save data encryption key Ksav may be generated by, for example, setting the password itself as this key Ksav or using the master key MKx of the recording and reproducing device to generate this key Ksav based on the save data encryption key Ksav=DES (MKx, password). Alternatively, a unidirectional function may be applied, using the password as an input, so that an encryption key can be generated based on an output from the function.

If the user localization is set to "No" at step S822, then at step S828, a save data encryption key is generated based on the system common key of the recording and reproducing device 300.

Further, at step S825, the save data encryption key Ksav (generated at step S824 or S828) is used to encrypt the save data, and at step S826, the encrypted save data is stored in the recording device 400.

At step S827, the program localization set by the user at step S822 is written to the data managing file in FIG. 84, so as to be associated with the content ID and the recording and reproducing device ID.

Figure 85:
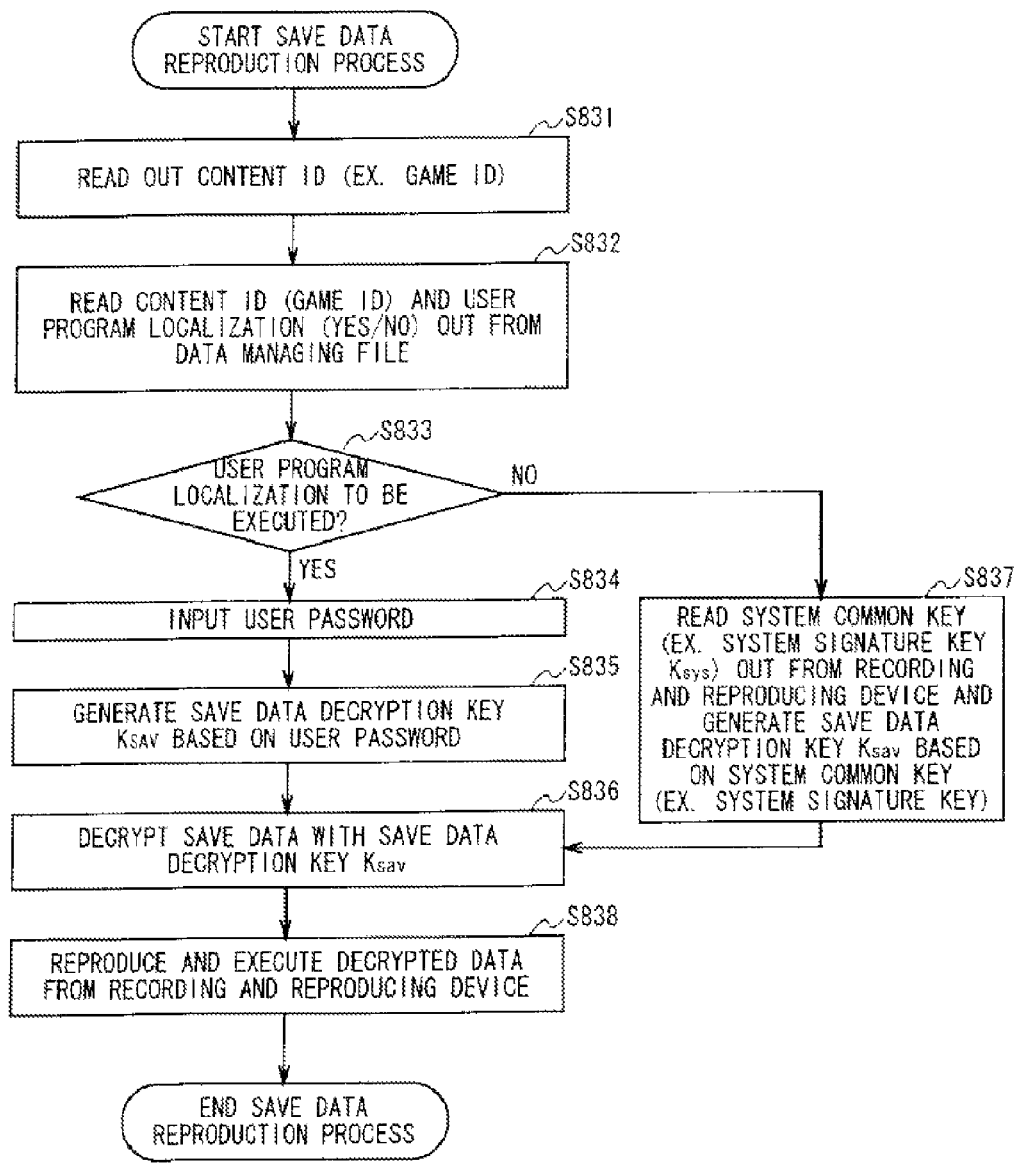
FIG. 85 is a view showing a process flow for an example (example 6) of the process for reproducing save data.

FIG. 85 illustrates a process for reproducing the save data stored by means of the process in FIG. 83. At step S831, the content ID is read out from the content data. At step S832, the content ID and the program localization set by the user are read out from the data managing file shown in FIG. 84.

At step S833, determination is made based on the data in the data managing file. If "the user set program localization" is set to "Yes," then at step S834 the user is prompted to input a password. Then at step S835, a decryption key is generated based on the input password. This decryption key generating process uses a process algorithm corresponding to the encryption key generating process. That is, a decryption key generating algorithm is used that enables data encrypted based on a certain password to be decrypted with a decryption key generated based on the same password.

If it is determined at step S833 that the program localization by the user is set to "No," then at step S837 the system common key stored in the internal memory of the recording and reproducing device 300 is used to generate the save data decryption key Ksav by using the system signature key Ksys. Alternatively, an encryption key, different from the other keys which have been separately saved to the internal memory 307 of the recording and reproducing device 300, may be used as the save data encryption key Ksav.

At step S836, the decryption key Ksav (generated at step S835 or S837) is used to decrypt the save data stored in the recording device. At step S838, the recording and reproducing device 300 reproduces and executes the save data.

According to the save data storage and reproduction process flows shown in FIGS. 83 and 85, save data for which "Yes" is selected for "the user set program localization" is encrypted and decrypted with the key based on the user input password. This is done so that this save data can be decrypted and used only if the same password is input, thereby improving the security of the save data.

The several aspects of the save data storage and reproduction processes have been described, but it is also possible to implement a process obtained by merging the above described processes together. For example, an aspect of generating save data encryption and decryption keys may be performed using an arbitrary combination of the password, the recording and reproducing device ID, the content ID, and other information.

(17) Configuration for Excluding (Revoking) Invalid Apparatuses

As described above, the data processing apparatus according to the present invention improves the security of provided content and allow such contents to be used only by valid users. It uses the configuration wherein the recording and reproducing device 300 executes processes such as authentication and encryption on various content data provided by the medium 500 (see FIG. 3), or the communication means 600, and then stores the data in the recording device 400.

As understood from the above description, the input content is authenticated, encrypted, and decrypted using the various signature keys, master keys, and integrity-check-value-generating keys (see FIG. 18) that are stored in the internal memory 307 (which is configured in the cryptography process section 302 of the recording and reproducing device 300). The internal memory 307 storing the key information is desirably characterized to restrain external illegal reads. It comprises a semiconductor chip that essentially rejects external accesses and has a multilayer structure, an internal memory sandwiched between dummy layers of aluminum or the like or arranged in the lowest layer, and a narrow range of operating voltages and/or frequencies. If, however, the key data or the like should be read out from the internal memory 307 and copied to an unauthorized recording and reproducing device 300, the copied key information may be used for invalid usage of the content.

A configuration for preventing the invalid use of content, based on invalid copying of a key, will be described below.

Figure 86:
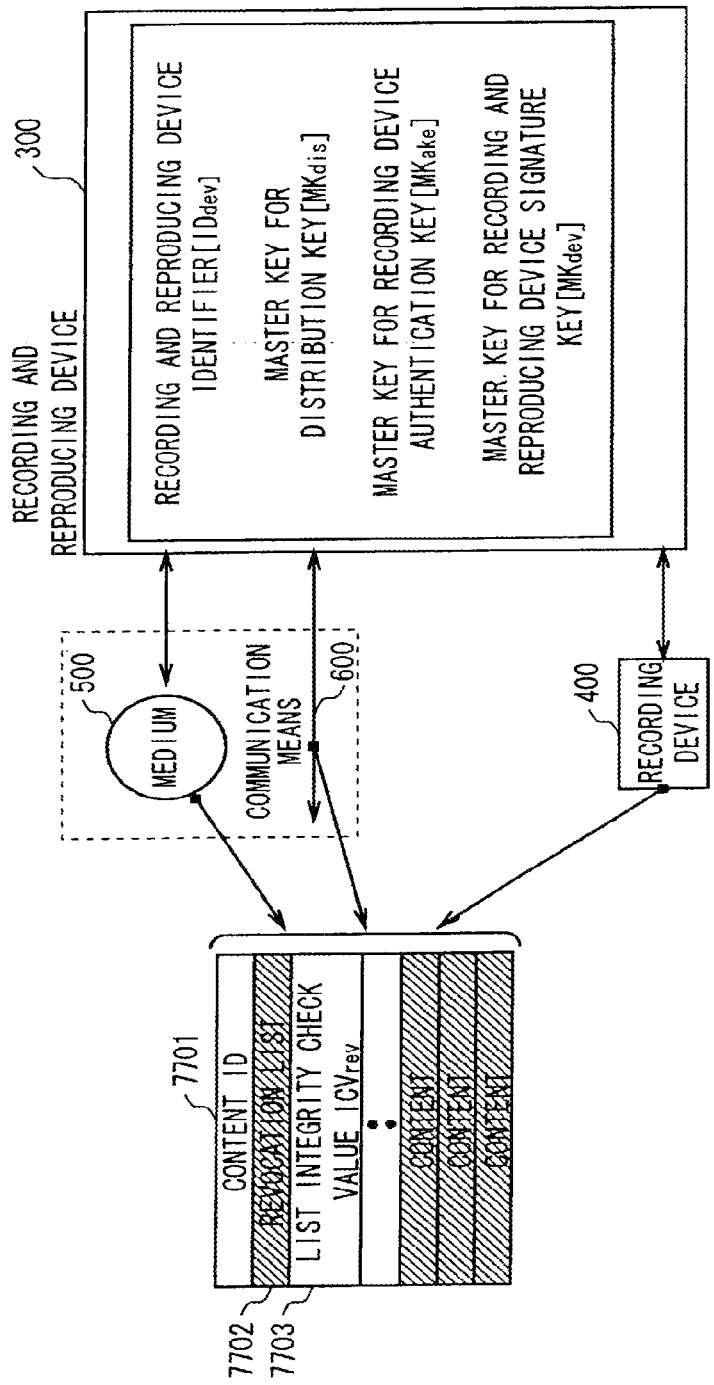
FIG. 86 is a view illustrating a configuration for excluding invalid content users (revocation).

FIG. 86 is a block diagram illustrating "(17) Configuration for Excluding Invalid Apparatuses," which corresponds to this configuration. The recording and reproducing device 300 is similar to the recording and reproducing device 300 shown in FIGS. 2 and 3. It has an internal memory, and the previously described various key data (FIG. 18) and recording and reproducing device ID. Here, the recording and reproducing device ID, the key data, or the like, copied by a third person, is not necessarily stored in the internal memory 307. The key data or the like in the recording and reproducing device 300 shown in FIG. 86 are collectively or distributively stored in a memory section accessible to the cryptography process section 302 (see FIGS. 2 and 3).

To implement the configuration for excluding invalid apparatuses, a list of invalid recording and reproducing device IDs is stored in the header section of the content data. As shown in FIG. 86, the content data holds a revocation list as the list of invalid recording and reproducing device IDs (IDdev). Further, a list integrity check value ICVrev is used to check the revocation list for tampering. The list of invalid recording and reproducing device IDs (IDdev) contains the identifiers IDdev of invalid recording and reproducing devices 300, determined by the content provider or manager, based on the state of distribution of invalid copies or the like. The revocation list may be encrypted with the distribution key Kdis before being stored. The decryption process executed by the recording and reproducing device 300 is similar to, for example, that in the content download process in FIG. 22.

Here, for better understanding, the revocation list is shown as single data in the content data, but may be contained, for example, in the previously described usage policy (for example, see FIGS. 32 to 35), which is a component of the header section of the content data. In this case, the previously described integrity check value ICVa is used to check the usage policy data containing the revocation list for tampering. If the revocation list is contained in the usage policy, the integrity check value A, ICVa, is used for the check, and the integrity-check-value-A-generating key, Kicva, in the recording and reproducing device 300 is used, thereby eliminating the need to store the integrity-check-value-generating key Kicv-rev.

If the revocation list is contained in the content data as independent data, the revocation list is checked using the list integrity check value ICVrev (for checking the revocation list for tampering), and an intermediate integrity check value is generated from the list integrity check value ICVrev and another partial integrity check value in the content data, and is used to carry out a verification process.

A method for checking the revocation list using the list integrity check value ICVrev for checking the revocation list for tampering is similar to the process for generating the integrity check value such as ICVa or ICVb as explained in the above-described FIGS. 23 and 24. That is, the calculation is executed in accordance with the ICV calculation method described in FIGS. 23 and 24 and other figures. The key used is the integrity-check-value-generating key, Kicv-rev (stored in the internal memory 307 of the recording and reproducing device cryptography process section 302), and using the revocation list contained in the content data as a message. The calculated integrity check value ICV-rev' and the integrity check value ICV-rev (stored in the header), are compared together. If they are equal, it is determined that the list has not been tampered with.

The intermediate integrity check value, containing the list integrity check value ICVrev, is generated, for example, by using the total-integrity-check-value-generating key Kicvt as a key. Kicvt is stored in the infernal memory 307 of the recording and reproducing device cryptography process section 302. The ICV calculation method described in FIG. 7 and other figures is applied to a message string comprising the integrity check values A and B and list integrity check value ICVrev in the verified header. The content integrity check value is added thereto depending on the format, as shown in FIG. 25.

The revocation list and the list integrity check value are provided to the recording and reproducing device 300 via the medium 500 (such as a DVD or a CD), or the communication means 600, or via the recording device 400 (such as a memory card). In this case, the recording and reproducing device 300 may hold valid key data or illegally copied IDs.

Figure 87:
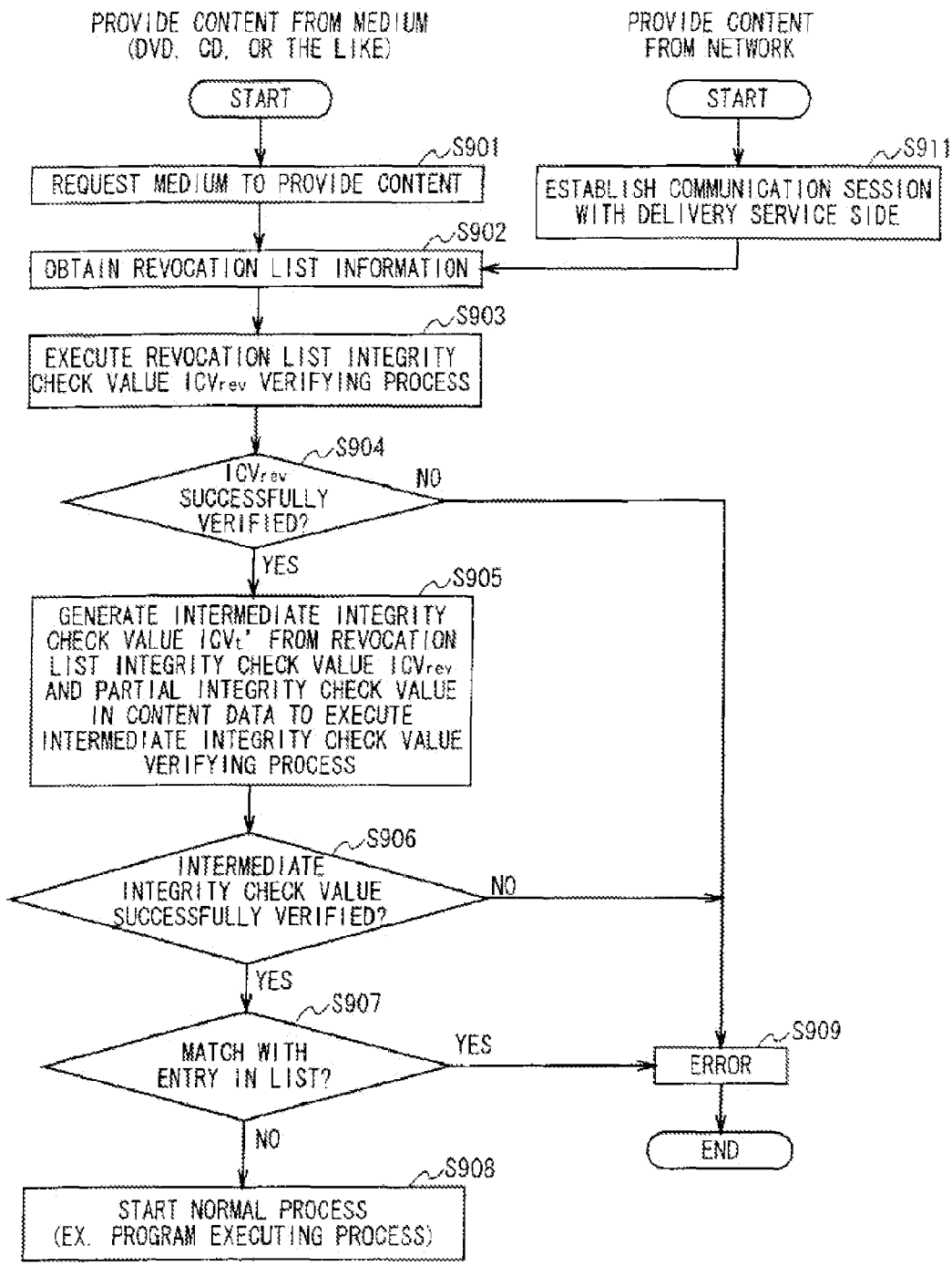
FIG. 87 is a view showing a flow of a process (example 1) for excluding invalid content users (revocation).
Figure 88:
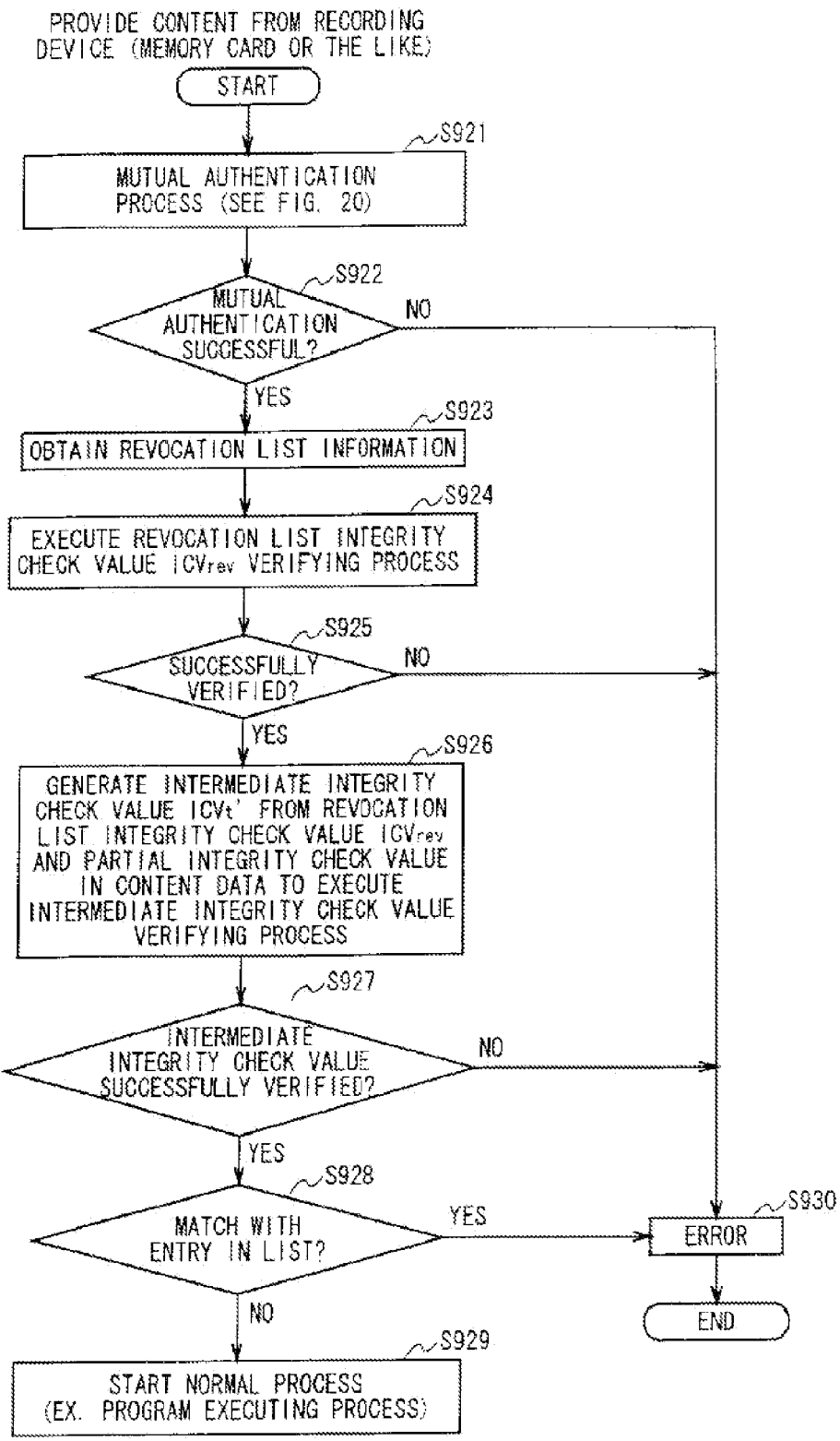
FIG. 88 is a view showing a flow of a process (example 2) for excluding invalid content users (revocation).

FIGS. 87 and 88 illustrate a process for excluding invalid recording and reproducing devices 300 in this configuration. FIG. 87 shows a process for excluding (revoking) invalid recording and reproducing devices 300 if content is provided by the medium 500 (such as a DVD or a CD) or the communication means 600. FIG. 88 shows a process for excluding (revoking) invalid recording and reproducing devices 300 if content is provided by the recording device 400 (such as a memory card).

First, the process flow in FIG. 87 will be explained. At step S901, the medium 500 is installed and a request is made for content, that is, a reproduction or download process. The process shown in FIG. 87 corresponds to a step executed, for example, before installation of the medium 500 (such as DVD or the like) in the recording device 400, followed by the download process. The download process is as previously described with reference to FIG. 22 and is executed as a step before the process flow in FIG. 22 or as a process inserted into this process flow.

If the recording and reproducing device 300 receives content via the communication means 600 (such as a network), then at step S911, a communication session with a content distribution service side is established. The process then proceeds to step S902.

At step S902, the revocation list (see FIG. 86) is obtained from the header section of the content data. In this list-obtaining process, if the content is present in the medium 500, the control section 301 (shown in FIG. 3) reads it out therefrom via the read section 304. If the content is obtained from the control section, the communication means 600 shown in FIG. 3 receives it from the content distributing side via the communication section 305.

Next, at step S903, the control section 301 passes the revocation list (obtained from the medium 500 or the communication means 600), to the cryptography process section 302. Cryptography process section 302 is then caused to execute the check value generating process. The recording and reproducing device 300 internally has the revocation-integrity-check-value-generating key Kicv-rev. It calculates the integrity check value ICV-rev' in accordance with the ICV calculation method described in FIGS. 23 and 24 and other figures. This is performed by applying the integrity-check-value-generating key Kicv-rev, using the received revocation list as a message. It compares the result of the calculation with the integrity check value, ICV-rev (stored in the header) If they are equal, it determines that the list has not been tampered with (Yes at step S904). If the values are not equal, the recording and reproducing device determines that the list has been tampered with. In that case, the process proceeds to step S909 to indicate a process error to end the process.

At step S905, the control section 306 of the recording and reproducing device cryptography process section 302 causes the encryption/decryption section 308 of the recording and reproducing device cryptography process section 302 to calculate the total integrity check value ICVt'. The total integrity check value ICVt' is generated by using the system signature key Ksys as a key. Ksys is stored in the internal memory 307 of the recording and reproducing device cryptography process section 302. The intermediate integrity check value is encrypted based on the DES, as shown in FIG. 25. The verification process, with each partial integrity check value such as the ICVa or ICVb, is omitted from the process flow shown in FIG. 87. Verification with these partial check values is carried out depending on the data format as in the process flow in the previously described FIGS. 39 to 45.

Then at step S906, the generated total integrity check value ICVt' is compared with the integrity check value ICVt in the header. If they are equal (Yes at step S906), the process advances to step S907. If the values are not equal, the recording and reproducing device determines that the list has been tampered with, and the process proceeds to step S909 to indicate a process error to end the process.

As previously described, the total integrity check value ICVt is used to check all the partial integrity check value contained in the content data, such as the ICVa and ICVb and integrity check values for corresponding content blocks, which are dependent on the data format. In this case, however, the list integrity check value ICVrev, for checking the revocation list for tampering, is added to the partial integrity check values. All of these integrity check values are checked for tampering. If the total integrity check value equals the integrity check value ICVt, stored in the header, it is determined that none of the ICVa and ICVb, the content block integrity check values, and the list integrity check value ICVrev have not been tampered with.

Further at step S907, the revocation list, which has been determined to be free from tampering, is compared with the recording and reproducing device ID (IDdev) stored in this recording and reproducing device 300.

If the list of invalid recording and reproducing device Ids, IDdev (read out from the content data) contains the identifier IDdev of this recording and reproducing device 300, this recording and reproducing device 300 is determined to have illegally copied key data. The process then advances to step S909 to abort the subsequent procedure. For example, the process disables, for example, the execution of the content download process in FIG. 22.

At step S907, if the list of invalid recording and reproducing device IDs IDdev is determined not to contain the identifier IDdev of this recording and reproducing device 300, this recording and reproducing device 300 is determined to have valid key data. The process proceeds to step S908 to enable the subsequent procedure, for example, the program executing process or the content download process in FIG. 22 or other figures.

FIG. 88 shows a process executed to reproduce content data stored in the recording device 400, such as a memory card. As previously described, the recording device 400 (such as a memory card) and the recording and reproducing device 300 carry out the mutual authentication process described in FIG. 20 (step S921). Only if the mutual authentication is successful at step S922 does the process proceed to step S923 and the subsequent processing. Whereas if the mutual authentication fails, an error occurs at step S930 to prevent the subsequent processing from being executed.

At step S923, the revocation list (see FIG. 86) is obtained from the header section of the content data. The processing at subsequent steps S924 to 930 is similar to the corresponding processing in FIG. 87. That is, the list is verified with the list integrity check value (S924 and S925) and with the total integrity check value (S926 and S927). The list entry is compared with the recording and reproducing device ID IDdev (S928). Then, if the list of invalid recording and reproducing device Ids, Iddev, contains the identifier IDdev of this recording and reproducing device 300, this recording and reproducing device 300 is determined to have illegally copied key data. Then the process advances to step S930 to abort the subsequent procedure. For example, the process disables, for example, the execution of the content reproduction process in FIG. 28. On the other hand, if the list of invalid recording and reproducing device Ids, Iddev, is determined not to contain the identifier IDdev of this recording and reproducing device 300, this recording and reproducing device 300 is determined to have valid key data, and the process proceeds to step S929 to enable the subsequent procedure.

As described above, according to the present data processing apparatus, the data identifying invalid recording and reproducing devices 300, that is, the revocation list containing the identifiers IDdev of invalid recording and reproducing devices 300, is contained in the content (provided by the content provider or manager) as constituent data of the header section of the content data. Before using the content in the recording and reproducing device 300, the recording and reproducing device user collates the recording and reproducing device ID, IDdev (stored in the memory of this recording and reproducing device 300), with the ID in the list and prevents subsequent processing if matching data are found. Consequently, the content can be prevented from being used by invalid recording and reproducing devices 300 that store copied key data in their memory.

(18) Method for Configuring and Manufacturing Secure Chip

As previously described, the internal memory 307 of the recording and reproducing device cryptography process section 302 or the internal memory 405 of the recording device 400 holds important information such as the cryptography keys and thus needs to be structured to reject external invalid reads. Thus, the recording and reproducing device cryptography process section 302, and the recording device cryptography process section 401, are configured as a tamper resistant memory. The tamper resistant memory is characterized to restrain external illegal reads in that it comprises, for example, a semiconductor chip that rejects external accesses and has a multilayer structure, an internal memory sandwiched between dummy layers of aluminum or the like or arranged in the lowest layer, and a narrow range of operating voltages and/or frequencies.

As understood from the above description, however, data such as the recording and reproducing device signature key (Kdev), which vary depending on the recording and reproducing device 300, must be written to the internal memory 307 of the recording and reproducing device cryptography process section 302. Additionally, data rewrites or reads must be difficult after individual information for each chip (for example, identification information (ID) and encryption key information) has been written to a non-volatile storage area in the chip, for example, a flash memory or an FeRAM, for example, after shipment.

A conventional method for making data reads and rewrites difficult comprises, for example, making a data write command protocol secret, or separating signal lines on the chip for accepting the data write command from communication signal lines used after completion of the product, so that the data write command will not be effective unless the signal is directly transmitted to the chip.

Even with such a conventional method, however, those who have a technical knowledge of storage elements can output signals to a data write area of the chip if they have a facility and a technique for driving the circuit, and even if a data write command protocol is secret, there is always a possibility that the protocol may be analyzed.

Distribution of elements for storing cryptography process data, which allow secret data to be modified, may threaten the entire cryptography process system. In addition, to prevent data from being read out, it is possible to avoid implementing the data read command. In this case, however, even if a regular data write has been executed, it may be impossible to determine whether or not the written data has been accurately written. This can result in the possibility of supplying chips with inappropriate data written thereto.

In view of these conventional techniques, the present invention provides a secure chip configuration that enables data to be accurately written to a non-volatile memory, such as a flash memory or an FeRAM, while restraining data from being read out therefrom, as well as a method for manufacturing such a secure chip.

Figure 89:
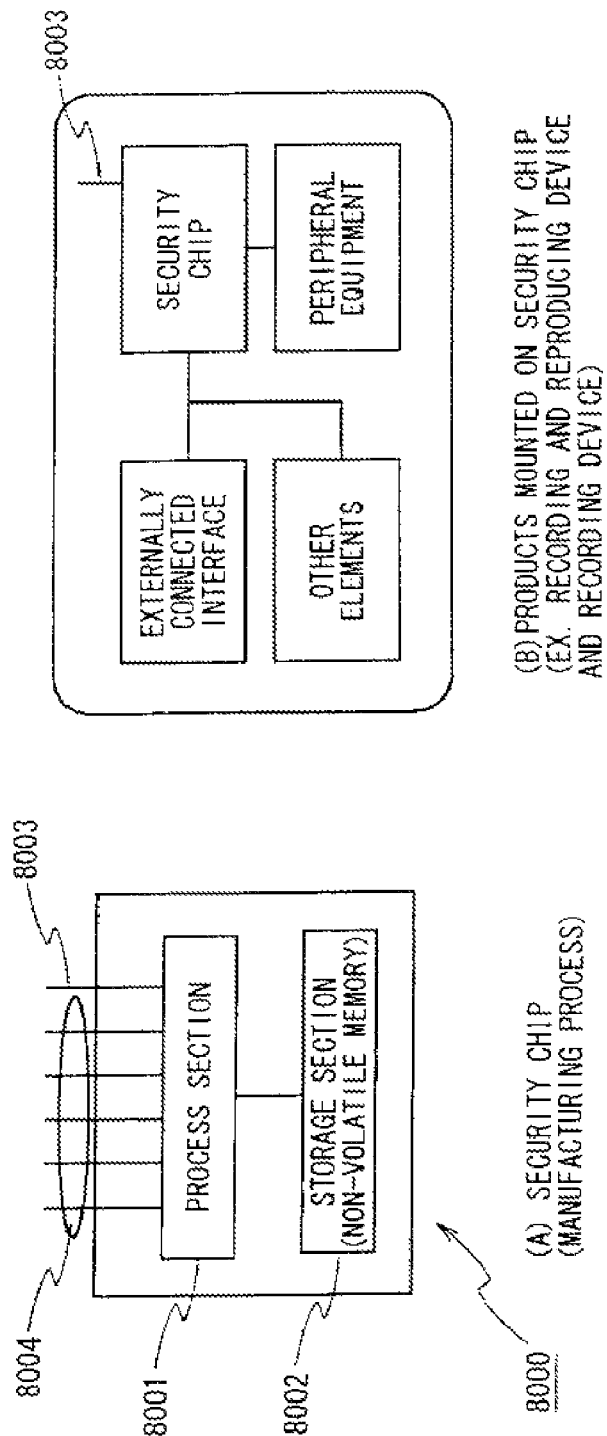
FIG. 89 is a view illustrating a configuration of the security chip (example 1).

FIG. 89 shows a security chip configuration applicable to, for example, the above-described recording and reproducing device cryptography process section 302, or the cryptography process section 401 of the recording device 400. FIG. 89(A) shows a security chip configuration formed during a chip manufacturing process, that is, during a data write process. FIG. 89(B) shows an example of the configuration of a product, such as the recording and reproducing device 300 or the recording device 400, which has a security chip mounted in the product and having data written thereto.

During the manufacturing process, a process section 8001 of the security chip has mode specifying signal lines 8003 and various command signal lines 8004 connected thereto. It writes or reads data to or from a storage section 8002. Storage section 8002 comprises a non-volatile memory. Data is written or read depending on, for example, whether the chip is in a data write mode or a data read mode.

In the security chip mounted product in FIG. 89(B), the security chip is connected to an externally connected interface, peripheral equipment, and other elements via general purpose signal lines. The mode signal lines 8003 are not connected. Specific processing for the mode signal lines 8003 includes connecting these lines 8003 to ground, increasing the voltage on these lines to Vcc, cutting them, sealing them with an insulator resin, etc. Such processing hinders the mode signal lines 8003 in the security chip from being accessed after shipment, thereby preventing data from being externally read out from the chip or written thereto.

Figure 90:
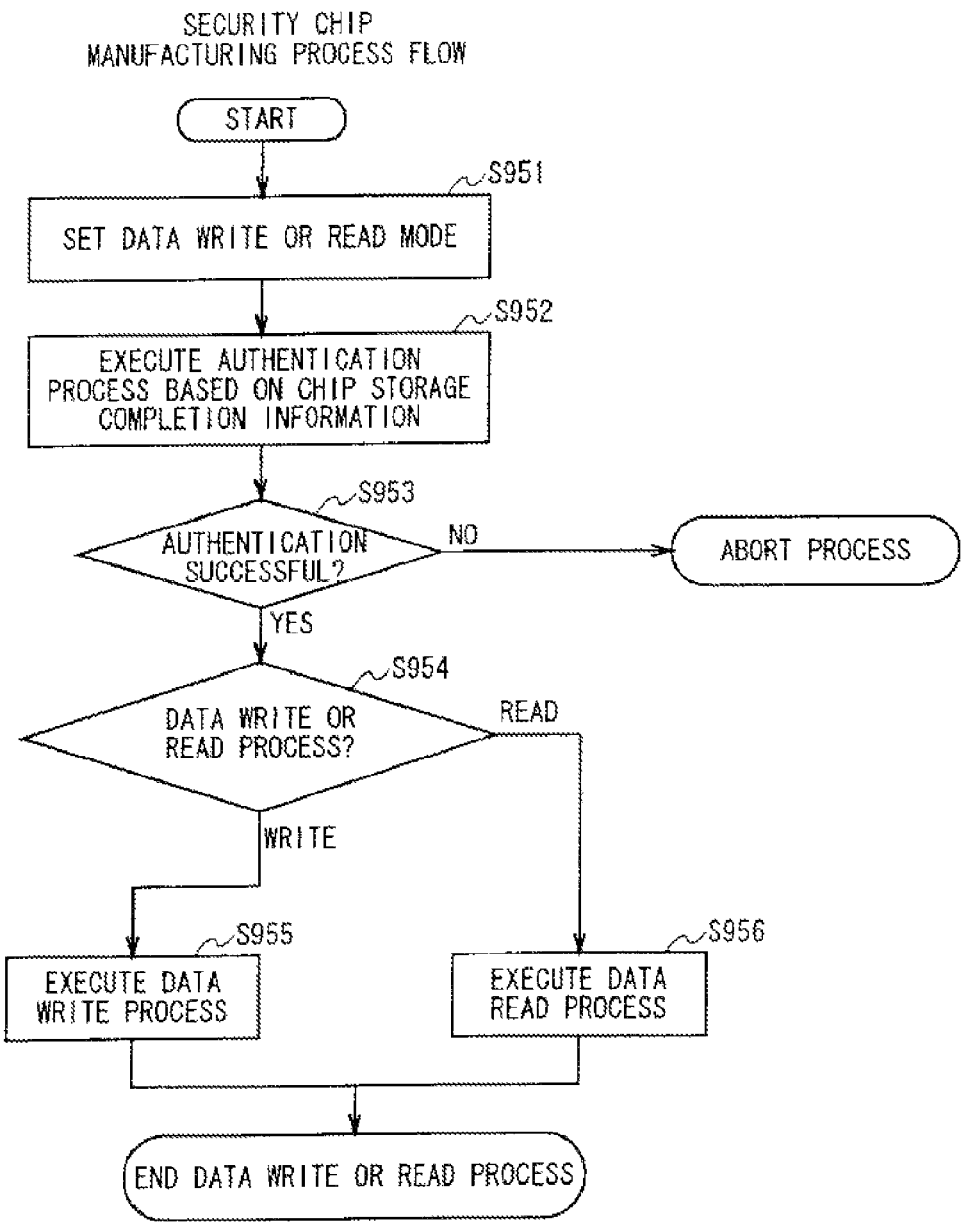
FIG. 90 is a view showing a process flow for a method for manufacturing a security chip.

Further, the security chip 8000 of this configuration hinders data from being written to the storage section 8002 while hindering written data from being read out therefrom, thereby preventing invalid data writes or reads even if a third person successfully accesses the mode signal lines 8003. FIG. 90 shows a process flow of a data write to, or a data read from, the security chip of this configuration.

At step S951, the mode signal lines 8003 are set for a data write or read mode.

At step S952, authentication information is taken out from the chip. The security chip of this configuration stores information required for the authentication process, such as a password and key information for the authentication process for the cryptography technique, for example, by wires or the mask ROM configuration. At step S952, this authentication information is read out to execute the authentication process. If, for example, a regular data write jig and data read device are connected to the general purpose signal lines to execute the authentication process, the authentication will be successful (Yes at step S953). If, however, an invalid data write jig and data read device are connected to the general purpose signal lines to execute the authentication process, the authentication will fail (No at step S953), and the process is stopped. The authentication process can be executed, for example, in accordance with the mutual authentication process procedure previously described in FIG. 13. The process section 8001, shown in FIG. 89(A), has a configuration capable of such an authentication process. This can be implemented, for example, using a configuration similar to a command register integrated into the control section 403 of the cryptography process section 401 of the recording device 400 (shown in the previously described FIG. 29). For example, the process section of the chip in FIG. 89(A) has a configuration similar to the command register, integrated into the control section 403 of the cryptography process section 401 of the recording device 400 shown in FIG. 29. It carries out an appropriate process to enable the authentication process sequence to be executed in response to an input of a predetermined command from an apparatus connected to the various command signal lines 8004.

The process section 8001 accepts the data write or read command to execute the data write (step S955) or read (step S956) process only if the authentication process is successful.

As described above, the security chip of this configuration is configured to execute the authentication process on a data write or read, thereby preventing an unauthorized third person from reading or writing data to or from the storage section of the security chip.

Figure 91:
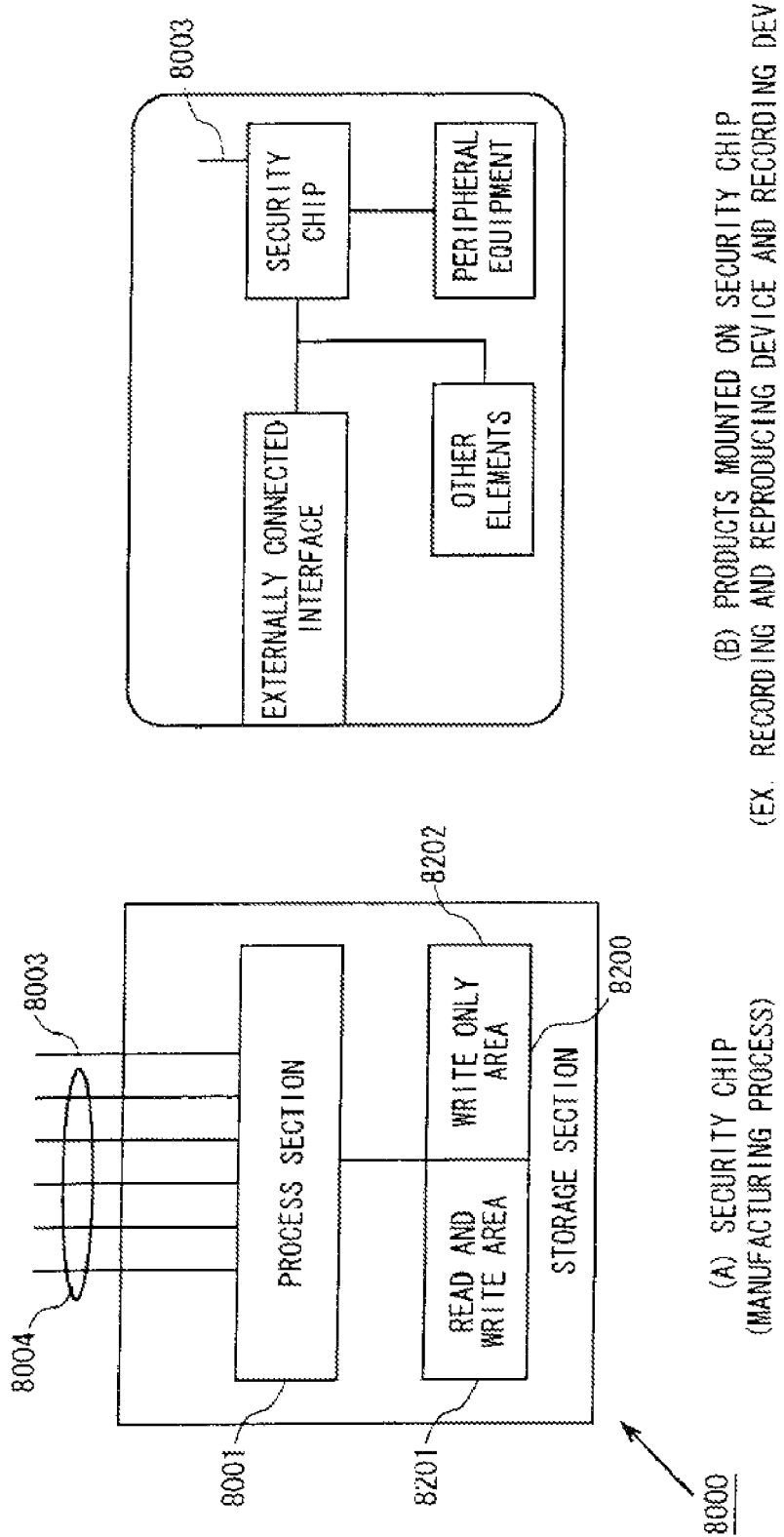
FIG. 91 is a view illustrating the configuration of the security chip (example 2).

FIG. 91 shows an embodiment of a securer element configuration. In this example, the storage section 8200 of the security chip is separated into two areas. One of the areas is a Read Write (RW) area 8201, which data can be written and read to and from. The other section is a Write Only (WO) area 8202 which data can only be written to.

In this configuration, cryptography key data, ID data, and other data which require high security are written to the Write Only area 8202, whereas integrity check data and other data which do not require so high security are written to the Read Write area 8201.

As a process for reading data out from the Read Write (RW) area 8201, the process section 8001 executes a data read process involving the authentication process described in the above described FIG. 90. The data write process, however, is executed following the flow in FIG. 92.

Figure 92:
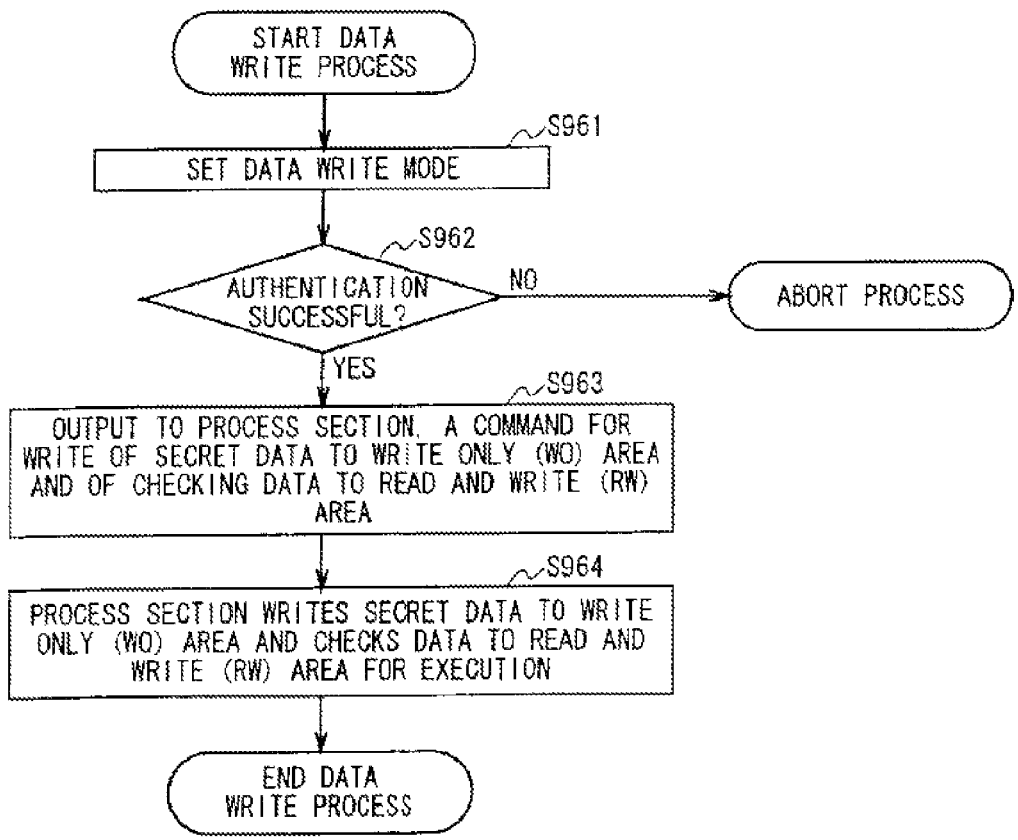
FIG. 92 is a view showing a flow of a process for writing data in the security chip (example 2).

At step S961 in FIG. 92, the mode signal lines 8003 are set for the write mode. At step S962, an authentication process, similar to that described in the above FIG. 90, is executed. When the authentication process is successful, the process proceeds to step S963 to output to the process section 8001, a command for writing information such as key data which requires high security to the Write Only (WO) area 8202 via the command signal lines 8004, while writing check data or other data, which do not require as high a security, to the Read Write (RW) area 8201.

On receiving the command, the process section 8001 executes a data write process at step S964. This is done on the Write Only (WO) area 8202 or the Read Write (RO) area 8201, depending on the command.

Figure 93:
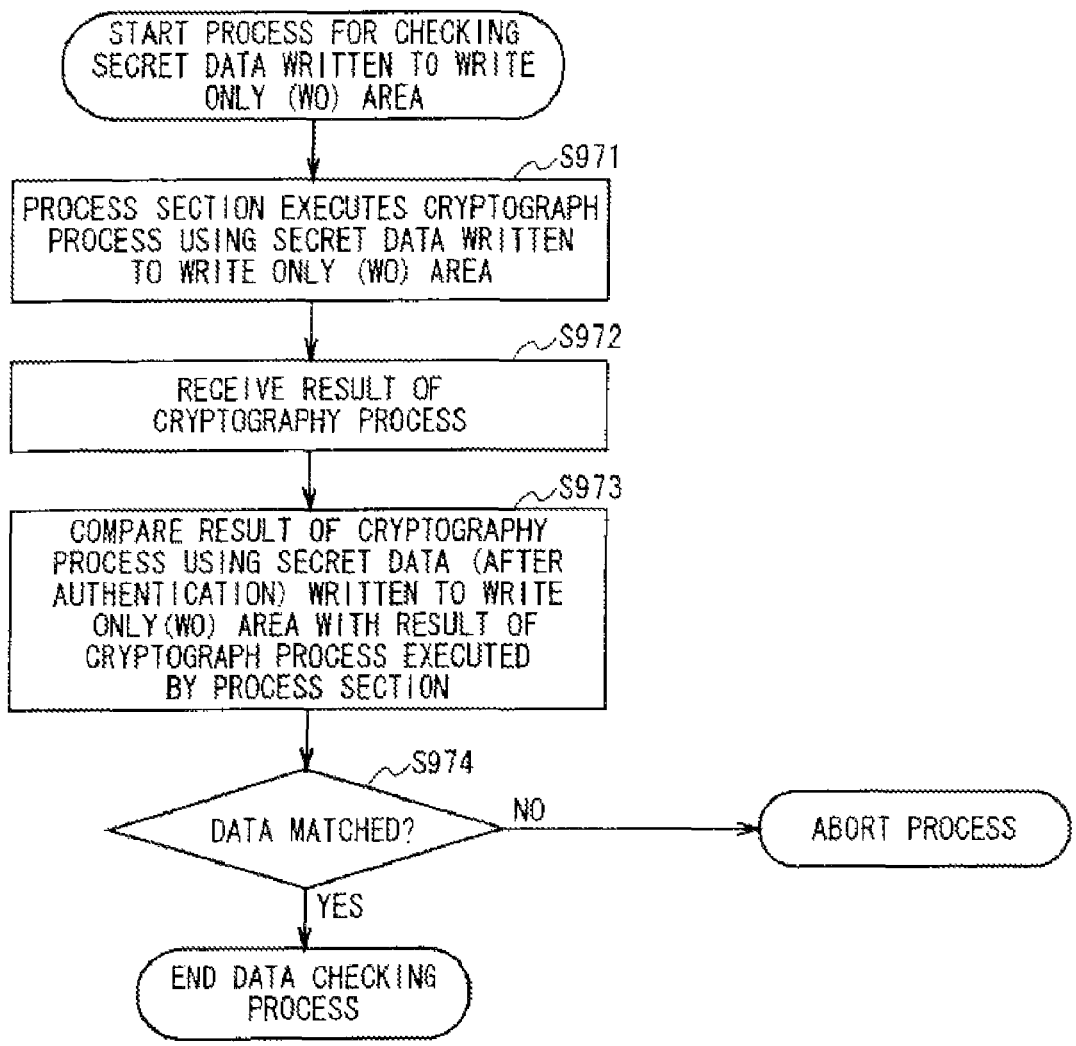
FIG. 93 is a view showing a flow of a process for checking written data in the security chip (example 2).

In addition, FIG. 93 shows a process for verifying data written to the Write Only (WO) area 8202.

At step S971 in FIG. 93, the process section 8001 causes the Write Only (WO) area 8202 to execute the cryptography process based on the written data. Like the above authentication process executing configuration, this execution configuration is implemented by a configuration for sequentially executing the cryptography process sequence stored in the command register. Additionally, the cryptography process algorithm executed in the process section 8001 is not particularly limited. For example, the previously described DES algorithm can be carried out.

Then at step S972, a verification device (connected to the security chip) receives the result of the cryptography process from the process section 8001. Then at step S973, the result of the application of a cryptography process (similar to the algorithm executed by the process section 8001) on the regular write data written to the storage section at step S973 is compared with the result of encryption from the process section 8001.

If the compared results are identical, it is verified that the data written to the Write Only (WO) area 8202 is correct.

With this configuration, if the authentication process should be deciphered to enable the read command to be executed, data can be read out only from the Read Write (RW) area 8201, while data written to the Write Only (WO) area 8202 cannot be read out. Thus this configuration provides much higher security. In addition, unlike chips that prohibit data reads, this chip includes the Read Write (RW) area 8201 to enable memory accesses to be validated.

This invention has been described with reference to the particular embodiments. Obviously, however, modifications or substitutions may be made to the present invention by those skilled in the art without deviating from the spirits thereof. That is, the present invention has been disclosed for illustrative purposes only and should not be interpreted in a restrictive manner. In addition, in the above described embodiments, the recording and reproducing device, capable of recording and reproducing content, is described by way of example. However, the configuration of the present invention is applicable to apparatuses capable of either recording or reproducing data. The present invention can be implemented in personal computers, game apparatuses, and other various data processing apparatuses in general.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A data processing system comprising:
a recording and reproducing apparatus having a processing section configured to receive a command identifier and encrypted data from an external apparatus; and
a recording apparatus configured to be installed in and removed from the recording and reproducing apparatus, the recording apparatus having an encryption processing section for executing encryption processing on the encrypted data transmitted to and from said recording and reproducing apparatus, said encryption processing section including a control section operable to receive said command identifier in accordance with a pre-defined setting sequence, to retrieve a command from a register based on said command identifier, and to have said command executed on the encrypted data, said recording apparatus further including a command register for storing said command in accordance with said pre-defined setting sequence, wherein when said command identifier differs from said pre-defined setting sequence, said control section is operable to cancel execution of said command, said pre-defined setting sequence being a command number setting sequence in which numbers are sequentially incremented; and
a sequence set such that an authentication command identifier corresponding to a authentication processing command sequence is executed prior to a command sequence corresponding to an encryption processing command sequence for executing said encryption processing, said encryption key processing command sequence including encryption key exchange processing for encryption data stored in a storage unit in said recording apparatus, the authentication processing command sequence executing authentication processing between said recording and reproducing apparatus and said recording apparatus; and wherein said control section is operable to manage an order of command execution based on said pre-defined setting sequence and said command identifier in said encryption key exchange processing, and said control section does not accept command processing from an external apparatus, including said recording and reproducing apparatus, during command execution relating to said encryption key exchange processing when said command processing is different from said pre-defined setting sequence.

2. The data processing system according to claim 1, wherein:

and said control section is operable to store a value of said command identifier received from said recording and reproducing apparatus in a memory and to compare a new command identifier received from said recording and reproducing apparatus with said pre-defined setting sequence based on said received value stored in said memory.

3. The data processing system according to claim 1, wherein:

when authentication is established between said first apparatus and said recording apparatus, said control section is operable to:

set an authentication flag indicating that said authentication processing is finished, execute command management control to enable execution of said encryption processing command sequence during setting of said authentication flag, and reset said authentication flag when repeating said authentication processing command sequence.

4. The data processing system according to claim 1, wherein:

said recording apparatus has a data storage section for storing said encryption data;

said recording and reproducing apparatus is configured to store data in a storage section of said recording apparatus, and the recording and reproducing apparatus is configured for retrieving said data stored in said storage section to reproduce and execute said data; and said recording and reproducing apparatus further includes an encryption processing section for executing said encryption processing of transmitted data with said storage section.

5. The data processing system according to claim 4, wherein:

said recording apparatus includes a key block for storing an authentication key and a storing key, said authentication key being usable in authentication processing between said recording and reproducing apparatus and said recording apparatus, and said storing key being usable as an encryption key for said encryption data stored in said storage section; and said control section is operable to receive a command identifier from said recording and reproducing apparatus, to execute authentication processing using said authentication key in accordance with said pre-defined setting sequence, and, after completing said authentication processing, to execute said encryption processing of data accompanying key exchange processing using said storing key.

6. The data processing system according to claim 5, wherein:

said key block includes a plurality of key blocks each storing said authentication key and said storing key, said authentication key being different from said storing key; and said recording and reproducing apparatus is operable to notify said recording apparatus of one key block as a designated key block out of said plurality of key blocks, said designated key block being used in said authentication processing and said encryption processing; and said recording apparatus is operable to execute said authentication processing using said authentication key stored in said designated key block and to execute said encryption processing of said data using said storing key in said designated key block.

7. The data processing system according to claim 1, wherein the processing section further configured to, when the encrypted data is of a particular format, storing the encrypted data in the recording apparatus before the command is executed on the encrypted data.

8. The data processing system according to claim 1, wherein the external source includes a non-transitory recording medium.

9. The data processing system according to claim 1, wherein the external source is a device located at a different network location from both the recording and reproducing apparatus and the recording apparatus.

10. A recording device, comprising:

a data storage section operable to store content data that is transferable to an external apparatus; and an encryption processing section operable to execute encryption processing of transmission data with said external apparatus, said encryption processing section including a control section operable to receive a command identifier transferred from said external apparatus in accordance with a setting sequence, to retrieve a command from a register based on said command identifier, and to have said command executed, said control section further including a command number setting sequence in which numbers are sequentially incremented as said setting sequence;

wherein, when said command identifier differs from said setting sequence, said control section is operable to (1) cancel processing of said command and (2) not accept command processing from any external apparatus during command execution relating to an encryption key exchange processing for encrypting data stored in a storage unit in said recording device, when said command processing is different from said pre-defined setting sequence.

11. The recording device according to claim 10, further comprising:

a command register for storing said command in accordance with said setting sequence;

an authentication processing command sequence for executing authentication processing between said external apparatus and said recording device;

an encryption processing command sequence for executing said encryption processing relating to transferred data between said external apparatus and said recording device; and a sequence set such that said command identifier corresponding to said authentication processing command sequence is executed prior to a command sequence corresponding to said encryption processing command sequence.

12. The recording device according to claim 11, wherein said encryption processing command sequence includes the encryption key exchange processing for encryption data stored in a storage unit in said recording device.

13. The recording device according to claim 11, wherein:
said control section is further operable to set an authentication flag, to execute command management control, and to reset said authentication flag when repeating said authentication processing command sequence;
when authentication is established between said external apparatus and said recording device, said authentication flag is set to indicate that said authentication processing is finished; and
said command management control enables execution of said encryption processing command sequence during setting of said authentication flag.

14. The recording device according to claim 12, wherein:
said control section is operable to manage an order of command execution based on said setting sequence and said command identifier in said encryption key exchange processing; and
said control section does not accept command processing from said external apparatus during said command execution relating to said encryption key exchange processing when said command processing is different from said setting sequence.

15. The recording device according to claim 10, further comprising:
a key block for storing an authentication key and a storing key, said authentication key being usable in authentication processing between said external apparatus and said recording device, and said storing key being usable as an encryption key for said data stored in said data storage section;
wherein control section is operable to receive said command identifier from said external apparatus, to execute said authentication processing using said authentication key, and after completing said authentication processing, to execute said encryption processing of data accompanying key exchange processing using said storing key.

16. The recording device according to claim 15, wherein:
said key block includes a plurality of key blocks, each storing said authentication key and said storing key;
said external apparatus is operable to notify said recording device of one key block out of said plurality of key blocks, said one key block being a designated key block used in authentication processing and encryption processing of selected data; and
said recording device is operable to execute said authentication processing using said authentication key stored in said designated key block to execute said encryption processing using said storing key in said designated key block.

17. A data processing method in a data processing system having a first apparatus and a second apparatus operable to transmit encryption data to each other, said method comprising:
executing command processing control in said second apparatus for receiving a command identifier in accordance with a setting sequence, said command identifier being transferred from said first apparatus;
retrieving, from a register, a command based on said command identifier;
processing said command; and
when said command identifier is different from said setting sequence, canceling said processing of said command and not accepting command processing from any external apparatus during command execution relating to an encryption key exchange processing for encrypting data stored in a storage unit in said recording device;
wherein said setting sequence is a command number setting sequence in which numbers are sequentially incremented.

18. The data processing method according to claim 17, said command processing control including:
executing an authentication processing command sequence for executing authentication processing between said first apparatus and said second apparatus; and
executing an encryption processing command sequence for executing encryption processing relating to transferred data between said first apparatus and said second apparatus;
wherein said setting sequence is a sequence for executing said authentication processing command sequence prior to said encryption processing command sequence.

19. The data processing method according to claim 18, wherein said encryption processing command sequence includes encryption key exchange processing for encryption data stored in a storage unit in said second apparatus.

20. The data processing method according to claim 18, further including:
when authentication is established between said first apparatus and said second apparatus, setting an authentication flag indicating that said authentication processing is finished; and
executing command management control during said command processing control to enable execution of said encryption processing command sequence when setting said authentication flag.

21. The data processing method according to claim 20, further including resetting said authentication flag when executing a new authentication processing command sequence.

22. The data processing method according to claim 19, wherein said command processing control includes:
during processing of a series of commands relating to said encryption key exchange processing, managing an order of command processing based on said setting sequence and said command identifier; and
not accepting command processing from an external apparatus when said command processing is different from said setting sequence.

23. A non-transitory recording medium recorded with a computer program for executing data processing having certain actions in a data processing system that includes a first apparatus and a second apparatus operable to transmit encryption data to each other, said actions comprising:
receiving a command identifier that is transferred from said first apparatus to said second apparatus in accordance with a setting sequence, said setting sequence being a command number setting sequence in which numbers are sequentially incremented;
retrieving, from a register, a command based on said command identifier;
processing said command; and
when said command identifier is different from said setting sequence, canceling said processing of said command and not accepting command processing from any external apparatus during command execution relating to an encryption key exchange processing for encrypting data stored in a storage unit in said recording device.

* * * * *

UNITED STATES PATENT AND TRADEMARK OFFICE
CERTIFICATE OF CORRECTION

PATENT NO.        : 8,375,206 B2                       Page 1 of 1
APPLICATION NO.   : 12/709918
DATED             : February 12, 2013
INVENTOR(S)       : Tomoyuki Asano et al.

It is certified that error appears in the above-identified patent and that said Letters Patent is hereby corrected as shown below:

In The Specification

Col. 30, Line 31, "(10)" should read -- "(10) --.

In The Claims

Col. 111, Claim 2, Line 17, delete "and" from first line.
Col. 112, Claim 7, Line 16, "section further" should read -- section is further --.
Col. 112, Claim 7, Line 17, "storing" should read -- store --.
Col. 113, Claim 15, Line 34, "wherein control" should read -- wherein said control --.

Signed and Sealed this
Tenth Day of February, 2015

Michelle K. Lee
*Deputy Director of the United States Patent and Trademark Office*